United States Patent
Nguyen

(10) Patent No.: US 10,889,472 B2
(45) Date of Patent: Jan. 12, 2021

(54) AUTO LOCK CABLE LIFTER

(71) Applicant: Nhon Hoa Nguyen, Bankstown (AU)

(72) Inventor: Nhon Hoa Nguyen, Bankstown (AU)

(*) Notice: Subject to any disclaimer, the term of this patent is extended or adjusted under 35 U.S.C. 154(b) by 0 days.

(21) Appl. No.: 16/593,716

(22) Filed: Oct. 4, 2019

(65) Prior Publication Data
US 2020/0109034 A1  Apr. 9, 2020

Related U.S. Application Data

(60) Provisional application No. 62/741,555, filed on Oct. 5, 2018.

(51) Int. Cl.
  *B66C 1/44* (2006.01)
  *B66C 1/48* (2006.01)
  *F16B 2/06* (2006.01)

(52) U.S. Cl.
  CPC .............. *B66C 1/44* (2013.01); *B66C 1/48* (2013.01); *F16B 2/06* (2013.01); *Y10S 294/901* (2013.01)

(58) Field of Classification Search
  CPC ........... B66C 1/422; B66C 1/44; B66C 1/442; B66C 1/48; Y10S 294/901; F16B 2/06; F16B 2/12
  USPC .............. 294/102.1, 110.2, 103.1, 901
  See application file for complete search history.

(56) References Cited

U.S. PATENT DOCUMENTS

| | | | | |
|---|---|---|---|---|
| 1,400,491 A * | 12/1921 | Mechling | ................ | E21B 19/12 24/136 B |
| 2,360,602 A * | 10/1944 | Waldrup | ................... | B66C 1/48 294/104 |
| 2,387,408 A * | 10/1945 | Pertuit | ...................... | B66C 1/48 294/102.1 |
| 2,550,424 A * | 4/1951 | Penn | ........................ | B66C 1/48 294/103.1 |
| 2,629,627 A * | 2/1953 | Stone | ...................... | B66C 1/422 294/110.1 |
| 3,388,942 A * | 6/1968 | Borje | ..................... | G21C 19/10 294/95 |
| 3,508,780 A * | 4/1970 | Bartman | ................. | B66C 1/422 294/110.1 |
| 5,893,595 A * | 4/1999 | Corbett | ..................... | B66C 1/48 294/102.1 |
| 6,322,120 B1 * | 11/2001 | Carey | ..................... | B66C 1/422 294/110.2 |
| 7,156,436 B2 * | 1/2007 | Nguyen | .................. | B66C 1/442 294/102.1 |
| 7,290,816 B2 * | 11/2007 | Migliori | ................ | B23K 37/04 294/103.1 |
| 7,490,882 B2 * | 2/2009 | Nguyen | ..................... | B66C 1/48 294/102.1 |
| 2019/0144245 A1 * | 5/2019 | Corbett | ..................... | B66C 1/48 294/104 |

* cited by examiner

*Primary Examiner* — Dean J Kramer
(74) *Attorney, Agent, or Firm* — Tue Nguyen

(57) ABSTRACT

A clamping device includes a rotatable element disposed between a jaw and a jaw support. The rotatable element has a slanting surface, interfacing a roller, and thus is configured to push the jaw toward an opposite jaw of the clamping device when rolling in a clamping direction. An auto lock mechanism is included in the clamping device, which can secure the rotating element for keeping the jaws separated. The auto lock mechanism can be activated or deactivated when the jaws are separated at a maximum or near maximum separation.

17 Claims, 56 Drawing Sheets

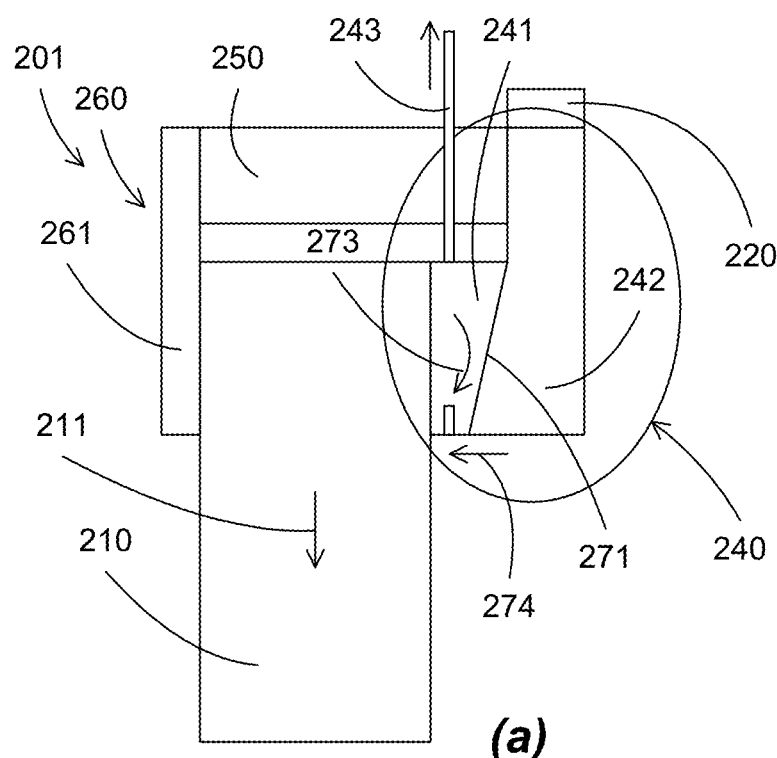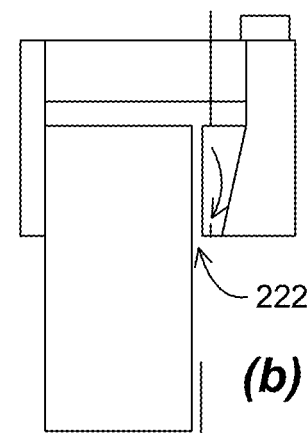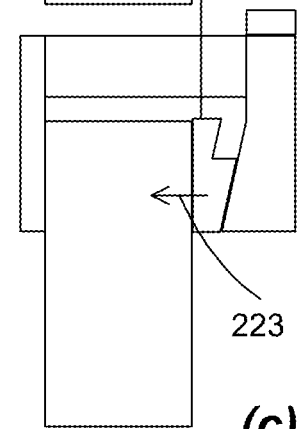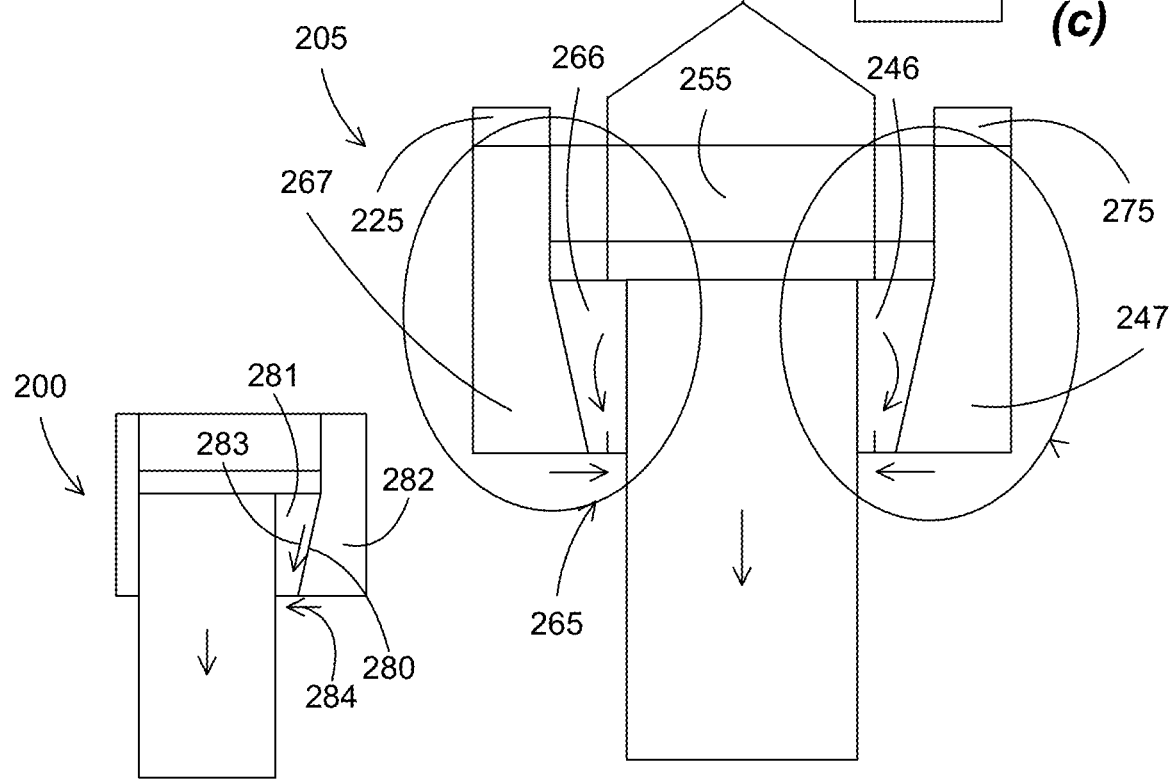
FIG. 2A  FIG. 2B  FIG. 2C

Forming a clamping device, wherein the clamping device comprises a jaw and a jaw support, wherein the jaw and the jaw support is coupled with a slanting angle, wherein the slanting angle is configured so that when an element of the clamping device is lifted up, the jaw moves toward an object
300

*FIG. 3A*

Forming a clamping device, wherein the clamping device comprises a clamp bar, a first jaw fixedly coupled to the clamp bar, and a jaw support assembly movably fixedly coupled to the clamp bar, wherein the jaw support assembly comprises a second jaw and a jaw support, wherein the second jaw and the jaw support is coupled with a slanting angle, wherein the slanting angle is configured so that when the slanting angle moves, the second jaw moves toward an object supported between the first and second jaw for keeping the object in place
320

*FIG. 3B*

Placing an object between a first jaw and a second jaw of a clamping device, wherein the second jaw is coupled to a jaw support with a slanting angle, wherein the slanting angle is configured so that when an element of the clamping device is lifted up or the slanting angle moves, the object makes the second jaw moving toward the object for keeping the object in place
340

Lifting the element of the clamping device to move the object
350

*FIG. 3C*

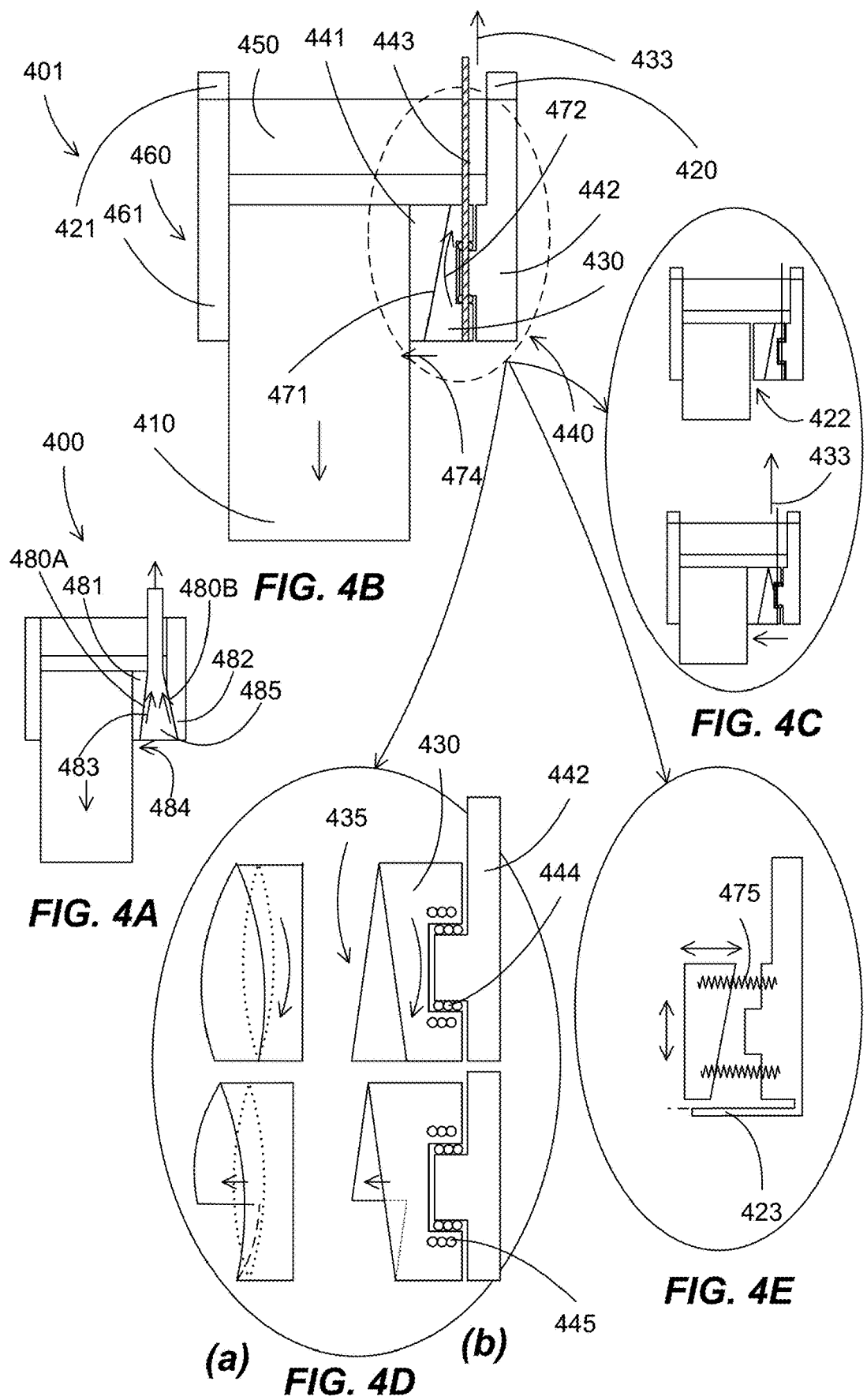

Forming a clamping device, wherein the clamping device comprises a first jaw fixedly coupled to a clamp bar, and a second jaw assembly movably and fixedly coupled to the clamp bar, wherein the second jaw assembly comprises a second jaw and a jaw support, together with a pulling element having a pullable component coupled to either the second jaw or the jaw support, wherein there is at least a slanting interface coupling between the pulling element and the second jaw or between the pulling element and the jaw support, wherein the slanting interface is configured so that when the pullable component moves up, the second jaw moves toward an object for keeping the object in place
500

FIG. 5A

Placing an object between a first jaw and a second jaw of a clamping device, wherein the second jaw is part of a jaw assembly, wherein the jaw assembly further comprises a jaw support and a pulling element having a pullable component coupled to either the second jaw or the jaw support, wherein there is at least a slanting interface coupling between the pulling element and the second jaw or between the pulling element and the jaw support
520

↓

Optionally locking the jaw assembly so that the object is disposed between the first jaw and the second jaw
530

↓

Lifting the pullable component which moves the second jaw toward the object, since the slanting interface is configured so that when the pulling element moves up, the second jaw moves toward the object
540

FIG. 5B

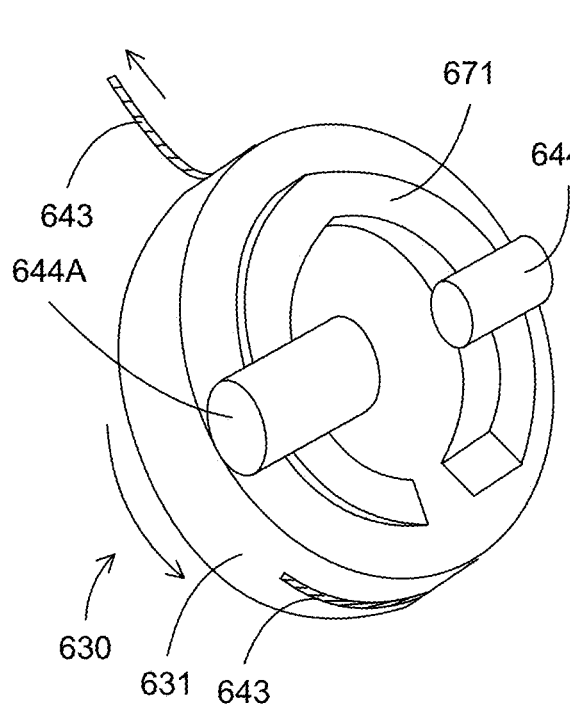
FIG. 6A
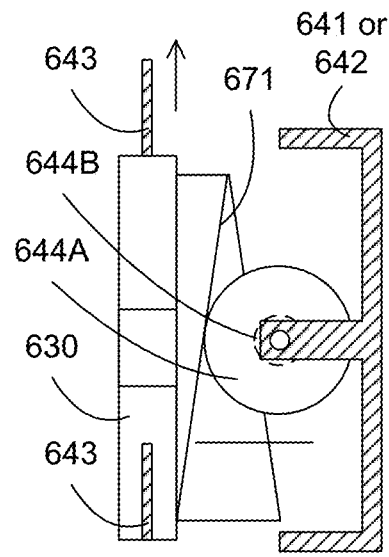
FIG. 6B
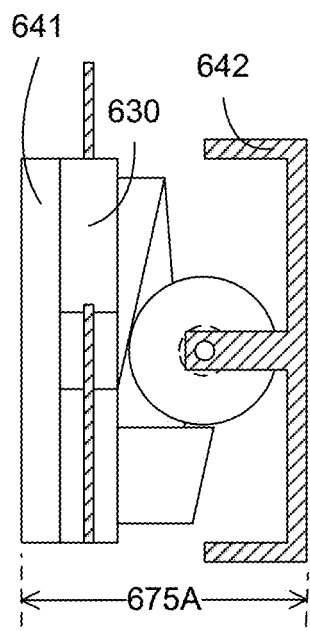
(a)
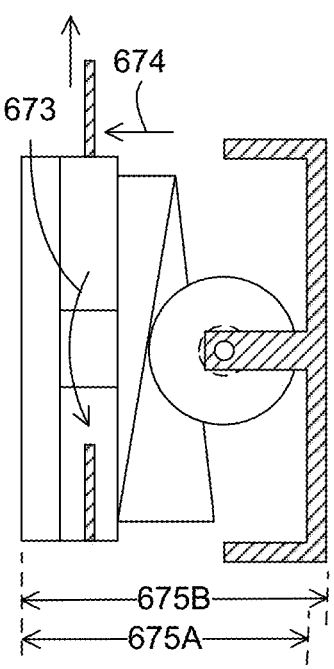
(b)
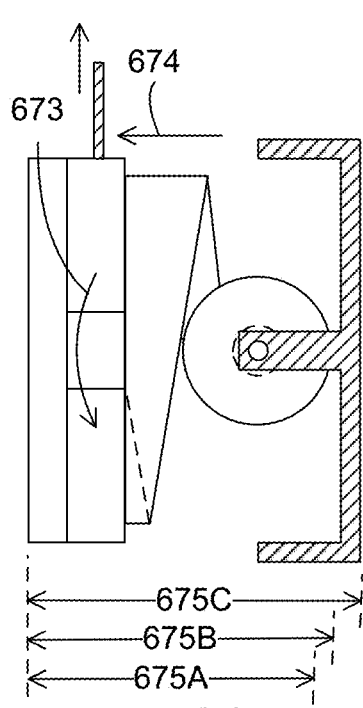
(c)
FIG. 6C

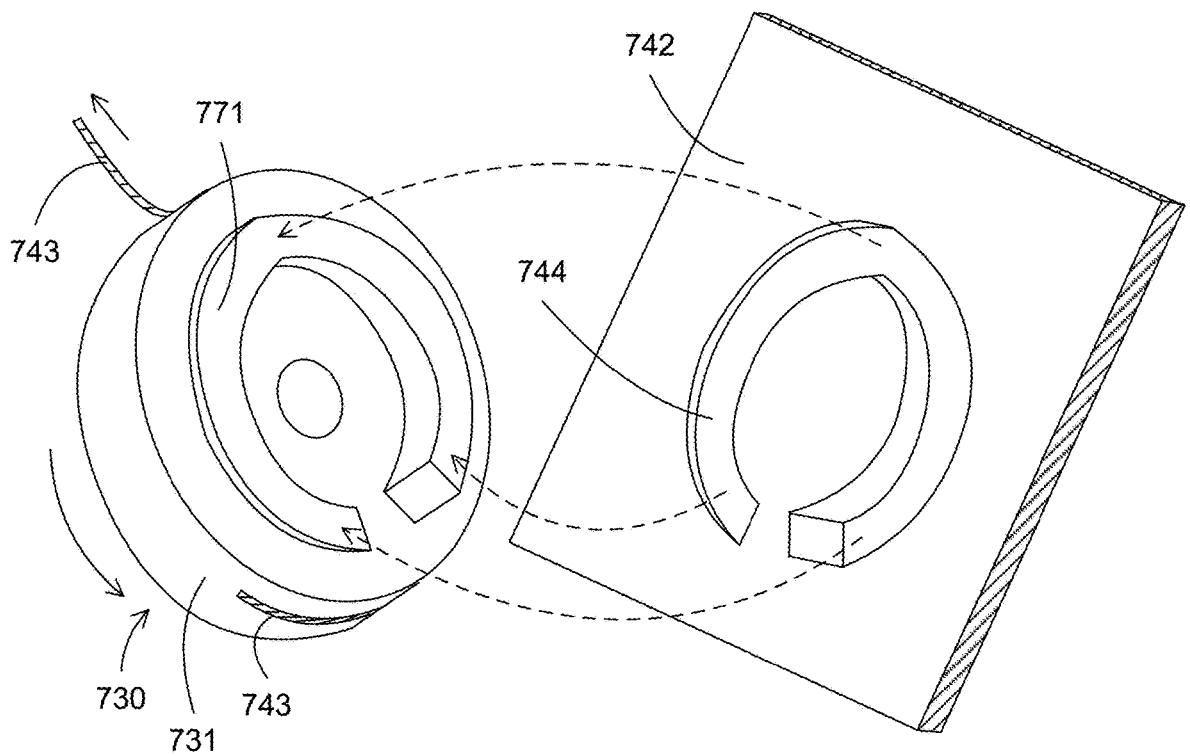
FIG. 7A FIG. 7B
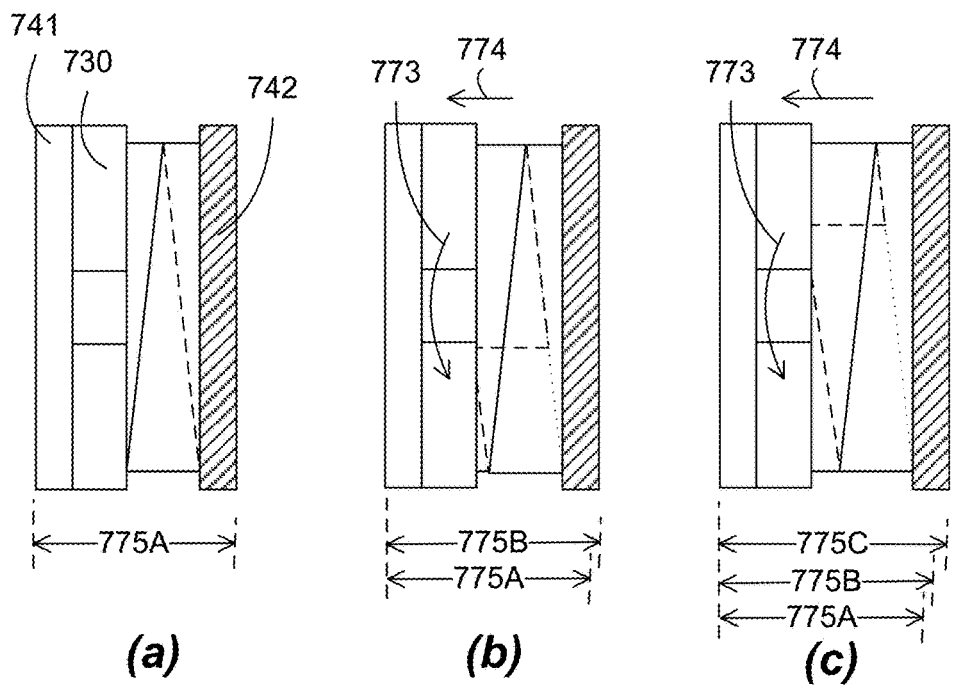
FIG. 7C

(a)   (b)   (c)

Forming a clamping device, wherein the clamping device comprises a rotatable component coupled to a jaw support, wherein the rotatable component or the jaw support comprises a slanting interface, wherein the slanting interface is configured so that when the rotatable component rotates, the rotatable component moves relative to the jaw support in a direction along an axis of rotation
1000

*FIG. 10A*

Forming a clamping device, wherein the clamping device comprises a rotatable component coupled to a jaw support, wherein the rotatable component comprises a slanting surface interfacing a roller coupled to the jaw support, wherein the interface is configured so that when the rotatable component rotates, the roller rolls on the slanting surface in such a way to move the rotatable component relative to the jaw support in a direction along an axis of rotation
1020

*FIG. 10B*

Forming a clamping device, wherein the clamping device comprises a rotatable component coupled to a jaw support, wherein the rotatable component comprises a slanting surface interfacing a mating surface of the jaw support, wherein the interface is configured so that when the rotatable component rotates, the slanting surface moves on the mating surface in such a way to move the rotatable component relative to the jaw support in a direction along an axis of rotation
1040

*FIG. 10C*

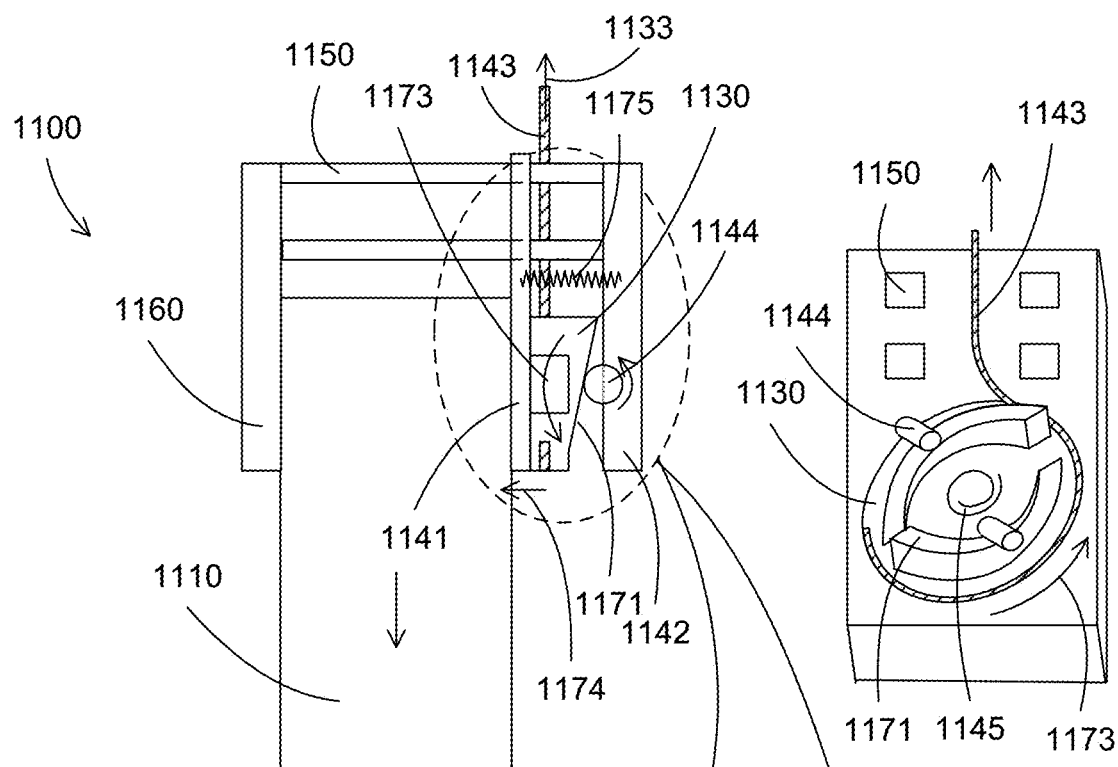
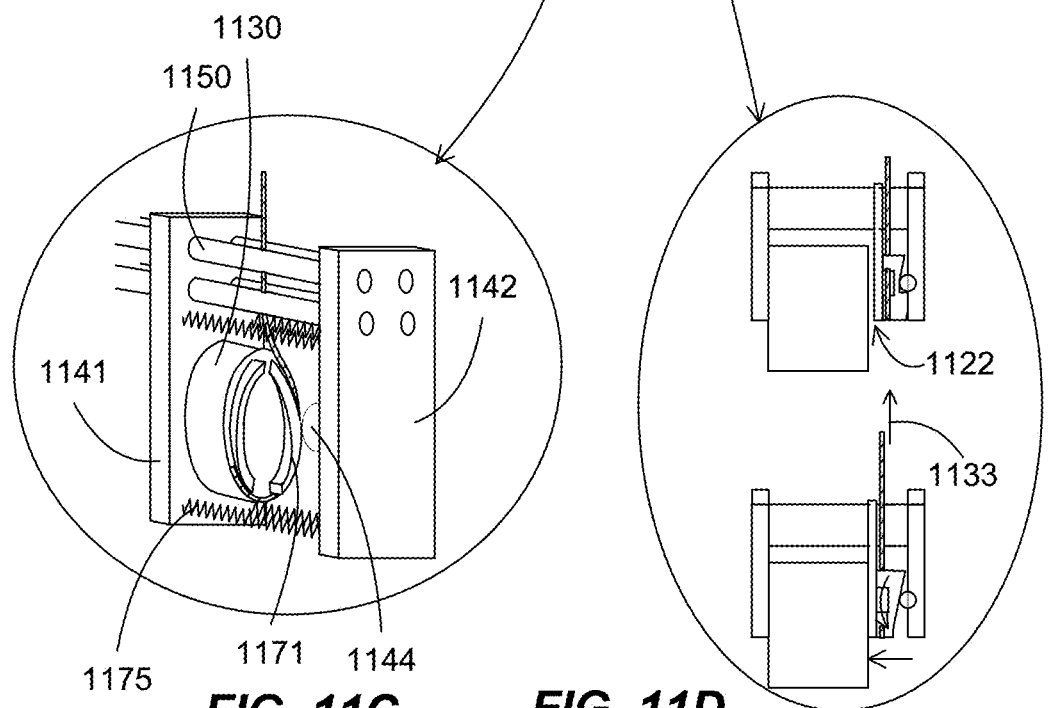
FIG. 11A  FIG. 11B  FIG. 11C  FIG. 11D

Forming a clamping device, wherein the clamping device comprises a first jaw fixedly coupled to a clamp bar, and a second jaw assembly coupled to the clamp bar, wherein the second jaw assembly comprises a second jaw and a jaw support, wherein the second jaw assembly comprises a rotatable component comprising a slanting interface and a pulling component coupled to the rotatable component, wherein the pulling component is configured to rotate the rotatable component, wherein the slanting interface is configured so that when the pulling component moves up, the distance between the second jaw and the jaw support increases
1200

*FIG. 12A*

Placing an object between a first jaw and a second jaw of a clamping device, wherein the second jaw is part of a jaw assembly, wherein the jaw assembly further comprises a jaw support and a pulling element having a pulling component disposed between the second jaw and the jaw support, wherein there is at least a slanting interface coupling between the pulling element and the second jaw or between the pulling element and the jaw support
1220

Optionally locking the jaw assembly so that the object is disposed between the first jaw and the second jaw
1230

Lifting the pulling component which moves the second jaw toward the object, since the slanting interface is configured so that when the pulling element moves up, the second jaw moves toward the object
1240

*FIG. 12B*

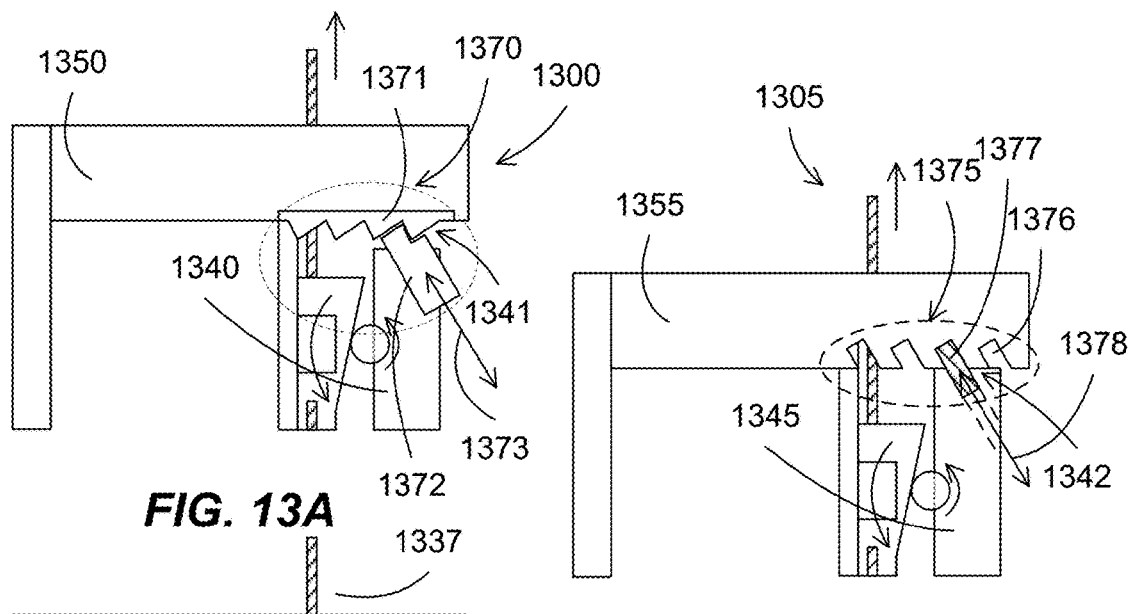
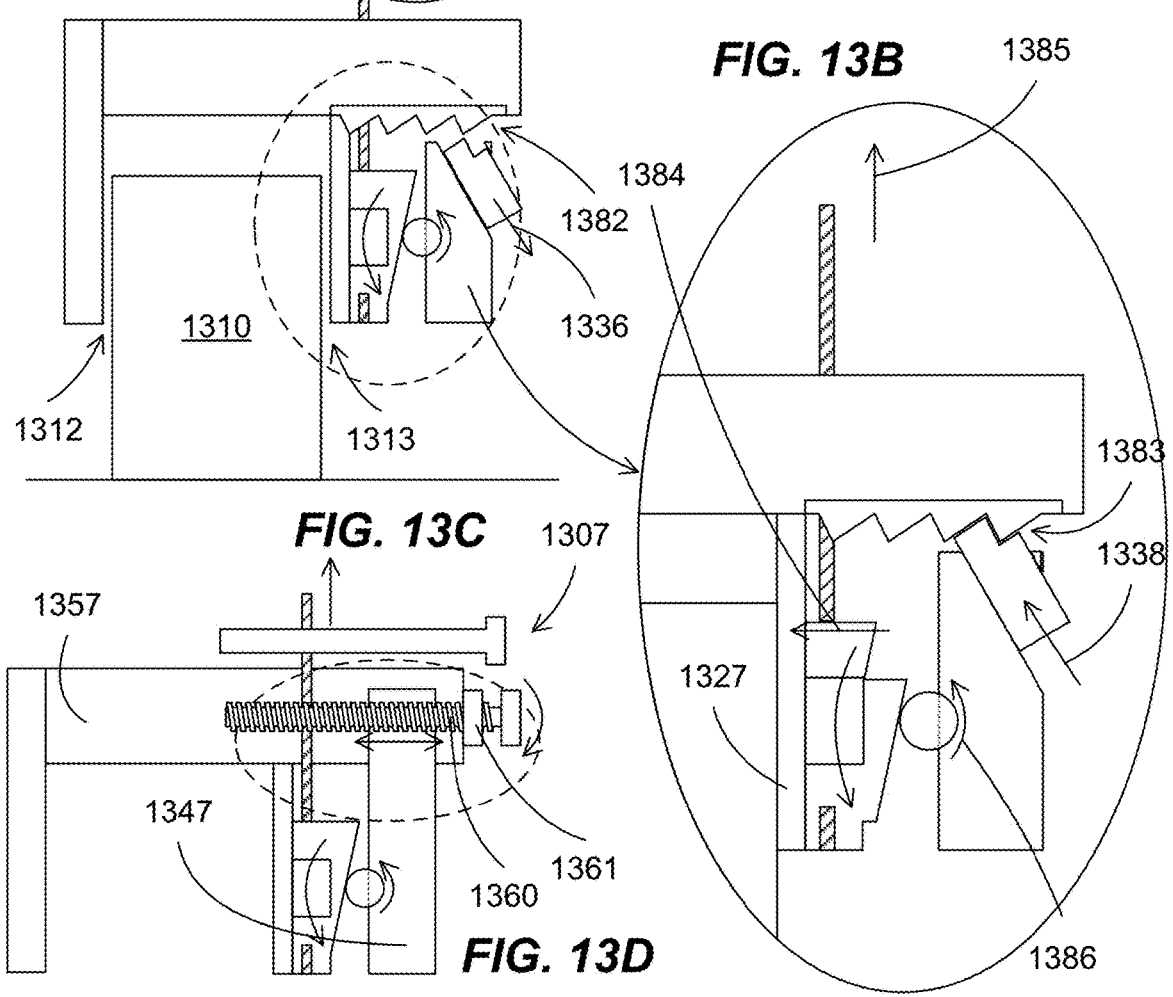
FIG. 13A
FIG. 13B
FIG. 13C
FIG. 13D

Forming a clamping device, wherein the clamping device comprises a first jaw fixedly coupled to a clamp bar, and a second jaw assembly movably and fixedly coupled to the clamp bar, wherein the second jaw assembly comprises a locking mechanism for fixedly coupling the second jaw assembly to the clamp bar, wherein the locking mechanism is configured to secure the second jaw assembly to the clamp bar continuously or at discrete locations
1500

*FIG. 15A*

Placing an object between a first jaw and a second jaw of a clamping device, wherein the second jaw is part of a jaw assembly, wherein the jaw assembly further comprises a locking mechanism for securing the jaw assembly with respect to the first jaw, wherein the locking mechanism is configured to secure the jaw assembly at discrete locations
1520

Unlocking the locking mechanism to place an object between the first jaw and the second jaw
1530

Locking the locking mechanism at a location to achieve a minimum gap between the first and second jaws with the object
1540

Lifting the clamping device to secure the object between the first and second jaws
1550

Lifting the clamping device to move the object
1560

*FIG. 15B*

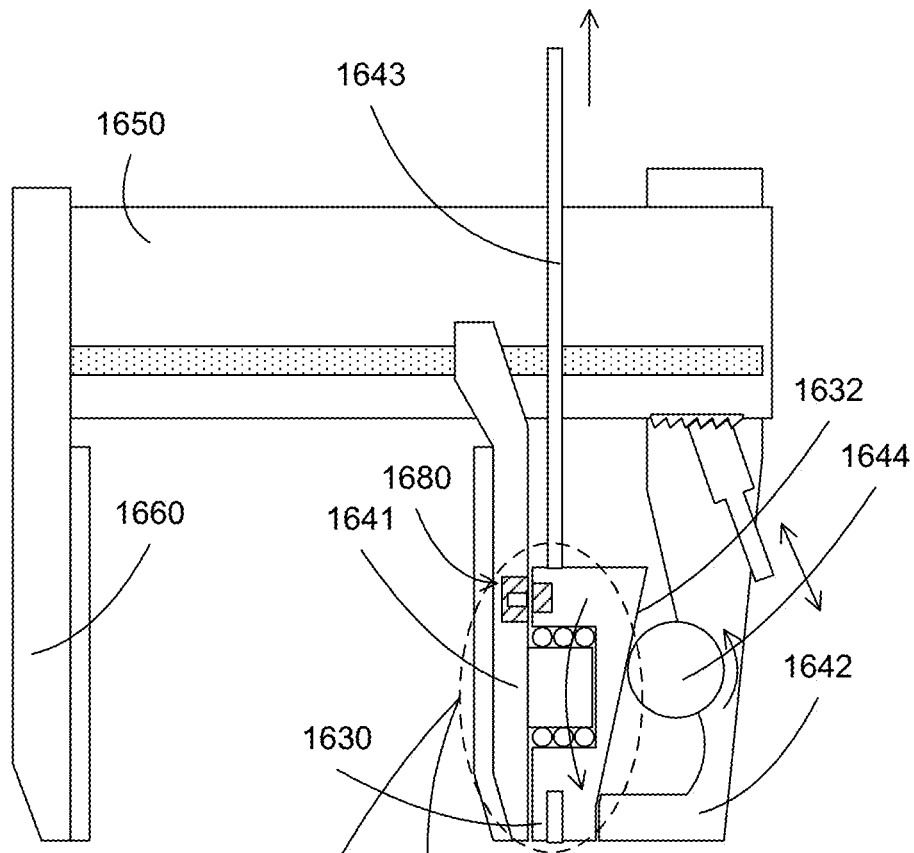
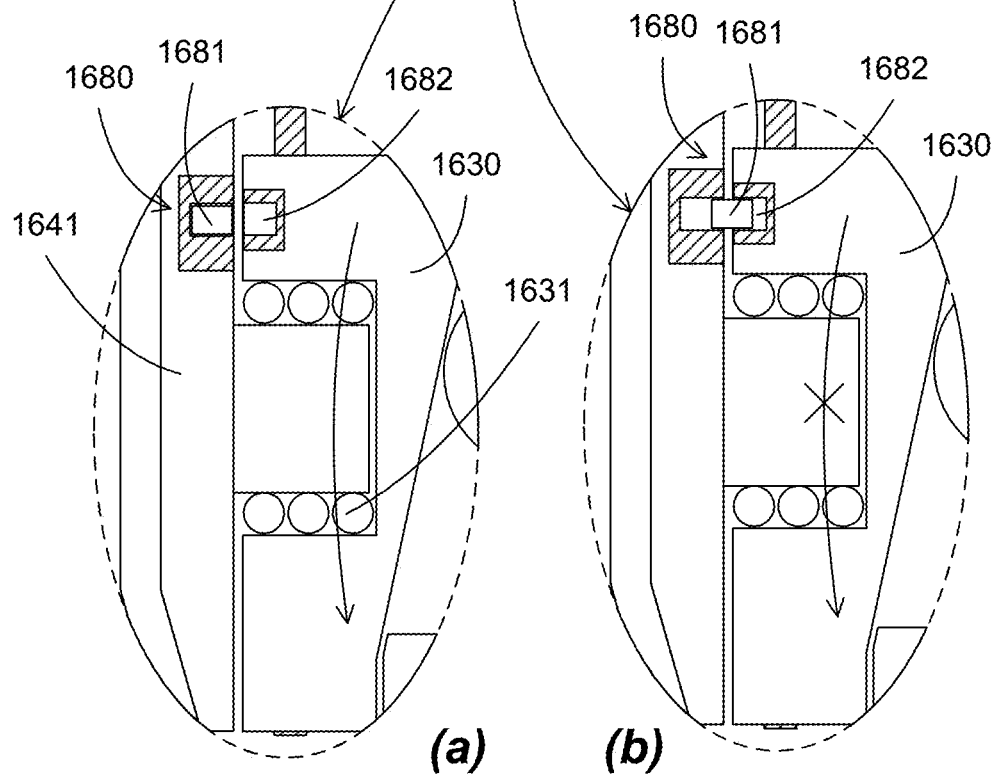
FIG. 16

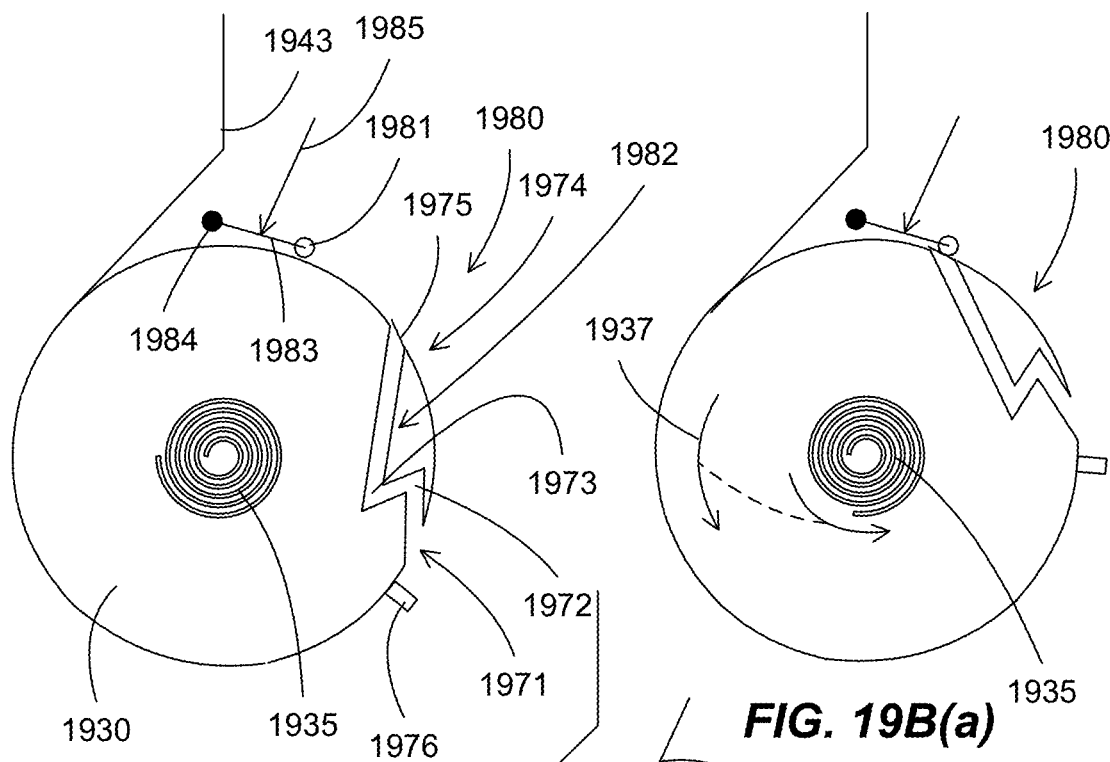
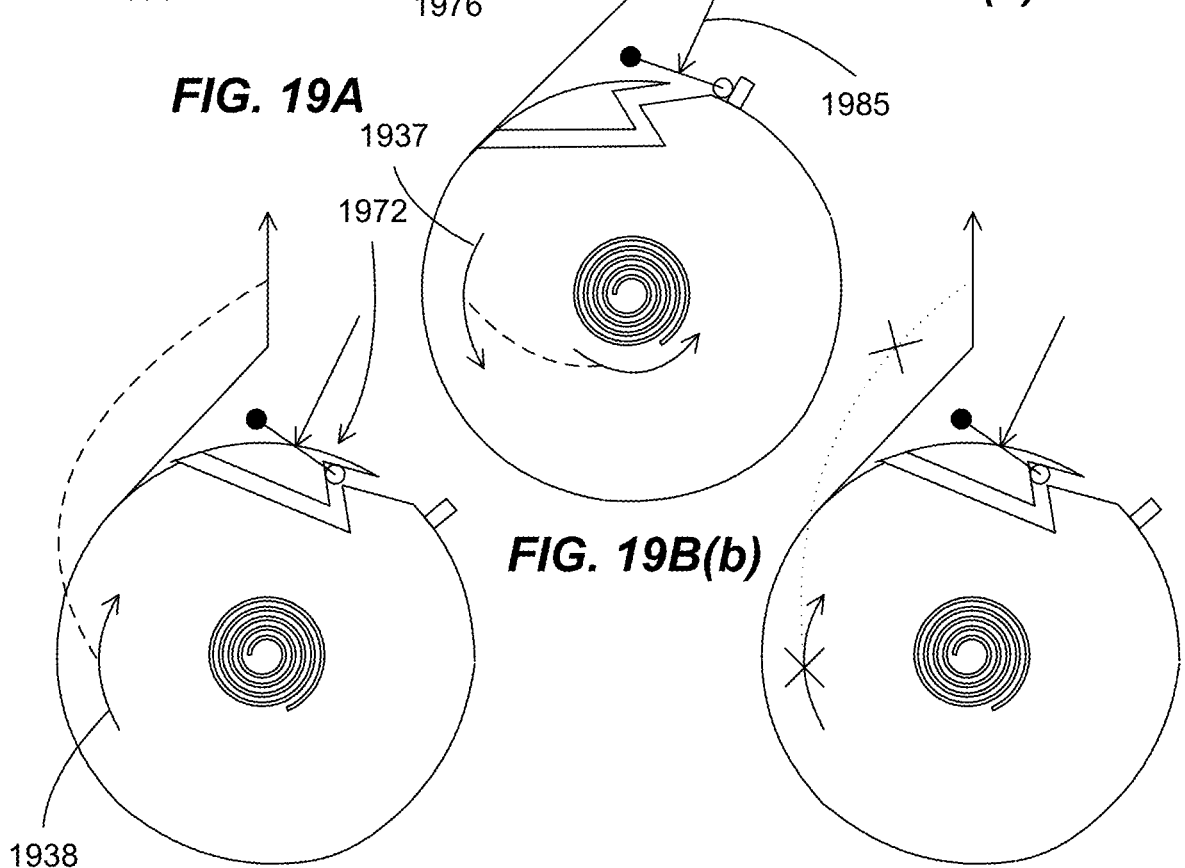
FIG. 19A
FIG. 19B(a)
FIG. 19B(b)
FIG. 19C
FIG. 19D

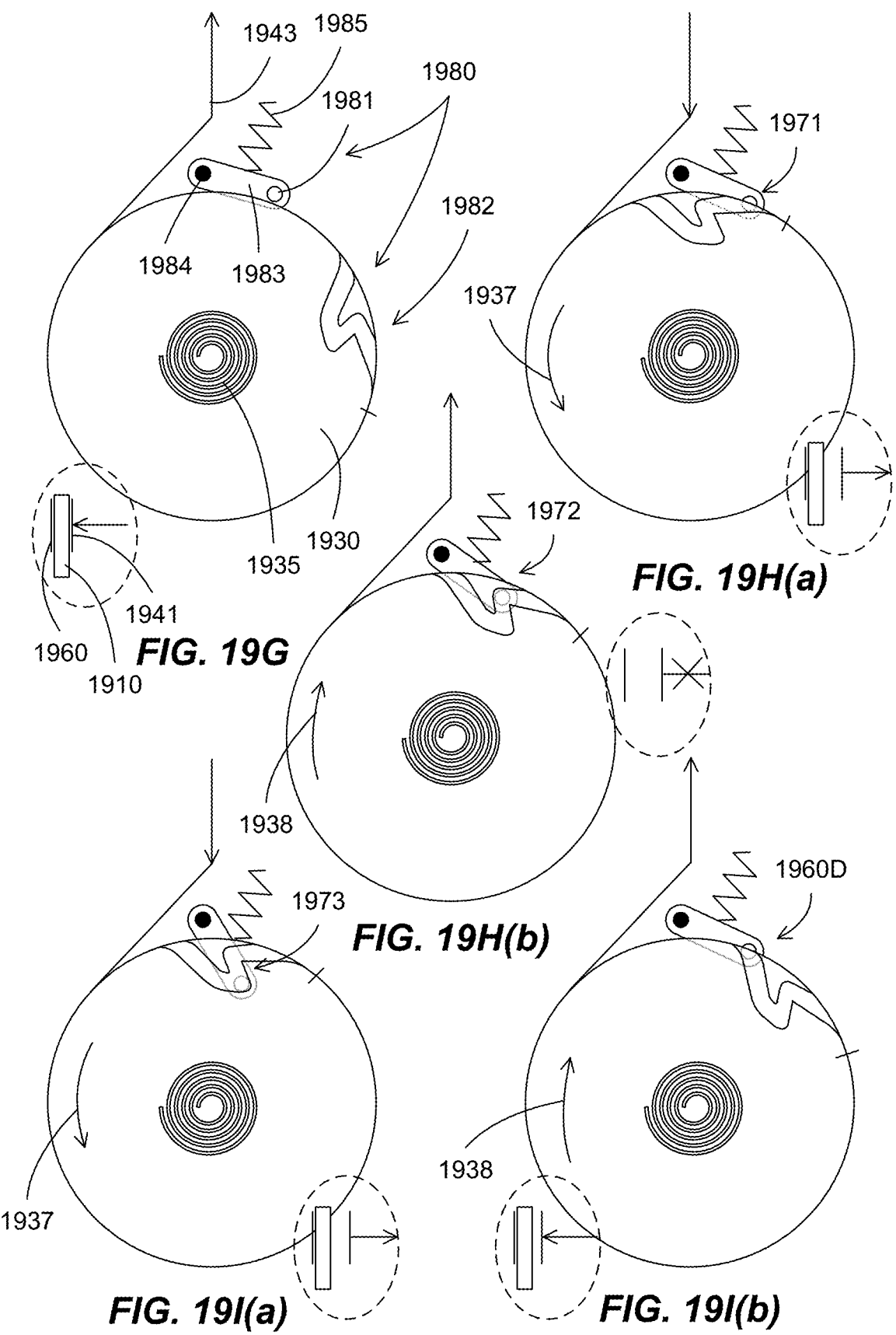

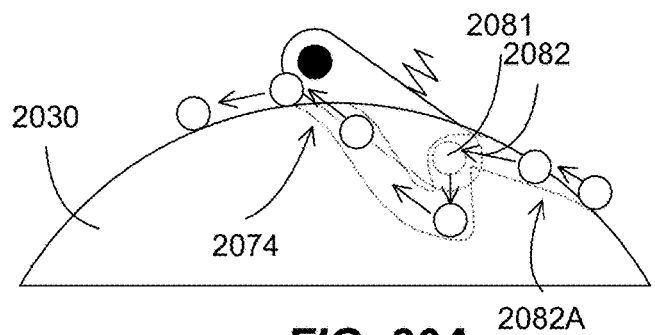
FIG. 20A
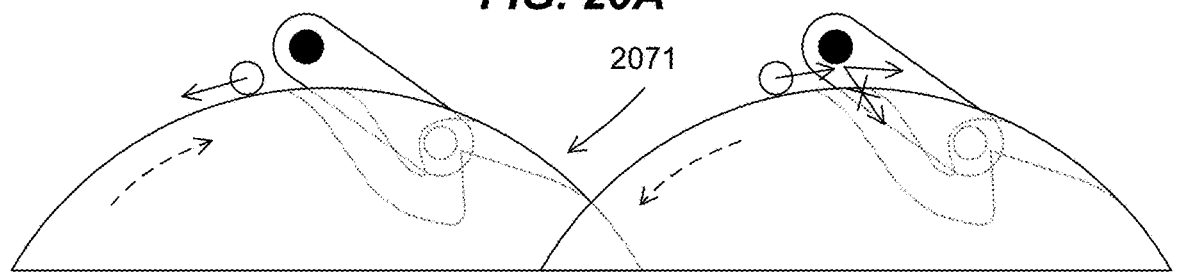
(a)     FIG. 20B     (b)
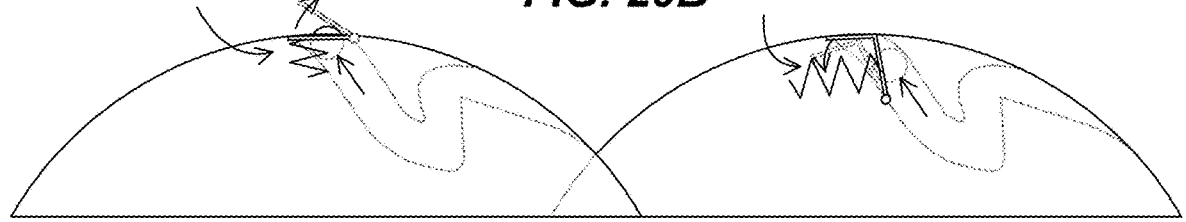
(a)     FIG. 20C     (b)
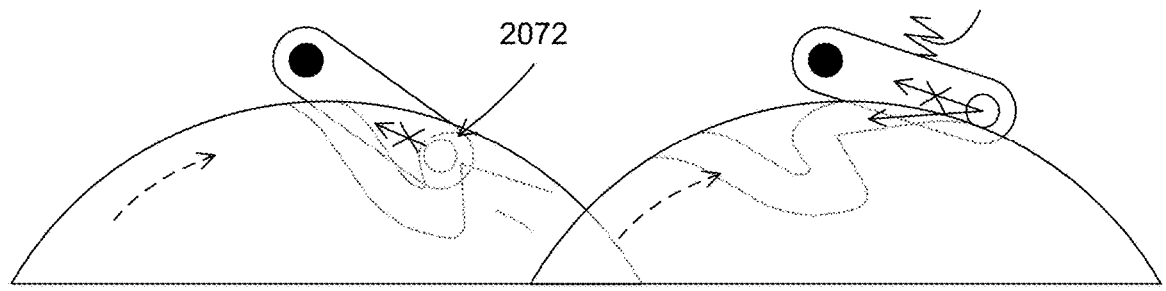
(a)     FIG. 20D     (b)
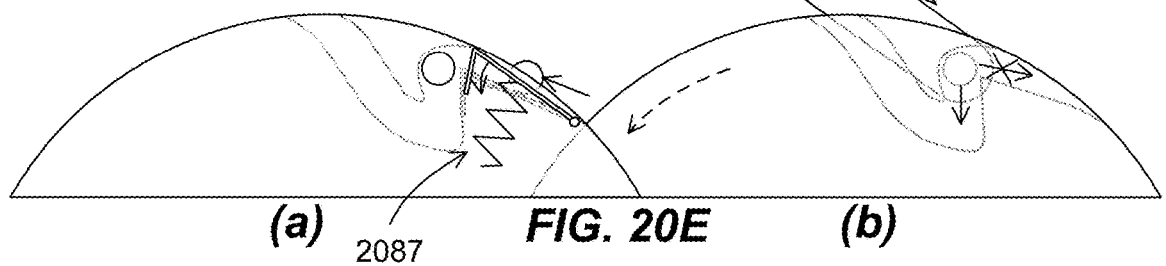
(a)     FIG. 20E     (b)

Toggling a locking mechanism of a clamping device by lowering and then raising a hoist coupled to the clamping device, wherein the locking mechanism comprises a locking position in which at least a jaw of two jaws of the clamping device is unmovable when the hoist is continued to be raised and an unlock position in which the jaw is movable toward the other jaw when the hoist is continued to be raised
2100

FIG. 21A

Lowering a hoist for moving a jaw of a clamping device
2120

Raising the hoist, wherein the jaw is toggled between being movable and being unmovable when the hoist is continued to be raised
2130

FIG. 21B

Lowering a hoist for moving a clamping mechanism in one direction, wherein the clamping mechanism causes a jaw of a clamping device to move
2150

Raising the hoist for moving the clamping mechanism in an opposite direction, wherein the clamping mechanism is toggled between the jaw being movable and the jaw being unmovable when the hoist is continued to be raised
2160

FIG. 21C

Lowering a hoist coupled to a clamping device, wherein the clamping device is lowered together with the hoist, wherein two jaws of the clamping device are separated at a distance
2200

Continuing lowering the hoist, wherein at least a jaw of the two jaws moves to increase the distance until the jaw reaches a position
2210

Raising the hoist to activate a toggling mechanism for securing the jaw
2220

Continuing raising the hoist
2230

FIG. 22A

Lowering a hoist coupled to a clamping device, wherein the clamping device is lowered together with the hoist
2240

Continuing lowering the hoist, wherein at least a jaw of two jaws of the clamping device moves to enlarge a distance between the two jaws
2250

Continuing lowering the hoist until the jaw reaches a position
2260

Raising the hoist to activate a toggling mechanism for securing the jaw
2270

Continuing raising the hoist
2280

FIG. 22B

Lowering a hoist coupled to a clamping device to contact an object, wherein the clamping device is configured to have two jaws fixedly separated, wherein the object is disposed between the two jaws
2300

↓

Continuing lowering the hoist to activate a toggling mechanism, wherein the toggling mechanism releases a lock that prevents at least one of the two jaws from moving
2310

↓

Lifting the hoist to activate a clamping mechanism that is configured to move the jaws together for clamping on the object
2320

↓

Continuing lifting the hoist to raise the clamping device and the object, wherein the object is secured between the two jaws due to the clamping mechanism
2330

*FIG. 23A*

Lowering a hoist coupled to a clamping device clamping on an object so that the object touch a surface, wherein the object is clamped between two jaws of the clamping device
2350

↓

Continuing lowering the hoist to enlarge a distance between the two jaws
2360

↓

Lifting the hoist to activate a toggling mechanism, wherein the toggling mechanism activates a lock that prevents at least one of the two jaws from moving
2370

↓

Lifting the hoist to raise the clamping device without the object, wherein the object is separated from the clamping device due to the distance between the two jaws larger than a dimension of the object
2380

*FIG. 23B*

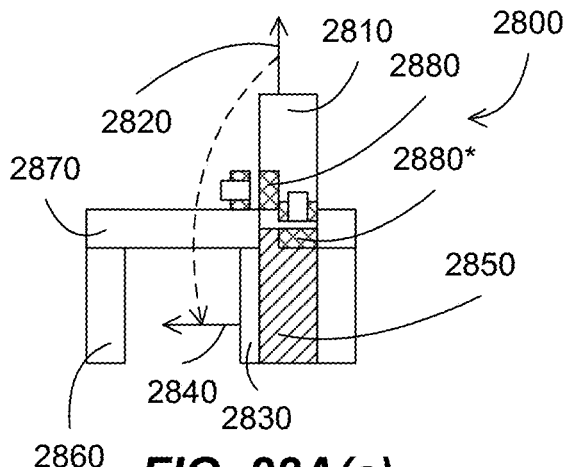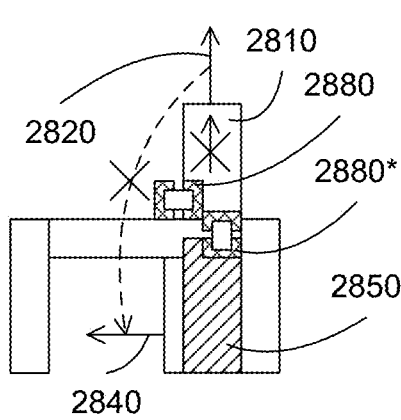
FIG. 28A(a)    FIG. 28A(b)
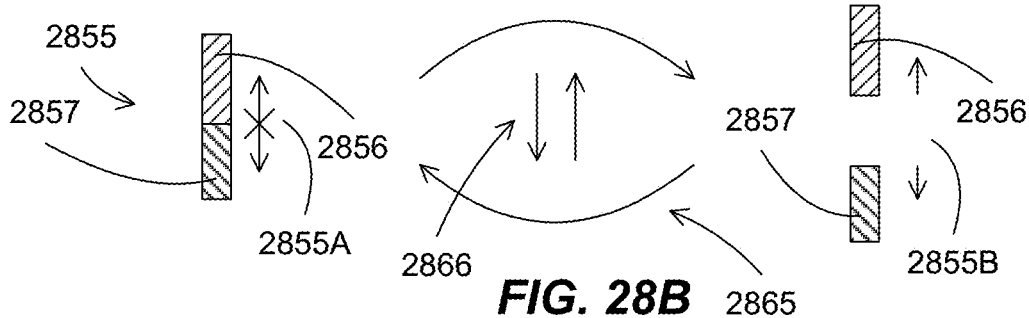
FIG. 28B
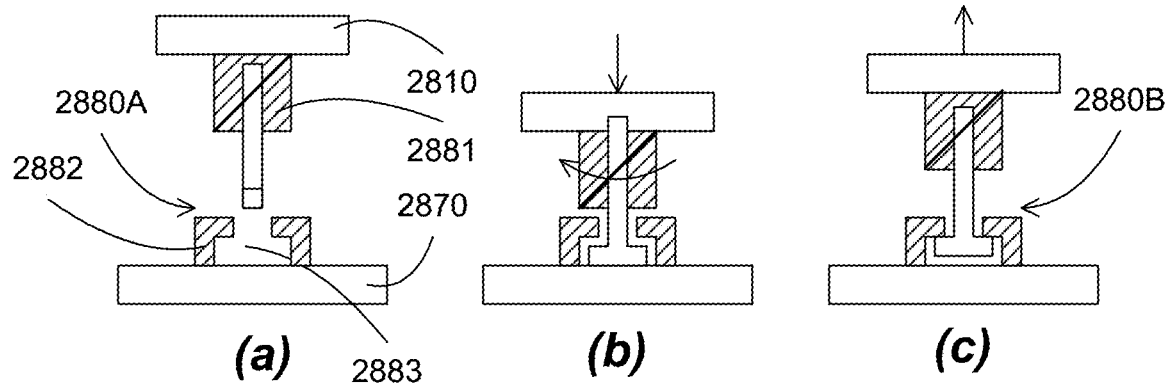
FIG. 28C
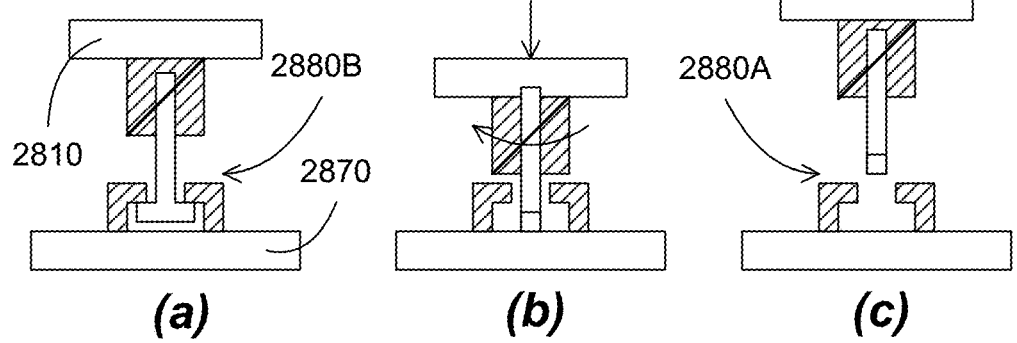
FIG. 28D

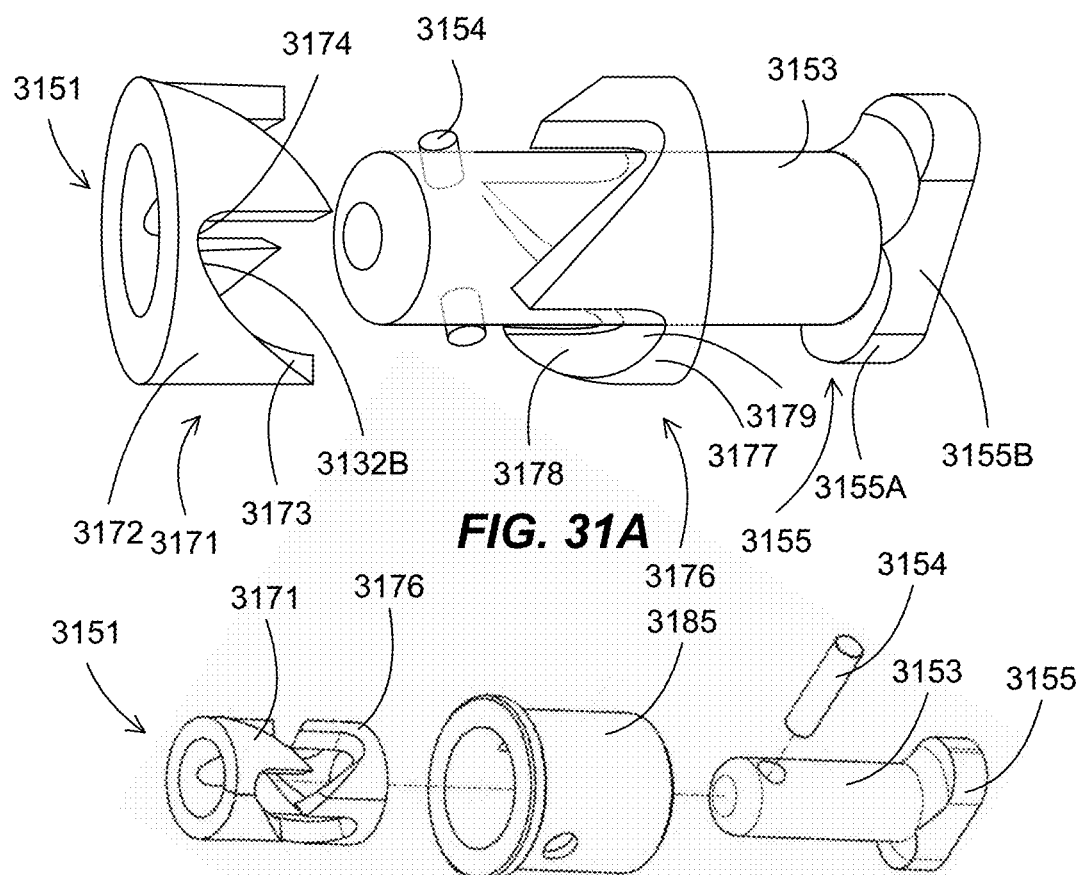
FIG. 31A
FIG. 31B
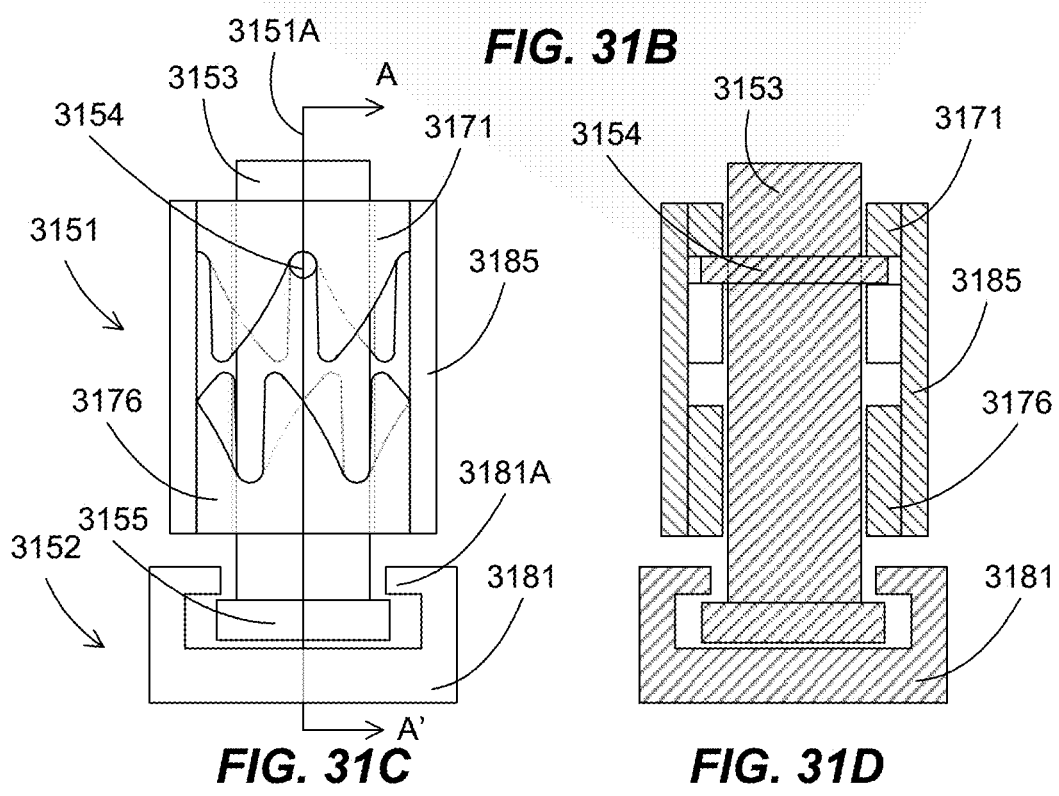
FIG. 31C   FIG. 31D

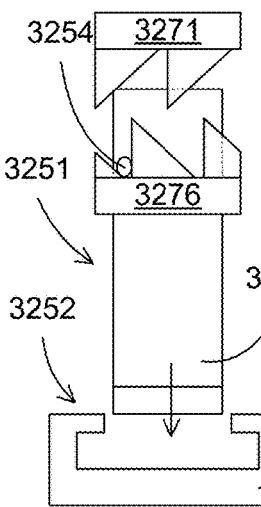
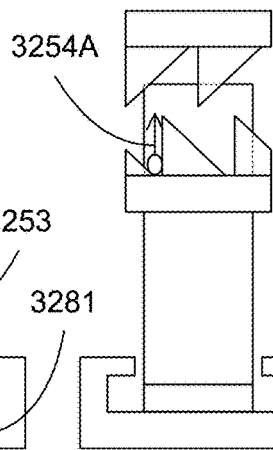
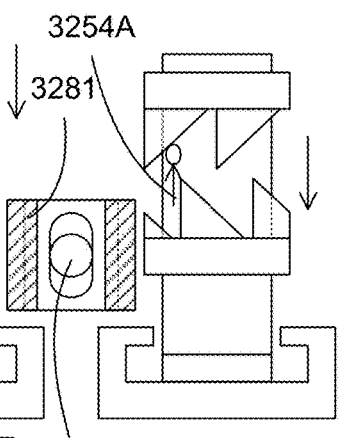
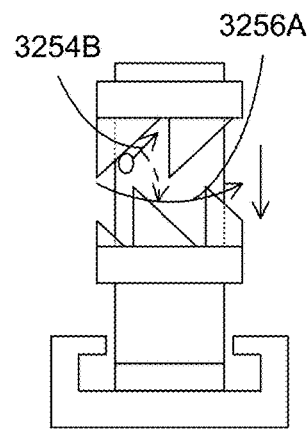
FIG. 32A    FIG. 32B    FIG. 32C    FIG. 32D
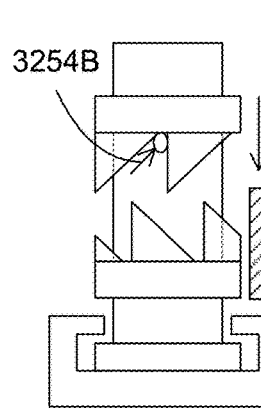
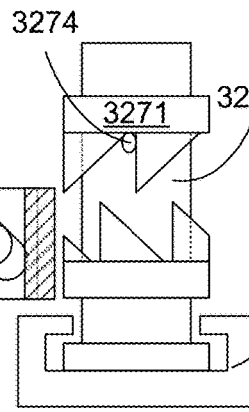
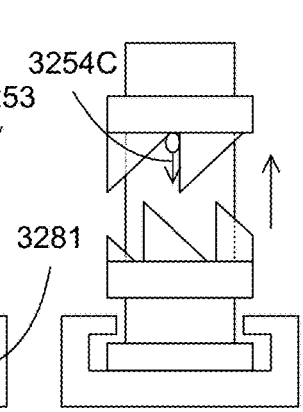
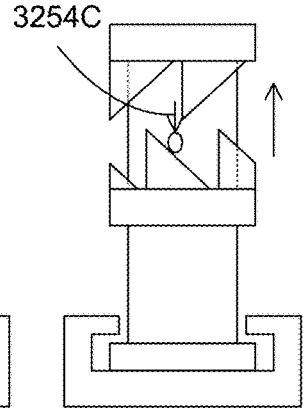
FIG. 32E    FIG. 32F    FIG. 32G    FIG. 32H
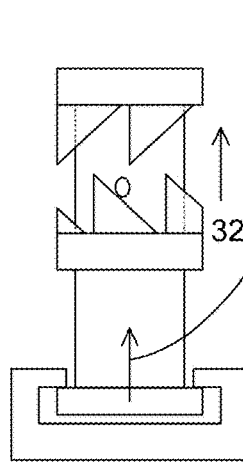
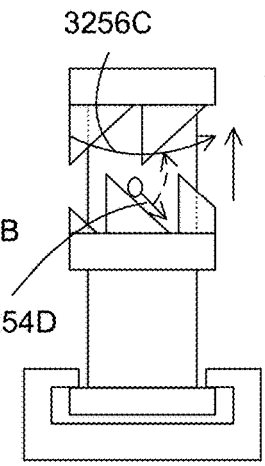
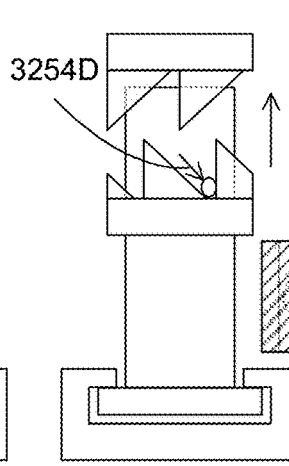
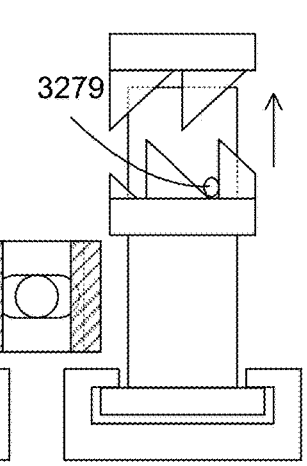
FIG. 32I    FIG. 32J    FIG. 32K    FIG. 32L

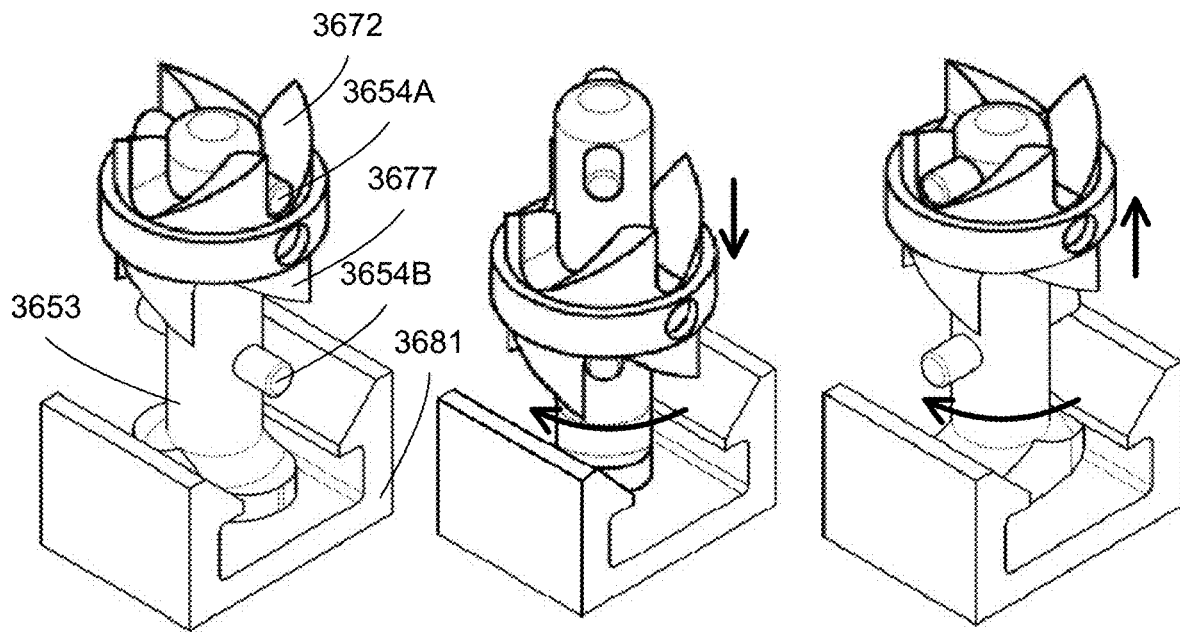
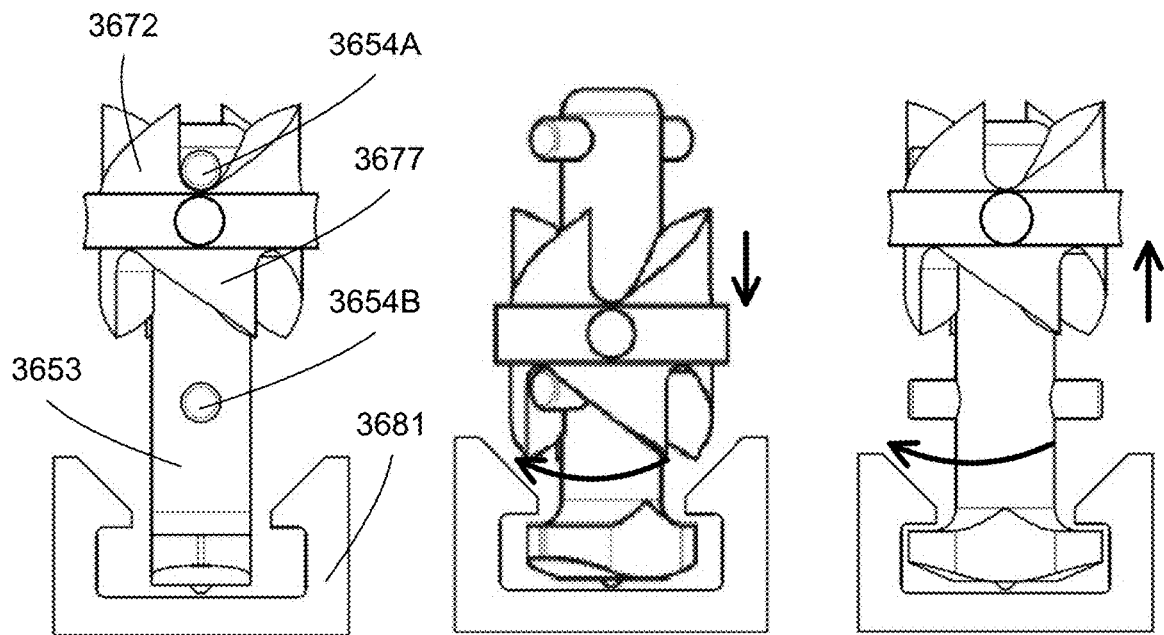
FIG. 36A    FIG. 36B    FIG. 36C

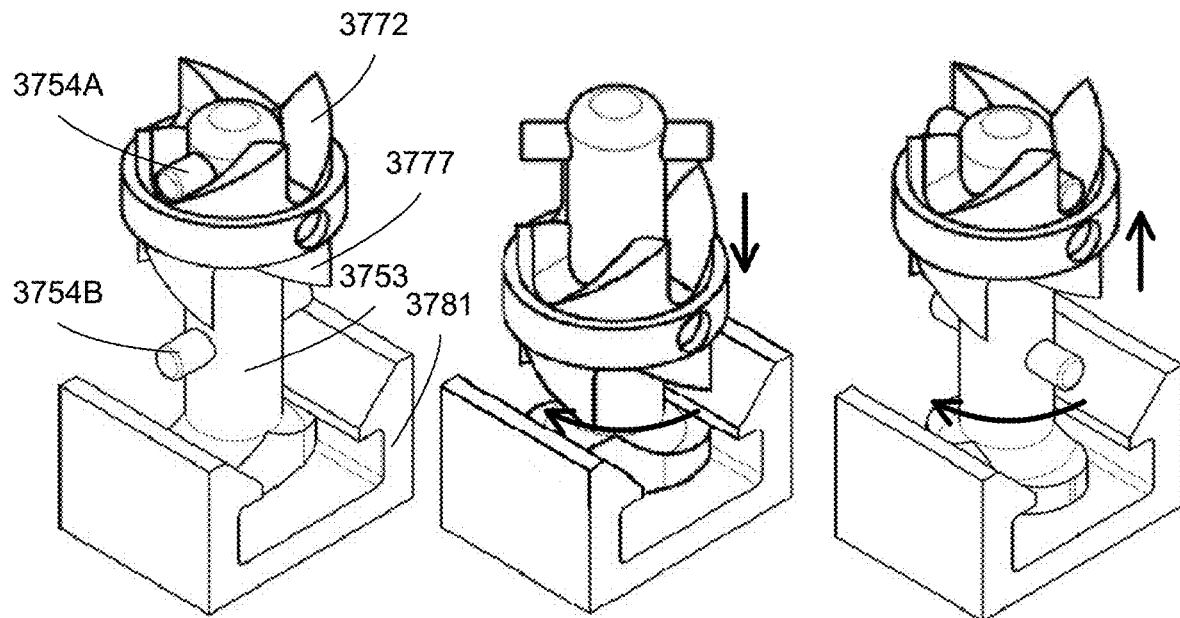
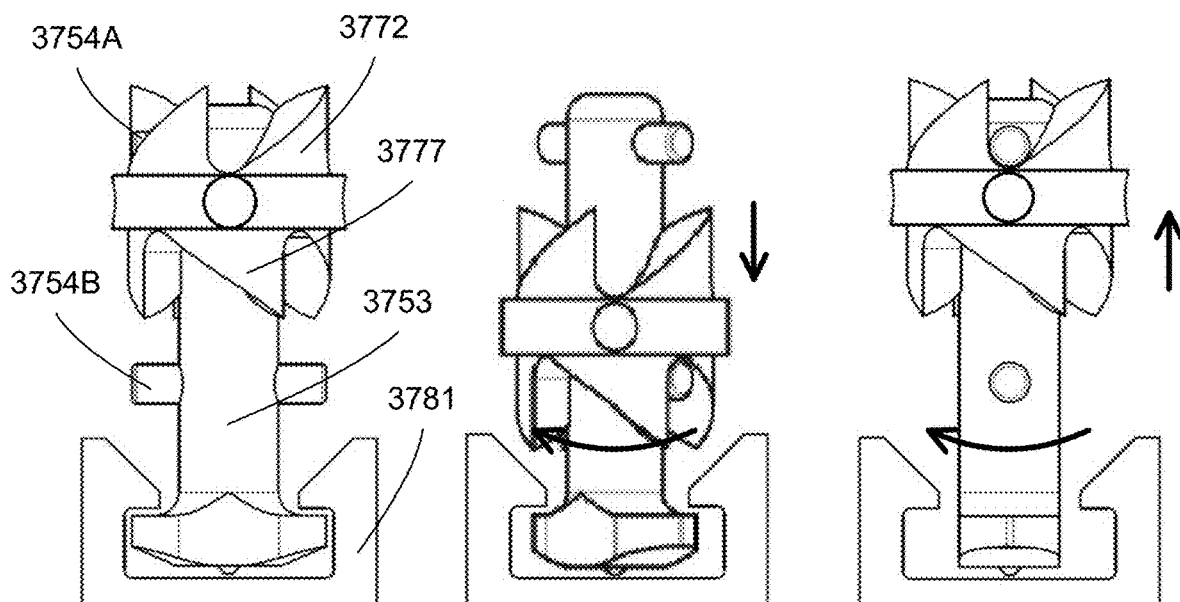
FIG. 37A   FIG. 37B   FIG. 37C

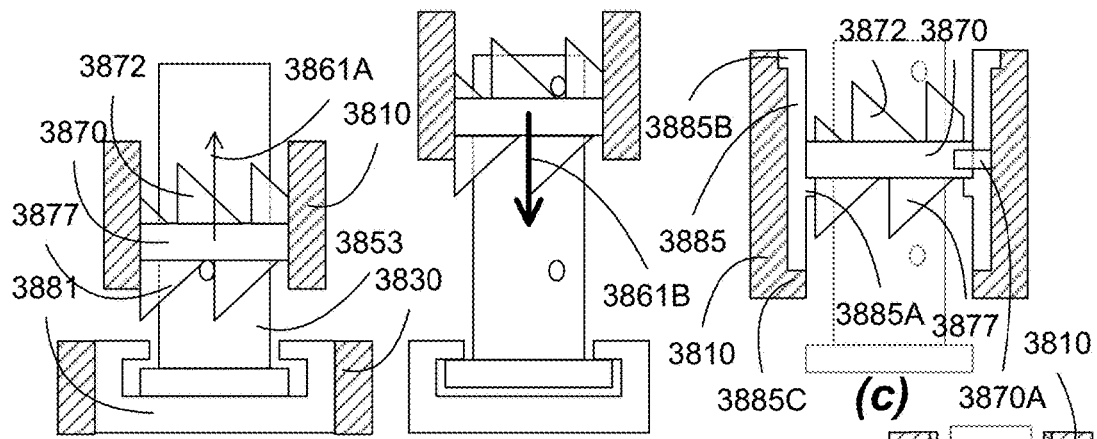
FIG. 38A
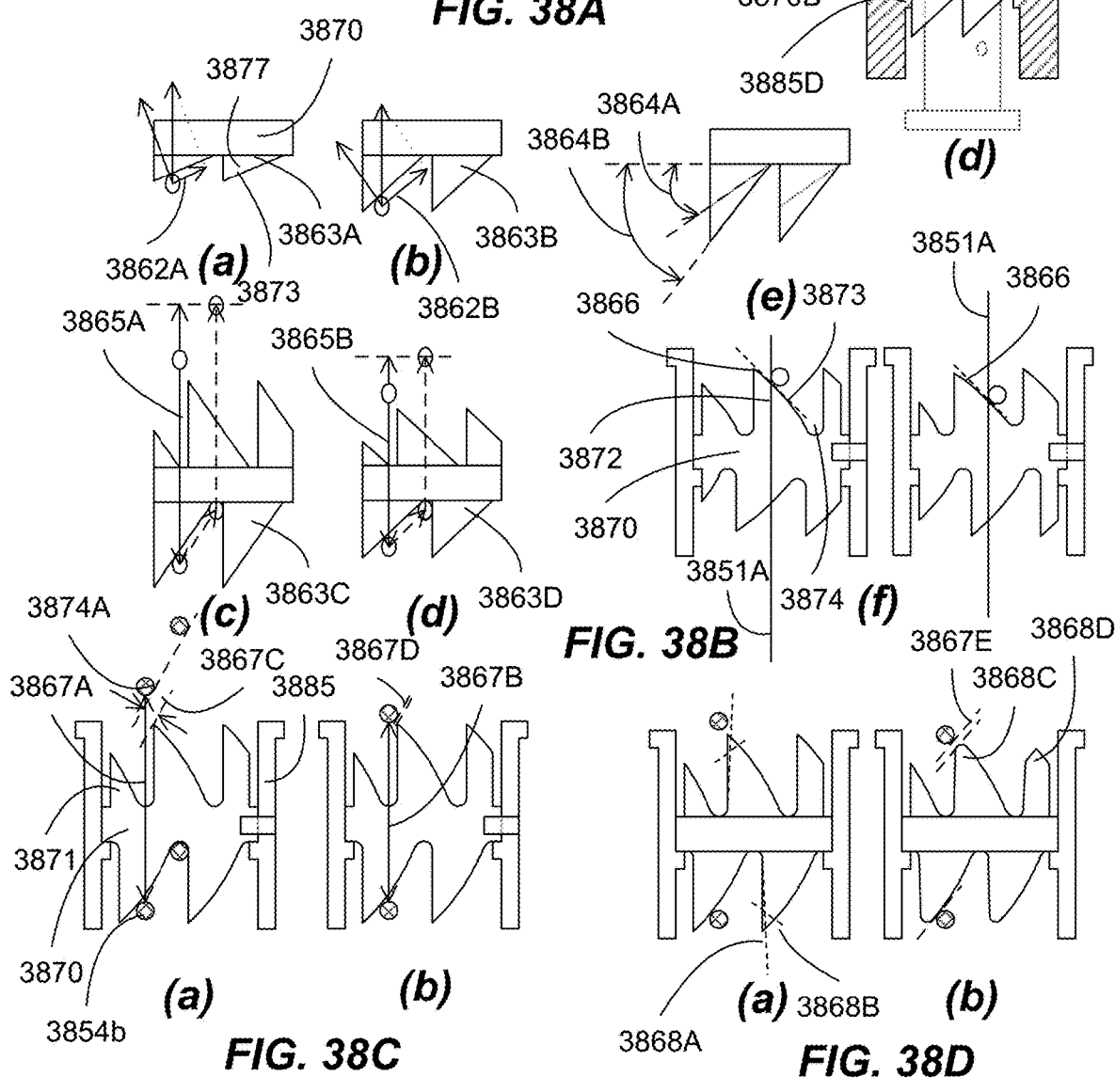
FIG. 38B
FIG. 38C
FIG. 38D

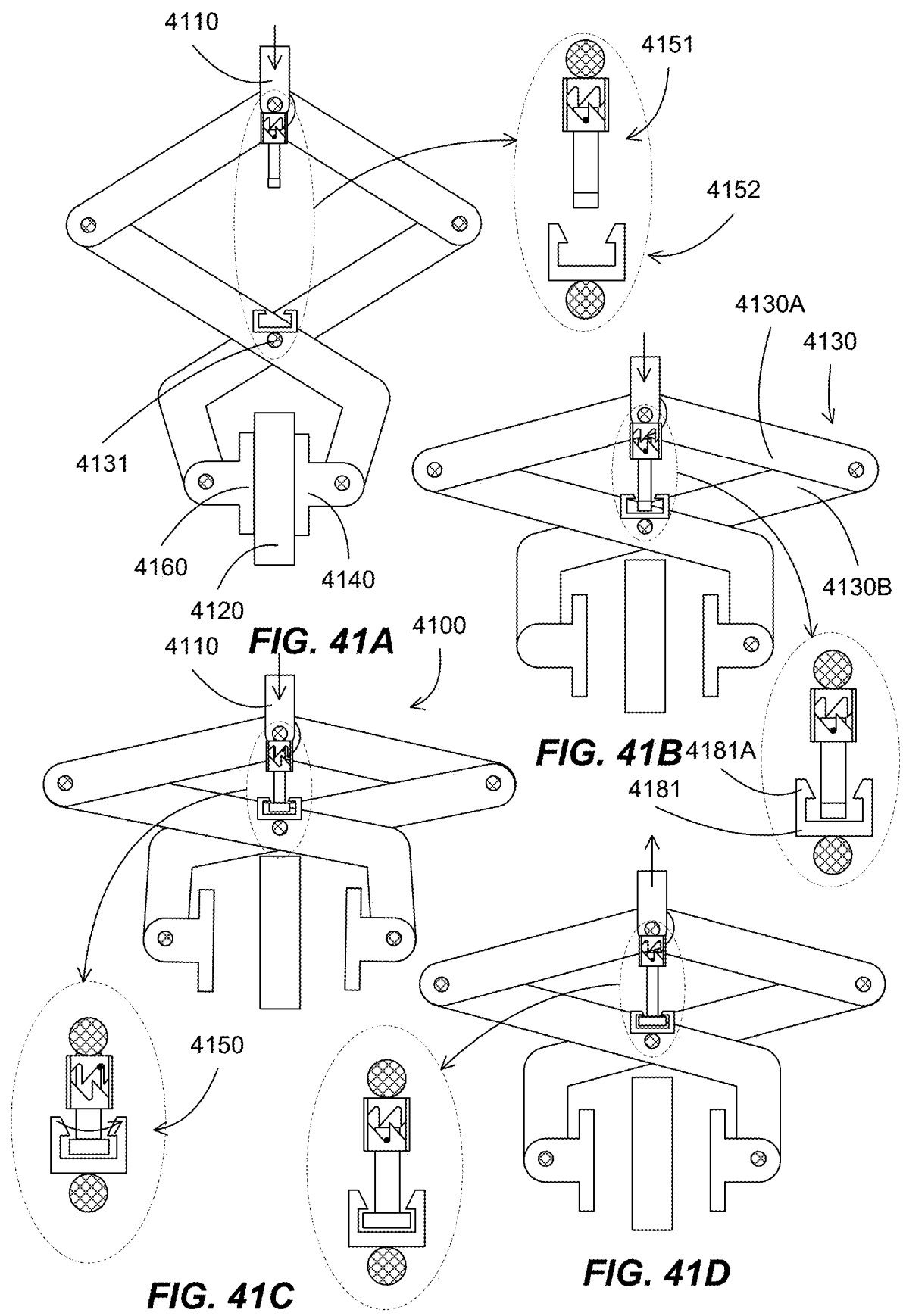

Toggling between a movable status and an unmovable status for a component of a clamping mechanism of a clamping device, wherein the toggling process is activated when at least one of the jaws of the clamping device is in a vicinity of an opening distance from the other jaw, wherein in the movable status, the component is configured to allow jaws of the clamping device to be movable toward each other to clamp on an object, wherein in the unmovable status, the component is configured to have the jaws remaining opened
4200

*FIG. 42A*

Moving a component of a clamping mechanism of a clamping device downward, wherein when the component reaches a position, a toggling mechanism is activated to toggle between a movable status and an unmovable status for at least a jaw of the clamping device, wherein in the movable status, the jaw is configured to be movably reachable toward an object disposed between the jaw and another jaw of the clamping device, wherein in the unmovable status, the jaws are configured to remain opened
4220

*FIG. 42B*

Moving a component of a clamping mechanism of a clamping device downward to toggle at least a jaw of the clamping device between movably reachable toward an object disposed between the jaw and another jaw of the clamping device for clamping on the object and remaining opened without clamping on the object
4240

*FIG. 42C*

Moving a hoist coupled to a clamping device downward to contact a surface, wherein the clamping device clamps on an object
4300

Continuing moving the hoist downward to open the jaws to reach an opening distance, wherein when the jaws reach the opening distance, a locking mechanism of the clamping device is toggled from a movable to an unmovable status, wherein in the movable status, the jaws of the clamping device are movable toward each other to clamp on the object, wherein in the unmovable status, the jaws remain opened without clamping on the object
4310

Moving the hoist upward with the jaws opened and not clamping on the object
4320

FIG. 43A

Moving a hoist coupled to a clamping device downward to contact an object, wherein the jaws of the clamping device clamps are separated at a distance larger than a dimension of the object
4340

Continuing moving the hoist downward to toggle a locking mechanism of the clamping device from an unmovable to a movable status, wherein in the movable status, the jaws of the clamping device are movable toward each other to clamp on the object, wherein in the unmovable status, the jaws are opened without clamping on the object
4350

Moving the hoist upward so that the jaws clamp on the object
4360

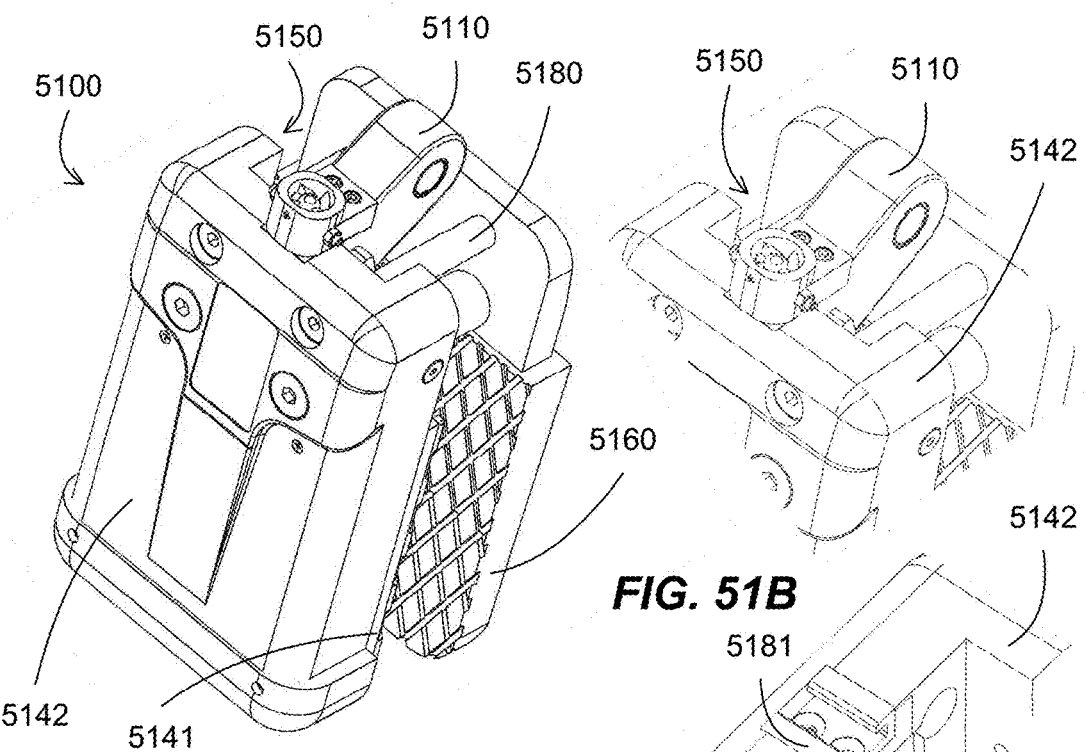
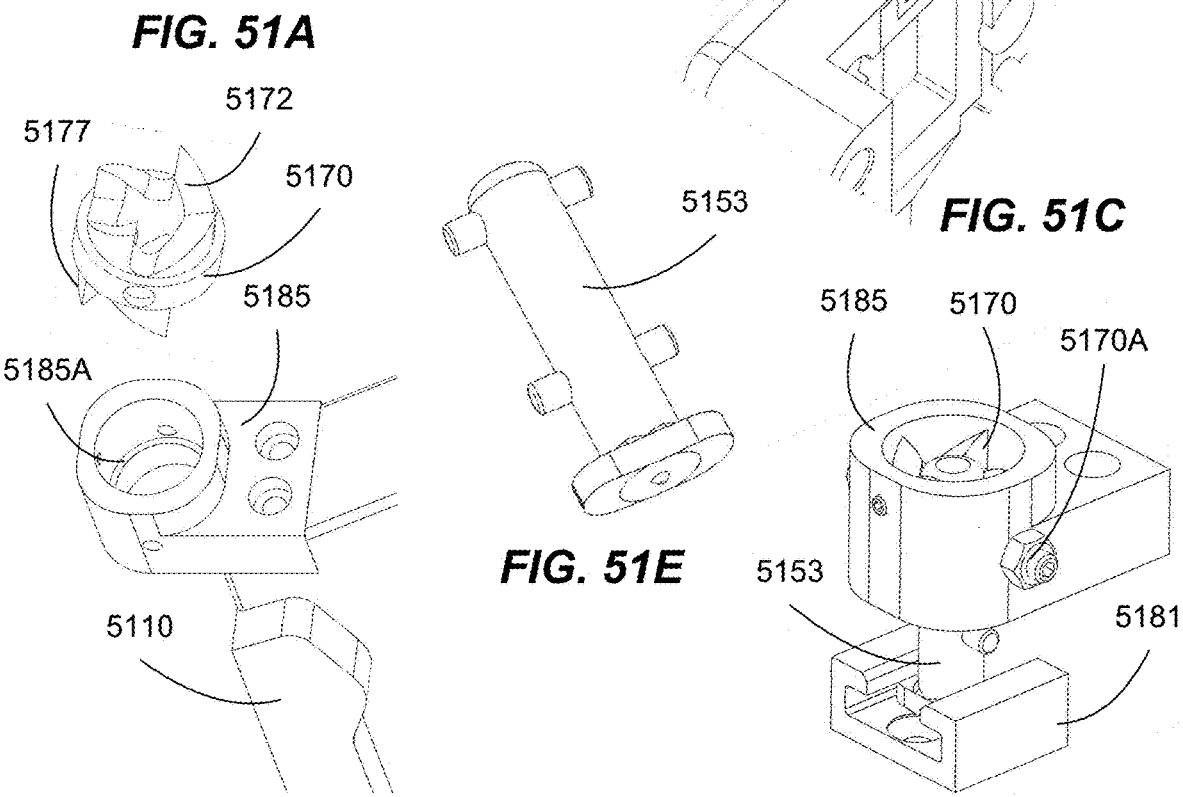
FIG. 51A  FIG. 51B  FIG. 51C
FIG. 51D  FIG. 51E  FIG. 51F

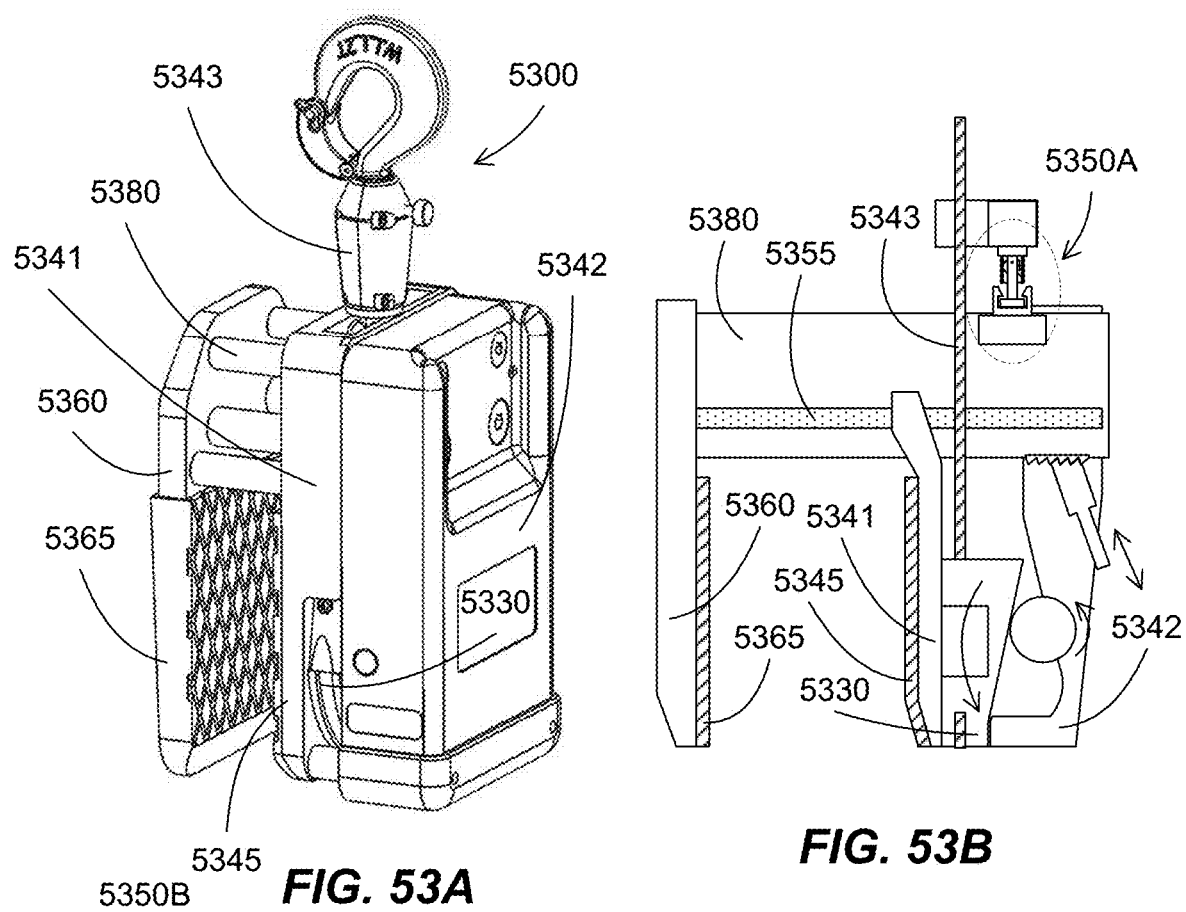
FIG. 53A
FIG. 53B
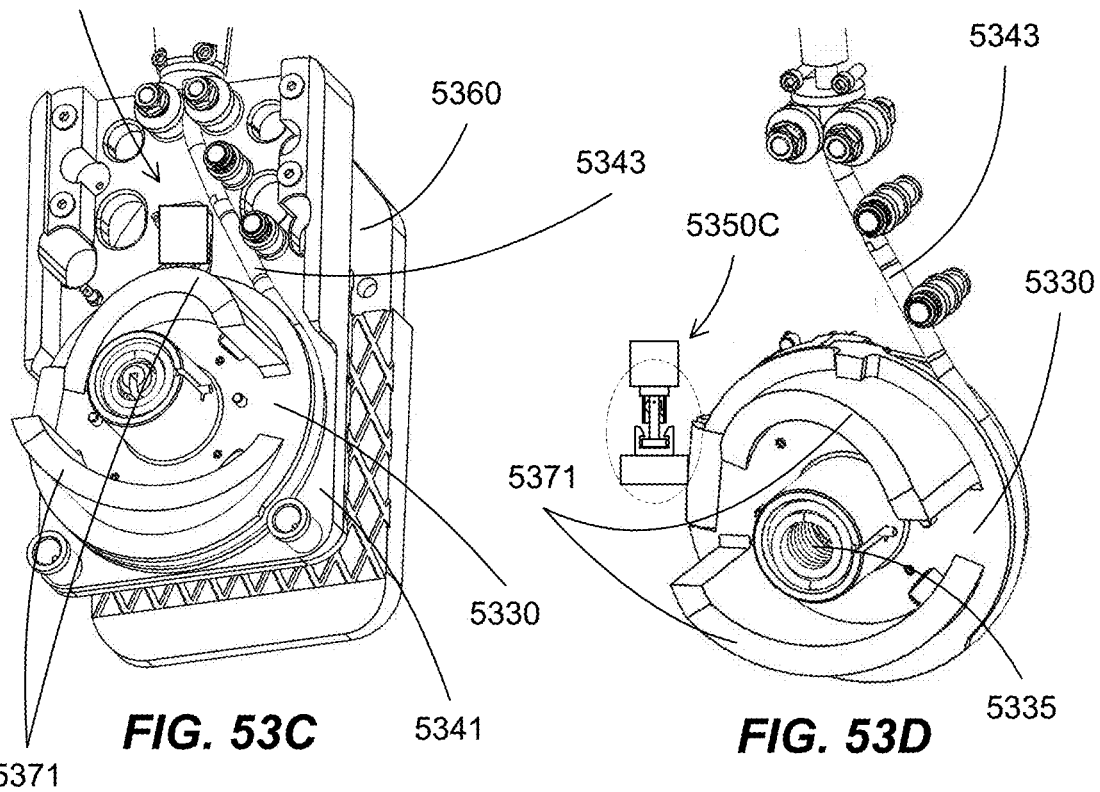
FIG. 53C
FIG. 53D

AUTO LOCK CABLE LIFTER

The present application claims priority from U.S. Provisional Patent Application Ser. No. 62/741,555, filed on Oct. 5, 2018, entitled "Auto lock cable lifter", which is incorporated herein by reference.

The present invention relates to lifting devices. More particularly, it relates to clamping devices for lifting and transferring objects such as metal or ceramic plates.

BACKGROUND

In the heavy industry, large and heavy products can be difficult to handle manually. Thus, a hoist connecting to a clamping device can be used to lift and move heavy objects. An object can be clamped to a clamping device that is coupled to a hoist. The hoist can lift the object to a certain height, and then transfer to a proper location.

The clamping devices can utilize a mechanism that converts the weight of the object into a clamping force, thus the holding force on the object exerted by the clamping devices can be proportional to the weight of the object. A loading and unloading device, such as a crane or a hoist, can be coupled to the clamping device for lifting and transferring the objects.

A basic prior art clamping device can include a rotatable clamping jaw, which can rotate to change a spacing distance to a fixed clamping jaw. Rotation of the rotatable clamping jaw can enlarge or narrow the distance between the two clamp jaws. For example, an object can be placed between the two jaws from a bottom position, and the pushed upward toward the gap between the two jaws. The upward motion of the object can cause a clockwise rotation of the rotatable clamping jaw, which can make the distance between the two jaws larger, to accommodate an object. After the object is placed between the two jaws, the weight of the object can cause the object to move downward. The downward motion of the object can cause a counterclockwise rotation of the rotatable clamping jaw, which can narrow the distance between the two jaws, or to exert a clamping force on the object.

FIG. 1A illustrates a prior art rotatable clamping device according to some embodiments. A clamping device 100 can include a clamp body 110, which can house a fixed clamp jaw 130 and a rotatable clamp jaw 120. The fixed clamp jaw and the rotatable clamp jaw can be configured to clamp an object 160. The rotatable clamp jaw can have an offset center of rotation 150, thus when the rotatable clamp jaw rotates counter clockwise, it comes closer to the fixed clamp jaw 130. That way the clamping device can support a number of sizes of objects. A spring 140 can preload the rotatable clamp jaw, e.g., to push the rotatable clamp jaw toward the fixed clamp jaw.

In operation, when the clamping device 100 is empty, e.g., when there is no object in the clamping device, the spring 140 pushes the rotatable clamp jaw counterclockwise toward the fixed clamp jaw, so there is no gap between the two jaws. An object 160 can be pushed in the clamping device, for example, upward to the space between the two jaws from a bottom position. The pushing action can open the gap between the two jaws by rotating the rotatable clamp jaw clockwise.

Gravity then hold the object in place, e.g., when the object is pulling out of the clamping device, for example, in a downward direction, the rotatable clamp jaw is rotated counterclockwise due to friction between the object and the contact surface of the rotatable clamp jaw. The rotation exerts a force on the object, preventing the object from being pulled out of the clamping device.

The rotatable clamping device can be compact and simple. But there can be focused force at the rotatable clamp jaw, e.g., at the contact area of the rotatable clamp jaw with the object. Thus the rotatable clamping device is not designed to handle heavy object, since heavy object requires a large clamping force, and the focused large clamping force might cause damage to the object.

Another prior art clamping device can include a gripping device normally fabricated from structural steel components, that are designed to securely hold and lift construction materials though a scissor movement. The gripping device can use freely rotating pin connections to create a scissor configuration with two scissor arms.

A first end of the scissor arms is configured to rotate towards each other in reaction to the opposite second end of the scissor arms being lifted vertically. The first end of the scissor arms rotate inwards and generate a compression force clamping on the object to be lifted. Essentially, the weight of the object is used to generate this clamping action.

FIG. 1B illustrates a prior art gripping device according to some embodiments.

A gripping device 105 can include two scissor arms 125 and 155, which can freely rotate about a pivot point 135. The scissor arms 125 and 155 can include upper arms 121 and 151, together with lower arms 122 and 152, respectively, connected through the freely rotating pivot 135.

The upper arms 121 and 151 can be coupled to pulling elements 141 and 142, respectively. The coupling between the upper arms and the pulling elements can include freely rotating pin connections, e.g., the pulling element 141/142 can be rotated relative to the upper arm 121/151. The pulling elements 141 and 142 can be coupled to a lift 145, such as a hoist. The coupling between the pulling elements and the lift can include freely rotating pin connections, e.g., the pulling elements 141 and 142 can be rotated relative to the lift 145.

The lower arms 122 and 152 can be coupled to holding pads 111 and 112, respectively. The coupling between the lower arms and the holding pads can include freely rotating pin connections, e.g., the holding pads 111/112 can be rotated relative to the lower arm 122/152.

In operation, an object 165 is placed between the holding pads 111 and 112. The lift 145 is pulled up, which pulls on the pulling elements 141 and 142. The pulling elements 141 and 142 can in turn pull on the upper arms 121 and 151. The scissor movement between the upper arms 121/151 and the lower arms 122/152 around the pivot point 135 can turn the pulling action on the upper arm 121/151 into a pressing action of the lower arm 122/152, which presses on the object 165 through the holding pads 111 and 112.

Disadvantages of the gripper devices can include multiple operators for handling. For example, when the empty gripper device is pulled up, the holding pads are pressed together. Thus when the empty gripper is lowered to approach the object, another operator might need to be present to enlarge the holding pads for encompassing the object.

SUMMARY OF THE EMBODIMENTS

In some embodiments, the present invention discloses a clamping device for lifting and transferring objects. The clamping device can employ slanting interfaces to convert a pulling action on the clamping device to a clamping action on the object.

The clamping device can include a jaw and a jaw assembly coupled to a clamp bar. The jaw assembly can include a second jaw and a jaw support facing each other. A rotating element can be disposed between the second jaw and the jaw support. The rotating element can have a slanting surface interfacing either the second jaw or the jaw support. For example, the rotating element can include a hollow cylinder with a slanting base, interfacing one or more rollers coupled to the second jaw or to the jaw support. In this configuration, when the rotating element rotates, the rollers can roll on the cylinder base, and can enlarge or narrow the gap between the rollers and the rotating element, due to the slanting surface of the cylinder base. A pulling element, such as a cable coupled to the rotating element, can be used to rotate the rotating element in one direction. A spring can be used for rotating the rotating element in an opposite direction. When the pulling element is pulled up, the rotating element rotates, which can exert a force on the jaw against the jaw support, for securing a gripping action on the object.

In some embodiments, an auto lock mechanism can be included, which can secure the rotating element for keeping the jaws separated. The auto lock mechanism can be activated or deactivated when the jaws are separated at a maximum distance. For example, an empty clamping device can have the auto lock mechanism activated to secure the jaws opened at the maximum distance. After the clamping device is lowered to place an object between the open jaws, the clamping device can contact the object and deactivate the auto lock. The jaws are then free to move for clamping on the object when the clamping device pulls up. When the clamping device with the object is lowered to the ground, the jaws can be open. When the jaws reach a maximum distance, the auto lock mechanism can be activated, securing the jaws at the maximum separation. The clamping mechanism can rise up, with the jaws remaining open.

BRIEF DESCRIPTION OF THE DRAWINGS

FIGS. 2A-2C illustrate clamping devices according to some embodiments.

FIGS. 3A-3C illustrate flow charts for forming and operating a clamping device according to some embodiments.

FIGS. 4A-4E illustrate clamping devices according to some embodiments.

FIGS. 5A-5B illustrate flow charts for forming and operating a clamping device according to some embodiments.

FIGS. 6A-6C illustrate a rotatable element having a slanting surface according to some embodiments.

FIGS. 7A-7C illustrate a rotatable element having a slanting surface according to some embodiments.

FIGS. 10A-10C illustrate flow charts for forming rotatable elements according to some embodiments.

FIGS. 11A-11D illustrate a configuration of a clamping device according to some embodiments.

FIGS. 12A-12B illustrate flow charts for forming an operating a clamping device according to some embodiments.

FIGS. 13A-13D illustrate configurations for clamping devices with secure (locking) mechanisms according to some embodiments.

FIGS. 15A-15B illustrate flow charts for forming and operating a clamping device according to some embodiments.

FIG. 16 illustrates a lock mechanism for a clamping device according to some embodiments.

FIGS. 19A-19I illustrate a process for the engagement and disengagement of a lock mechanism according to some embodiments.

FIGS. 20A-20E illustrate configurations for an auto lock mechanism according to some embodiments.

FIGS. 21A-21C illustrate flow charts for operating a clamping device having an auto lock mechanism according to some embodiments.

FIGS. 22A-22B illustrate flow charts for operating a clamping device having an auto lock mechanism according to some embodiments.

FIGS. 23A-23B illustrate flow charts for operating a clamping device having an auto lock mechanism according to some embodiments.

FIGS. 28A-28D illustrate configurations of clamping devices having a locking mechanism according to some embodiments.

FIGS. 31A-31D illustrate a schematic configuration for a locking mechanism or assembly according to some embodiments.

FIGS. 32A-32L illustrate a toggle process from an unlocked state to a locked state according to some embodiments.

FIGS. 36A-36C illustrate a toggle process from an unlocked state to a locked state according to some embodiments.

FIGS. 37A-37C illustrate a toggle process from a locked state to an unlocked state according to some embodiments.

FIGS. 38A-38D illustrate optimized configurations for the locking assembly according to some embodiments.

FIGS. 41A-41D illustrate another toggling configuration of the locking mechanism according to some embodiments.

FIGS. 42A-42C illustrate flow charts for operating a locking mechanism according to some embodiments.

FIGS. 43A-43B illustrate flow charts for operating a locking mechanism according to some embodiments.

FIGS. 51A-51F illustrate another clamping device configuration according to some embodiments.

FIGS. 53A-53D illustrate a clamping device according to some embodiments.

DETAILED DESCRIPTION OF THE EMBODIMENTS

Figure 1A:
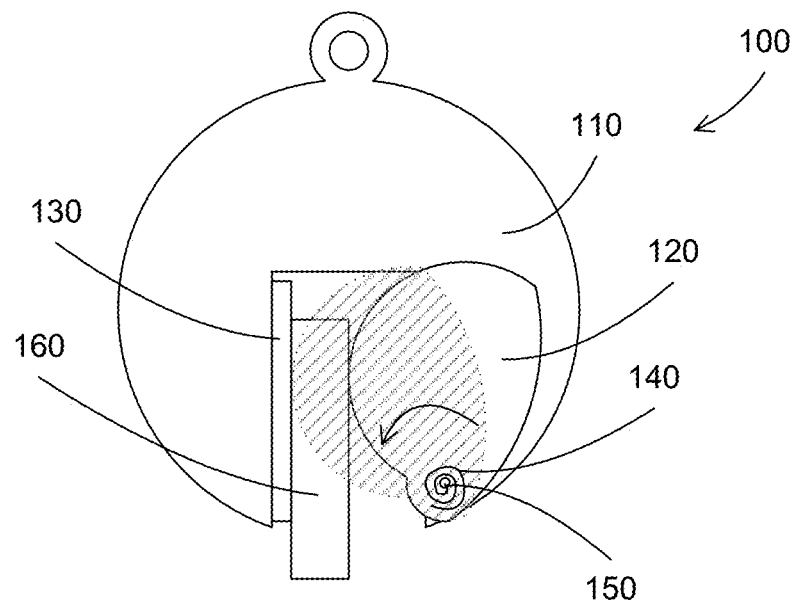
FIGS. 1A-1B illustrates a prior art devices according to some embodiments.
Figure 1B:
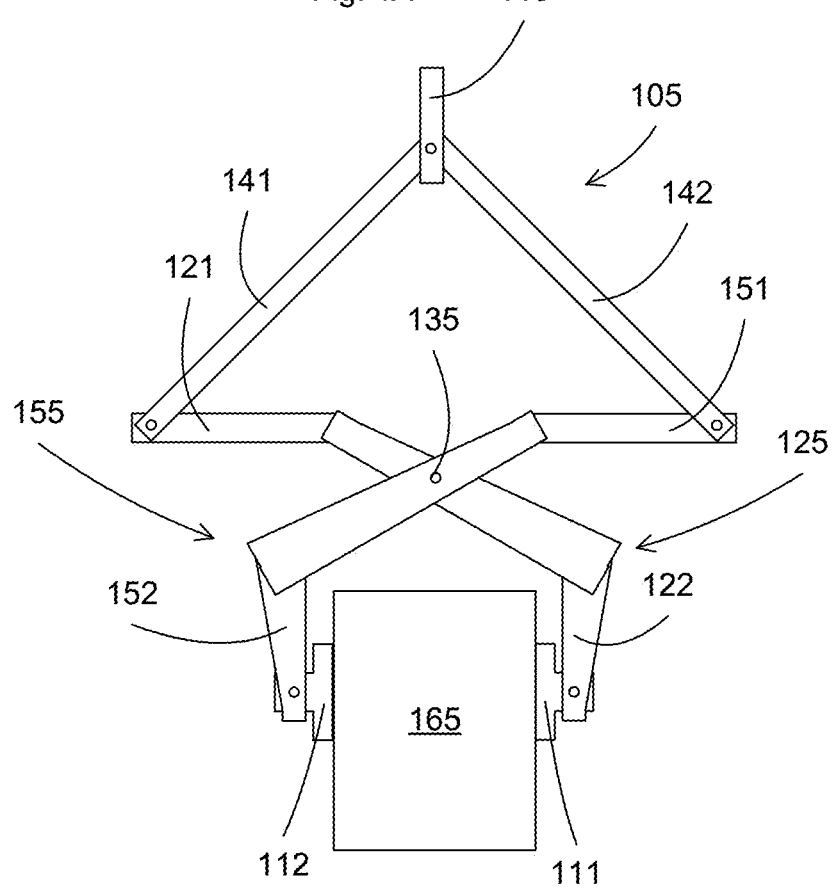

In some embodiments, the present invention discloses a clamping device for lifting and/or transferring objects, such as metal, granite, ceramic, glass, quartz, or concrete plates. The clamping device can include two jaws facing each other for clamping on the object.

The clamping device can use a slanting surface to convert the weight of the object into a compression force for clamping and holding the object. The slanting surface can provide a high ratio of force transfer. Due to the high conversion ratio, the clamping devices using slanting surface can be compact for lifting and transferring heavy objects.

The clamping device can include an auto lock mechanism that can keep the jaws open when needed, e.g., the auto lock mechanism, when activate, can keep the jaws separated, for example, at a maximum separation. This activation can allow the clamping device to release the object and to position the object between the open jaws. When the auto lock mechanism is deactivated, the jaws can move to clamp on the object, to allow lifting and moving the object.

In some embodiments, a clamping device can include two jaw assemblies coupled to a clamp bar, e.g., a connection element. The jaw assemblies can be disposed away and facing each other. Each jaw assembly can include a jaw for clamping on an object. A jaw assembly can include other components, such as a high friction pad, e.g., a rubber pad with high surface area pattern, coupled to a surface of the jaw for holding the object. The jaw assembly can be coupled to the clamp bar through the jaw, e.g., it is the jaw that is coupled to the clamp bar, and the other components, such as the rubber pad, can be coupled to the jaw.

A jaw assembly can include a jaw support, in addition to the jaw and optionally the rubber pad. The jaw assembly can be coupled to the clamp bar through the jaw support, e.g., it is the jaw support that is coupled to the clamp bar, and the other components, such as the jaw, can be coupled to the jaw support. The other components can be coupled to the components that are coupled to the jaw support, such as the rubber pad is coupled to the jaw.

In some embodiments, there are two jaw supports coupled to the clamp bar. The clamping device thus can include a first jaw assembly having a first jaw and a first rubber pad coupled to the first jaw support, and a second jaw assembly having a second jaw and a second rubber pad coupled to the second jaw support.

In some embodiments, there are one first jaw coupled to the clamp bar, and one jaw support coupled to the clamp bar. The clamping device thus can include a first jaw assembly having the first jaw and a first rubber pad. The first jaw can be coupled to the clamp bar. The clamping device can include a second jaw assembly having a second jaw and a second rubber pad which are coupled to the jaw support. The jaw support can be coupled to the clamp bar.

The jaw assemblies can be fixedly coupled to the clamp bar, or can be movably coupled to the clamp bar. If movably coupled to the clamp bar, the jaw assemblies can be secured, e.g., fixedly coupled to the clamp bar when secured, and movable when unsecured. The movable jaw assemblies can be used to adjust a distance between the jaws for accommodating different sizes of the object to be clamped and lifted. After the object is placed between the jaws, e.g., after the opening between the jaws is large enough to accommodate the object, the movable jaw assemblies can be secured, e.g., fixedly coupled to the clamp bar.

A secure mechanism can be used to secure the jaw assembly to the clamp bar. For example, if the jaw assembly does not have a jaw support, the jaw of the jaw assembly can be secured to the clamp bar through a secure mechanism. If the jaw assembly has a jaw support, the jaw support can be secured to the clamp bar through a secure mechanism. There can be one secure mechanism for a clamping device configuration having a fixed jaw assembly and one movable jaw assembly. There can be two secure mechanisms for a clamping device configuration having two movable jaw assemblies.

In some embodiments, there are two jaw assemblies movably and securely coupled to the clamp bar. For example, a first jaw assembly can include a first jaw having an opening in which the clamp bar can pass through. Thus the first jaw (and the first jaw assembly) can be movable along the clamp bar. A first secure (locking) mechanism can be included to secure the first jaw to the clamp bar, such as a latch or a spring-loaded latch. The secure (locking) mechanism can be engaged, e.g., securing the jaw (and the jaw assembly) to the clamp bar, and/or disengaged, e.g., releasing the jaw (and the jaw assembly) from the clamp bar so that the jaw (and the jaw assembly) can be freely movable along the clamp bar, with or without a key.

Alternatively, a first jaw assembly can include a first jaw coupled to a first jaw support which has an opening in which the clamp bar can pass through. Thus the first jaw support (and the first jaw assembly) can be movable along the clamp bar. A first secure (locking) mechanism can be included to secure the first jaw support to the clamp bar, such as a latch or a spring-loaded latch. The secure (locking) mechanism can be engaged, e.g., securing the jaw support (and the jaw assembly) to the clamp bar, and/or disengaged, e.g., releasing the jaw support (and the jaw assembly) from the clamp bar so that the jaw support (and the jaw assembly) can be freely movable along the clamp bar, with or without a key.

The second jaw assembly can be similarly constructed. For example, the second jaw assembly can include a second jaw having an opening in which the clamp bar can pass through and a second secure (locking) mechanism to secure the second jaw to the clamp bar. Alternatively, the second jaw assembly can include a second jaw coupled to a jaw support which has an opening in which the clamp bar can pass through and a second secure (locking) mechanism to secure the second jaw support to the clamp bar.

In some embodiments, there are one first jaw assembly movably and securely coupled to the clamp bar and one second jaw assembly fixedly coupled to the clamp bar. For example, a first jaw assembly can include a first jaw having an opening in which the clamp bar can pass through. Thus the first jaw (and the first jaw assembly) can be movable along the clamp bar. A first secure (locking) mechanism can be included to secure the first jaw to the clamp bar, such as a latch or a spring-loaded latch. The secure (locking) mechanism can be engaged, e.g., securing the jaw (and the jaw assembly) to the clamp bar, and/or disengaged, e.g., releasing the jaw (and the jaw assembly) from the clamp bar so that the jaw (and the jaw assembly) can be freely movable along the clamp bar, with or without a key.

Alternatively, a first jaw assembly can include a first jaw coupled to a first jaw support which has having an opening in which the clamp bar can pass through. Thus the first jaw support (and the first jaw assembly) can be movable along the clamp bar. A first secure (locking) mechanism can be included to secure the first jaw support to the clamp bar, such as a latch or a spring-loaded latch. The secure (locking) mechanism can be engaged, e.g., securing the jaw support (and the jaw assembly) to the clamp bar, and/or disengaged, e.g., releasing the jaw support (and the jaw assembly) from the clamp bar so that the jaw support (and the jaw assembly) can be freely movable along the clamp bar, with or without a key.

The second jaw assembly can be fixedly coupled to the clamp bar. For example, the second jaw assembly can include a second jaw fixedly coupled to the clamp bar. Alternatively, the second jaw assembly can include a second jaw coupled to a jaw support which is fixedly coupled to the clamp bar.

In some embodiments, there are two jaw assemblies fixedly coupled to the clamp bar. For example, a first jaw assembly can include a first jaw which is fixedly coupled to the clamp bar, such as with a bolt set. Alternatively, the first jaw assembly can include a first jaw coupled to a first jaw support which is fixedly coupled to the clamp bar. Similarly, the second jaw assembly can include a second jaw which is fixedly coupled to the clamp bar. Alternatively, the second jaw assembly can include a second jaw coupled to a second jaw support which is fixedly coupled to the clamp bar.

In some embodiments, the clamp bar can include a connection bar having a round or substantially rectangular cross section, such as a rectangular shape with rounded corners. The connection bar can be large enough so that a fixed jaw assembly can be secured to. The connection bar can also be configured to let a movable jaw assembly pass through for moving along the clamp bar.

In some embodiments, the clamp bar can include multiple connection bars, such as multiple round rods or polygon rods. Each connection bar can be secured to a fixed jaw assembly with bolts, for example, at one end of the connection bar. The multiple connection bars can be distributed to provide structural support to the jaw assemblies.

In some embodiments, the clamping device can use a slanting surface to convert the weight of the object into a compression force for clamping and holding the object. The slanting surface can provide a high ratio of force transfer. Due to the high conversion ratio, the clamping devices using slanting surface can be compact for lifting and transferring heavy objects.

A slanting interface can be included in a jaw assembly, for example, between a jaw and a jaw support, or between the jaw support (or the jaw) and another component of the clamping device. When a hoist coupled to a clamping device is pulling upward, the upward force can be converted to a side force due to the slanting interface. Alternatively, when an object is sliding down from the clamping device, the weight of the object can be converted to the side force due to the slanting interface. The side force can press on the jaw of the jaw assembly for clamping on the object, preventing the object from being released or slide or dropped from the clamping device.

The clamping device can have one slanting interface, e.g., a first jaw assembly having the slanting interface and a second jaw assembly without a slanting interface. Alternatively, the clamping device can have two slanting interfaces, e.g., a first jaw assembly having two slanting interfaces, or a first jaw assembly having a first slanting interface and a second jaw assembly having a second slanting interface.

FIGS. 2A-2C illustrate clamping devices according to some embodiments. The clamping devices can have compact sizes for handle heavy objects by using slanting interfaces.

FIG. 2A shows a clamping device 200 having a sliding slanting interface 280 in a jaw assembly. A clamping device 200 can include a jaw and a jaw assembly, with both coupled to a clamp bar. The jaw assembly can include a jaw 281 and a jaw support 282. Other configurations can be used, such as a clamping device having two jaw assemblies.

The jaw assembly can include a sliding slanting interface 280, which can include a planar slanting surface on the jaw 281, mating with a slanting surface on the jaw support 282. At the slanting interface 280, the second jaw 281 can move relative to the jaw support 282 along the slanting interface.

When the object clamped between the two jaws starts to move down due to gravity, the object can cause the jaw 281 to also start to move down due to a friction between the object and the second jaw. Alternatively, when the clamping device 200 starts to move up for lifting the object, the jaw support 282 can move up.

The slanting interface 280 can be configured so that when the jaw 281 starts to move down 283 (or when the jaw support 282 starts to move up), the jaw 281 can also start to move away 284 from the jaw support since the jaw support is secured to the clamp bar. The potential side movement of the second jaw can exert a force on the object, preventing the object from moving down, e.g., to clamp the object in place.

The slanting interface can be configured so that the jaw 281 can move toward the object when the jaw 281 is moving down. Thus, if there is no obstacle blocking the movement of the jaw, e.g., the object is not present or the object is not in contact with the jaw, the jaw is moving toward the object when the jaw is moving downward.

The slanting interface can be configured so that when there is a downward force 283 acting on the jaw 281, the downward force can be converted to a sideward force 284 toward the object. The downward force can be a force in any direction having a force component in a downward direction. The conversion of the downward force can be viewed as a decomposition or a splitting of the downward force into multiple force components, in which a force component has a sideward direction. Thus, if there is no obstacle blocking the movement of the jaw, e.g., the object is not present or the object is not in contact with the jaw, the jaw is moving toward the object (in addition to the jaw moving down) when there is a downward force acting on the jaw. If there is an obstacle blocking the movement of the jaw, e.g., the object is in contact with the jaw, there is a sideward force from the jaw pressing on the object.

The slanting interface can include a slanting surface making an acute angle with a vertical plane with a top portion of the slanting surface away from the object more than a bottom portion of the slanting surface. The slanting surface can be tilted toward the object at a bottom portion, or tilted away from the object at a top portion.

The slanting interface can have a low friction surface, e.g., lower than the friction between the object and the jaw 281. For example, the jaws can include a rubber layer facing the object, which can have high friction with the object.

In some embodiments, the downward direction means the direction of the gravity. An upward direction means an opposite direction of the downward direction. A top portion can mean a portion in an upward direction, in opposite direction to a bottom portion, which can mean a portion in a downward direction.

A sideward direction means a horizontal direction, e.g., a direction perpendicular to the downward direction. Since the clamping device is configured to clamp, lift and transfer objects, the object exerts a downward force on the clamping device due to gravity, or the clamping device exerts an upward force on the object for lifting the object.

FIG. 2B (a)-(c) show a clamping device 201 having a rotating slanting interface in a jaw assembly 240. A clamping device 201 can include two jaw assemblies 240 and 260 coupled to a clamp bar 250. The jaw assembly can include a jaw, or a jaw and a jaw support. As shown, the jaw assembly 260 includes a jaw 261. And the jaw assembly 240 includes a jaw 241 and a jaw support 242.

The jaw assembly can be fixedly coupled to the clamp bar, or can be movably and securably (or lockably) coupled to the clamp bar, using an optional secure (locking) mechanism. As shown, the jaw assemblies 260 and 240 are fixedly coupled to the clamp bar 250 by the jaw 261 and the jaw support 242. Alternatively, the jaw assemblies can be movably coupled to the clamp bar, such as the jaw assembly 240 can be movably coupled to the clamp bar 250. For movable jaw assemblies, secure (locking) mechanisms, such as latch mechanisms, can be included for securing the jaw assemblies to the clamp bar.

The jaw assemblies 240 and 260 each can include a jaw for clamping on an object 210. For example, the jaw assembly 260 can include a first jaw 261. The jaw assembly 240 can include a second jaw 241, which together with the first jaw 261, pressing on the object 210 for clamping the object. The jaw assemblies can be fixedly coupled to the clamp bar. For example, the jaw assembly 260 can be fixedly coupled to the clamp bar 250 by securing the first jaw 261 with the clamp bar 250. The jaw assemblies can be movable along to the clamp bar, e.g., to accommodate different sizes of the object. Once the jaw opening between the jaws 241 and 261 is large enough to clamp on the object 210, the jaw support 240 can then be fixed to the clamp bar 250. For example, the jaw assembly 240 can be movable along the clamp bar 250 by sliding the jaw support 242 along the clamp bar 250. A secure (locking) mechanism 220 can be included to lock, e.g., to secure, the jaw assembly 240 to the clamp bar 250, for example, by latching the jaw support 242 to the clamp bar 250.

The jaw assembly 240 can include a rotating slanting interface 271, which can include a slanting surface on the second jaw 241, mating with a slanting surface on the jaw support 242. At the slanting interface 271, e.g., at the mated slanting surfaces of the second jaw 241 and the jaw support 242, the second jaw 241 can move relative to the jaw support 242 along the slanting interface.

A cable 243 can be coupled to the second jaw 241 to rotate the second jaw. When the cable is lifted up to move the clamping device up, the second jaw can rotate to change a distance with the jaw support, or to exert a force of the object. A spring mechanism can be included to rotate the second jaw in the opposite direction.

The rotating slanting interface 271 can be configured so that when the second jaw 241 starts to rotate 273, the second jaw can also start to move away 274 from the jaw support since the jaw support is secured to the clamp bar. The potential side movement of the second jaw can exert a force on the object, preventing the object from moving down, e.g., to clamp the object in place.

The slanting interface can be configured so that the second jaw 241 can move toward the object 210 when the second jaw 241 is moving down. Thus, if there is no obstacle blocking the movement of the second jaw, e.g., the object is not present or the object is not in contact with the second jaw, the second jaw is moving toward the object when the second jaw is rotating.

The slanting interface can be configured so that when there is a rotating force 273 acting on the second jaw 241, the rotating force can be converted to a sideward force 274 toward the object. The rotating force can be activated in one direction, e.g., the up direction for lifting the clamping device, by a cable. The rotating force can be activated in an opposite direction, e.g., the down direction when lowering the clamping device, by a spring mechanism. Thus, if there is no obstacle blocking the movement of the second jaw, e.g., the object is not present or the object is not in contact with the second jaw, the second jaw is moving toward the object (in addition to the second jaw rotating) when there is a rotating force acting on the second jaw. If there is an obstacle blocking the movement of the second jaw, e.g., the object is in contact with the second jaw, there is a sideward force from the second jaw pressing on the object.

The rotating slanting interface can include a curve slanting surface making a rotating acute angle with a vertical plane with a top portion of the slanting surface away from the object more than a bottom portion of the slanting surface. The slanting surface can be tilted toward the object at a bottom portion, or tilted away from the object at a top portion.

The slanting interface can have a low friction surface, e.g., lower than the friction between the object 210 and the second jaw 241.

In some embodiments, the rotating direction can be clockwise or counterclockwise. One rotating direction can cause the rotating jaw to further separate from the jaw support. An opposite direction can cause the rotating jaw to move closer to the jaw support. A downward direction means the direction of the gravity. An upward direction means an opposite direction of the downward direction. A top portion can mean a portion in an upward direction, in opposite direction to a bottom portion, which can mean a portion in a downward direction.

A sideward direction means a horizontal direction, e.g., a direction perpendicular to the downward direction. Since the clamping device is configured to clamp, lift and transfer objects, the object exerts a downward force on the clamping device due to gravity, or the clamping device exerts an upward force on the object for lifting the object.

In operation, the object is first clamped between the jaws 261 and 241 of the clamping device. For clamping device with a movable jaw assembly, the secure (locking) mechanism of the movable jaw assembly can be disengaged, so that the movable jaw assembly is free to move along the clamp bar. The movable jaw assembly can be moving away from the jaw assembly to enlarge the opening between the two jaws. Once the opening is large enough to accommodate the object, the object can be placed between the jaws. The movable jaw assembly can then be moving toward the object so that the object is in contact with the jaws, or so that there is a minimum gap between the object and the jaws. The movable jaw assembly then can be secured to the clamp bar, for example, by engaging the secure (locking) mechanism.

There can be a gap 222 (FIG. 2B (b)) between the object and the jaws, e.g., the opening of the jaws of the clamping device configuration can be larger than the size of the object for ease of accepting the object. For example, a clamping device with fixed jaw assemblies can be selected to meet the object sizes. Alternatively, for clamping devices with fixed jaw assemblies, a secure (locking) mechanism can secure the movable jaw assembly to the clamp bar at discrete locations, and the engagable locations for the current object do not allow the object to be in contact. The location to engage the secure (locking) mechanism can be selected to cover a range of object thicknesses, e.g., a range that the movement of the rotating jaw can achieve for clamping on the object. The location to engage the secure (locking) mechanism can be selected to ensure a minimum gap between the object and the jaws, meaning the distance between the object and the first and second jaw is smaller than the distance between two successive locking locations of the secure (locking) mechanism. The minimum gap can be achieved by moving the movable jaw assembly in a direction of narrowing the gap until the movable jaw assembly reaches the object, e.g., until the object is in contact with the jaws. The movable jaw assembly is then backed up, e.g., moving in an opposite direction of enlarging the gap, until reaching the first engagable location for the secure (locking) mechanism.

After placing the object between the jaws and securing or locking the jaw assembly, one or both jaws can be adjusted, so that the jaws are in contact with the object. For example, the object can be positioned or moved so that it is in contact with the first jaw 261 (e.g., the jaw of the jaw assembly that cannot be moved), leaving a gap only between the object and the second jaw 241 (e.g., the jaw of the movable jaw assembly). Then the hoist coupled to the cable can move up, pulling on the cable to rotate the rotating element. When the rotating element rotates, the second jaw moves 223 toward the object (FIG. 2A (c)) due to the slanting interface, until the object is in contact with the second jaw.

After the jaws are adjusted, e.g., the jaws are in contact with the object, the hoist can continue to be lifted up, lifting the cable and the clamping device. The weight of the object can exert a rotating force on the rotating element, which can be converted to a sideward force 274 toward the object. The sideward force 274 can exert a force on the object, holding the object in place, preventing the object from going down, e.g., slipping out of the jaws.

Advantages of the clamping device using the slanting interface can include compact size, since the clamping device includes two opposite jaw assemblies connected by a clamp bar. Further, the force clamping on the object can be well distributed throughout the surface of the jaws, meaning no focused point.

Further, the contact surfaces of the clamping device with the object can be scalable, meaning large size jaw pads can be used to accommodate heavy objects. Together with evenly distributed force, the clamping device can be gentle on the object, meaning the clamping device can be used on heavy fragile objects, such as granite, glass or ceramic plates.

FIG. 2C shows another configuration for a clamping device, having two slanting interfaces in two jaw assemblies. A clamping device 205 can include two jaw assemblies 245 and 265 coupled to a clamp bar 255. The jaw assembly 265 includes a jaw 266 and a jaw support 267, together with a first slanting interface there between. And the jaw assembly 245 includes a jaw 246 and a jaw support 247, together with a second slanting interface there between. A first secure (locking) mechanism 225 can be used to secure the jaw assembly 265 to the clamp bar. A second secure (locking) mechanism 275 can be used to secure the jaw assembly 245 to the clamp bar.

With two jaw support assemblies, the object can be symmetrically oriented, thus the two jaws 246 and 266 can be pulling down together by the weight of the object. The two jaws then can be sliding toward the object, due to the slanting interfaces, and exerting forces on the object, keeping the object in place and preventing the object from moving out of the clamp device.

In some embodiments, the components of the clamping devices 200 and 205, such as the jaw supports 242, 247 and/or 267, the jaws 241, 261, 246, and/or 267, the clamp bars 250 and/or 255, can include a metal core embedded in a different material. The construction of the components using metal cores can be simpler and more cost effective while meeting the requirements of strength, hardness, durability and reliability.

FIGS. 3A-3C illustrate flow charts for forming and operating a clamping device according to some embodiments. In FIG. 3A, operation 300 forms a clamping device. The clamping device can include a jaw and a jaw support. The jaw and the jaw support can be coupled with a slanting surface. The slanting surface can be configured so that when a rotatable element coupled to a jaw of the clamping device rotates, the jaw moves toward an object. The slanting surface can also be configured so that when there is a force comprising a downward direction acting on the rotatable element, there is a force comprising a sideward direction acting toward an object to be clamped by the clamping device.

In FIG. 3B, operation 320 forms a clamping device. The clamping device can include a clamp bar, a first jaw fixedly coupled to the clamp bar, and a jaw assembly movably and securely coupled to the clamp bar. The jaw assembly can include a second jaw and a jaw support. The second jaw and the jaw support is coupled with a slanting surface. The slanting surface can be configured so that when a rotatable element coupled to the second jaw of the clamping device rotates, the second jaw moves toward an object supported between the first and second jaw for keeping the object in place. The slanting surface can also be configured so that when there is a force comprising a downward direction acting on the second jaw, there is a force comprising a sideward direction acting toward the object.

In FIG. 3C, operation 340 places an object between a first jaw and a second jaw of a clamping device. The second jaw can be coupled to a jaw support with a slanting surface. The slanting interface can be configured so that when a rotatable element coupled to the second jaw rotates, the rotation makes the second jaw moving toward the object for keeping the object in place.

The first and second jaws can be directly or indirectly coupled to a clamp bar. For example, the first jaw can be directly coupled to the clamp bar. The second jaw can be indirectly coupled to the clamp bar, e.g., the second jaw is coupled to jaw support while the jaw support is directly coupled to the clamp bar.

If the opening between the first jaw and the second jaw is not enough to accommodate the object, the first jaw, the second jaw, or the jaw support can be move along the clamp bar to enlarge the opening distance.

After placing the object between the jaws, the opening can be narrowed so that the object is in contact with the jaws, or there is a minimum gap between the object and the jaws. The first jaw, the second jaw, or the jaw support then can be securely coupled to the clamp bar.

If there is a gap between the object and the jaws, one or two jaws can be adjusted, e.g., changing the positions of the jaws or moving the jaws, so that the jaws can contact the object. For example, a hoist can lift a cable coupled to the rotatable element, which can rotate the rotatable element and moves the second jaw toward the object. The hoist can lift the cable until the jaws are in contact with the object.

Operation 350 lifts the clamping device, e.g., continuing lifting the cable, to move the object.

In some embodiments, the clamping device can include a pulling element, which is coupled to the rotatable element which is coupled to the second jaw. For example, the pulling element can be a flexible line, such as a cable, a wire, a string, a cord, a rope, or a chain wrapping around the rotatable element. The flexible line can include a metal component, such as metallic or alloy flexible line (e.g., a cable, a wire, a string, a cord, a rope, or a chain), or a flexible line having a metallic or alloy backbone for additional strength. Throughout the present description, the term "cable" or "chain" can mean flexible line, such as nonmetallic, metallic, or alloy flexible line. A free end of the pulling element can be coupled to a hoist, for lifting the pulling element and also the clamping device.

A slanting interface can be included between the rotatable element and at least one of the jaw and the jaw support. For example, there can be a slanting interface between the rotatable element and the jaw support. There can be a second slanting interface between the rotatable element and the jaw. The rotatable element can simplify the operation of the clamping device, for example, by eliminating the adjustment of the jaws, e.g., moving the jaws so that the jaws can be in contact with the object if there are gaps between the jaws and the object after the jaw assemblies are secured to the clamp bar.

By pulling on the pulling element, when there is a gap, the jaw will move toward the object to narrow the gap. After the jaws are in contact with the object, further pulling action will exert a force from the jaws to the object, clamping the object in place. The clamping force can be evenly distributed at the clamping jaws.

Further, the pulling element can improve the clamping force on the object, for example, due to the wedging configuration of the jaw and the jaw support. The high clamping force can improve the gripping action of the clamping device on the object, further preventing the object from slipping out of the jaws of the clamping device.

In some embodiments, the clamping device can include a spring assembly which is configured to rotate the rotatable element in an opposite direction, e.g., in the opposite direction of the direction that the pulling element, e.g., the flexible line, can exert on the rotatable element when the flexible line is pulled. For example, if the flexible line is wrapped around the rotatable element in a clockwise direction, pulling on the flexible line can cause the rotatable element to rotate in a counterclockwise direction.

The spring assembly can be configured so that when the flexible line is relaxed, e.g., when the pulling force on the flexible line is less than the force of the spring assembly, the spring assembly can cause the rotatable element to rotate in the clockwise direction, e.g., opposite to the counterclockwise direction that the flexible line can exert on the rotatable element.

In some embodiments, the present invention discloses a clamping device for lifting and/or for transferring heavy objects, such as granite plates, cement blocks, metal plates, and objects of other shapes and materials. The clamping device can grip the objects by clamping on portions of the objects, such as at edges of the objects.

The present clamping device can lift an object, or multiple objects placing next to each other, such as lifting a plate or a stack of multiple plates. The clamping device can be used for lifting heavy plates with large thicknesses without damaging the lifted plates, such as without deforming or cracking the plates. The center of the clamping action can be evenly distributed to the clamping jaws, to provide an even clamping force on the objects.

Further, the clamping device can be compact and light weight, e.g., which can include two jaw assemblies coupled to a clamp bar. The small size of the clamping device can allow the clamping device to be placed in the gaps of multiple objects to clamp on the selected object. For example, multiple heavy plates can be stacked against each other in a facility with small gaps in between. The clamping device can be placed at the gaps, and enclosing the plate to be clamped.

The small size and light weight of the clamping device can allow the clamping device to easily move along the object, for example, so that the clamping device can clamp on a vertical line with the center of gravity of the object. The alignment of the clamping device with the center of gravity can prevent excessive tilting of the object when lifted.

FIGS. 4A-4E illustrate clamping devices according to some embodiments. In FIG. 4A, a clamping device 400 can have a solid pulling element. The clamping device can include a jaw and a jaw assembly coupled to a clamp bar. The jaw assembly can include a jaw 481 and a jaw support 482.

A pulling element 485 can be disposed between the jaw 481 and the jaw support 482. The pulling element can be loosely coupled to the clamp bar. For example, the pulling element can include a hollow space, such as a through hole, in which the clamp bar can pass through. The hollow space can be larger than the cross section of the clamp bar, so that the pulling element can move relative to the clamp bar.

Alternatively, the clamp bar between the two jaw assemblies, e.g., the connection element between the two jaw assemblies, can include one connection bar or multiple connection bars. The multiple connection bars can be secured to the jaw assemblies, and the pulling element can be disposed between the connection bars.

In some embodiments, the pulling element can be constrained to prevent sideward movements, e.g., the pulling element can move in the up and down directions, e.g., in the directions of gravity and in the directions along the clamp bar. Thus the hollow space of the pulling element can be larger above and below the clamping bar, to allow the pulling element to move up and down with respect to the clamp bar. The hollow space can be close to the clamp bar at sides, such as in contact or having a small gap. The closeness of the pulling element and the clamp bar in sideward directions, e.g., in directions perpendicular to the gravity directions, can constrain the pulling element from moving in the sideward directions. Similarly, the multiple clamp bar configuration with the pulling element disposed between the clamp bars can allow the pulling element to move freely in directions except the sideward directions.

There can be slanting interfaces between the pulling element and the jaw assembly in which the pulling element is disposed within. There can be one or two slanting interfaces. For example, slanting interface 480A can be between the pulling element 485 and the jaw 481. Slanting interface 480B can be between the pulling element 485 and the jaw support 482. There can be two slanting interfaces, or there can be one slanting interface, with the other interface being a non-slanting interface, e.g., a vertical surface or a tilted surface sloped in an opposite direction as the slanting interface. As shown, the pulling element can move up and down along the slanting interfaces 480A and 480B.

The slanting interfaces can be configured so that when the pulling element moves up, e.g., in a direction for lifting the object, the jaw can move in a direction that increases a separation between the jaw and the jaw support. For example, a bottom portion of the pulling element, e.g., a dimension of the pulling element at the bottom portion in a direction between the jaw and the jaw support, can be larger than a top portion of the pulling element, e.g., a dimension of the pulling element at a top portion in a direction between the jaw and the jaw support, or a dimension of the pulling element at a portion above the dimension of the pulling element at a top portion, in a direction between the jaw and the jaw support.

That way, when the pulling element moves up, the larger bottom portion also moves up, further separating the jaw and the jaw support. The slanting interface between the pulling element and the jaw support can provide that the corresponding bottom portion of the jaw support can be smaller than the corresponding top portion of the jaw support. The slanting interface between the pulling element and the jaw can provide that the corresponding bottom portion of the jaw can be smaller than the corresponding top portion of the jaw.

In some embodiments, the slanting interfaces can be provided at a portion of the surface that the pulling element is facing the jaw or the jaw support. Thus a bottom portion or a top portion of the pulling element can be only a portion of the interface between the pulling element and the jaw/jaw support.

The slanting interfaces 480A and 480B can be configured so that when the pulling element 485 starts to move up, the pulling element can move along the slanting interfaces. With the slanting interfaces, the jaw 481 can also start to move away 484 from the jaw support. The potential side movement of the second jaw can exert a force on the object, preventing the object from moving down, e.g., to clamp the object in place.

The slanting interface can be configured so that the second jaw can be moving toward the object when the pulling element is moving up. Thus, if there is no obstacle blocking the movement of the second jaw, e.g., the object is not present or the object is not in contact with the second jaw, the second jaw is moving toward the object or away from the jaw support when the pulling element is moving upward.

The slanting interface can be configured so that when there is an upward force acting on the pulling element, there is an upward force (e.g., a force having a component in the upward direction) along the slanting interfaces. The upward force can be converted to a sideward force toward the object. The conversion of the upward force can be viewed as a decomposition or a splitting of the upward force into multiple force components, in which a force component has a sideward direction. Thus, if there is no obstacle blocking the movement of the jaw, e.g., the object is not present or the object is not in contact with the jaw, the jaw is moving toward the object (in addition to the jaw potentially moving down) when there is the upward force acting on the pulling element. If there is an obstacle blocking the movement of the jaw, e.g., the object is in contact with the jaw, there is a sideward force from the jaw pressing on the object.

In FIG. 4B, a clamping device 401 can include a flexible line as a pulling element. The clamping device can include two jaw assemblies 440 and 460 coupled to a clamp bar 450. The jaw assembly can include a jaw, or a jaw and a jaw support. As shown, the jaw assembly 460 includes a jaw 461. And the jaw assembly 440 includes a jaw 441 and a jaw support 442.

The jaw assembly can be fixedly coupled to the clamp bar, or can be movably and securably (or lockably) coupled to the clamp bar, using an optional secure (locking) mechanism. As shown, the jaw assembly 460 is movably coupled to the clamp bar 450, together with a secure (locking) mechanism 421 for securing the jaw assembly 460 to the clamp bar 450. And the jaw assembly 440 is movably coupled to the clamp bar 450, together with a secure (locking) mechanism 420 for securing the jaw assembly 440 to the clamp bar 450.

The jaw assemblies 440 and 460 each can include a jaw for clamping on an object 410. For example, the jaw assembly 460 can include a first jaw 461. The jaw assembly 440 can include a second jaw 441, which together with the first jaw 461, pressing on the object 410 for clamping the object. The jaw assemblies can be fixedly or movably coupled to the clamp bar. For example, the jaw assembly 460 can be movably coupled to the clamp bar 450 by the first jaw 461 movably along the clamp bar 450. The jaw 461 can be secured to the clamp bar by the secure (locking) mechanism 421, for example, through a latching mechanism that latches the jaw 461 to the clamp bar 450.

The jaw assemblies can be movable along to the clamp bar, e.g., to accommodate different ranges of sizes of the object. Once the jaw opening between the jaws 441 and 461 is large enough to clamp on the object 410, the jaw support 440 can then be fixed to the clamp bar 450. For example, the jaw assembly 440 can be movable along the clamp bar 450 by sliding the jaw support 442 along the clamp bar 450. A secure (locking) mechanism 420 can be included to lock, e.g., to secure, the jaw assembly 440 to the clamp bar 450, for example, by latching the jaw support 442 to the clamp bar 450.

A rotatable element 430 can be disposed between the jaw 441 and the jaw support 442 of the jaw assembly 440. The rotatable element can be coupled to the second jaw or to the jaw support. For example, the rotatable element can be coupled to the jaw support through a set of bearing 444 (see FIG. 4D(b)), which can allow the rotatable element to rotate relative to the jaw support.

There can be slanting interfaces between the rotatable element and the jaw assembly in which the rotatable element is disposed within. For example, slanting interface 471 can be between the rotatable element 430 and the jaw 441. The slanting interface can include a tilted surface, which can be configured to change a relative distance between the rotatable element and the second jaw (or the jaw support if the rotatable element is coupled to the second jaw). As shown, the rotatable element is coupled to the jaw support and can rotate to push or pull the second jaw.

The slanting interfaces can be configured so that when the rotatable element rotates, e.g., in a direction 472 caused by lifting a pulling element 443 such as a cable or a chain, the jaw can move in a direction that increases a separation between the jaw and the jaw support. For example, the rotatable element 430 can include a cylinder having a tilted base 435. Thus, then the cylinder rotates, the tilted base also rotates, to push a mating surface of the second jaw away. That way, when the pulling element moves up, the rotatable element rotates to further separate the jaw and the jaw support.

In some embodiments, the slanting interfaces can be provided at a portion of the surface that the pulling element is facing the jaw or the jaw support.

The slanting interface 471 can be configured so that when the rotatable element 430 starts to rotate 472, the jaw 441 can also start to move away 474 from the jaw support since the jaw support is secured to the clamp bar by the secure (locking) mechanism 420. The potential side movement of the second jaw can exert a force on the object, preventing the object from moving down, e.g., to clamp the object in place.

The slanting interface can be configured so that the second jaw 441 can be moving toward the object 410 when the rotatable element 430 is rotating. Thus, if there is no obstacle blocking the movement of the second jaw, e.g., the object is not present or the object is not in contact with the second jaw, the second jaw is moving toward the object or away from the jaw support when the rotatable element is rotating in one direction.

The slanting interface can be configured so that when there is an upward force 433 acting on the pulling element 443, there is a torque acting on the rotatable element 430, which results in a sideward force 474 toward the object. Thus, if there is no obstacle blocking the movement of the jaw, e.g., the object is not present or the object is not in contact with the jaw, the jaw is moving toward the object (in addition to the jaw potentially moving down) when there is the upward force acting on the pulling element. If there is an obstacle blocking the movement of the jaw, e.g., the object is in contact with the jaw, there is a sideward force from the jaw pressing on the object.

The slanting interface can have a low friction surface, e.g., lower than the friction between the object 410 and the jaws 461 and 441. For example, the jaws 461 and 441 can include a rubber layer facing the object, which can have high friction toward the object.

There can be one or two slanting interfaces.

A spring assembly 445 can be coupled to the rotatable element. The spring assembly can be tensioned as to rotate the rotatable element in a direction opposite to direction 472, e.g., opposite to the direction of rotation of the rotatable element when the pulling element is pulled up. The tensioned spring assembly thus can rotate the rotatable assembly when there is no tension or when there is less tension in the pulling element, for example, when the pulling element is relaxed, not being pulled up.

In operation, the object is first clamped between the jaws 461 and 441 of the clamping device. For example, the secure (locking) mechanism 421 can be engaged to secure the jaw 461 to the clamp bar 450. The secure (locking) mechanism 420 can be disengaged, so that the jaw support 442 is free to move along the clamp bar 450. The jaw assembly 440 can be moving away from the jaw assembly 460 to enlarge the opening between the jaw 461 and 441. Once the opening is large enough to accommodate the object, the object can be placed between the jaws. The jaw assembly 440 can then be moving toward the object so that the object is in contact with the jaws, or so that there is a minimum gap between the object and the jaws. The jaw assembly 440 then can be secured to the clamp bar, for example, by engaging the secure (locking) mechanism 420.

Alternatively, the jaw assembly 440 can be locked first, and the jaw assembly 460 can be adjusted to ensure a minimum gap between the object and the jaws.

There can be a gap 422 between the object and the jaws, if the secure (locking) mechanism 420 is a discrete secure (locking) mechanism, e.g., the secure (locking) mechanism can secure the jaw assembly 440 to the clamp bar 450 at discrete locations, and the engagable locations for the current object do not allow the object to be in contact. The location to engage the secure (locking) mechanism can be selected to ensure a minimum gap between the object and the jaws, meaning the total gap between the object and the first jaw and between the object and the second jaw is smaller than the distance between two successive locking locations of the secure (locking) mechanism.

After placing the object between the jaws and secure the jaw assemblies, the pulling element can be pulled up. For example, the pulling element can be coupled to a hoist, and the hoist can move upward. The upward movement 423 of the pulling element can rotate the rotatable element, which can push the jaw 441 toward the object, closing the gap 422 until the jaw 441 is in contact with the object. A slow upward pulling of the pulling element can be applied when the jaws are not yet in contact with the object, so that the object does not escape the clamping element.

After the jaws clamp on the object, the pulling element, e.g., through the hoist, can be further pulled up to lift the object. The hoist then can move and transfer the object to a new location.

Additional advantages of the clamping device having a pulling element include that the jaw can be fixed in location with respect to the object, meaning the pulling element can move to press on the jaw without the need to move the jaw. A further advantage of the clamping device having a pulling element is a high transfer coefficient between the upward force of the pulling element and the sideward force of the jaw on the object.

In some embodiments, in a jaw assembly, the jaw and the jaw support can be flexibly coupled, e.g., there can be limited movements of the jaw relative to the jaw support. For example, the jaw can include hollow spaces, such as through holes. One or more rods or bars can pass through the hollow spaces, which constrain the movements of the jaw. The hollow spaces can be larger than the rods or bars, e.g., larger than a cross section of the rods or bars, thus the jaw can move within the constraints of the rods and bars. For example, the jaw can slide in a direction along the rods or bars. With the hollow spaces larger than the rods or bars, the jaw can also move in a direction perpendicular to the direction along the rods or bars. The rods or bars can be a part of the clamp bar, e.g., the connection element, meaning the rods and bars can be secured at both ends to the jaw support if the jaw assembly includes a jaw and a jaw support. The clamp bar can include additional rods or bars.

In addition, by shaping the hollow spaces with respect to the rods or bars, the jaw can be further constrained to move in linear directions instead of moving in a plane perpendicular to the rods or bars. For example, the hollow spaces can include elongated holes along up and down directions. The elongated hollow spaces thus can allow the rods or bars to move within the hollow spaces in the up and down directions. The elongated holes can form minimum gaps with the rods or bars in horizontal directions perpendicular to the up/down directions and to the directions along the rods or bars. Thus the rods or bars is constrained, e.g., not able to move in the horizontal directions perpendicular to the up/down directions and to the directions along the rods or bars. With the elongated hollow spaces in the jaw, the jaw can move in upward direction, downward directions, direction toward the jaw support, and direction away from the jaw support.

In some embodiments, there can be a limiter to restrict the movements of the jaw with respect to the jaw support (FIG. 4E). The limiter can be coupled to the jaw support, and include a stopper to prevent the jaw from moving pass a certain position. The limiter can be coupled to other components, such as coupled to the clamp bar, or to any component that is fixed coupled to the jaw support.

There can be flexible couplings between the second jaw and the jaw support. The flexible couplings can allow the second jaw to move in multiple directions with respect to the jaw support, such as down and away from the jaw support. The flexible couplings can include springs 475 having two ends fixedly coupled to the second jaw and the jaw support. The springs can bend and flex, allowing the second jaw to move relative to the jaw support.

The springs 475 can also be tensioned to pull the jaw 441 toward the jaw support 442. For example, the springs 475 can be stretched when being assembled between the jaw and the jaw support. The stretched springs can function to pull the jaw toward the jaw support, for example, especially when the tension in the pulling element is reduced, such as when the pulling element is released.

The pulling element can pulls up, rotating the rotatable element in a direction to push the jaw away from the jaw support. When the pulling element is released, such as when a hoist coupled to the pulling element is lowered when the clamping device is on the ground, the spring assembly 445 can rotate the rotatable element in an opposite direction, which can roll the pulling element around the rotatable element, and which can create a gap between the jaw and the rotatable element. The tensioned or stretched springs can pull the jaw toward the jaw support, to eliminate the gap.

The tensioned spring assembly thus can rotate the rotatable assembly when there is no tension or when there is less tension in the pulling element, for example, when the pulling element is relaxed, not being pulled up.

In addition, end point limits such as limiter 423 can be included to prevent the second jaw from moving too far from the jaw support. The second jaw can be blocked in the horizontal directions by the jaw support and the object, so there can be no need for end point limits in the horizontal directions.

In some embodiments, the slanting interfaces can have low friction, e.g., lower than the friction at the interfaces between the jaws and the object. For example, the friction at the interfaces between the jaws and the object can be increased by adding a high friction layer, such as a rubber pad, to the jaw external surfaces. Alternatively, the friction at the slanting interface can be reduced by using rolling friction, e.g., the pulling element can include rollers, which roll on a surface of the jaw, providing a rolling friction at the slanting interface between the pulling element and the jaw; or the rollers can roll on a surface of the jaw support, providing a rolling friction at the slanting interface between the pulling element and the jaw support. Inversely, the jaw or the jaw support can include rollers for rolling on surfaces of the pulling element.

FIGS. 5A-5B illustrate flow charts for forming and operating a clamping device according to some embodiments. In FIG. 5A, operation 500 forms a clamping device. The clamping device can include a first jaw fixedly coupled to a clamp bar, and a second jaw assembly movably and fixedly coupled to the clamp bar. The second jaw assembly can include a second jaw and a jaw support, together with a rotatable element disposed between the second jaw and the jaw support. There can be at least a slanting interface coupling between the rotatable element and the second jaw or between the rotatable element and the jaw support. The slanting interface can be configured so that when the rotatable element rotates, the second jaw moves toward an object for keeping the object in place.

In some embodiments, the components of the clamping device, such as the jaw supports, the jaws, and the clamp bars, can include a metal core embedded in a different material. The construction of the components using metal cores can be simpler and more cost effective while meeting the requirements of strength, hardness, durability and reliability.

In FIG. 5B, operation 520 places an object between a first jaw and a second jaw of a clamping device. The second jaw can be part of a jaw assembly. The jaw assembly further can include a jaw support and a pulling element coupled to a rotatable element disposed between the second jaw and the jaw support. There can be at least a slanting interface coupling between the rotatable element and the second jaw or between the rotatable element and the jaw support.

In some embodiments, a distance between the first jaw and the second jaw can be enlarged, for example, by disengaging a secure (locking) mechanism that is used to secure the jaw assembly to a clamp bar. If there are two secure (locking) mechanisms, either one can be disengaged. After the secure (locking) mechanism is disengaged, the jaw assembly can be freely moved along the clamp bar, and the jaw assembly can be moved away from the other jaw or the other jaw assembly.

After placing the object in between the jaws, the distance between the first jaw and the second jaw can be optionally narrowed, for example, by moving one jaw assembly toward the other jaw assembly. For example, if the first jaw assembly is fixedly coupled to the clamp bar, then the second jaw assembly can be pushed toward the first jaw assembly to narrow the distance between the two jaws. The second jaw assembly can be stopped, e.g., after being pushed toward the first jaw assembly, when the total gap between the object and the jaws is at a minimum.

Operation 530 optionally locks the jaw assembly so that the object is disposed between the first jaw and the second jaw. The secure (locking) mechanism can be a discrete secure (locking) mechanism, meaning the jaw assembly can be secured to the clamp bar at discrete locations. The jaw assembly is then locked, e.g., the secure (locking) mechanism is engaged, at a location that the total gap between the object and the jaws is minimum, e.g., the total gap is smaller than a distance between two discrete locations that the secure (locking) mechanism can be engaged.

Operation 540 lifts the pulling element which rotates the rotatable element, which moves the second jaw toward the object, since the slanting interface is configured so that when the pulling element moves up, the second jaw moves toward the object. The pulling element can be lifted slowly, to ensure that the object is still placed on the ground when there is a gap between the object and the jaws. After the jaws contact the object, the pulling element can be further lifted to lift the object from the ground. The pulling force, and/or the weight of the object, can be converted to a clamping force of the jaws against the object, keeping the object within the grip of the clamping device.

In some embodiments, a clamping device can be formed by forming a clamp bar, e.g., a connection element for the two jaw assemblies, forming a first jaw, and then coupling the first jaw with the clamp bar. A second jaw can be formed, which includes a jaw support and a second jaw. The jaw support can be coupled with the clamp bar. The second jaw can be coupled with the jaw support by a set of springs.

In some embodiments, one or more slanting interfaces of the clamping device can have a low friction, such as a low coefficient of friction. The friction of the slanting interfaces can be lower than that of the gripping interfaces, e.g., the interfaces between the object and the jaws gripping the object.

The lower friction can be achieved by increasing the friction of the gripping interfaces or gripping surfaces. For example, the jaw outer surfaces, e.g., the surfaces of the jaws to be in contact with the object, can have a high friction layer disposed thereon. For example, a rubber layer can be coupled to the jaw, to increase the friction of the jaw with the object, which can prevent the object from slipping from the jaw during the handling of the object.

The lower friction can be achieved by decreasing the friction of the slanting interfaces. For example, the slanting interfaces, e.g., the mating surfaces between two parts in the jaw assembly, such as the interface between the jaw and the rotatable element, or the interface between the rotatable element and the jaw support, can have smoother surfaces, such as having a grease coating, or low contact area surfaces, such as rolling frictions from balls or rollers. The low friction interfaces can make it easier for the rotatable element to move with respect to the jaw while the jaws grip the object.

For example, the rotatable element can have rolling balls on one or two surfaces, e.g., on one surface facing the second jaw, or on one surface facing the jaw support, or on both surfaces. Alternatively, the second jaw can have rolling balls on the surface facing the rotatable element, or the jaw support can have rolling balls on the surface facing the rotatable element.

In some embodiments, a clamping device can have a rotatable element having a slanting surface. The slanting surface can include a curve surface, e.g., having a spiral curve configuration on a rotatable element, so that a point on the slanting surface can move away or toward an end of the rotatable element when the rotatable element rotates. For example, the rotatable element can include a cylinder with a perpendicular end, e.g., the surface of the perpendicular end forms a right angle with an axis of the cylinder. An opposite end of the cylinder can have a slanting surface, such as a curve or a spiral surface. Thus, when the cylinder rotates, a point on the curve or spiral surface can move linearly along the axis of the cylinder, toward or away from the perpendicular end.

FIGS. 6A-6C illustrate a rotatable element having a slanting surface according to some embodiments. FIG. 6A shows a perspective view and FIG. 6B shows a side view of a rotatable element 630. The rotatable 630 can include a base 631 and a spiral component 671, e.g., a curve element with gradually increase thickness. The rotatable element can be disposed between a jaw and a jaw support of a jaw assembly of a clamping device. For example, a jaw can be coupled to the base 631 of the rotatable element, while the jaw support interfacing the spiral component 671 of the rotatable element. Alternatively, the jaw support can be coupled to the base and the jaw coupled to the spiral component.

One or more rollers 644A and 644B can interface the spiral component 671, e.g., resting against the spiral surface of the spiral component. The rollers can have a same axis of rotation, and can be mounted on a jaw 641 or on a jaw support 642.

A pulling element 643 can be coupled to the rotatable element 630 to rotate the rotatable element. For example, a cable, such as a steel cable or a chain, can wrap around the base of the rotatable element, with one end fixedly coupled to the base. Thus when the cable is pulled, the rotatable element can rotate in one direction. The rotatable element can be spring-loaded, so that when the cable is released, the rotatable element rotates in an opposite direction.

When the rotatable element rotates, for example, by pulling on the pulling element, the rollers roll on the spiral surface while maintaining a same axis of rotation. The axis of rotation can move linearly with respect to the base of the rotatable element, e.g., staying closer to the base at one section of the spiral surface, and stay farther from the base at another section of the spiral surface.

As shown, the slanting surface, e.g., the spiral surface, is coupled to the rotatable component, to interface with rollers coupled to the jaw or the jaw support. Alternatively, the slanting surface, e.g., the spiral surface, can be coupled to the jaw or to the jaw support, to interface with rollers coupled to the rotatable component.

FIGS. 6C (a)-(c) show an operation of the rotatable element. The rotatable element 630 can be disposed between a jaw 641 and a jaw support 642 of a jaw assembly of a clamping device. As shown, the rotatable element has a base end facing the jaw 641 and the spiral surface interfacing rollers coupled to the jaw support. Other configuration can be used, such as the base facing the jaw support and the spiral surface interfacing the jaw. In some embodiments, the jaw support can be fixedly coupled to the clamp bar of the clamping device.

In FIG. 6C (a), the rollers are resting on one end of the spiral surface, e.g., the end section of the spiral surface closest to the base, separating the jaw support 642 from the jaw 641 by a distance 675A.

In FIG. 6C (b), the rotatable element 630 can rotate 673, for example, by pulling on the pulling element. The rollers can roll on the spiral surface of the rotatable element. The rotatable element can rotate an angle, so that the rollers are resting on a section of the spiral surface, away from the end section. A force 674 can be exerted on either the rotatable element or the jaw support when the rotatable element rotates to increase the distance between the jaw and the jaw support to be 675B, which is larger than the previous distance of 675A.

In FIG. 6C (c), the rotatable element 630 can continue to rotate 673. The distance can further increase to 675C, which is larger than the previous distances of 675B and 675A.

Thus, the rotatable element can convert a vertical pulling force on the pulling element to a horizontal force, to push the jaw away from the jaw support, for clamping on an object.

FIGS. 7A-7C illustrate a rotatable element having a slanting surface according to some embodiments. FIG. 7A shows a perspective view of a rotatable element 730, and FIG. 7B shows a perspective view of a mating component to the rotatable element, such as a jaw 741 or a jaw support 742. The rotatable 730 can include a base 731 and a spiral surface on a spiral component 771. The rotatable element can be disposed between a jaw and a jaw support of a jaw assembly of a clamping device. For example, a jaw can be coupled to the base 731 of the rotatable element, while the jaw support interfacing the spiral component 771 of the rotatable element. Alternatively, the jaw support can be coupled to the base and the jaw coupled to the spiral component.

A mating spiral component 744, e.g., a spiral component that can interface the spiral component 771, can be used to interface the spiral component 771, e.g., facing against the spiral surface of the spiral component. The mating spiral component 744 can be mounted on a jaw 741 or on a jaw support 742.

A pulling element 743 can be coupled to the rotatable element 730 to rotate the rotatable element. For example, a cable, such as a steel cable or a chain, can wrap around the base of the rotatable element, with one end fixedly coupled to the base. Thus when the cable is pulled, the rotatable element can rotate in one direction. The rotatable element can be spring-loaded, so that when the cable is released, the rotatable element rotates in an opposite direction.

When the rotatable element rotates, for example, by pulling on the pulling element, the mating spiral surface can slide on the spiral surface. The mating spiral component thus can move linearly with respect to the base of the rotatable element, e.g., staying closer to the base at one section of the spiral surface, and stay farther from the base at another section of the spiral surface.

FIGS. 7C (a)-(c) show an operation of the rotatable element. The rotatable element 730 can be disposed between a jaw 741 and a jaw support 742 of a jaw assembly of a clamping device. As shown, the rotatable element has a base end facing the jaw 741 and the spiral surface interfacing the mating spiral interface coupled to the jaw support. Other configuration can be used, such as the base facing the jaw support and the spiral surface interfacing the jaw. In some embodiments, the jaw support can be fixedly coupled to the clamp bar of the clamping device.

In FIG. 7C (a), the two spiral surfaces are facing each other at a position with maximum surface contact between the two spiral surfaces, e.g., the thickest part of the mating spiral surface contacting the thinnest part of the spiral surface. The jaw 741 is separated from the jaw support 742 by a distance 775A.

In FIG. 7C (b), the rotatable element 730 can rotate 773, for example, by pulling on the pulling element. The mating spiral surface can slide on the spiral surface of the rotatable element. The rotatable element can rotate an angle, so that the two spiral surfaces are at a position with less surface contact as compared to the position having maximum surface contact. A force 774 can be exerted on either the rotatable element or the jaw support when the rotatable element rotates to increase the distance between the jaw and the jaw support to be 775B, which is larger than the previous distance of 775A.

In FIG. 7C (c), the rotatable element 730 can continue to rotate 773. The distance can further increase to 775C, which is larger than the previous distances of 775B and 775A.

Thus, the rotatable element can convert a vertical pulling force on the pulling element to a horizontal force, to push the jaw away from the jaw support, for clamping on an object.

Figure 8A:
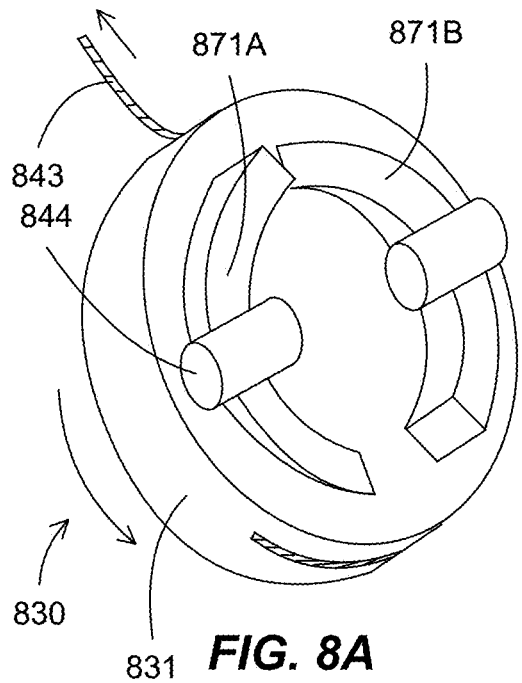
FIGS. 8A-8C illustrate a rotatable element having a slanting surface according to some embodiments.
Figure 8B:
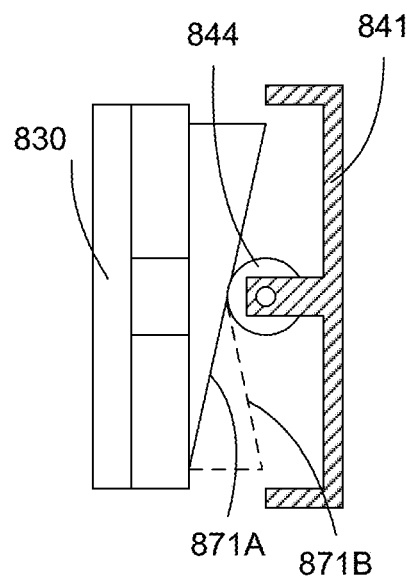
Figure 8C:
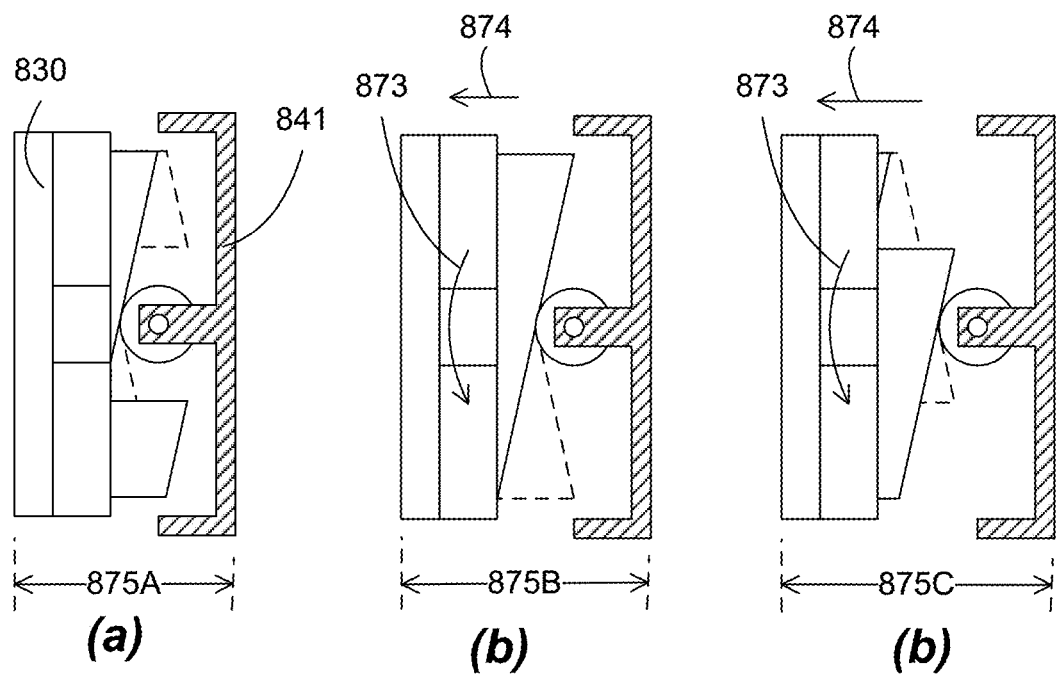

FIGS. 8A-8C illustrate a rotatable element having a slanting surface according to some embodiments. FIG. 8A shows a perspective view and FIG. 8B shows a side view of a rotatable element 830. The slanting surface can include two end-to-end spiral surfaces disposed in two portions of the rotatable component. The rotatable element 830 can include a base 831 and two spiral components 871A and 871B. The two spiral components can formed one after the other, so that there can be two spiral surfaces following each other. A spiral surface can increase from a thinnest thickness to a thickest thickness, followed by another spiral surface also from a thinnest thickness to a thickest thickness. The two spiral surfaces can be mated with two rollers 844.

The rotatable element can be disposed between a jaw and a jaw support of a jaw assembly of a clamping device. For example, a jaw can be coupled to the base 831 of the rotatable element, while the jaw support interfacing the spiral component 871 of the rotatable element. Alternatively, the jaw support can be coupled to the base and the jaw coupled to the spiral component.

Two rollers 844 can interface the spiral components 871A and 871B, e.g., resting against the spiral surfaces of the spiral components. The rollers can have a same axis of rotation, and can be mounted on a jaw 841 or on a jaw support 842.

A pulling element 843 can be coupled to the rotatable element 830 to rotate the rotatable element. For example, a cable, such as a steel cable or a chain, can wrap around the base of the rotatable element, with one end fixedly coupled to the base. Thus when the cable is pulled, the rotatable element can rotate in one direction. The rotatable element can be spring-loaded, so that when the cable is released, the rotatable element rotates in an opposite direction.

When the rotatable element rotates, for example, by pulling on the pulling element, the rollers roll on the spiral surface while maintaining a same axis of rotation. The axis of rotation can move linearly with respect to the base of the rotatable element, e.g., staying closer to the base at one section of the spiral surface, and stay farther from the base at another section of the spiral surface.

As shown, the slanting surface, e.g., the spiral surface, is coupled to the rotatable component, to interface with rollers coupled to the jaw or the jaw support. Alternatively, the slanting surface, e.g., the spiral surface, can be coupled to the jaw or to the jaw support, to interface with rollers coupled to the rotatable component.

FIGS. 8C (a)-(c) show an operation of the rotatable element. The rotatable element 830 can be disposed between a jaw 841 and a jaw support 842 of a jaw assembly of a clamping device. As shown, the rotatable element has a base end facing the jaw 841 and the spiral surfaces interfacing rollers coupled to the jaw support. Other configuration can be used, such as the base facing the jaw support and the spiral surfaces interfacing the jaw. In some embodiments, the jaw support can be fixedly coupled to the clamp bar of the clamping device.

In FIG. 8C (a), the rollers are resting on one end of the spiral surfaces, e.g., the end section of the spiral surface closest to the base, separating the jaw support 842 from the jaw 841 by a distance 875A.

In FIG. 8C (b), the rotatable element 830 can rotate 873, for example, by pulling on the pulling element. The rollers can roll on the spiral surfaces of the rotatable element. The rotatable element can rotate an angle, so that the rollers are resting on a section of the spiral surfaces, away from the end section. A force 874 can be exerted on either the rotatable element or the jaw support when the rotatable element rotates to increase the distance between the jaw and the jaw support to be 875B, which is larger than the previous distance of 875A.

In FIG. 8C (c), the rotatable element 830 can continue to rotate 873. The distance can further increase to 875C, which is larger than the previous distances of 875B and 875A.

Thus, the rotatable element can convert a vertical pulling force on the pulling element to a horizontal force, to push the jaw away from the jaw support, for clamping on an object.

Figures 9A, 9B:
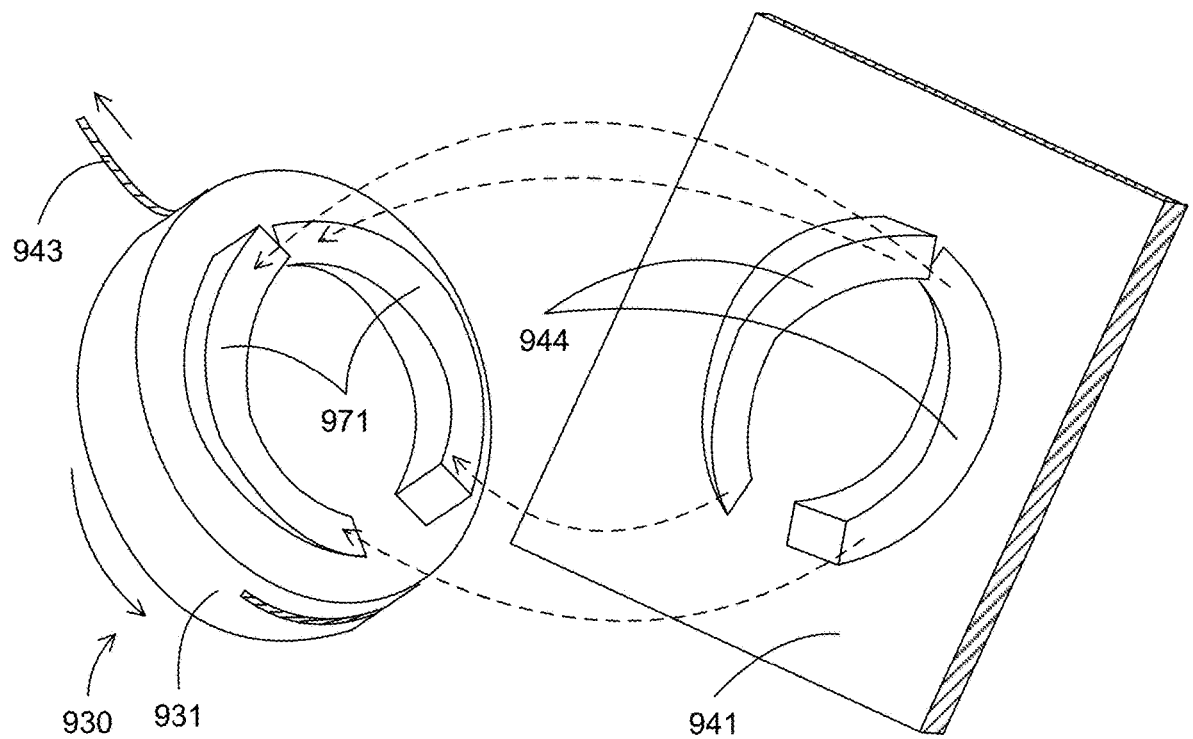
FIGS. 9A-9C illustrate a rotatable element having a slanting surface according to some embodiments.
Figure 9C:
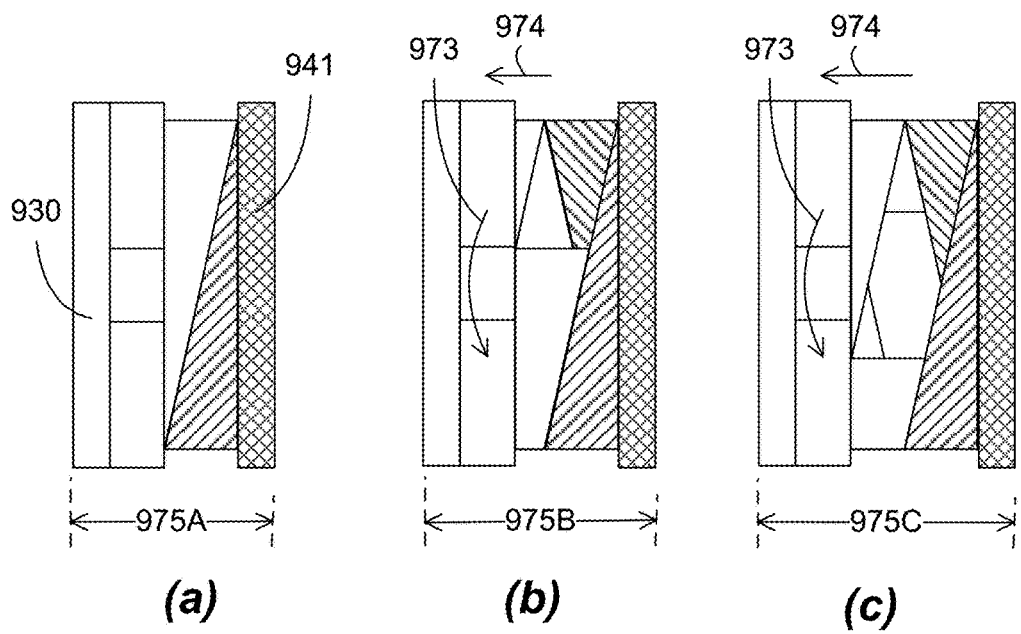

FIGS. 9A-9C illustrate a rotatable element having a slanting surface according to some embodiments. FIG. 9A shows a perspective view of a rotatable element 930, and FIG. 9B shows a perspective view of a mating component to the rotatable element, such as a jaw 941 or a jaw support 942. The slanting surface can include two spiral surfaces disposed in two portions of the rotatable component. The rotatable 930 can include a base 931 and two spiral surfaces on two spiral components 971. The rotatable element can be disposed between a jaw and a jaw support of a jaw assembly of a clamping device. For example, a jaw can be coupled to the base 931 of the rotatable element, while the jaw support interfacing the spiral components 971 of the rotatable element. Alternatively, the jaw support can be coupled to the base and the jaw coupled to the spiral components.

Mating spiral components 944, e.g., spiral components that can interface the spiral components 971, can be used to interface the spiral components 971, e.g., facing against the spiral surfaces of the spiral components. The mating spiral components 944 can be mounted on a jaw 941 or on a jaw support 942.

A pulling element 943 can be coupled to the rotatable element 930 to rotate the rotatable element. For example, a cable, such as a steel cable or a chain, can wrap around the base of the rotatable element, with one end fixedly coupled to the base. Thus when the cable is pulled, the rotatable element can rotate in one direction. The rotatable element can be spring-loaded, so that when the cable is released, the rotatable element rotates in an opposite direction.

When the rotatable element rotates, for example, by pulling on the pulling element, the mating spiral surfaces can slide on the spiral surfaces. The mating spiral components thus can move linearly with respect to the base of the rotatable element, e.g., staying closer to the base at one section of the spiral surface, and stay farther from the base at another section of the spiral surface.

FIGS. 9C (a)-(c) show an operation of the rotatable element. The rotatable element 930 can be disposed between a jaw 941 and a jaw support 942 of a jaw assembly of a clamping device. As shown, the rotatable element has a base end facing the jaw 941 and the spiral surfaces interfacing the mating spiral surfaces coupled to the jaw support. Other configuration can be used, such as the base facing the jaw support and the spiral surfaces interfacing the jaw. In some embodiments, the jaw support can be fixedly coupled to the clamp bar of the clamping device.

In FIG. 9C (a), the spiral surfaces and the mating spiral surfaces are facing each other at a position with maximum surface contact between the spiral surfaces, e.g., the thickest part of the mating spiral surfaces contacting the thinnest part of the spiral surfaces. The jaw 941 is separated from the jaw support 942 by a distance 975A.

In FIG. 9C (b), the rotatable element 930 can rotate 973, for example, by pulling on the pulling element. The mating spiral surfaces can slide on the spiral surfaces of the rotatable element. The rotatable element can rotate an angle, so that the spiral surfaces are at a position with less surface contact as compared to the position having maximum surface contact. A force 974 can be exerted on either the rotatable element or the jaw support when the rotatable element rotates to increase the distance between the jaw and the jaw support to be 975B, which is larger than the previous distance of 975A.

In FIG. 9C (c), the rotatable element 930 can continue to rotate 973. The distance can further increase to 975C, which is larger than the previous distances of 975B and 975A.

Thus, the rotatable element can convert a vertical pulling force on the pulling element to a horizontal force, to push the jaw away from the jaw support, for clamping on an object.

FIGS. 10A-10C illustrate flow charts for forming rotatable elements according to some embodiments. In FIG. 10A, operation 1000 forms a clamping device. The clamping device can include a rotatable component coupled to a jaw support. The rotatable component or the jaw support can include a slanting interface. The slanting interface can be configured so that when the rotatable component rotates, the rotatable component moves relative to the jaw support in a direction along an axis of rotation. The slanting interface can include a slanting surface, such as one or more spiral surfaces, interfacing one or more rollers. The slanting interface can include a slanting surface, such as one or more spiral surfaces, interfacing another slanting surface, such as one or more mating spiral surfaces, e.g., second spiral surfaces which can be mated with the first spiral surfaces.

In FIG. 10B, operation 1020 forms a clamping device. The clamping device can include a rotatable component disposed between a jaw and a jaw support. The rotatable component can include a slanting surface interfacing a roller coupled to the jaw support or to the jaw. The interface can be configured so that when the rotatable component rotates, the roller rolls on the slanting surface in such a way to move the rotatable component relative to the jaw support or the jaw in a direction along an axis of rotation.

The slanting interface can include a slanting surface, such as one or more spiral surfaces, interfacing one or more rollers. The slanting interface can include a slanting surface, such as one or more spiral surfaces, interfacing another slanting surface, such as one or more mating spiral surfaces, e.g., second spiral surfaces which can be mated with the first spiral surfaces.

Alternatively, the jaw support can include a slanting surface interfacing a roller coupled to the rotatable component.

In FIG. 10C, operation 1040 forms a clamping device. The clamping device can include a rotatable component coupled to a jaw support. The rotatable component can include a slanting surface interfacing a mating surface of the jaw support. The interface can be configured so that when the rotatable component rotates, the slanting surface moves on the mating surface in such a way to move the rotatable component relative to the jaw support in a direction along an axis of rotation.

The slanting interface can include a slanting surface, such as one or more spiral surfaces, interfacing one or more rollers. The slanting interface can include a slanting surface, such as one or more spiral surfaces, interfacing another slanting surface, such as one or more mating spiral surfaces, e.g., second spiral surfaces which can be mated with the first spiral surfaces.

Alternatively, the jaw support can include a slanting surface interfacing a roller coupled to the rotatable component.

FIGS. 11A-11D illustrate a configuration of a clamping device according to some embodiments. A clamping device 1100 can include two jaws 1160 and 1141 for clamping on an object 1110. The jaw 1160 can be fixed coupled to a clamp bar 1150, which can include multiple rods. The jaw 1141 can be movably coupled to the clamp bar, e.g., the jaw 1141 can slide along the clamp bar 1150. A jaw support 1142 can be fixedly coupled to the clamp bar, which can be configured as a support for the jaw 1141 to slide along the clamp bar.

A spring assembly 1175 can be coupled between the jaw 1141 and the jaw support 1142. The springs in the spring assembly 1175 can be tensioned as to pulling the jaw 1141 toward the jaw support 1142. For example, the springs can be stretched from a stable or equilibrium position before the two ends of the springs are coupled to the jaw and the jaw support. Thus, the jaw is normally pulled toward the jaw support.

A rotatable element 1130 can be rotatably coupled to the jaw 1141, e.g., the rotatable element can move as a same unit with the jaw 1141, and can rotate 1173 with respect to the jaw 1141. For example, the rotatable element can be mounted on to the jaw 1141 through a set of bearings.

The rotatable element can include a slanting surface, such as one or more spiral surfaces 1171. The slanting surface can be configured so that the rotatable element can move toward or away from the jaw support when rotating.

A pulling element 1143 can be coupled to the rotatable element to rotate the rotatable element. For example, a solid pulling element can be used to rotate the rotatable element in either rotation direction. A flexible pulling element, such as a flexible line of a cable or a chain, can be used to rotate the rotatable element in one direction when the cable is pulled up. When using flexible pulling elements, a spring set 1145 can be used to rotate the rotatable element in the opposite direction. For example, when a flexible pulling element is released from pulling, the spring set, which is pre-tensioned from a stable position into the rotation direction of the rotatable element when the pulling element is pulling, can return to the stable position by rotating the rotatable element in the opposite direction.

In some embodiments, one or more rollers 1144 can be used to interface with the slanting surface, e.g., one or more spiral surfaces on the rotatable element. The rollers can be coupled to the jaw support 1142, e.g., the axes of the rollers are fixedly coupled to the jaw support and the rollers are free to roll on the fixed axes. Typically, when the rotatable element rotate in one direction, such as direction 1173, by pulling on the flexible pulling element 1143, the slanting surfaces 1171 can push on the rollers 1144 to separate the jaw 1141 and the jaw support 1142, e.g., moving the jaw 1141 away from the jaw support 1142. When the flexible pulling element is released, e.g., the pulling force is reduced to be less than the tension of the spring set 1145, the spring set 1145 can rotate the rotatable element. There can be a gap between the rollers and the slanting surfaces. The spring assembly 1175 can then pull the jaw toward the jaw support, eliminating the gap. As a result, when the pulling element is pulled, the rotatable element rotates in direction 1173, separating the jaw and the jaw support. When the pulling element is released, e.g., refrained from pulling, the rotatable element rotates in an opposite direction, moving the jaw toward the jaw support.

In operation, the two jaws can be separated at a distance larger than a dimension of an object, such as larger than a thickness of the object. The clamping device is then positioned so that the object is disposed between the two jaws. There can be a gap 1122 between the jaws and the object.

The pulling element is then pulled up 1133, for example, by a hoist coupled to the pulling element. When the pulling element is pulled, the rotatable element rotates, and the slanting interface between the rotatable element and the jaw support can cause the rotatable element to move away from the jaw support, to close the gap until the jaws are in contact with the object.

Further pulling of the pulling element can exert a force from the jaws on the object, to effectively clamping the object between the jaws. The hoist then can move up further to lift the clamping device and the object clamped between the jaws.

Other configurations can be used, such as a second slanting surface on the jaw support to interface with the slanting surface of the rotatable element, instead of rollers. Also, the rotatable element can be rotatably coupled to the jaw support, instead of to the jaw. The jaw can be flexibly coupled to the jaw support, instead of movably coupled to the clamp bar.

FIGS. 12A-12B illustrate flow charts for forming an operating a clamping device according to some embodiments. In FIG. 12A, operation 1200 forms a clamping device. The clamping device can include a first jaw fixedly coupled to a clamp bar, and a second jaw assembly coupled to the clamp bar. The second jaw assembly can include a second jaw and a jaw support. The second jaw assembly can include a rotatable component comprising a slanting interface and a pulling component coupled to the rotatable component. The pulling component can be configured to rotate the rotatable component. The slanting interface can be configured so that when the pulling component moves up, the distance between the second jaw and the jaw support increases.

In FIG. 12B, operation 1220 places an object between a first jaw and a second jaw of a clamping device. The second jaw is part of a jaw assembly. The jaw assembly further can include a jaw support and a pulling element having a pulling component disposed between the second jaw and the jaw support. There can be at least a slanting interface coupling between the pulling element and the second jaw or between the pulling element and the jaw support. In some embodiments, the slanting interface can include spiral surfaces coupled with rollers. For example, the rotatable element can include one or more spiral surfaces interfacing one or more rollers coupled to the jaw support. Alternatively, the jaw support can include one or more spiral surfaces interfacing one or more rollers coupled to the rotatable element.

Operation 1230 optionally locks the jaw assembly so that the object is disposed between the first jaw and the second jaw. Operation 1240 lifts the pulling component which moves the second jaw toward the object, since the slanting interface can be configured so that when the pulling element moves up, the second jaw moves toward the object.

In some embodiments, a secure (locking) mechanism can be formed to secure a movable jaw assembly to the clamp bar. The secure (locking) mechanism can be used to secure the jaw or the jaw support of a movable jaw assembly to the clamp bar.

The jaw assembly can be fixedly coupled to the clamp bar, e.g., the jaw assembly cannot be moved. For example, a jaw or a jaw support of the fixed jaw assembly can be secured to the clamp bar, for example, with bolts.

The jaw assembly can be movable along the clamp bar to accommodate different sizes of the objects. For example, the jaw or the jaw support of the jaw assembly can have a hollow portion for the clamp bar to pass through.

The secure (locking) mechanism can secure the movable jaw assembly to the clamp bar. The secure (locking) mechanism can be continuous, meaning the jaw assembly can be moved and secured, e.g. locked, along the clamp bar until the object is placed between the two jaws, meaning there is zero or a very little gap between the object and the jaws.

The continuous secure (locking) mechanism can include a screw type, meaning a lead screw can be used to move the jaw support assembly along the clamp bar. A lock can be included, such as a screw or a clamp to lock the lead screw or to lock the handle that turns the lead screw.

The secure (locking) mechanism can be discrete, meaning the jaw assembly can be moved continuously along the clamp bar, but can only be secured, e.g. locked, at predetermined locations along the clamp bar. Thus the jaw assembly can move from a lockable location to another lockable location, until there is a minimum gap between the object and the jaws, meaning the next lockable location would not be large enough to accommodate the object.

The discrete secure (locking) mechanism can include a peg fitting into one of multiple holes, or a cyclic pattern bar (such as a rack bar, or a bar having repeat triangle shapes)

A cyclic pattern bar and a mating pattern component can be used for securing the jaw support assembly to the clamp bar at discrete locations, meaning at locations that the pattern of the patent component fitted to one of the multiple patterns of the cyclic pattern bar. The cyclic pattern bar can include a rack bar, a tooth bar, a cog bar, or a linear gear bar, which can be fixedly coupled to the clamp bar. For example, the pattern can be a triangle. The pattern component can have a recess with the shape of the triangle. The cyclic pattern bar can have multiple mating triangles, e.g., triangles that match with the triangle of the pattern component, such as with the base of the triangles at the base of the cyclic pattern bar, and the tip of the triangle protruded from the base. Alternatively, the pattern component can have one or more triangles protruded from the pattern component. The cyclic pattern bar can have multiple recesses of triangle shapes. Thus the jaw support can be locked onto various locations of the cyclic pattern bar. For example, the jaw support can be released from the cyclic pattern bar, such as by pulling the jaw support assembly in a downward direction for disengaging with the cyclic pattern bar. In this disengaged position, the released jaw support assembly can be moved along the clamp bar (and the cyclic pattern bar), to adjust the size of the opening between the first jaw and the second jaw, to accommodate different object sizes.

At the appropriate opening size, the jaw support assembly can be engaged, such as by pushing up the mating pattern component, thus the pattern component is engaged with the cyclic pattern bar. In this engaged position, the jaw assembly can be locked to the clamp bar.

In some embodiments, one way pattern secure (locking) can be used, meaning the jaw support assembly can be moved along the clamp bar to narrow the opening between the two jaws, but cannot be moved in the opposite direction to enlarge the opening. For example, the triangle pattern can have an acute angle in one side and an obtuse angle in another side. The asymmetric triangle can prevent movement against the acute side while allowing movement against the obtuse side.

In some embodiments, the pattern can be asymmetric, for example, so that the jaw assembly can be easier to move toward the object, while it is much more difficult to move back away from the object. This will provide a further security against the losing the clamping action of the clamping device.

In some embodiments, the secure (locking) mechanism can include a cyclic pattern configuration, such as a series of holes on the clamp bar. The secure (locking) mechanism can include a mating pattern component, such as a pin, a rod or a bar which can fit into the holes. The mating pattern component can be movably coupled to the jaw assembly, such as to the jaw support. For example, the mating pattern component, e.g., the pin, can be movable, such as pulling back for disengaging with the clamp bar, e.g., out of the hole. In this disengaged position, the jaw assembly can be free to move along the clamp bar. The mating pattern component, e.g., the pin, can be pushed up, entering one hole in the holes in the clamp bar. In this engaged position, the jaw assembly can be locked to the clamp bar.

The jaw support can include a pattern component, which is a peg, which can be mated to various positions of a cyclic pattern bar, which includes multiple holes. As shown, the mating is in the shape of pegs and holes, e.g., the cyclic pattern bar can have multiple holes, and the pattern component can have a peg, such as a round peg. Thus the jaw support can be locked onto various locations of the cyclic pattern bar. For example, the jaw component can be released from the cyclic pattern bar, such as by pulling the peg in a generally downward (or sideway) direction. The released jaw support assembly can be moved along the clamp bar (and the cyclic pattern bar), to adjust the size of the opening between the first jaw and the second jaw, to accommodate different object sizes. At the appropriate opening size, the jaw support assembly can be engaged, meaning the pattern component is engaged with the cyclic pattern bar, to lock the jaw support assembly in place.

FIGS. 13A-13D illustrate configurations for clamping devices with secure (locking) mechanisms according to some embodiments. In FIG. 13A, a clamping device 1300 can have a secure (locking) mechanism 1370 for securing a movable jaw assembly, such as securing a jaw support 1340, to a clamp bar 1350. The secure (locking) mechanism 1370 can include a cyclic pattern bar 1371, such as a rack bar, a tooth bar, a cog bar, or a linear gear bar. The cyclic pattern bar 1371 can be fixedly coupled to the clamp bar. The secure (locking) mechanism 1370 can include a mating pattern component 1372, such as a rod or a bar having a mated pattern at one end, such as a tooth pattern, a gear pattern, or a cog pattern. The mating pattern component 1372 can be movably coupled to the jaw assembly, such as to the jaw support 1340. For example, the mating pattern component 1372 can be movable 1373, such as pulling back for disengaging with the cyclic pattern bar 1371. In this disengaged position, the jaw assembly can be free to move along the clamp bar. The mating pattern component 1372 can be pushed up, contacting the cyclic pattern bar 1371 to engage with the cyclic pattern bar 1371. In this engaged position 1341, the jaw assembly can be locked to the clamp bar.

As shown, the mating is in the shape of triangles, e.g., the cyclic pattern bar can have multiple triangles protruded from a base, and the pattern component can have multiple triangular recesses. Thus the jaw support can be locked onto various locations of the cyclic pattern bar. For example, the jaw component can be released from the cyclic pattern bar, such as by pulling the jaw support assembly in a downward direction. The released jaw support assembly can be moved along the clamp bar (and the cyclic pattern bar), to adjust the size of the opening between the first jaw and the second jaw, to accommodate different object sizes. At the appropriate opening size, the jaw support assembly can be engaged, meaning the pattern component is engaged with the cyclic pattern bar, to lock the jaw support assembly in place.

In some embodiments, one way pattern secure (locking) can be used, meaning the jaw support assembly can be moved along the clamp bar to narrow the opening between the two jaws, but cannot be moved in the opposite direction to enlarge the opening. For example, the triangle pattern can have an acute angle in one side and an obtuse angle in another side. The asymmetric triangle can prevent movement against the acute side while allowing movement against the obtuse side.

In some embodiments, the pattern can be asymmetric, for example, so that the jaw assembly can be easier to move toward the object, while it is much more difficult to move back away from the object. This will provide a further security against the losing the clamping action of the clamping device.

In FIG. 13B, a clamping device 1305 can have a secure (locking) mechanism 1375 for securing a movable jaw assembly, such as securing a jaw support 1345, to a clamp bar 1355. The secure (locking) mechanism 1375 can include a cyclic pattern configuration 1376, such as a series of holes on the clamp bar. The secure (locking) mechanism 1370 can include a mating pattern component 1377, such as a pin, a rod or a bar which can fit into the holes. The mating pattern component 1377 can be movably coupled to the jaw assembly, such as to the jaw support. For example, the mating pattern component 1377, e.g., the pin 1377, can be movable 1378, such as pulling back for disengaging with the clamp bar, e.g., out of the hole 1376. In this disengaged position, the jaw assembly can be free to move along the clamp bar. The mating pattern component 1377, e.g., the pin 1377, can be pushed up, entering one hole in the holes 1376 in the clamp bar. In this engaged position 1342, the jaw assembly can be locked to the clamp bar.

The jaw support can include a pattern component 1377, which is a peg, which can be mated to various positions of a cyclic pattern bar 1376, which includes multiple holes. As shown, the mating is in the shape of pegs and holes, e.g., the cyclic pattern bar can have multiple holes, and the pattern component can have a peg, such as a round peg. Thus the jaw support can be locked onto various locations of the cyclic pattern bar. For example, the jaw component can be released from the cyclic pattern bar, such as by pulling the peg in a generally downward (or sideway) direction. The released jaw support assembly can be moved along the clamp bar (and the cyclic pattern bar), to adjust the size of the opening between the first jaw and the second jaw, to accommodate different object sizes. At the appropriate opening size, the jaw support assembly can be engaged, meaning the pattern component is engaged with the cyclic pattern bar, to lock the jaw support assembly in place.

FIG. 13C shows an operation to clamp the object with the clamping device with a discrete secure (locking) mechanism. The lock mechanism can be disengaged, e.g., the pattern component can be pulled back 1336, so that the pattern component is disengaged 1382 from the cyclic pattern bar. The jaw support assembly can slide back to enlarge the opening between the two jaws. An object 1310, such as a slap, can be placed between the two jaws. The jaw support assembly can be slide forward to make sure that the total gaps 1312+1313 between the jaws and the object is minimal, meaning that that total gaps are the smallest when the lock mechanism is engaged.

The lock mechanism is then engaged, e.g., the pattern component can be pushed up 1338 toward the cyclic pattern bar, so that the pattern component is engaged 1383 with the cyclic pattern bar. The jaw assembly is now fixedly coupled to the clamp bar.

The pulling element 1337 can be pulled up, e.g., in a substantially vertical direction 1385. Due to the slanting surface between the jaw support and the pulling element 1337, and since the jaw support is locked, the upward movement 1385 of the pulling element can have a component moving toward the object, e.g., the pulling element moves in a direction 1386 upward and toward the object.

The side movement of the pulling element can move the second jaw 1327 toward the object, until the second jaw is in contact with the object.

When the second jaw is not yet in contact with the object, the second jaw can be freely moved, and therefore the second jaw can move in a downward direction 1384 (due to gravity) toward the object, meaning sliding vertically down and horizontally sideway.

When the second jaw contacts the object, the upward movement 1385 of the pulling element can push on the second jaw. With a good friction between the second jaw and the object, the second jaw can only be pushed toward the object without actually moving, thus clamping on the object.

In FIG. 13D, a clamping device 1307 can have a screw type mechanism, such as lead screw, ball screw, or other screw type mechanism 1360, for securing a movable jaw assembly, such as securing a jaw support 1347, to a clamp bar 1357. When the lead screw 1360 is turned, the jaw support 1347 can move linearly. For example, the lead screw 1360 can turn in one direction (depending on the direction of the teeth of the lead screw), and the jaw support can move toward the fixed jaw. When the lead screw 1360 turns in an opposite direction, the jaw support can move away from the fixed jaw. The lead screw can allow a continuous movement of the jaw support. For example, the jaw support can move backward, e.g., away from the jaw, to widen the gap between the jaw and the jaw support. After an object, such as a slap, is positioned between the jaw and the jaw support, the lead screw can be turned to secure the object between the jaw and the jaw support. The lead screw can have a large enough dimension to prevent bending, due to the pulling action of the weight of the object.

In some embodiments, a secure mechanism can be used to lock the lead screw, for example, to prevent the lead screw from moving. In general, the jaw support can only move linearly, and thus it is not easy for the lead screw to turn due to the force acting on the jaw support. However, vibration can loosen the lead screw. Thus, a secure mechanism can be used to lock the lead screw, after setting the lead screw to an appropriate location for securing the object. The secure mechanism can include a lock washer and a nut 1361, which can be tightened against the clamp bar, to prevent any movement of the lead screw.

Figure 14A:
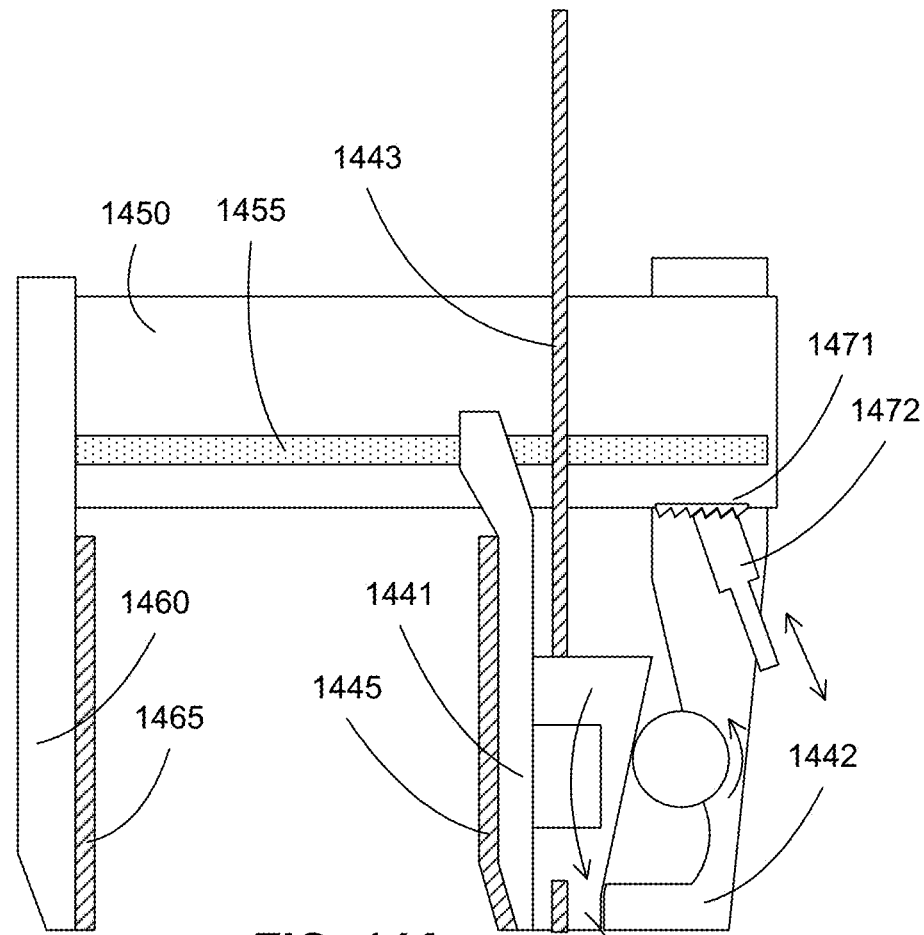
FIGS. 14A-14B illustrate a clamping device according to some embodiments.
Figure 14B:
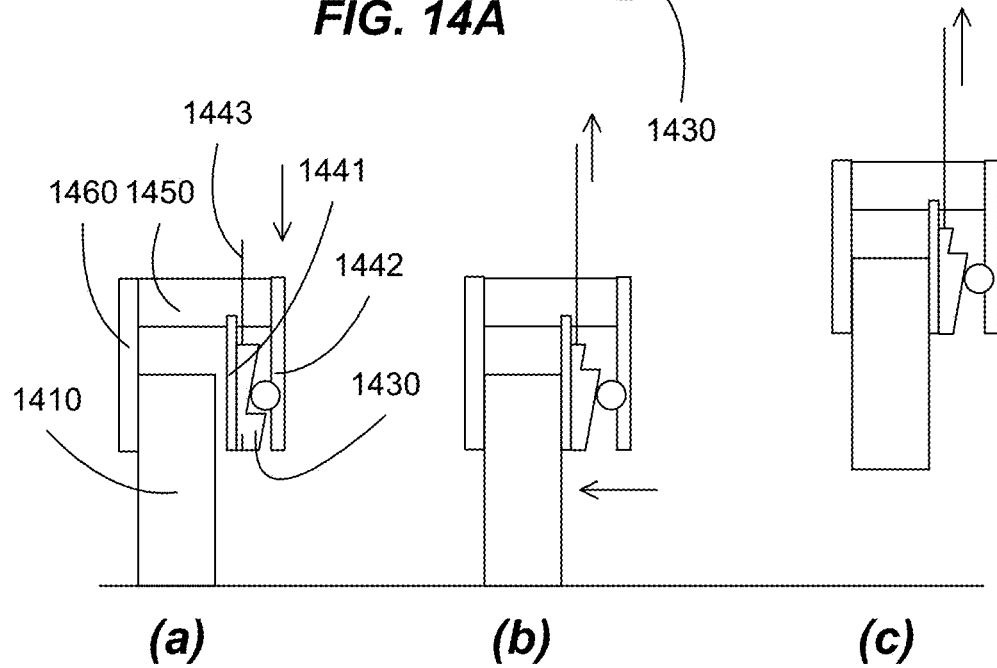

FIGS. 14A-14B illustrate a clamping device according to some embodiments. FIG. 14A shows a cross section of a clamping device, which can include a first jaw 1460 fixedly coupled to a clamp bar 1450, such as a single bar or multiple connection bars. The first jaw can include a rubber pad 1465 to increase a friction with objects to be clamped. In some embodiments, the first jaw can be removably coupled to the clamp bar, together with a secure (locking) mechanism for securing the first jaw to the clamp bar. Alternatively, the first jaw can be a part of a first jaw assembly, which can also include a first jaw support. The first jaw of the first jaw support can be coupled to the clamp bar, such as fixedly coupled or removably coupled with a secure (locking) mechanism.

The clamping device can include a second jaw assembly, which can be movably and lockably coupled to the clamp bar. The second jaw assembly can include a second jaw 1441 disposed opposite the first jaw. The second jaw can include a rubber pad 1445 to increase a friction with objects to be clamped. The second jaw assembly can include a jaw support 1442, which can slide along the clamp bar for movably coupled to the clamp bar. As shown, the first jaw is fixedly coupled to the clamp bar, and the second jaw assembly is movably coupled to the clamp bar. Other configurations can be used, such as the first jaw is movably coupled to the clamp bar, and the second jaw assembly is fixedly coupled to the clamp bar. Alternatively, the first jaw and the second jaw assembly can both be movably coupled to the clamp bar. A jaw or a jaw assembly, if movably coupled to the clamp bar, can include a secure (locking) mechanism for securing the jaw or the jaw assembly to the clamp bar.

There can be flexible couplings between the second jaw and the jaw support. The flexible couplings can allow the second jaw to move in multiple directions with respect to the jaw support, such as down and away from the jaw support. The flexible couplings can include springs having two ends fixedly coupled to the second jaw 1441 and the jaw support 1442. The springs can bend and flex, allowing the second jaw to move relative to the jaw support.

In addition, end point limits can be included to prevent the second jaw from moving too far from the jaw support. The second jaw can be blocked in the horizontal directions by the jaw support and the object, so there can be no need for end point limits in the horizontal directions. Support bars 1455 can be coupled to the clamp bar and passing through the second jaw with large openings. Thus the second jaw can be freely moved within the confinement of the openings. For example, the second jaw cannot move too far down, since the support bar can prevent such as movement. The openings can be configured to limit the movements of the second jaw. For example, the openings can be close or touching the support bars in horizontal directions, e.g., the openings can have an elongated shape in the up and down directions. The elongated openings can prevent the second jaw from moving in directions parallel to the jaw support, e.g., perpendicular to the up/down directions and perpendicular to the directions of toward to/away from the jaw support.

The second jaw assembly can be movably coupled to the clamp bar by having the jaw support movably coupled to the clamp bar, and the second jaw flexibly coupled to the jaw support. For example, the jaw support can have a hollow space in which the clamp bar can pass through. The dimension of the hollow space can be just about the size of the cross section of the clamp bar, which can allow the jaw support to move along the clamp bar, with zero or minimum movements in other directions, such as in directions perpendicular to the direction along the clamp bar.

The second jaw assembly can include a secure (locking) mechanism having first mated component 1471, e.g., the cyclic pattern bar, and second mated component 1472, e.g., the mating pattern component, for securing (locking) the jaw assembly, such as locking the jaw support, to the clamp bar. When the secure (locking) mechanism is disengaged, e.g., when the second mated component 1472 is pulled back to not contacting or not mating with the first mated component 1471, the jaw support 1442 can be freely moved along the clamp bar. When the secure (locking) mechanism is engaged, e.g., when the second mated component 1472 is pushed up to contact or mate with the first mated component 1471, the jaw support 1442 can be securely and fixedly coupled to the clamp bar.

The clamping device can include a pulling element 1443, which can be configured to be pulled on for lifting the clamped object. The pulling element can be coupled to a rotatable element 1430, which is disposed between the second jaw and the jaw support. The pulling element can also be disposed between the clamp bar, e.g., between the multiple connection bars. The pulling element can freely move in an up direction. In the down direction, a spring set can be used to pull the pulling element toward the rotatable element.

The rotatable element can be configured to exert a clamping force on the object when rotating, for example, through a slanting surface on the rotatable element. For example, the jaw support can include a set of rollers, which can provide rolling friction with the slanting surface of the rotatable element. Thus there can be minimum friction when the rotatable element is rotating, pushing the second jaw away from the jaw support due to the slanting surface.

The clamping device can include a second secure (locking) mechanism, which can be coupled to either the clamp bar or to the second jaw assembly to prevent the rotatable element from being rotated. The rotatable element can be constrained from rotating, thus the second secure (locking) mechanism, when engaged, when secure the rotatable element to the second jaw. The rotatable element can be locked to a position of maximum jaw opening, which can provide that the second jaw is closest to the jaw support.

In operation, the secure (locking) mechanism, e.g., the secure (locking) mechanism that locks the second jaw assembly to the clamp bar, can be unlocked, for example, by pulling back the second mated component 1472 to disengage the second mated component 1472 from the first mated component 1471. This will release the second jaw assembly from the clamp bar, and thus the second jaw assembly can slide along the clamp bar so that the distance between the two jaws can be large enough to accommodate the object.

After putting the object within the first and second jaw, the secure (locking) mechanism can be engaged, e.g., the second mated component can be pushed up to engage with the first mated component, locking the second jaw assembly to the clamp bar. If the secure (locking) mechanism is a discrete secure (locking) mechanism, there can be gaps between the object and the jaws.

This process can be optional. In some embodiments, the second jaw assembly can be secured to the clamp bar, and the clamping device can be configured to handle objects having a range of thicknesses, determined by the movements of the second jaw.

Next, the second secure (locking) mechanism, e.g., the secure (locking) mechanism that locks the pulling element to the clamp bar, can be unlocked, so the pulling element can be pulled up. Due to the rollers, the rotatable element can easily rotate against the jaw support. The second jaw can move away from the jaw support, until the second jaw is in contact with the object. If there is a gap between the object and the first jaw, the second jaw can keep moving to narrow that gap. The second jaw then continue to move until the first and second jaws all contact the object.

FIG. 14B (a)-(c) show an operation of the clamping device. In FIG. 14B (a), the rotatable element 1430 can be in a down most position, and optionally locked by a secure (locking) mechanism. The second jaw 1441 can be pulled toward the jaw support 1442. An object 1410 can be placed between the two jaws of the clamping device.

In FIG. 14B (b), the pulling element can be pulled up, for example, by a hoist hooking to the pulling element. The pulling on the pulling element can rotate the rotatable element 1430, which can push the second jaw toward the object for clamping the object. In FIG. 14B (c), further pulling on the pulling element can lift the object above the ground to move to a new location.

FIGS. 15A-15B illustrate flow charts for forming and operating a clamping device according to some embodiments. In FIG. 15A, operation 1500 forms a clamping device. The clamping device can include a first jaw fixedly coupled to a clamp bar, and a second jaw assembly movably and fixedly coupled to the clamp bar. The second jaw assembly can include a secure (locking) mechanism for fixedly coupling the second jaw assembly to the clamp bar. The secure (locking) mechanism can be configured to secure the second jaw assembly to the clamp bar continuously or at discrete locations.

In FIG. 15B, operation 1520 places an object between a first jaw and a second jaw of a clamping device. The second jaw is part of a jaw assembly. The jaw assembly further can include a secure (locking) mechanism for securing the jaw assembly with respect to the first jaw. The secure (locking) mechanism can be configured to secure the jaw assembly at discrete locations.

Operation 1530 unlocks the secure (locking) mechanism to place an object between the first jaw and the second jaw. Operation 1540 locks the secure (locking) mechanism at a location to achieve a minimum gap between the first and second jaws with the object. Operation 1550 lifts the clamping device to secure the object between the first and second jaws. Operation 1560 lifts the clamping device to move the object.

In some embodiments, the present invention discloses a lock mechanism, and clamping device incorporating the lock mechanism. The clamping device can operate on force conversion principle, e.g., converting a pulling force on the clamping device into a side force of the jaws for clamping on the object. In other words, there is a linkage between the vertical pulling force for lifting the clamping device and the horizontal force pushing the jaws together. Thus, when the clamping device is pulled up, the linkage can cause the jaws to clamp on the object, securing the object between the jaws for lifting and moving.

However, when the clamping device is empty, e.g., not clamping on an object, pulling the clamping device also activates the linkage to move the jaws together. Without the object, the jaws can be moved together until the distance between the jaws becomes a minimum distance, e.g., the jaws cannot move any closer. This can cause difficulties for an empty clamping device to capture an object, e.g., additional action is needed to separate the jaws before the object can be placed between the jaws.

In some embodiments, the present invention discloses a lock mechanism that can activate or deactivate a linkage between the pulling action and the side movements of the jaws. When the linkage is deactivated, the pulling element can lift the clamping device without moving the jaws. When the linkage is activated, lifting the pulling element can move the jaws sideward.

In some embodiments, the deactivation of the linkage can be performed by immobilizing the rotatable element, for example, when the clamping device, after bringing an object to the destination, is ready to leave. Thus when the jaws are opened at a maximum distance, the rotatable is immobilized, disconnecting the linkage between the pulling element and the jaws.

The linkage can be re-activated when the clamping device, with the jaws separated at a maximum distance, is positioned so that a new object is between the jaws. Thus, when the clamping device is pulled up, for example, by pulling on the pulling element, the jaws move to clamp on the object.

FIG. 16 illustrates a lock mechanism for a clamping device according to some embodiments. A clamping device can include a first jaw 1660 fixedly coupled to a clamp bar 1650. The clamping device can include a second jaw 1641, which can be coupled to the clamp bar. A jaw support 1642 can be fixedly and slidably coupled to the clamp bar 1650, e.g., the jaw support can slide along the clamp bar, and then can be secured to the clamp bar.

The clamping device can include a rotatable element 1630, which can be rotatably coupled to the jaw 1641, for example, through a set of bearings such as ball bearings 1631. A pulling element 1643 can be coupled to the rotatable element 1630. When the pulling element is pulled up, the rotatable element can rotate. The rotatable element 1630 can include a slanting interface, such as one or more spiral surfaces 1632. Coupling with one or more rollers 1644 which is rotatably coupled to the jaw support 1642, the slanting interface can provide a linkage between the force pulling on the pulling element and the side force moving the jaw 1641. When the pulling element is pulled, the rotatable element can rotate, which rolls the rollers on the slanting interface to push the jaw 1641 toward the other jaw 1660.

A locking mechanism 1680 can be included to limit movements of the rotatable element, e.g., to prevent the rotatable element from rotating a significant amount, which can move the jaws together. The rotatable element can be secured to prevent any movement, or the rotatable element can have limited movements, for example, to allow the incorporation of an auto lock mechanism. The limited movements can provide the jaw with a linear movement of less than a few millimeters, such as 5 mm or less, 3 mm or less, 2 mm or less, or 1 mm or less. The limited movements can provide the rotatable element with a rotational movement of less than a few degrees, such as 15 degrees or less, 10 degrees or less, 8 degrees or less, or 5 degrees or less.

The locking mechanism can include a pin 1681 which can be extended into a mating hole 1682. When the pin is retracted, as shown in FIG. 16 (a), the rotatable element 1630 can be freely rotated with respect to the jaw 1641. When the pin is extended, as shown in FIG. 16 (b), the rotatable element 1630 is not freely rotatable.

Figure 17A:
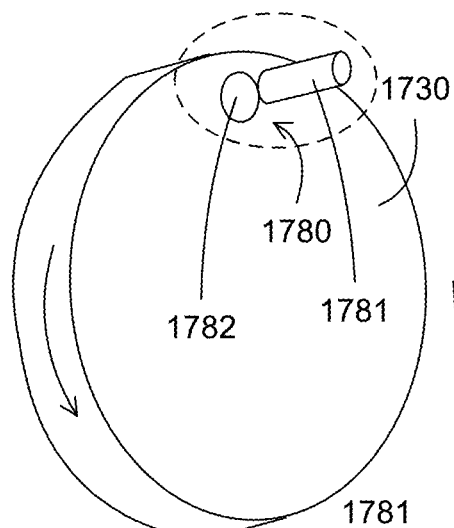
FIGS. 17A-17B illustrate configurations for a locking mechanism according to some embodiments.
Figure 17A:
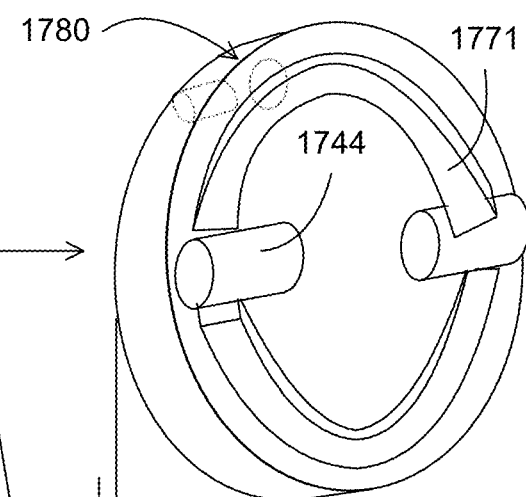
Figure 17B:
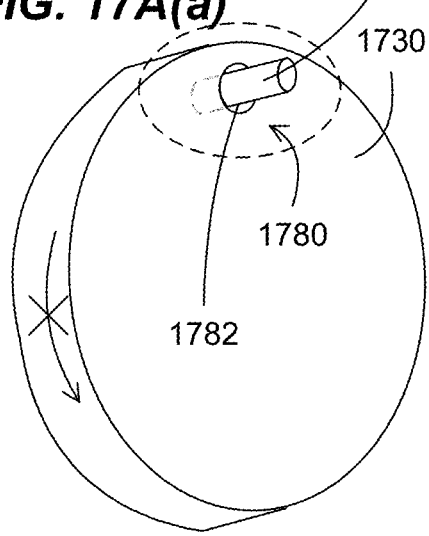
Figure 17A:
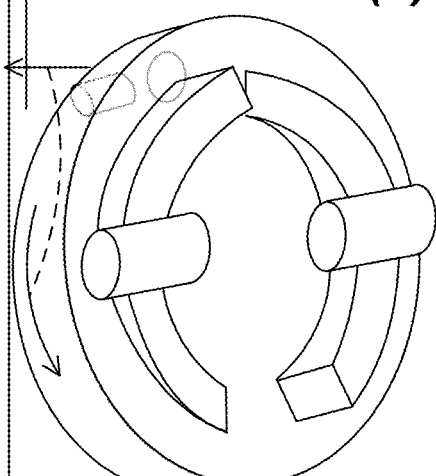
Figure 17B:
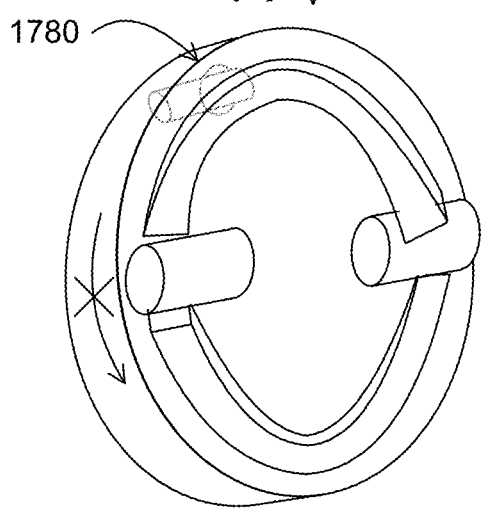
Figure 17A:
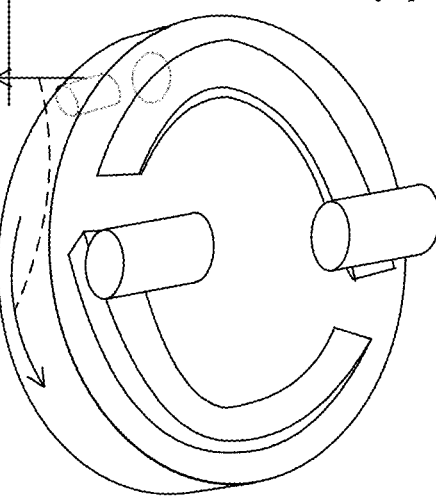

FIGS. 17A-17B illustrate configurations for a locking mechanism according to some embodiments. A lock mechanism 1780 can in incorporated into a rotatable element 1730. The lock mechanism 1780 can include pin 1781 and mating hole 1782. In FIG. 17A(a), the lock mechanism is disengaged, with the pin away from the hole, and thus the rotatable element 1730 can be freely rotated. FIGS. 17A (b)-(d) show a rotational process of the rotatable element when the lock mechanism is disengaged. When the rotatable element rotates, rollers 1744 can roll on the slanting surface 1771, and can push the rotatable element away from the rollers.

In FIG. 17B(a), the lock mechanism is engaged, with the pin engaging with the hole, and thus the rotatable element 1730 cannot be freely rotated. There can be limited movements of the rotatable element, since the pin and hole configuration can have some tolerance. FIG. 17B (b) shows that the rotatable element cannot be rotatable, thus fixing a distance between the rotatable element and the rollers.

In some embodiments, the present invention discloses an auto lock mechanism, and clamping device incorporating the auto lock mechanism. In the auto lock mechanism, the activation and deactivation of the linkage can be performed automatically, for example, when a clamping device carrying the object has finished delivering the object, and when the empty clamping device contacts the object for clamping.

In some embodiments, the lock mechanism can be operated automatically, e.g., the lock mechanism can be operated by an operator operating the clamping device, such as operating a hoist coupled to a pulling element of the clamping device. For example, the lock mechanism can be engaged to lock the rotatable element. When the clamping device engages with an object, the engagement of the clamping device with the object can disengage the lock mechanism, allowing the jaws to move toward each other for clamping on the object. When the clamping device carrying the object reaches a destination, the clamping device can release the object, e.g., enlarging the distance between the jaws to allow the object to be released from the clamping device. The releasing of the object by the clamping device, such as the jaw distance enlarging process, can engage the lock mechanism, preventing the rotatable element from rotating any significant amount.

Figure 18A:
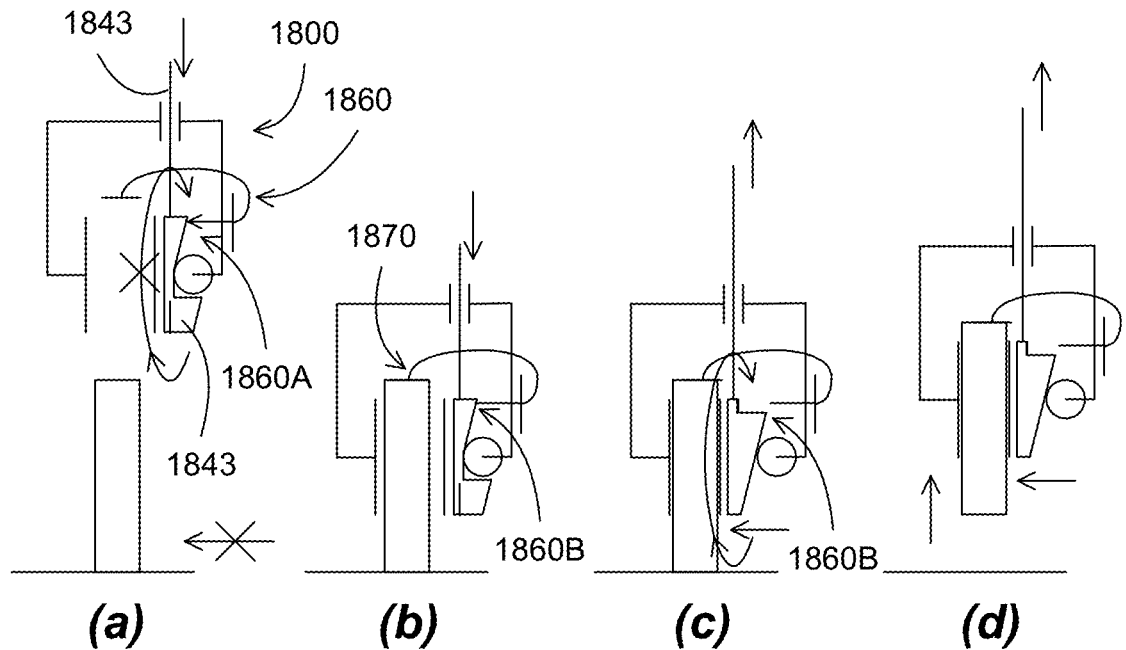
FIGS. 18A-18B illustrate operating processes for the auto lock mechanism according to some embodiments.
Figure 18B:
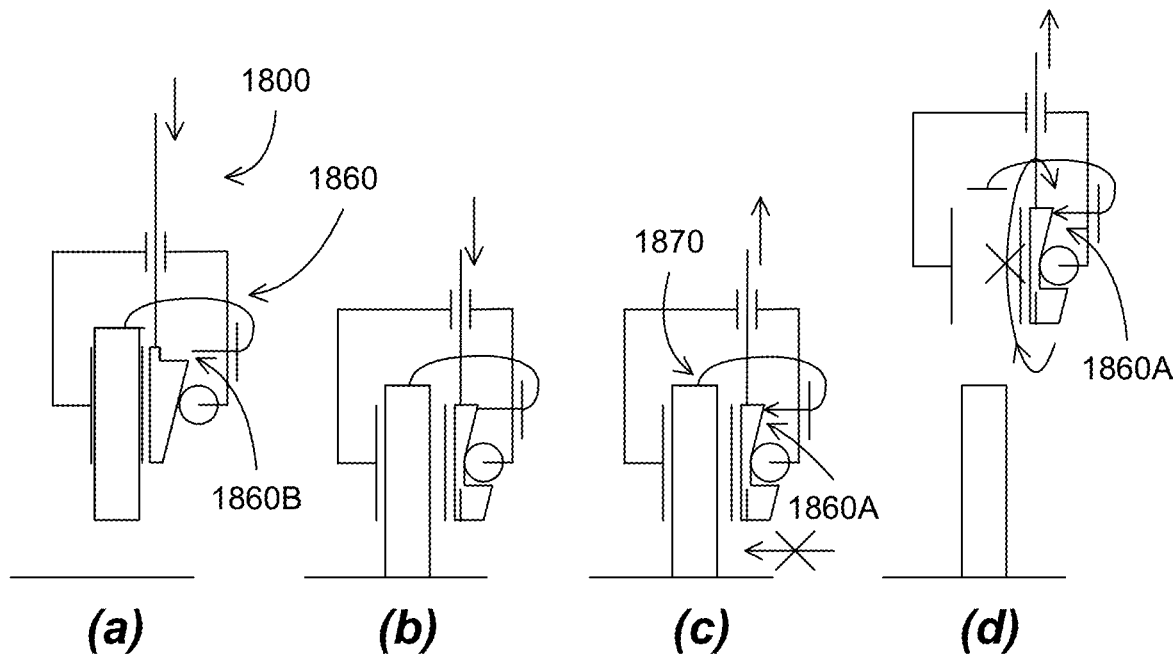

FIGS. 18A-18B illustrate operating processes for the auto lock mechanism according to some embodiments. FIGS. 18A(a)-(d) show a process for an empty clamping device 1800 to pick up an object. The clamping device is supported by a hoist coupled to the pulling element 1843, which can be a flexible line such as a steel cable, of the clamping device. In FIG. 18A(a), the clamping device is brought to the object, e.g., positioned above the object with the object located between the two jaws of the clamping device. The clamping device can have the auto lock mechanism 1860 activated 1860A, meaning the rotatable element 1830 is secured, for example, to a jaw so prevent the rotatable element from rotating. The non-rotating rotatable element can disable the linkage between the pulling element and the jaw, thus the jaws can be separated, for example, at a maximum distance in order to accommodate the getting of the object between the opening of the jaws. The activation of the auto lock mechanism can be accomplished after the clamping device finishes delivering the object, as discussed in subsequent processes.

The auto lock mechanism can be activated when the separation of the two jaws of the clamping device is at a stopping distance, which can be a maximum distance, or close to a maximum distance, e.g., the jaws can be further separated a little more. The stopping distance can be close to the largest separation of the two jaws.

In FIG. 18A(b), the clamping device is lowered, for example, by lowering the hoist. Since the jaws are widely separated, the object can be placed between the two jaws. The clamping device can touch the object, for example, by a mechanism 1870 that links to the auto lock mechanism. The contacting of the mechanism 1870 can toggle the auto lock mechanism, e.g., activating the auto lock mechanism if the auto lock mechanism is deactivated, and deactivating the auto lock mechanism if the auto lock mechanism is activated. Thus, the contacting of the mechanism by the clamping device when lowering to capture the object can deactivate 1860B the auto lock mechanism. The rotatable element can be free to rotate when the pulling element is pulled up.

In some embodiments, the contacting of the clamping device to the object, e.g., a downward force or movement of the clamping device acting on the object can create an upward force or movement on the mechanism 1870, which can partially deactivate the auto lock mechanism.

In FIG. 18A(c), the pulling element is pulled up, for example, by the hoist that is coupled to the pulling element. When the pulling element is pulled up, the upward force or movement of the clamping device due to gravity can create a downward force or movement on the mechanism 1870, which can complete the deactivation of the auto lock mechanism.

Since the auto lock mechanism is deactivated, further pulling on the pulling element by the hoist can rotate the rotatable element, which can move the jaws toward each other for clamping on the object. The clamping device, characterized by the clamp bar and the two jaws, is still stationary and in contact with the object. Only one end of the pulling element, which is the end of the pulling element coupled to the hoist, is pulled up, unwinding the flexible line from the rotatable element to rotate the rotatable element. The rotation of the rotatable element can move a jaw toward the other jaw. When the two jaws contact the object, the rotation of the rotatable element can stop, and further pulling on the pulling element can exert a clamping force on the object by the jaws.

In FIG. 18A(d), further pulling on the pulling element can lift the clamping device and the object clamped between the jaws of the clamping device. The clamping device can then be moved to a new location for disposing the object.

FIGS. 18B(a)-(d) show a process for a clamping device 1800 holding an object to release the object. In FIG. 18B(a), the clamping device with the object clamped between the jaws is brought to a destination, e.g., to a location that the object is to be placed. The clamping device can have the auto lock mechanism 1860 deactivated 1860B, meaning the rotatable element 1830 is free to rotate, and thus the linkage between the pulling element and the jaw is enabled to move the jaws together for clamping on the object. The deactivation of the auto lock mechanism can be accomplished after the clamping device finishes picking the object, as discussed in the previous processes.

In FIG. 18B(b), the clamping device is lowered to place the object on the ground or any surface at the destination. The lowering of the clamping device can be accomplished by lowering the hoist coupled to the pulling element. After the object touches the ground, the hoist can continue to lower, thus lowering the pulling element without lowering the clamping device. Since the auto lock mechanism is deactivated, a spring mechanism in the rotatable element, such as a spiral spring coupled to the rotatable element, can rotate the rotatable element and thus pull the pulling element down when the hoist is lowered. The rotation of the rotatable element can cause the jaws to be separated.

The pulling element is further pulled down, for example, by the spiral spring rotating the rotatable element, together with by the lowering of the hoist that is coupled to the pulling element. Since the auto lock mechanism is deactivated, rotating the rotatable element by the spiral spring can move the jaws away from each other. When the jaws reach a maximum separation (or when the rotatable element encounters a limit stop), the rotation of the rotatable element can stop.

The lowering of the pulling element, or the stopping of the rotatable element can contact the mechanism 1870. The contacting of the mechanism 1870 can activate the auto lock mechanism.

In some embodiments, the downward force or movement of the pulling element or the rotatable element can create an upward force or movement on the mechanism 1870, which can partially activate the auto lock mechanism.

In FIG. 18B(c), the pulling element is pulled up, for example, by the hoist that is coupled to the pulling element. When the pulling element is pulled up, the upward force or movement of the clamping device due to gravity can create a downward force or movement on the mechanism 1870, which can complete the activation of the auto lock mechanism.

Since the auto lock mechanism is activated, further pulling on the pulling element by the hoist cannot rotate the rotatable element, e.g., the activation of the auto lock mechanism can secure the rotatable element, prevent the rotatable element from further rotating when the pulling element is further pulled up. The jaws are at a maximum (or close to the maximum) separation.

In FIG. 18B(d), the pulling element is further pulled up, for example, by the hoist that is coupled to the pulling element. Since the auto lock mechanism is activated, pulling the pulling element cannot rotate the rotatable element, thus the jaws are still separated at the maximum separation, e.g., the previous separation when the auto lock mechanism is activated. The clamping device can be lifted up. Since the jaws are separated, the object can be left on the ground, and the empty clamping device with the open jaws can be move to another location to pick up another object.

The process can be continued, e.g., with moving the empty clamping device to approach an object for pick up.

In some embodiments, the present invention discloses an automatic locking mechanism coupled to a clamping device, and a clamping device incorporating an automatic locking mechanism. The automatic locking mechanism can toggle between an activation configuration and a deactivation configuration. The toggling process can mean that a same action sequence can be used for changing from an activation configuration to a deactivation configuration and vice versa, e.g., from a deactivation configuration to an activation configuration.

In the activation configuration, the locking mechanism is activated or engaged, which can prevent the jaws of the clamping device from moving toward each other. In this configuration, the rotatable element can be prevented from rotating in the direction that causes the jaws to move toward each other.

In the deactivation configuration, the locking mechanism is deactivated or disengaged, which can allow the clamping device to operate normally. In this configuration, the rotatable element can rotate in either direction, e.g., in a direction that can cause the jaws to move toward each other and in an opposite direction that can cause the jaws to move away from each other.

Figure 19D:
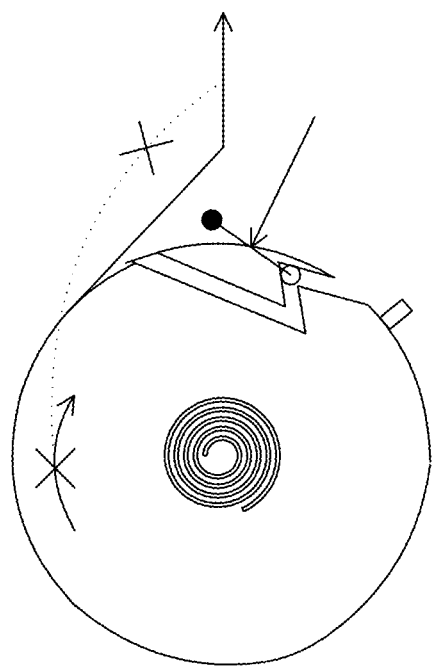
Figure 19E:
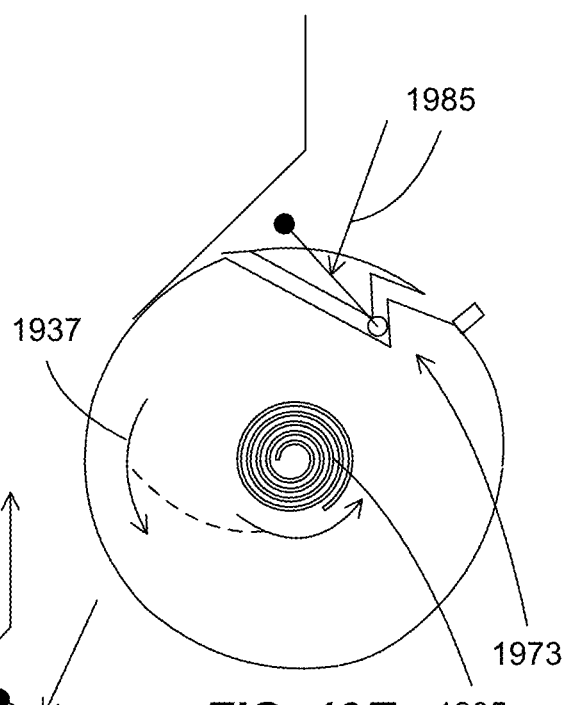
Figure 19F:
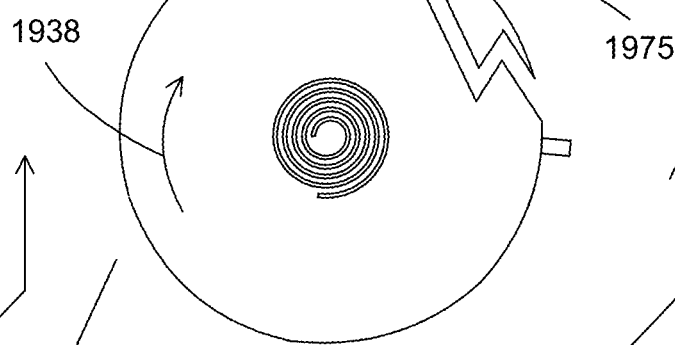
Figure 19F:
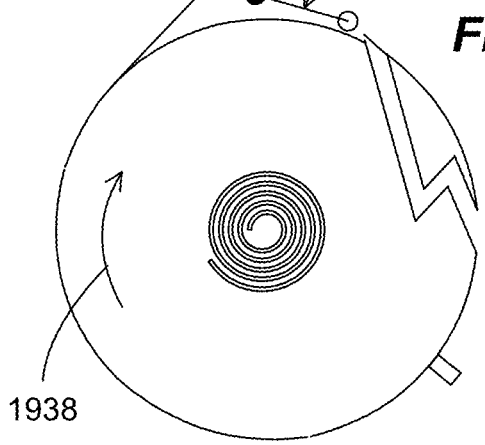
Figure 19A:
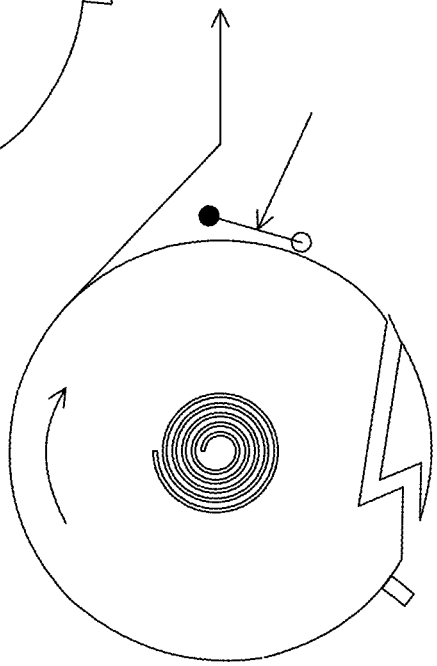

FIGS. 19A-19I illustrate a process for the engagement and disengagement of a lock mechanism according to some embodiments. FIG. 19A shows a configuration of a rotatable element 1930 in a deactivation process of the locking mechanism, in which the jaws clamp on an object. This deactivation configuration can be used when the clamping device, with the object clamped between the jaws, starts moving up with the object, when the clamping device transports the object, and when the clamping device is lowered to bring the object to the ground. FIG. 19D shows an activation configuration of the locking mechanism, in which the rotatable element is prevented from moving in a direction that can allow the jaws to move to clamp on the object. This activation configuration can be used when the clamping device starts moving up to leave the object on the ground, when the empty clamping device moves to different location to pick up an object, and when the empty clamping device is lowered to place the object between its open jaws.

FIGS. 19B(a) and 19B(b) show a configuration of a first portion of a two-portion toggle process, which partially changes a deactivation configuration to an activation configuration of the locking mechanism. FIG. 19C shows a configuration of a second portion of the two-portion toggle process, which completes the change from the deactivation configuration to the activation configuration of the locking mechanism. FIG. 19D shows an activation configuration of the locking mechanism, in which the rotatable element is prevented from rotating in the direction that functions to clamp the jaws together.

FIG. 19E shows a configuration of the first portion of a two-portion toggle process, which partially changes the activation configuration to the deactivation configuration. FIGS. 19F(a) and 19F(b) show a configuration of the second portion of the two-portion toggle process, which completes the change from the activation configuration to the deactivation configuration.

In some embodiments, the automatic locking mechanism can include a lockable element and a receptacle configured to be mated to the lockable element. Either the lockable element or the receptacle can be coupled to the rotatable element, and the other component is coupled to a body of the clamping device, e.g., to a non-rotatable element near the rotatable element, such as to the jaw support or the jaw.

The lockable element and the receptacle are configured to toggle the rotatable element of the clamping device between a rotatable configuration, e.g., deactivation configuration of the automatic locking mechanism, and a non-rotatable configuration, e.g., activation configuration of the automatic locking mechanism.

In the non-rotatable configuration or the activation configuration, the lockable element is coupled to the receptacle, which is to prevent the rotatable element from rotating at least in the clamping direction, e.g., in the direction that causes the jaws to move toward each other for clamping on an object.

In the rotatable configuration or the deactivation configuration, the lockable element is decoupled from, e.g., not securely coupled to, the receptacle, which allows the clamping device to operate normally, such as to let the rotatable element to rotate in the clamping direction to clamp on the object.

In some embodiments, the toggling process can include two portions. A first portion can include rotating the rotatable element in the unclamping direction opposite the direction of the clamping direction, e.g., the unclamping direction is the direction that causes the jaws to move away from each other. The rotation of the rotatable element in the unclamping direction can be performed by a tensioned spring assembly 1935, which is coupled to the rotatable element and which is tensioned in the clamping direction. Thus, when the rotatable element is not rotating in the clamping direction or is not conditioned for not rotating, for example, by pulling on the pulling element 1943, the spring assembly 1935 can rotate the rotatable element in the unclamping direction.

A second portion can include rotating the rotatable element in the clamping direction opposite the direction of the unclamping direction, e.g., the clamping direction is the direction that causes the jaws to move toward each other. The rotation of the rotatable element in the clamping direction can be performed by pulling on the pulling element 1943, which can be wrapped around the rotatable element in such as a way so that when the pulling element is unraveled from the wrap around configuration, the rotatable element rotates in the clamping direction.

FIG. 19A shows a configuration of an automatic locking mechanism 1980, in which the receptacle 1982 can include a zigzag path, which can be formed in a component coupled to the rotatable element, such as on a surface of the rotatable element. The lockable element can include a rod element 1981 configured to fit in the zigzag path 1982. The rod element is coupled to the body of the clamping device, such as to the jaw or the jaw support which houses the axis or rotation of the rotatable element.

The zigzag path 1982 can include an entrance 1971 and an exit 1974. In some embodiments, the rod element 1981 can travel in the zigzag path 1982 in only one direction, such as from the entrance 1971 to the exit 1975. The rod element 1981 can return from the exit to the entrance in another path, such as traveling on an outer periphery of the rotatable element.

The one way direction can be accomplished using a one way valve 1975 coupled to an end of the zigzag path, such as the exit 1974, to allow the lockable element to exit the zigzag path and to prevent the lockable element from entering the zigzag path from the exit 1974.

Within the zigzag path, there can be a first abrupt turn 1972 nearer the entrance and a second abrupt turn 1973 nearer the exit. Thus the rod element can enter the entrance 1971, encounter the first abrupt turn 1973, encounter the second abrupt turn, and then exit at the exit 1974.

In some embodiments, the automatic locking mechanism 1980 can include a spring mechanism 1985 to bias the lockable element, e.g., the rod element 1981, in a direction from the first abrupt turn 1972 toward the second abrupt turn 1973. e.g., in the direction that pushes the rod element toward the center of the rotatable element, such as to contact the periphery of the rotatable element if the rod element is outside of the rotatable element, pushing the rod element into the entrance of the zigzag path when the rod element is near the entrance, and pushing the rod element toward the second abrupt turn when the rod element is at the first abrupt turn.

The spring mechanism 1985 can be applied to a rotatable level 1983, which has one end coupled to the rod element, and the opposite end coupled to a fixed point on the body to form the axis of rotation for the level 1983.

FIG. 19A can be a configuration when the clamping device is clamping on an object, and can be moved to a destination for releasing the object. This configuration can be viewed in FIG. 18B(a), showing a clamping device 1800 bringing an object to a destination, with the automatic locking mechanism 1860 in unlocked or disengaged or deactivated configuration 1860B.

FIGS. 19B(a) and 19B(b) show two snap shots of the first portion of the two portion toggling process. After a hoist moving the clamping device having the object reaches the destination, the hoist coupled to one end of the pulling element 1943 lowers the clamping device until the object touches the ground.

Afterward, the hoist can continue to move down. The tension on the pulling element can be reduced since the object has touched the ground. The spring mechanism 1935 can then rotate the rotatable element in the unclamping direction 1937 to unclamp the object, e.g., to move the jaws away from each other.

FIG. 19B(a) shows a snapshot of the rotation of the rotatable element, when the rod element moves past the exit of the zigzag path. Due to the one way valve, the rod element does not enter the exit, and keeps traveling on the outer periphery of the rotatable element.

The hoist can continue to move down, releasing tension on the pulling element, which can lead to the spring mechanism 1935 to keep rotating the rotatable element in the unclamping direction 1937, until an end of the rotation, such as encountering a stop 1976. The stop can be positioned so that the rod element is at a vicinity of the entrance of the zigzag path, such as passing the entrance of the zigzag path (FIG. 19B(b)). This configuration can be viewed in FIG. 18B(b), showing the hoist lowers the pulling element to enlarge the separation between the jaws until the separation is at a maximum, such as when the rotation of the rotatable element encounters a limit stop.

Thus, the zigzag path can be configured so that when the entrance is in a vicinity of the rod element and the rotatable element rotates in the unclamping direction 1937, the entrance 1971 rotates past the rod element 1981.

FIG. 19C shows the second portion of the two portion toggling process. After the rotatable element reaches the limit stop 1976, the hoist can pull up, pulling on the pulling element. The pulling on the pulling element can rotate the rotatable element in a clamping direction 1938, which can re-tension the spring mechanism 1935.

Since the rod element 1981 is biased toward the zigzag path, e.g., the spring mechanism 1985 is configured to push the level 1983 carrying the rod element 1981 toward an inner area on the rotatable element, the rod element is pushed to enter the entrance 1971, and moved along the zigzag path to rest on the first abrupt turn 1972. The first turn 1972 of the zigzag path is configured to function as a limit stop for the rod element, e.g., the rod element cannot move further along the zigzag path even when there is a high tension on the pulling element. Thus, the rotatable element is constrained from further rotating in the clamping direction 1938, which leads to the jaws remaining open at a maximum or close to a maximum separation. The separation can be close to maximum separation since the jaws can move toward each other a little when the rod element moves from the outer periphery of the rotatable element, enters the entrance and rests at the first abrupt turn. The separation can be maximum if the travelling of the rod element to reach the first abrupt turn does not move the jaws, for example, due to tolerance or backlash movement.

This configuration can be viewed in FIG. 18B(c), showing the hoist raises the pulling element to complete the activation of the automatic locking mechanism 1860, to put the automatic locking mechanism into the activation configuration 1860A.

Thus, the zigzag path can be configured so that when the entrance is past the lockable element in the unclamping direction 1937 and the rotatable element rotates in the clamping direction 1938, the zigzag path rotates to accept the rod element 1981 into the entrance 1971 and stops at the first abrupt turn 1972.

FIG. 19D shows an activation configuration of the automatic locking mechanism, in which the jaws of the clamping device are prevented from moving toward each other. This can be accomplished by the rod element 1981 stucked at the first abrupt turn 1972, which prevents the rotatable element from rotating in the clamping direction 1938. The zigzag path can be configured so that when the rod element is at the first abrupt turn, the rotatable element is prevented from rotating in the clamping direction 1938, After the automatic locking mechanism is activated, the jaws remain open at a maximum or close to maximum separation. The clamping device now can be lifted up, for example, by raising the hoist coupled to the pulling element. Sine the jaws are open, the object can be left behind, and the clamping device is lifted up empty.

This configuration can be viewed in FIG. 18B(d), showing the hoist raises the empty clamping device, with the automatic locking mechanism in the activation configuration 1860A.

The empty clamping device can move to pick up a new object. First, the empty clamping device is move to the object location, and can be positioned so that the object is positioned within the open jaws. This configuration can be viewed in FIG. 18A(a), showing the hoist brings an empty clamping device with the open jaws to an object so that the object is positioned in the opening of the jaws.

The hoist can move down to bring the clamping device down. After the clamping device contacts the object, the hoist can continue to move down.

FIG. 19E shows the first portion of the two portion toggling process. After the clamping device contacts the object, further down movement of the hoist will slacken the pulling element, reducing the tension on the pulling element. The reduction in tension will allow the spring mechanism 1935 to unwind, which can rotate the rotatable element in the unclamping direction 1937. The rotation of the rotatable element will cause the rod element to move from the first abrupt turn 1972 to the second abrupt turn 1973, since the rod element is biased toward the second abrupt turn. The spring mechanism 1985 can push on the level 1983, which causes the rod element to rotate around the axis of rotation 1984. Since the spring assembly is configured to push the rod element in the direction from the first abrupt turn to the second abrupt turn, the rod element can travel from the first abrupt turn to the second abrupt turn, instead of returning to the entrance 1971 from the first abrupt turn.

This configuration can be viewed in FIG. 18A(b), showing that after the clamping device contacts the object, the pulling element can be lowered further to partially deactivate the automatic locking mechanism 1860 into the deactivation configuration 1960B.

The zigzag path can be configured so that when the lockable element is at the first abrupt turn and the rotatable element rotates in the unclamping direction 1837, the zigzag path rotates to guide the rod element toward the second abrupt turn.

FIGS. 19F(a) and 19F(b) show two snap shots of the second portion of the two portion toggling process. In the first portion, after the hoist further moves down, after the clamping device contacts the object, to reduce tension on the pulling element, the spring mechanism 1935 can be unwound to rotate the rotatable element in the unclamping direction 1937, which forms the first portion of the two portion toggling process.

The hoist can start move up, pulling on the pulling element. The pulling on the pulling element can rotate the rotatable element in the clamping direction 1938, which can move the rod element from the second abrupt turn to the exit of the zigzag path, since the rod element is biased toward the second abrupt turn. Since the spring assembly is configured to push the rod element in the direction from the first abrupt turn to the second abrupt turn, the rod element can travel from the second abrupt turn to the exit, instead of returning to the first abrupt turn from the second abrupt turn.

At the exit, the rod element can push on the one way valve 1975 to leave the zigzag path (FIG. 19F(a)). The pulling element can keep pulling, and the rotatable element can keep rotating on the same clamping direction 1938, to clamp on the object. The rod element can leave the exit of the zigzag path and travel on the outer periphery of the rotatable element (FIG. 19F(b)).

This configuration can be viewed in FIG. 18A(c), showing the pulling element lifted up so that the jaws clamping on the object.

The zigzag path can be configured so that when the rod element is at the second abrupt turn and the rotatable element rotates in the clamping direction, the zigzag path rotates to guide the rod element toward the exit. When the rod element is at the exit, the rotatable element is configured for further rotating in the clamping direction.

The pulling element can keep pulling until the jaws touch the object to clamp on the object (FIG. 19A). The clamping device is ready to be lifted up by the hoist, with the object clamped between the jaws.

This configuration can be viewed in FIG. 18A(d), showing the clamping device listing the object from the ground.

In some embodiments, the zigzag path can be coupled to the body, such as forming a zigzag groove on a round portion of the body. The rod element can be coupled to the rotatable element, such as the axis of rotation 1984 is positioned on the rotatable element. The operation of the automatic locking mechanism can be similar to the configuration in which the rod element is coupled to the body and the zigzag path is coupled to the rotatable element as shown in FIGS. 19A-19F.

In some embodiments, the present invention discloses a clamping device having an automatic locking mechanism. The clamping device then can allow an operator to operate by controlling a hoist coupled to the clamping device, without leaving the hoist area. For example, by lifting and lowering the hoist, the clamping device can be toggled between an activation configuration and a deactivation configuration, which can make it easier to leave an object on the ground after being transport by the clamping device, and which can make it easier to position an empty clamping device on an object.

FIG. 19G shows the clamping device having an object 1910 clamped between a jaw 1960 facing another jaw 1941. The jaw 1941 is coupled to a mechanism, which can include a rotatable element 1930. The rotatable element can have a slanting surface facing a stationary jaw support. The rotatable element can be configured to be rotatable around a center of rotation on the jaw 1941. Thus the rotatable element is rotatable with respect to the jaw 1941. Alternatively, the center of rotation can be on the jaw support, and the rotatable element is coupled to the jaw support, and can be rotatable with respect to the jaw support.

The mechanism can be configured for moving the jaw 1941 toward the jaw 1960 when the rotatable element rotates in a clamping direction. The mechanism can be configured for moving the jaw 1941 away from the jaw 1960 when the rotatable element rotates in an unclamping direction opposite to the clamping direction.

The clamping device can include a pulling element, which can be a flexible line, such as a steel cable. One end of the cable can be coupled to a hoist. The other end of the cable can be coupled to the mechanism, such as to the rotatable element. The cable can be wound around the rotatable element. The cable can be configured to rotate the rotatable element when the end coupled to the hoist moves relative to the center of rotation.

When a pulling element 1943 of the clamping device is pulled up, the rotatable element is rotating. The rotation of the rotatable element can push the jaw 1941 against the stationary jaw support toward the object, due to a slanting interface between the rotatable element and the jaw support. The rotatable element can have a spring mechanism 1935 tensioned in the clamping direction that moves the jaw 1941 toward the jaw 1960. Thus when the pulling element is relaxed, e.g., the tension on the pulling element is reduced, the spring mechanism can rotate the rotatable element in an opposite unclamping direction, which can retract the jaw 1941 to rest on the jaw support.

The clamping device can include an auto lock mechanism 1980. In this configuration, the auto lock mechanism is disengaged or deactivated or in a deactivation configuration, meaning the rotatable element 1930 is free to rotate when the pulling element 1943 is pulled up in the clamping direction, or when the pulling element is released with the spiral spring 1935 providing a rotational force to rotate the rotatable element in the opposite unclamping direction.

The auto lock mechanism 1980 can include a rod element such as a rod 1981 and a mating hole path such as a zigzag path 1982. The rod 1981 can be mounted on a bar 1983, which can be rotatable around a fixed axis 1984. A spring mechanism, such as a linear spring 1985 or a spiral spring, can be used to push the rod toward the rotatable element, so that the rod can rest and slide on an outer surface of the rotatable element. Other configurations or variations can be used, such as push rod configurations to form the auto lock mechanism.

FIGS. 19H(a) and (b) show a process in which the auto lock mechanism is engaged or activated, meaning the rotatable element is restricted from freely moving when the pulling element is pulled up. When the auto lock mechanism is engaged, the linkage between the pulling element 1943 and the jaw 1941 is deactivated, since the rotatable element 1930 is no longer allowed to rotate freely.

After reaching the destination, the clamping device is lowered, e.g., by lowering the pulling element, until the object touch the ground. Before the object touching the ground, the pulling element and the clamping device is coupled as a unit, e.g., the pulling element is stationary relative to the clamping device. The stationary pulling element can cause the rotatable element to also be stationary, with the jaw 1941 clamping on the object.

After touching the ground, the pulling element is further lowered. The clamping device is now stationary, thus the pulling element moves down relative to the clamping device. Spring 1935 can cause the rotatable element to rotate in the direction that opens the jaw 1941. The rotatable element can rotate so that the rod 1981 passes the path 1982, such as at or passing an entrance 1971 to the path 1982 (FIG. 19H(a)). The jaws are now at a maximum separation. The object is then separated from the jaws, e.g., the jaws no longer clamp on the object.

The pulling element is raised up. The rising of the pulling element can be gradually. The rotatable element can rotate slowly as the pulling element is pulled up. The rotation of the rotatable element can cause rod 1981 to slide within the path 1982, and can be stuck at a sharp corner 1972, e.g., a first sharp or abrupt turn counting from the entrance 1971. The sharp corner can form a V shape with the rod sliding along a branch of the V shape, and ending at the junction of the two branches of the V shape. The sharp corner configuration can prevent the rotatable element from any further rotation, and the jaws can be kept separated, away from the object (FIG. 19H(b)).

The pulling element can be further raised up, pulling the clamping device up and away from the object. The stationary of the rotatable element can keep the jaws separated, until the clamping element can approach a new object. The separation of the jaws can allow the clamping device to place the new object between the two jaws.

FIGS. 19I(a) and (b) show a process in which the auto lock mechanism is disengaged or deactivated, meaning the rotatable element can now freely move. When the auto lock mechanism is disengaged, the linkage between the pulling element 1943 and the jaw 1941 is re-activated, with the freely-rotatable rotatable element 1930 acting as the intermediate element between the pulling element and the jaw 1941.

After the clamping device is lowered to place a new object within the separation of the jaws, the pulling element can be further lowered, e.g., even after the clamping device stops by already reaching the new object. The lowering of the pulling element can push the rod 1981 out of the sharp corner 1972 in the auto lock mechanism path 1982. The rod then can move to another opposite sharp corner 1973, e.g., a second sharp or abrupt turn counting from the entrance 1971, such as a V shape corner that is in opposite direction with the first sharp corner 1972 (FIG. 19I(a)).

The pulling element can now be raised up. The pull on the pulling element can rotate the rotatable element, which can slide the rod 1981 out of the sharp corner 1973, e.g., following a second branch of the V shape, to get the rod at the end 1974 or the exit of the path 1982 (FIG. 19I(b)). The first sharp corner and the second sharp corner on the path 1982 form a zigzag pattern, making the path 1982 looks like a zigzag path, e.g., a zigzag-like path. Portion of the zigzag path can be curved or bend, for example, to reduce the path portion within the rotatable element.

The rod is now contacting the outer edge of the rotatable element, which can freely rotate to move the jaw 1941 toward the object for clamping on the object (back to FIG. 19G).

After the jaws clamp on the object, further pulling the pulling element can also raise the clamping device and the object, which can then lift and move the object to a new location.

The process can continue, with the auto lock mechanism engaged to keep the jaws from moving and disengaged to keep the jaws clamping on the object.

In some embodiments, the auto lock mechanism can include a rod and a zigzag-like path on a rotatable element. The path can have an entrance, such as entrance 1971, from an outer periphery. The path can have an exit, such as exit 1974, to the outer periphery.

The path can be a one-way path, e.g., having door or configured so that the rod can travel in one direction, such as from the entrance to the exit. For example, at the exit, there can be a spring-loaded door or obstacle that can open or overcome only from inside the path, e.g., the rod can exit the path through the spring-loaded door or obstacle, but on the return, the rod can slide pass or over the door or obstacle without being able to get into the path through the exit. The path and the rod can also be configured to provide the one-way path. For example, the path can include a horizontal V shape or an Z shape. The rod can be connected to a spring, e.g., through a pivotable arm, that push the rod in one direction, such as downward. Thus, when reaching the horizontal V shape or the Z shape, the rod can be pushed down by the spring to enter the down portion of the horizontal V shape or the Z shape, and not returning to the original path. The branch configuration and the spring action can make the path one way, e.g., the rod can follow the path without returning to the original path.

The path can include a stopping location, e.g., a location at which the rod is prevented from further traveling without back tracking. For example, the stopping location can include a corner, e.g., a straight or round corner making an angle less than 180 or 90 degrees with the direction of travel along the path at the stopping location, such as a V shape corner or a rounded V shape corner. The stopping location can stop the rotating movement of the rotatable element, e.g., the rotatable element cannot continue to rotate without first reversing direction, or at least first stopping to wiggle the rod out of the stopping location.

Alternatively, the stopping location can include a turn on the path with the portion of the path after the turn making an angle greater than 90 degrees with respect to the relative moving direction of the rod, such as the movement direction of rotatable element at the rod location in the stopping location.

FIGS. 20A-20E illustrate configurations for an auto lock mechanism according to some embodiments. A rotatable element 2030 can include a path 2082, which can enter the rotatable element, making a few turns, such as zigzag turns, and then exiting the rotatable element. The path can be configured to accept a rod 2081 from a rod assembly.

In FIG. 20A, the path 2082 can be configured to provide a one-way travel for the rod, including a first stopping location, e.g., a first sharp or abrupt turn, which can prevent the rod for further travelling in the path without first back tracking. There can be a second stopping location, e.g., a second sharp or abrupt turn, to guide the path back to the exit. Thus, when the rod is disposed outside the path, the rotatable element is free to rotate. When the rod enters the path, the rod can be stopped at the first stopping location, preventing the rotatable element from any further rotation. After back tracking the rotatable element, the rotatable element then can rotate forward to let the rod out of the path. The rotatable element is then free to move again.

The path can be a one way path at the entrance 2071 and exit 2074 by having the entrance and exit portions tangential or forming an acute angle with a tangent of the periphery of the rotatable element. For example, a portion of the rotatable element can have a shape of a cylinder, and the rod can rest on the cylinder outer shape, with a spring mechanism to push the rod toward the cylinder shape. The spring can be a linear, e.g., straight, spring, or a spiral spring.

The entrance and exit can form an acute angle, e.g., an angle less than 90 degrees, with the tangent vector in the direction of the one way. For the entrance, the acute angle formation can be adequate to ensure a one way travel, since the counterclockwise rotation of the rotatable element (or relative clockwise movement of the rod) will let the rod passing the entrance. On the opposite direction, e.g., on the clockwise rotation of the rotatable element (or relative counterclockwise movement of the rod), the rod can enter the entrance.

For the exit, the acute angle formation can allow easy of movements for the rod, in both two ways travel.

FIGS. 20B(a) and (b) show a configuration for the path to be one way path at the exit of the path. When the rotatable element rotates in one direction, such as a clockwise direction (FIG. 20B(a)), the rod can leave the exit to stay at a periphery of the rotatable element. When the rotatable element rotates in the opposite direction, such as the counterclockwise direction (FIG. 20B(b), the rod can bypass the exit to keep on the periphery of the rotatable element.

FIGS. 20C(a) and (b) show configurations for the path to be one way path at the exit of the path. In FIG. 20C(a), a one-way door 2075 can be disposed at the exit of the path. The door can be hinged at one end. The door can have a spring pulling the door downward, e.g., counterclockwise as shown. Thus the door can be opened from inside the path, by forcing the spring to extend by the rod. After the rod leaving the exit, the spring can pull the door shut to prevent the rod from re-entering the exit from the outside.

In FIG. 20C(b), a one-way obstacle 2085 can be disposed at the exit of the path. The obstacle can be disposed on the path near the exit of the path. The obstacle can be hinged at one end. The obstacle can have a spring pushing the obstacle to block the path, e.g., pushing the obstacle to the right as shown. Thus the obstacle can be overcome from inside the path, by compressing the spring by the rod. After the rod leaving the exit, the spring can push the obstacle back to prevent the rod from re-entering the exit from the outside.

As shown, the obstacle can block the path with a hinge perpendicular to the surface of the rotatable element. Other configurations can be used, such as an obstacle having a hinge parallel to the surface of the rotatable element. As shown, the springs are linear or straight springs, but other configurations can be used, such as spiral springs, or non-spring action elements such as rubber elements or hydraulic elements.

Further, other configurations to form a one-way exit for the path can be used, such as a gradually narrow portion of the path at the exit point, thus the rod can be forced through the exit, but on the reverse path, the rod will just pass through the exit without entering the path.

FIG. 20D(a) shows a configuration for the first stopping location on the path. When the rotatable element rotates in one direction, such as a clockwise direction, actuated by pulling the pulling element, the rod can travel from the entrance to the first stopping location 2072, and then stopped at the first stopping location, which can prevent the rotatable from any further rotation. Thus, the rotatable element can stop rotating when the rod reaches the first stopping location. This action can disable the linkage between the pulling element and the rotation of the rotatable element, and which can prevent the jaws from approaching each other.

FIGS. 20D(b) and 20E(b) show configurations for the path to be one way path based on a spring mechanism acting on the rod assembly. The spring mechanism activated by the spring 2085 can push the rod downward, e.g., in the direction toward the rotatable element. Thus, the rod is more likely to follow the lower branch, e.g., the branch toward the center of the rotatable element, when reaching a path divider with two possible path portions.

The rod can stay at or near the entrance to the path. When the rotatable element rotates in one direction, such as the counterclockwise direction, the rod can stay at the periphery of the rotatable element, since the entrance forms an acute angle with the tangential direction of the relative travel of the rod.

When the rotatable element rotates in the opposite direction, such as the clockwise direction as shown in FIG. 20D(b), the rod can either stay on the outer periphery of the rotatable element, or the rod can enter the entrance portion of the path. Due to the spring mechanism pushing the rod downward, the rod can enter the entrance portion of the path to reach the stopping location.

The rod can stay at the stopping location of the path. When the rotatable element tries to rotate in one direction as shown in FIG. 20D(a), such as the clockwise direction, the rod can stop the rotatable element from rotating.

When the rotatable element rotates in the opposite direction, such as the counterclockwise direction as shown in FIG. 20E(b), the rod can either return on the path to the entrance, or the rod can enter the new downward or lower branch of the path. Due to the spring mechanism pushing the rod downward, the rod can enter the downward portion of the path, e.g., on the one way travel of the path.

FIG. 20E(a) shows another configuration to prevent the rod from returning to the entrance at the stopping location. A spring door or obstacle 2087 can be used to block the return path, forcing the rod to follow the downward lower branch of the path to the exit. The spring door or obstacle can be configured to allow the rod to travel from the entrance to the stopping location, and prevent the return of the rod.

Other configurations to form a one-way travel at the stopping location can be used, such as a gradually narrow portion of the path at the stopping location, thus the rod can be forced through to the stopping location, but on the reverse path, the rod will just pass through to the exit without returning to the entrance. Further, the obstacle can have different configurations for the hinges and the springs.

In some embodiments, the zigzag path can be coupled to the body, such as forming a zigzag groove on a round portion of the body. The rod element can be coupled to the rotatable element, such as the axis of rotation 1984 is positioned on the rotatable element. The operation of the automatic locking mechanism can be similar to the configuration in which the rod element is coupled to the body and the zigzag path is coupled to the rotatable element as shown in FIGS. 19A-19I.

FIGS. 21A-21C illustrate flow charts for operating a clamping device having an auto lock mechanism according to some embodiments. In FIG. 21A, operation 2100 toggles a locking mechanism of a clamping device by lowering and then raising a hoist coupled to the clamping device. The locking mechanism can include a locking position in which at least a jaw of two jaws of the clamping device is unmovable when the hoist is continued to be raised and an unlock position in which the jaw is movable toward the other jaw when the hoist is continued to be raised.

The locking mechanism can be coupled to a jaw, or to an intermediate linkage between the jaw and an element of the clamping device that is coupled to the hoist for moving the clamping device.

In FIG. 21B, operation 2120 lowers a hoist for moving a jaw of a clamping device. The hoist can be coupled to an element of the clamping device. The element can be coupled to the jaw through a linkage mechanism, so that when the element is lowered, the jaw can be moved.

Operation 2130 raises the hoist. The jaw can be toggled between being movable and being unmovable when the hoist is continued to be raised. The toggling process can be accomplished be an auto lock mechanism that enables or disables the linkage mechanism between the element and the jaw.

In FIG. 21C, operation 2150 lowers a hoist for moving a clamping mechanism in one direction. The clamping mechanism causes a jaw of a clamping device to move.

Operation 2160 raises the hoist for moving the clamping mechanism in an opposite direction. The clamping mechanism is toggled between the jaw being movable and the jaw being unmovable when the hoist is continued to be raised.

FIGS. 22A-22B illustrate flow charts for operating a clamping device having an auto lock mechanism according to some embodiments. When a hoist coupled to a clamping device is lowered, the jaws can be separated from each other due to a linkage between the jaws and an element of the clamping device, such as a pulling element. When the hoist is lowered so that the separation between the jaws reaches a predetermined distance, such as a maximum separation, the auto lock mechanism can be toggled when the hoist starts to raise the element up, or when the element is raised up a distance by the hoist. The auto lock mechanism can toggle between a unlock position, in which the jaws are movable when the element is pulled up, and a lock position, in which the jaws are not movable (or only movable a short distance) when the element is pulled up.

In FIG. 22A, operation 2200 lowers a hoist coupled to a clamping device. The clamping device is lowered together with the hoist. Two jaws of the clamping device are separated at a distance. Operation 2210 continuingly lowers the hoist. At least a jaw of the two jaws moves to increase a distance between the jaws, until the jaw reaches a position. Operation 2220 raises the hoist to activate a toggling mechanism for securing the jaw. Operation 2230 continuingly raises the hoist. The jaws remain separated since the toggling mechanism has been activated from movable jaw to secured jaw.

In FIG. 22B, operation 2240 lowers a hoist coupled to a clamping device. The clamping device is lowered together with the hoist. Operation 2250 continuingly lowers the hoist. At least a jaw of two jaws of the clamping device moves to enlarge a distance between the two jaws. Operation 2260 continuingly lowers the hoist until the jaw reaches a position. Operation 2270 raises the hoist to activate a toggling mechanism for securing the jaw. Operation 2280 continuingly raises the hoist.

FIGS. 23A-23B illustrate flow charts for operating a clamping device having an auto lock mechanism according to some embodiments. When a hoist coupled to a clamping device is lowered, with the jaws separated from each other due to an auto lock mechanism dissociating a linkage between the jaws and an element of the clamping device, such as a pulling element. The hoist can be lowered so that an object is placed between the separated jaws. The contact between the clamping device and the object can have an effect on the auto lock mechanism, in such as a way so that the auto lock is partially released. The auto lock mechanism can be fully released, e.g., toggling from the lock position to an unlock position, when the hoist starts to raise the element up. The auto lock mechanism is then toggled between a lock position, in which the jaws are not movable (or only movable a short distance) when the element is pulled up, and a unlock position, in which the jaws are movable when the element is pulled up.

In FIG. 23A, operation 2300 moves a clamping device to approach an object. A hoist coupled to the clamping device, for example, through a steel cable, is lowered so that the clamping device contacts the object. The clamping device can be configured to have two jaws fixedly separated. The object can be disposed between the two jaws. The hoist can lower the cable to place the second object between the two jaws. Operation 2310 continuingly lowers the hoist to activate a toggling mechanism, e.g., to bring the automatic locking mechanism from a previous activation configuration to a deactivation configuration. The toggling mechanism releases a lock that prevents at least one of the two jaws from moving. For example, after the clamping device contacts the second object, the hoist can further lower the cable to rotate the rotatable element in the unclamping direction until the automatic locking mechanism is partially activated.

Operation 2320 raises the hoist to further activate a clamping mechanism that can be configured to move the jaws together for clamping on the object. Activating the clamping mechanism is the same as deactivating the automatic locking mechanism, which does not lock the rotatable element, and which allows the clamping mechanism to operate to move the jaws together. For example, the hoist can raise the cable up to rotate the rotatable element in the clamping direction to complete the deactivation of the automatic locking mechanism, after the automatic locking mechanism is partially deactivated by the previous step. The complete deactivation of the automatic locking mechanism toggles the rotatable element from the non-rotatable configuration to the rotatable configuration.

Operation 2330 continuingly raises the hoist to raise the clamping device and the object. The object is secured between the two jaws due to the clamping mechanism. For example, the hoist can continuing raises the cable up to rotate the rotatable element in the clamping direction to move the jaws together, such as moving one jaw toward the other jaw, until the jaws clamp on the object. After the jaws clamp on the object, the hoist can lift up, and move the clamping device while the clamping device clamps on the object to a destination.

In FIG. 23B, operation 2350 lowers a hoist coupled to a clamping device clamping on an object so that the object touches a surface, such as the ground. The object is clamped between two jaws of the clamping device. The hoist can be coupled to a steel cable wrapped around a rotatable element of the clamping device.

Operation 2360 continuingly lowers the hoist to enlarge a distance between the two jaws. After the object touches the ground, the hoist continues to lower the cable. The tension on the cable is reduced, and a spring mechanism coupled to the rotatable element acts to rotate the rotatable element in the unclamping direction to separate the two jaws to loosen a grip on the object. When the jaws are separated at a predetermined distance, such as at or close to a maximum distance determined by a limit stop, the automatic locking mechanism coupled to the clamping device can be partially activated.

Operation 2370 lifts the hoist to activate a toggling mechanism, e.g., to bring the automatic locking mechanism from a previous deactivation configuration to an activation configuration. The toggling mechanism, which moves the automatic locking mechanism to the activation configuration, activates a lock that prevents at least one of the two jaws from moving. The hoist can raise the cable up to rotate the rotatable element in the clamping direction to complete the activation of the automatic locking mechanism. The activation of the automatic locking mechanism prevents the rotatable element from rotating further in the first direction.

Operation 2380 continues to raise the hoist to raise the clamping device without the object. The object is separated from the clamping device due to the distance between the two jaws larger than a dimension of the object. The hoist can continue to raise the cable up to raise the clamping device. The jaws of the clamping device remain open due to the non-rotatable configuration of the rotatable element, leaving the object on the ground.

Figure 24:
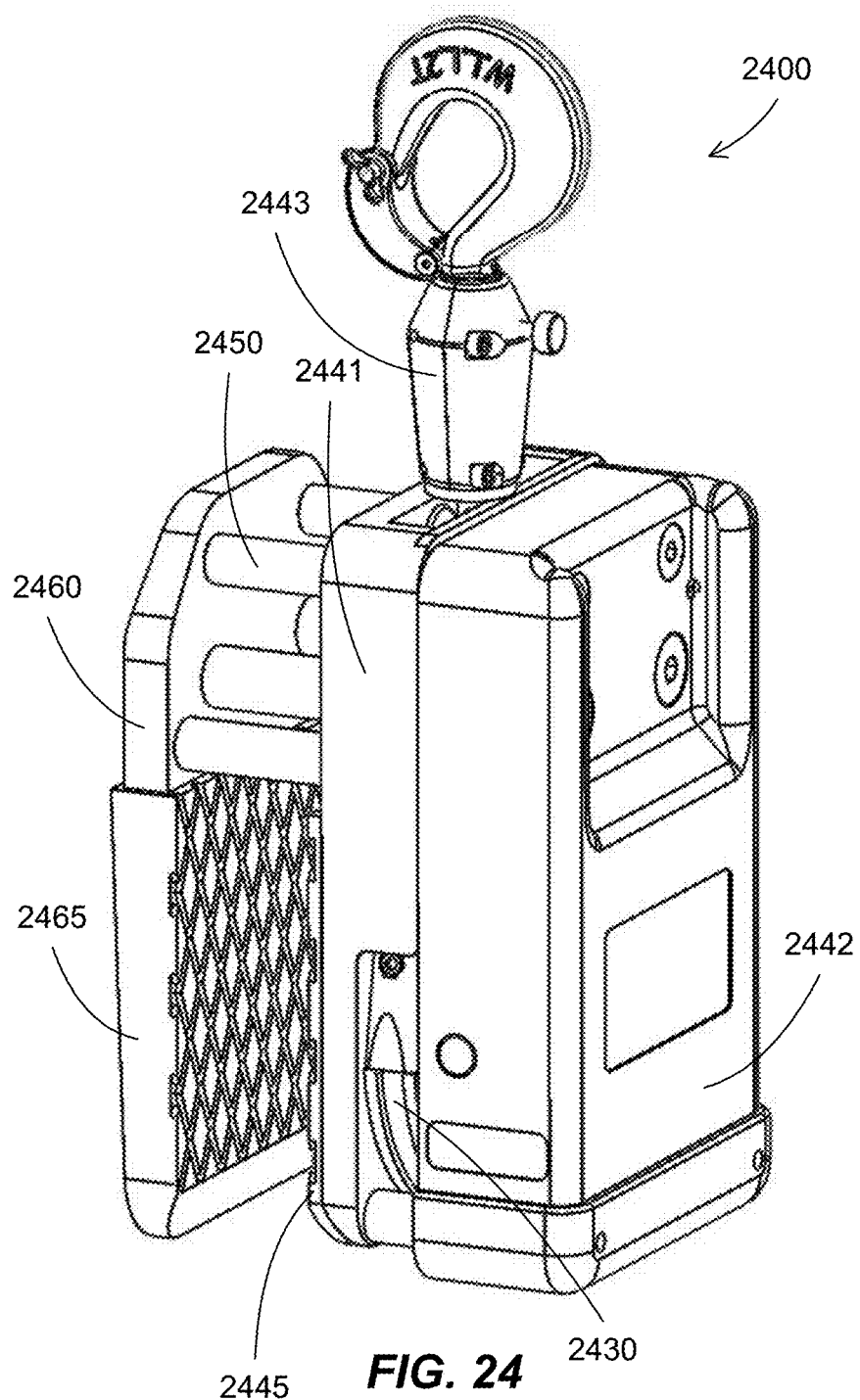
FIGS. 24-26 illustrate additional views of the clamping device according to some embodiments.

FIGS. 24-26 illustrate additional views of the clamping device according to some embodiments. A clamping device can include a first jaw assembly and a second jaw assembly disposed in substantially perpendicular with a clamp bar. The clamp bar can include multiple bars, which can be coupled to the first and second jaw assembly. The first jaw assembly can be fixedly coupled to the clamp bar. The second jaw assembly can also be fixedly coupled to the clamp bar. Alternatively, the second jaw assembly can be movably coupled to the clamp bar, such as moving along the clamp bar, and then secured to the clamp bar, for example, by a locking mechanism.

The clamping device can include a rotatable element, which can be coupled to a jaw assembly. For example, the jaw assembly can include a jaw facing a jaw support. The rotatable element can be disposed between the jaw and the jaw support, and can be rotatably coupled to a component of the jaw assembly, such as to the jaw. A pulling element can be coupled to the rotatable element to rotate the rotatable element in one direction. A return mechanism, such as a spiral spring assembly, can be used to rotate the rotatable element in an opposite direction.

An interface between the rotatable element and a component of the jaw assembly, such as the jaw support can include a slanting surface, which can be configured so that when the rotatable element is rotated in the direction caused by the pulling of the pulling element, the jaw is moving away from the jaw support if there is no obstacle blocking the movement of the jaw. If an object is already present between the jaws of the clamping device, the slanting surface can convert the action of pulling the pulling element to an action, e.g., a force, pushing on the jaw, to clamp on the object.

The slanting interface can include one or more spiral surfaces coupled to the rotatable element, and one or more rollers coupled to a component of the jaw assembly, such as to the jaw support.

FIG. 24 shows a perspective view of the clamping device. A clamping device 2400 can include a first jaw 2460 which is coupled to a clamp bar 2450. A rubber pad 2465 can be coupled to the first jaw to increase friction with clamped objects. A jaw assembly including a second jaw 2441 and a jaw support 2442 can be coupled to the clamp bar. A rubber pad 2445 can be coupled to the second jaw to increase friction with clamped objects.

A rotatable element 2430 can be disposed between the second jaw and the jaw support. The rotatable element can be rotatably coupled to the second jaw, and can have slanting interfaces with the jaw support. The rotatable element can have spiral surfaces, interfacing with rollers in the jaw support. The rollers can roll on the spiral surfaces of the rotatable element.

A pulling element 2443 can have one end fixedly coupled to the rotatable element, and wrapped around the rotatable element. Thus, when the pulling element is pulled up, the rotatable element can rotate, which can rotate the spiral surfaces on the rollers, moving the rotatable element relative to the jaw support. The other end of the pulling element can include a coupled, such as a hook, for coupling with a hoist for moving the clamping device.

The clamping device can include other components, such as an auto lock mechanism for enabling or disabling a linkage between the pulling element and the second jaw. For example, the auto lock mechanism can allow or prevent the rotatable element from rotating, thus pulling on the pulling element can rotate or non-rotate the rotatable element.

Figures 25A, 25B:
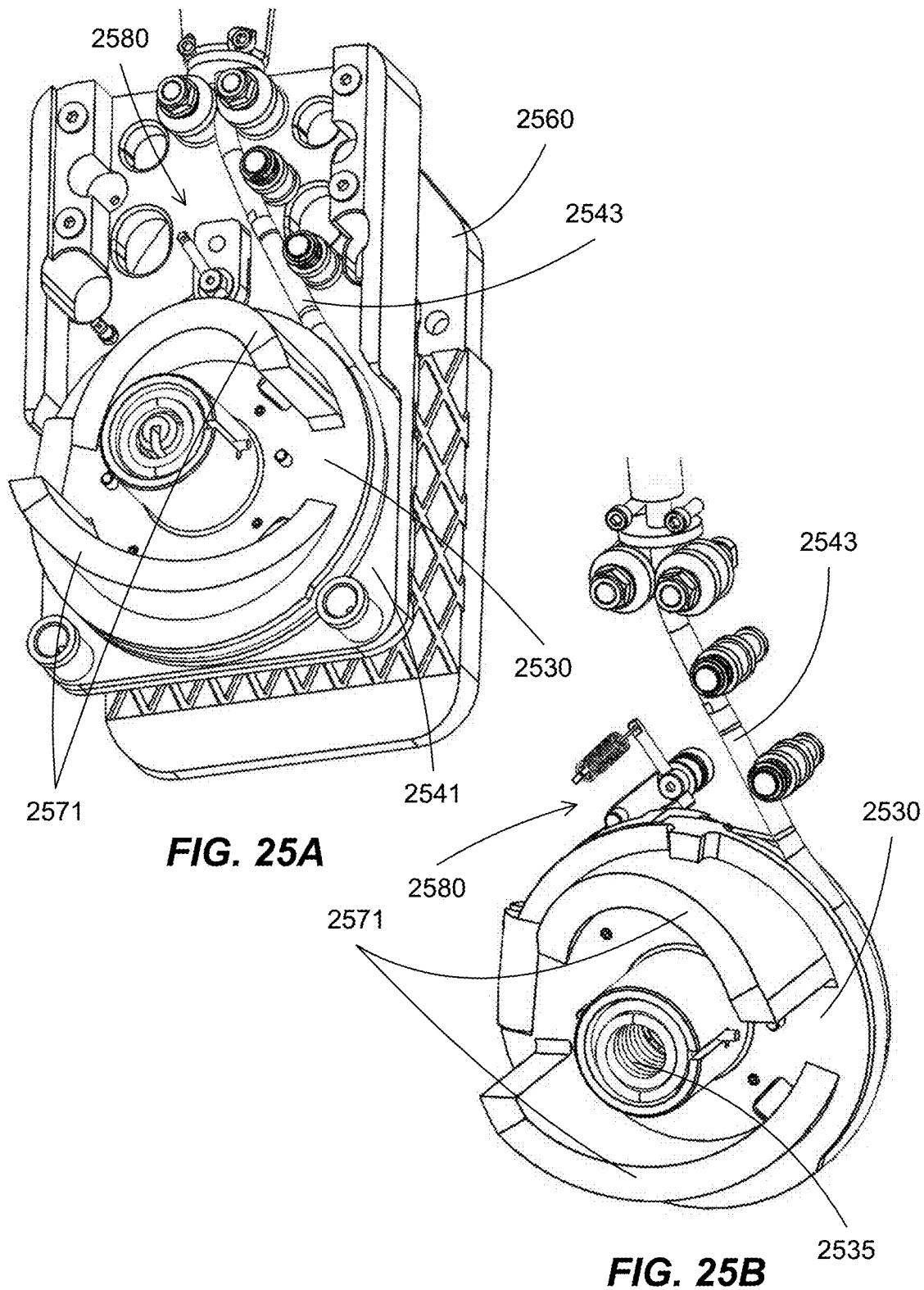

FIGS. 25A-25B show internal views of a clamping device according to some embodiments. A clamping device can include a first jaw 2560 facing a second jaw 2541. A rotatable element 2530 can be rotatably coupled to the second jaw, for example, through ball bearings. A pulling element 2543 can be coupled to the rotatable element, and can rotate the rotatable element, when pulled, in one direction, such as counterclockwise as shown. Spring assembly 2535 can be coupled between the rotatable element and the second jaw to rotate the rotatable element in an opposite direction, for example, when the pulling element is not pulled or released.

The rotatable element can include slanting surface, such as spiral surfaces 2571, which can change a distance between the rotatable element and a jaw support (not shown). An auto lock mechanism 2580 can be coupled to the rotatable element. The auto lock mechanism can be fixedly coupled to the second jaw, and can function to allow or to prevent the rotatable element from rotating.

Figure 26A:
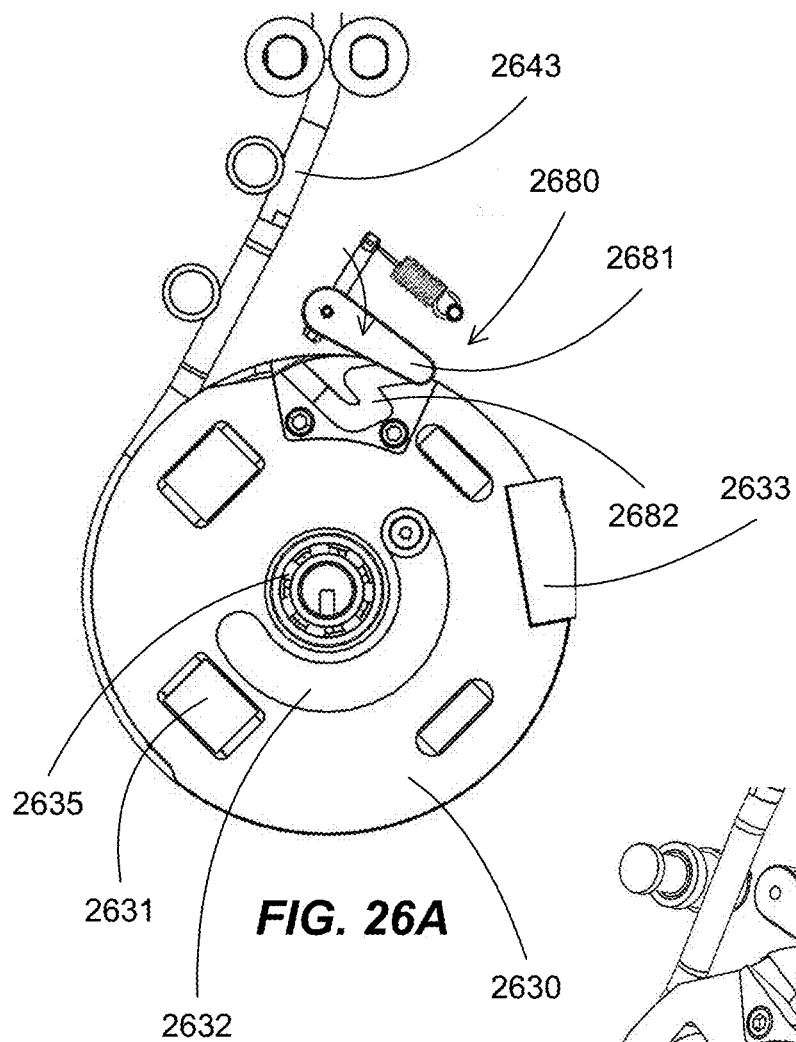
Figure 26B:
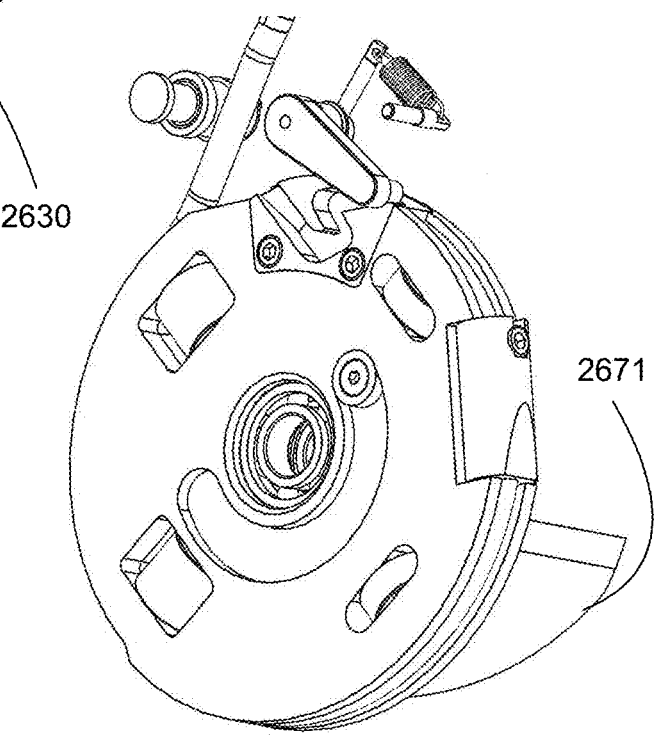

FIGS. 26A-26B show internal views of a clamping device according to some embodiments. A pulling element 2643 can be coupled to a rotatable element 2630. For example, one end 2633 of the pulling element can be fixedly coupled to the rotatable element. Thus, when the pulling element is pulled up, the rotatable element can rotate, such as in a clockwise direction as shown. A spring assembly 2635 can be used to rotate the rotatable element in an opposite direction, when the pulling element is relaxed.

A limiter 2632 can be used to limit the amount of rotation. For example, as shown, the rotatable element can rotate at most about 180 degrees. Rollers 2631 can be included to reduce friction between the rotatable element and a jaw support (not shown). The rotatable element can include slanting surface, such as spiral surfaces 2671. There can be 2 spiral surfaces, thus the rotatable element can obtain a maximum separation with the jaw support when rotating about 180 degrees.

An auto lock mechanism 2680 can couple the rotatable element with a second jaw (not shown). The auto lock mechanism can include a pin handle 2681, which can be spring loaded to be pressed against the rotatable element. A path 2682 can be included in the rotatable element to generate the auto lock feature, including a stopping location, and one way travel from an entrance to an exit.

In some embodiments, the present invention discloses an auto lock mechanism for a clamping device. The clamping device can be used for lifting and moving objects, such as plates like glass plates, or granite plates. The clamping device can have two opposing jaws configured to clamp on an object. A pulling element is coupled to at least one of the jaws, for actuating and de-actuating the clamping actions of the jaws. For example, when the pulling element moves up, e.g., relative to the jaws, for example, the jaws are clamping together for securing the object disposed between the jaws. When the pulling element moves down, the jaws are moving apart for releasing the object between the jaws. Generally, the relative movements of the pulling element, e.g., the movements of the pulling element with respect to at least another element of the clamping device, occur when the clamping device is stationary, such as when the clamping device is on the ground, or when the clamping device already contacts an object for lifting, or when the clamping device rests an object at a destination. The pulling element can be moved, but not relative to other elements of the clamping device, when the whole clamping device is moved, for example, when an empty clamping device is moved to approach an object for grasping, or when a clamping device having an object in its grasp is on the process of transferring the object.

The auto lock mechanism can automatically disable or enable the coupling or the linkage between the pulling element and the jaw or jaws. The automatic disabling or enabling can simplify the actions of the clamping device, such as allowing operating the clamping device with a single operator.

Figure 27A:
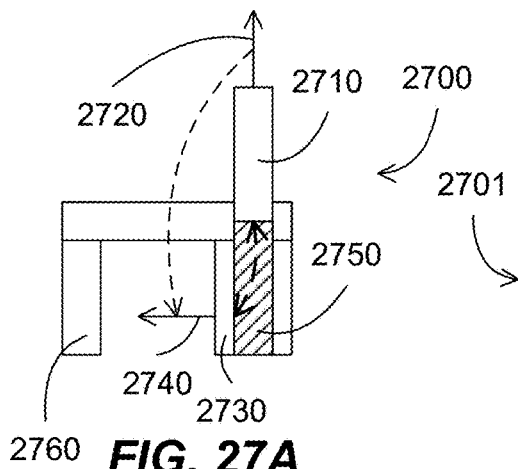
FIGS. 27A-27F illustrate configurations of clamping devices according to some embodiments.

FIGS. 27A-27F illustrate configurations of clamping devices according to some embodiments. FIG. 27A shows a schematic for a clamping device 2700, including two jaws 2760 and 2730 for clamping on an object. The clamping device can include a pulling element 2710, which can be coupled with at least one of the jaws, such as jaw 2730, through a linkage mechanism 2750. The linkage mechanism can be configured so that when the pulling element is moved, relative to the jaw, the jaw is moved in a different direction. For example, when the pulling element moves up 2720, the jaw can move 2740 toward the opposite jaw. The linkage mechanism can also function as a clamping mechanism, for example, by pulling on the pulling element, the jaw can exert a force on an object disposed between the two jaws for clamping on the object. After the object is clamped, further pulling on the pulling element can lift the clamping device, e.g., the pulling element is moved up together with other components of the clamping device, and not relative to the jaw or to other components of the clamping device.

Different clamping devices can be formed using different linkage mechanisms between the pulling element and the jaw. For example, the linkage mechanisms can include a scissor mechanism, a half scissor mechanism, a slanting interface mechanism including flat slanting surfaces or curved or spiral surfaces.

Figure 27B:
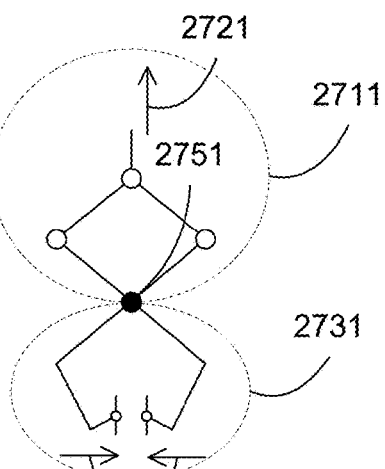

FIG. 27B shows a clamping device having a scissor mechanism. The clamping device 2701 can have two movable jaws caused by a scissor action of a scissor clamp. The clamping device can include one or more sets of clamping jaws, which can increase a gripping action on the object without increasing clamping pressures on the object.

In general, the clamping device can have two arm portions 2711 and 2731, having one ends coupled together through a fixed pivotal point 2751. The free end of the top arm portion 2711 can be lifted up 2721 or moved down. When lifted up or moved down, the pivotal linkage 2751 can move the free end of the bottom arm 2731. The free end of the bottom arm portion 2731 can be coupled to the jaws of the clamping device. The movements of the free end of the bottom arm 2731 can move 2741 the jaws to clamp on an object, e.g., the jaws moving toward each other, or to release the object, e.g., the jaws moving away from each other.

For example, when the free end of the top arm portion moves up 2721, the pivotal linkage can cause the jaws to move 2741 toward each other for clamping on the object. When the free end of the top arm portion moves down, the pivotal linkage can cause the jaws to move away from each other for releasing the object.

The clamping device 2701 is shown without an object, and with the linkage mechanism between the two portions of the scissor arms activated. The clamping device can be lifted up 2721. The lifting action causes the jaws to move together 2741. When the clamping device is positioned near an object for pick up, the closeness of the jaws can make it difficult to move the clamping device down to clamp on the object. Thus, an auto lock mechanism can be included to disable the linkage mechanism for empty clamping device for easy of picking objects.

The object can be disposed between the open jaws of the clamping device. The auto lock mechanism can re-enable the linkage mechanism. The pulling element of the clamping device can be lifted up, causing the jaws to securely clamp the object. The clamping device can then move the object to a desired location. When the clamping device reaches a target position, the clamping device can move down to position the object on the ground. The pulling element of the clamping device can move further down so that the jaws open for releasing the object, due to the activation of the linkage mechanism. When the clamping device lifts up to move to other locations, the lifting up action can cause the jaws to clamp again on the object, which can present difficulty to move the clamping device and leaving the object at the destination. The auto lock mechanism can disable the linkage mechanism for empty clamping device with open jaws for easy of leaving objects at destinations.

Figure 27C:
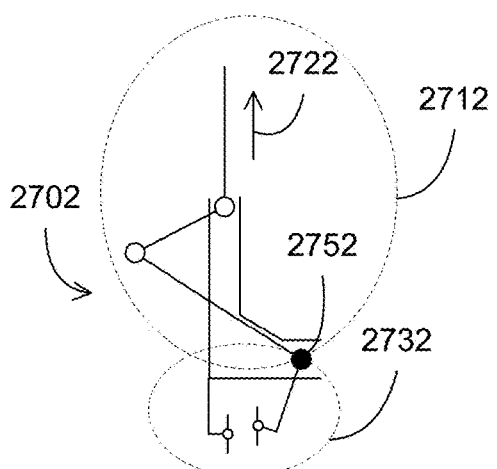

FIG. 27C shows a clamping device having a half scissor mechanism. The clamping device 2702 can have a fixed jaw disposed opposed to a movable jaw caused by a scissor action of the clamping device. The set of clamping jaws with a fixed jaw and a movable jaw can reduce movements of the objects, which can be useful for fragile objects.

The clamping device can further include one or more sets of clamping jaws, which can increase a gripping action on the object without increasing clamping pressures on the object. The low clamping pressure due to the multiple clamping jaw sets can be useful in clamping low friction and fragile objects, such as glass plates.

In general, the clamping device can have two arm portions 2712 and 2732, having one ends coupled together through a fixed pivotal point 2752. The free end of the top arm portion 2712 can be lifted up or moved down. When lifted up or moved down, the pivotal linkage 2752 can move the free end of the bottom arm 2732. The free end of the bottom arm portion 2732 can be coupled to the jaws of the clamping device. The movements of the free end of the bottom arm 2732 can move the jaws to clamp on an object, e.g., the jaws moving toward each other, or to release the object, e.g., the jaws moving away from each other.

For example, when the free end of the top arm portion moves up 2722, the pivotal linkage can cause one jaw to move 2742 toward the other jaw for clamping on the object. When the free end of the top arm portion moves down, the pivotal linkage can cause the jaw to move away from the other jaw for releasing the object.

The clamping device can include other components, such as a guiding mechanism for moving the jaw sets to the object. The jaw sets can have an opening for the object to enter. The guiding mechanism can assist the object, e.g., guiding the object to enter the openings between the jaws of the jaw sets. The clamping device can include a contact mechanism to visually detecting the object, for example, when the scissor clamp moves toward the object for clamping. The contact mechanism can be particular useful for transparent objects, such as glass plates, which can be difficult for the operator to see the edge of the plates. The scissor clamp can include roller feet for rolling the scissor clamp, for example, for moving between places on the ground.

The clamping device 2702 is shown without an object, and with the linkage mechanism between the two portions of the scissor arms activated. The clamping device can be lifted up 2722. The lifting action causes the jaws to move together 2742. When the clamping device is positioned near an object for pick up, the closeness 2730 of the jaws can make it difficult to move the clamping device down to clamp on the object. Thus, an auto lock mechanism can be included to disable the linkage mechanism for empty clamping device for easy of picking objects.

The object can be disposed between the open jaws of the clamping device. The auto lock mechanism can re-enable the linkage mechanism. The clamping device can clamp on the object, and deliver the object to a desired location. Afterward, the pulling element of the clamping device can move further down so that the jaws can release the object. When the clamping device lifts up to move to other locations, the lifting up action can cause the jaws to clamp again on the object, which can present difficulty to move the clamping device and leaving the object at the destination. The auto lock mechanism can disable the linkage mechanism for empty clamping device with open jaws for easy of leaving objects at destinations.

Figure 27D:
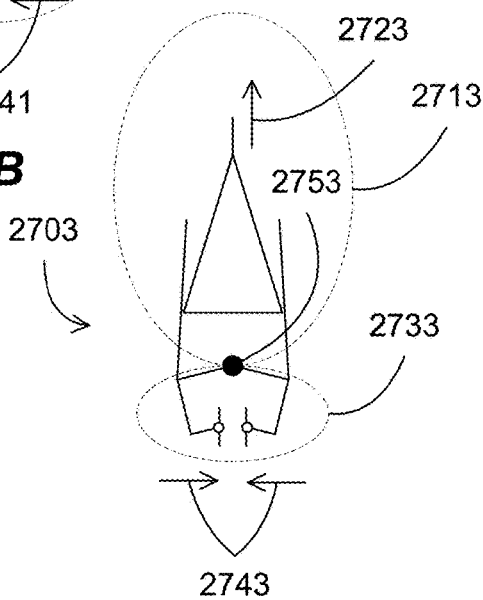

FIG. 27D shows a clamping device having a pulling element having slanting interfaces. The clamping device can have two movable jaws caused by a moving action of the pulling element due to the slanting interfaces. For example, the pulling element can have a triangular shape with two slanting surfaces at the sides of the triangle. The slanting surfaces can interface with arms of the linkage mechanism, so that when the pulling element moves up, the arms can move the jaws toward each other. The clamping device can include one or more sets of clamping jaws, which can increase a gripping action on the object without increasing clamping pressures on the object.

As shown, the clamping device 2703 can have two arm portions 2713 and 2733, having one ends coupled together through a fixed pivotal point 2753. The free end of the top arm portion 2713 can swing right or left, due to the up or down action of the pulling element at the slanting interfaces, respectively. When swing right or left, the pivotal linkage 2753 can move the free end of the bottom arm 2733. The free end of the bottom arm portion 2733 can be coupled to the jaws of the clamping device. The movements of the free end of the bottom arm 2733 can move the jaws to clamp on an object, e.g., the jaws moving toward each other, or to release the object, e.g., the jaws moving away from each other.

For example, when the pulling element moves up 2723, the larger size of the pulling element can cause the free end of the top arm portion to wing to the right. Due to this action, the pivotal linkage can cause the jaws to move 2743 together for clamping on the object. When the pulling element moves down, the smaller size of the pulling element can cause the free end of the top arm portion to swing to the left. Due to this action, the pivotal linkage can cause the jaws to move away from each other for releasing the object.

The clamping device 2703 is shown without an object, and with the linkage mechanism between the two portions of the scissor arms activated. The clamping device is lifted up 2723. The lifting action causes the jaws to move together 2743. When the clamping device is positioned near an object for pick up, the closeness of the jaws can make it difficult to move the clamping device down to clamp on the object. Thus, an auto lock mechanism can be included to disable the linkage mechanism for empty clamping device for easy of picking objects.

The object can be disposed between the open jaws of the clamping device. The auto lock mechanism can re-enable the linkage mechanism. The clamping device can clamp on the object, and deliver the object to a desired location. Afterward, the pulling element of the clamping device can move further down so that the jaws can release the object. When the clamping device lifts up to move to other locations, the lifting up action can cause the jaws to clamp again on the object, which can present difficulty to move the clamping device and leaving the object at the destination. The auto lock mechanism can disable the linkage mechanism for empty clamping device with open jaws for easy of leaving objects at destinations.

Figure 27E:
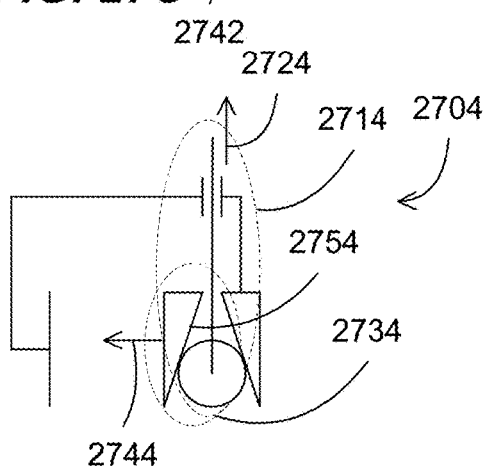

FIG. 27E shows a clamping device having a pulling element having a slanting interface including a planar slanting surface interacting with a roller. The clamping device can have a fixed jaw and an opposite jaw movable due to a moving action of the pulling element using the slanting interface between the planar surface of the jaw and a roller on the pulling element. For example, the pulling element can couple to a roller, which can roll on the slanting surface of the jaw, and optional on a slanting surface of a jaw support which can be fixedly coupled to the clamping device. When the pulling element moves up, the roller can roll up on the jaw, causing the jaw to move toward the other jaw.

As shown, the clamping device 2704 can have two portions 2714 (the pulling element) and 2734 (one jaw of the two jaws of the clamping device), coupled together through a slanting surface 2754. The pulling element 2714 can move up due to a pulling force, or down due to gravity. When moving up or down, the slanting surface 2754 can cause the jaw 2734 to move left or right, respectively, as shown in the figure. The movements of the jaw 2734 can clamp on an object, e.g., the jaw moving toward the opposite jaw, or to release the object, e.g., the jaw moving away from the opposite jaw.

For example, when the pulling element moves up 2724, the larger portion of the jaw due to the slanting surface can cause the jaw to move 2744 to the left, toward the other jaw for clamping on the object. When the pulling element moves down, the smaller portion of the jaw due to the slanting surface can cause the jaw to move to the left, away from the other jaw for releasing the object.

The clamping device 2704 is shown without an object, and with the linkage mechanism between the pulling element and the jaw activated. The clamping device is lifted up 2724. The lifting action causes the jaw to move 2744 toward the opposite jaw. When the clamping device is positioned near an object for pick up, the closeness of the jaws can make it difficult to move the clamping device down to clamp on the object. Thus, an auto lock mechanism can be included to disable the linkage mechanism for empty clamping device for easy of picking objects.

The object can be disposed between the open jaws of the clamping device. The auto lock mechanism can re-enable the linkage mechanism. The clamping device can clamp on the object, and deliver the object to a desired location. Afterward, the pulling element of the clamping device can move further down so that the jaws can release the object. When the clamping device lifts up to move to other locations, the lifting up action can cause the jaws to clamp again on the object, which can present difficulty to move the clamping device and leaving the object at the destination. The auto lock mechanism can disable the linkage mechanism for empty clamping device with open jaws for easy of leaving objects at destinations.

Figure 27F:
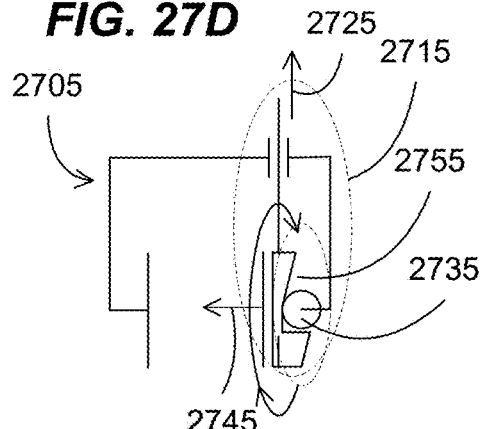

FIG. 27F shows a clamping device having a pulling element having slanting interfaces including curved or spiral surfaces interacting with rollers. The clamping device can have a fixed jaw and an opposite jaw movable due to a rotational action of a rotatable element. The pulling element, which can be a flexible cable or chain, can be coupled to the rotatable element, to rotate the rotatable element in one direction when the pulling element is pulled up.

The rotatable element can have a slanting interface, which includes spiral surfaces on the rotatable element interacting with rollers on a jaw support coupled to the clamping device. When the pulling element moves up, the rotatable element can rotate, with the rollers roll on the spiral surfaces of the rotatable element, causing the jaw to move toward the other jaw.

As shown, the clamping device 2705 can have two portions 2715 (the pulling element, the rotatable element, and the jaw) and 2735 (the rollers coupled to the jaw support of the clamping device), coupled together through spiral surfaces 2755 on the rotatable element. The pulling element 2715 can move up due to a pulling force, or down due to a spring mechanism in the rotatable element. When moving up or down, the spiral surfaces 2755 can cause the jaw 2735 to move left or right, respectively, as shown in the figure. The movements of the jaw 2735 can clamp on an object, e.g., the jaw moving toward the opposite jaw, or to release the object, e.g., the jaw moving away from the opposite jaw.

For example, when the pulling element moves up 2725, the rotatable element can rotate, presenting a thicker portion of the spiral surface to the rollers, and thus can cause the jaw to move 2745 to the left, toward the other jaw for clamping on the object. When the pulling element moves down, for example, when the force holding the pulling element is released, the spring mechanism in the rotatable element can cause the rotatable element to rotate in an opposite direction. The thinner portion of the spiral surface can be facing the rollers, and thus can cause the jaw to move to the left, away from the other jaw for releasing the object.

The clamping device 2705 is shown without an object, and with the linkage mechanism between the pulling element and the jaw activated. The clamping device is lifted up 2725. The lifting action causes the jaw to move 2745 toward the opposite jaw. When the clamping device is positioned near an object for pick up, the closeness of the jaws can make it difficult to move the clamping device down to clamp on the object. Thus, an auto lock mechanism can be included to disable the linkage mechanism for empty clamping device for easy of picking objects.

The object can be disposed between the open jaws of the clamping device. The auto lock mechanism can re-enable the linkage mechanism. The clamping device can clamp on the object, and deliver the object to a desired location. Afterward, the pulling element of the clamping device can move further down so that the jaws can release the object. When the clamping device lifts up to move to other locations, the lifting up action can cause the jaws to clamp again on the object, which can present difficulty to move the clamping device and leaving the object at the destination. The auto lock mechanism can disable the linkage mechanism for empty clamping device with open jaws for easy of leaving objects at destinations.

In some embodiments, the present invention discloses clamping devices having an automatic trigger mechanism, such as an automatic locking mechanism to prevent the jaws from moving toward each other when the clamping device is lifted up. The locking mechanism can allow the jaws to remain open when desired, even during the lifting and moving of the clamping device. Normally, the clamping device is configured so that when one end of the clamping arm is pulled up, the jaws of the clamping device will clamp on the object. Thus when the empty clamping device is lifted up, the jaws are clamped together. This can be detrimental, since the clamped jaws will need to be open to accept the object. The locking mechanism can force the jaws open when there is no clamped object. Thus the empty clamping device with the open jaws can be lifted up and moved to the location of the object, at which the open jaws can accept the object. The mechanism is then released, and the jaws can be clamped together when lifted up to hold the object for moving.

The locking mechanism can be activated when the jaws are separated. For example, after bringing an object to a destination, a pulling element of the clamping device can be lowered while the clamping device is stationary, e.g., the pulling element moves down relative to the clamping device. The lowering of the pulling element can move the jaws opened, e.g., separating the jaws apart. Thus the locking mechanism can be activated when the jaws are separated at a predetermined distance, such as a maximum separation distance or a distance close to the maximum distance. For example, the jaws can be separated to a maximum distance to partially activate the locking mechanism. When the pulling element reverses direction, e.g., starts pulling up, the jaws can move closer together. The closing movement of the jaws can complete the locking mechanism, preventing the jaws from moving further toward each other, and essentially keeping the jaws opened at a distance less than the maximum distance.

The locking mechanism can be partially deactivated by lowering the pulling element relative to the clamping device. The lowering of the pulling element can separate the jaws a little. Then the pulling element can be pulled up, complete the deactivation process. The jaws can move toward each other, for clamping on the object.

In some embodiments, the auto lock mechanism can be partially activated by lowering the pulling element so that the jaws can pass a certain separation distance. The pulling element is lowered relative to other elements of the clamping device, thus in some embodiments, the clamping device is rested against something, such as on the object that the clamp device is carried and the object is placed on the ground. Thus, the auto lock mechanism can be partially activated by lowering a hoist coupled to the clamping device carrying the object so that the object contacts the ground. The hoist can then be further lowered so that the jaws can be separated passing a certain separation distance, for example, by moving a pulling element down relative to the rest of the clamping device.

The auto lock mechanism can then be completely activated by pulling up the pulling element, which can secure the jaws open, at the previously separation distance or at a separation distance smaller or slightly smaller than the previously separation distance, for example, due to the possibility that the jaws can move together a little after the pulling element is pulled up.

In some embodiments, the auto lock mechanism can be partially deactivated by lowering the pulling element. The pulling element can be previously not pullable up, due to the activation of the auto lock mechanism. Thus, the pulling element can partially be released from the activation of the auto lock mechanism by reversing the movement, e.g., by lowering the pulling element. The lowering of the pulling element can keep the jaws at the previous separation distance, or can enlarge the separation distance, such as increasing the separation distance by a small amount, for example, due to the possibility that the jaws can move away from each other a little after the pulling element is lowered.

The pulling element is lowered relative to other elements of the clamping device, thus in some embodiments, the clamping device is rested against something, such as on the object that the clamp device is ready to pick up and the object is placed on the ground. Thus, the auto lock mechanism can be partially deactivated by lowering a hoist coupled to the empty clamping device so that the clamping device contacts the object. The hoist can then be further lowered so that the pulling element can move down relative to the rest of the clamping device.

The auto lock mechanism can then be completely deactivated by pulling up the pulling element, which can allow the jaws to move toward each other.

The locking mechanism can secure the top arm portion, e.g., to prevent the top arm portion from moving up/down or sideways. For example, the top arm portion can be locked to the pivotal point between the top arm portion and the bottom arm portion, or to any element fixedly coupled to the pivotal point. The top arm portion can be locked to an intermediate pivot within the top arm portion.

In some embodiments, the locking mechanism, e.g., the mechanism that can lock the jaws into the open state until being released, can include a mechanism that couples a hoist portion of the clamping device, e.g., the portion of the clamping device that is coupled to a hoist for pulling the clamping device, with a fixed component such as the fixed jaws or a pivot bar connecting the pivot points of the scissor mechanisms. Thus, the mechanism can be configured so that if being locked, the hoist portion can move together with the pivot points, so that the scissor mechanisms cannot function. In this configuration, the hoist portion is then decoupled from the scissor mechanisms, and thus when lifted up, the jaws remain open. If the mechanism is released, the hoist portion can be separated from the pivot points, so that the scissor mechanisms can function, e.g., clamping on the object. In this configuration, the hoist portion is then coupled to the scissor mechanisms, and thus when lifted up, the jaws can clamp on the object.

The locking mechanism can be automatic, meaning the mechanism can be locked or engaged, e.g., locking the jaws to keep the jaws separated, or unlocked or disengaged, e.g., unlocking the jaws to allow the jaws to move toward each other. The automatic mechanism can be triggered or toggled (e.g., activated when being deactivated and deactivated when being activated) by moving a hoist coupled to the pulling element of the clamping device.

For example, the locking mechanism can be engaged, meaning the jaws can be widely separated and prevented from moving toward each other when an empty clamping device is lifted up. The clamping device can be lowered toward the object. After touching the object, the pulling element can further move down while the rest of the clamping device is stationary. The moving down of the pulling element can partially unlock the locking mechanism, meaning the jaws can move toward each other when the clamping device is lifted up. The locking mechanism can be fully unlocked when the clamping device is lifted up, which moves the jaws together to clamp on the object. The clamping device can move to a new location. The clamping device can lower the object. When the object reaches the ground, the pulling element can be lowered further, e.g., while the rest of the clamping device is stationary, to trigger or activate the locking mechanism to change the state of the locking mechanism. The locking mechanism then can be engaged, meaning the jaws can be widely separated and prevented from moving toward each other when the clamping device is lifted up. The clamping device can then move up to move another object. Since the locking mechanism is engaged, the clamping device can lift up without moving the jaws.

The locking mechanism can be a hand-free or operator-free mechanism, which can allow switching between a clamping action of the jaws for clamping the object and non-clamping action of the jaws for inserting the object. The hand-free mechanism can allow a single operator to operate the clamping device for lifting and moving the object. For example, the locking mechanism can be activated or released by a pushing action, for example, when the clamping device is lowered down or pulled up.

FIGS. 28A-28D illustrate configurations of clamping devices having a locking mechanism according to some embodiments. FIGS. 28A(a)-28A(b) shows a schematic for a clamping device 2800, including two jaws 2860 and 2830 for clamping on an object. A pulling element 2810 can be coupled with jaw 2830 through a linkage mechanism 2850. The linkage mechanism can be configured so that when the pulling element is moved, relative to the jaw, the jaw is moved in a different direction. For example, when the pulling element moves up 2820, the jaw can move 2840 toward the opposite jaw.

A locking mechanism 2880 or 2880* can be included to allow a toggling between enabling (FIG. 28A(a)) and disabling (FIG. 28A(b)) of the linkage mechanism between the pulling element and the jaw. For example, a locking mechanism 2880 can form a coupling between the pulling element 2810 and the clamp bar 2870 of the clamping device. When the locking mechanism is unlocked, as shown in FIG. 28A(a), the linkage mechanism is enable, meaning the pulling element can move up and down, which can move the jaw sideway through the linkage mechanism. When the locking mechanism is locked, as shown in FIG. 28A(b), the pulling element is fixedly coupled to the clamp bar. Thus the pulling element cannot move up and down relative to the rest of the clamping device. The linkage mechanism is then disable, since the pulling element cannot move, and thus cannot move the jaw sideway.

Alternatively, another locking mechanism 2880\* can form a coupling between the pulling element 2810 and a component of the linkage mechanism 2850, such as a rotatable element. When the locking mechanism is unlocked, as shown in FIG. 28A(a), the linkage mechanism is enable, meaning the pulling element can move up and down relative to the linkage mechanism, which can move the jaw sideway through the linkage mechanism. When the locking mechanism is locked, as shown in FIG. 28A(b), the pulling element is fixedly coupled to the linkage mechanism. Thus the pulling element cannot move up and down relative to the linkage mechanism, e.g., to the other components of the clamping device. The linkage mechanism is then disable, since the pulling element cannot move, and thus cannot move the jaw sideway.

Other configurations for the locking mechanism can be used, which can secure any two components between the pulling element, the jaw, and the linkage between the pulling element and the jaw. For example, a locking mechanism can be between the pulling element and the jaw, or between the jaw and a component of the linkage mechanism.

FIG. 28B shows a schematic of a locking mechanism 2855 toggling between a locked (or engaged) state 2855A and an unlocked (or disengaged) state 2855B.

The locking mechanism 2855 can include 2 portions 2856 and 2857, which can be secured together (in locked or engaged stated 2855A), or can be separatable from each other (in unlocked or disengaged state 2855B). The locking mechanism can be a toggle mechanism, which can change states using a same set of activation mechanism. For example, the activation mechanism for the toggling operation 2865 can include a set of up and down forces 2866 acting on one or both portions 2856 and 2857 of the locking mechanism.

The toggling operation can include a conversion of a vertical force to a rotational force, for example, through a slanting surface such as a helical surface. The vertical force can be accomplished by the clamping device moving up or down. The rotational force can be used to activate a rotational latch, which can be toggled between a latch position and an unlatch position.

FIGS. 28C(a)-(c) show a process for automatically activating the locking mechanism. A locking mechanism is configured to couple a pulling element 2910 and a clamp bar 2870. The locking mechanism can include a lock receptacle 2881 which is coupled to the pulling element. The locking mechanism can include a lock housing 2882 which is coupled to the clamp bar. The lock housing can include a lock element 2883, such as a pin or a hook, which can retract or extend out of the lock housing for engaging with the lock receptacle.

In FIG. 28C(a), the locking mechanism is in an unlocked status 2880A, with lock element 2883 retracted into the lock housing 2882. The lock receptacle and the lock housing are separated, so the pulling element can move relative to the clamp bar.

In FIG. 28C(b), the pulling element moves toward the clamp bar. The movement is relative, meaning the two components move toward each other, such as one component moving and the other component stationary, or both components moving. The lock receptacle can contact the lock housing. The lock element can be coupled to the lock receptacle.

In FIG. 28C(c), the pulling element relatively moves away from the clamp bar. The lock element can still be coupled to the lock receptacle, and also to the lock housing. The lock mechanism is activated, e.g., the locking mechanism is in a locked status 2880B, securing the pulling element with the clamp bar. The pulling element thus will move as a unit with the clamp bar, e.g., with the clamping device. The linkage mechanism is now disable, meaning the pulling element cannot influence the movements of the jaw.

In FIG. 28D(a), the locking mechanism is in a locked status 2880B, with lock element 2883 extended and hooked into the lock housing 2882. The lock receptacle and the lock housing are coupled together, so the pulling element cannot move relative to the clamp bar.

In FIG. 28D(b), the pulling element relatively moves toward the clamp bar. The lock receptacle can contact the lock housing. The lock element can be move further into the lock housing.

In FIG. 28D(c), the pulling element relatively moves away from the clamp bar. The lock element can move further into the lock housing, and releasing the coupling with the lock receptacle. The lock mechanism is deactivated, e.g., the locking mechanism is in an unlocked status 2880A, separating the pulling element with the clamp bar. The pulling element thus can move relative to the clamp bar, e.g., to the clamping device. The linkage mechanism is now enable, meaning the pulling element can influence the movements of the jaw.

Figure 29A:
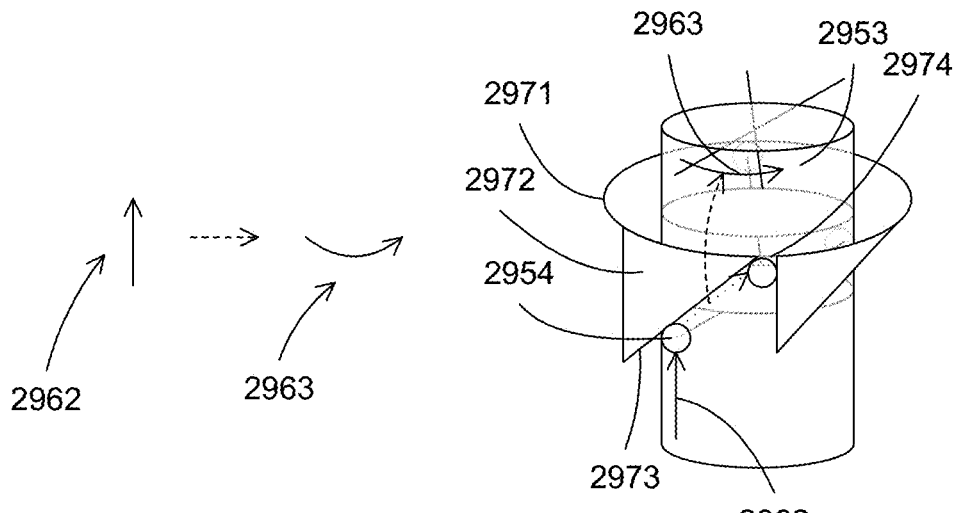
FIGS. 29A-29C illustrate a configuration of the locking mechanism according to some embodiments.
Figure 29B:
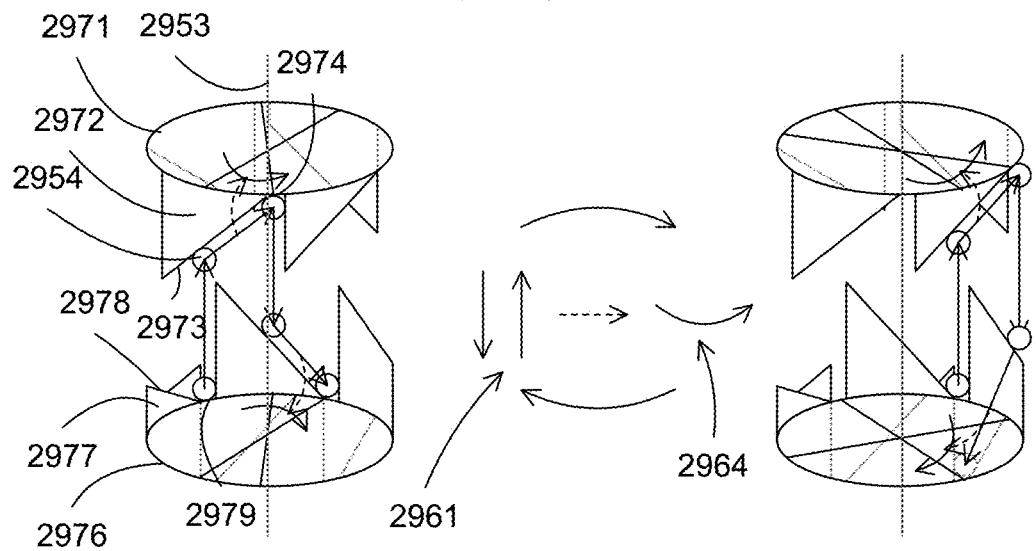
Figure 29C:
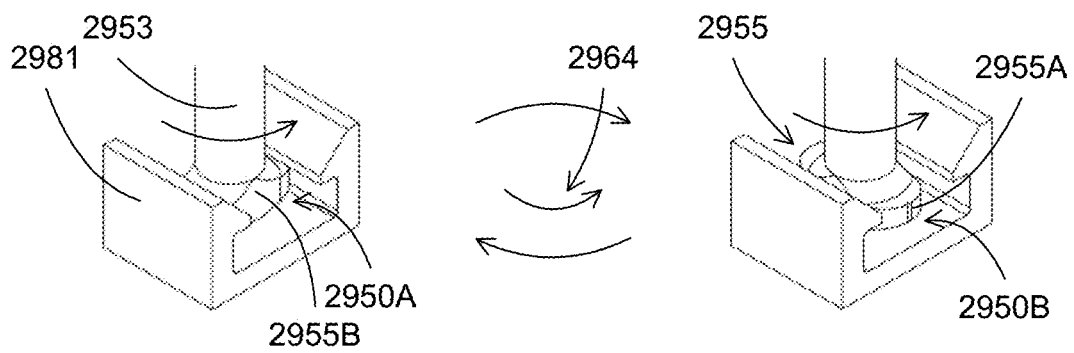

FIGS. 29A-29C illustrate a configuration of the locking mechanism according to some embodiments. FIG. 29A shows a schematic of a force conversion, using a slanting surface, such as a portion of a helical surface. The slanting surface can convert a vertical force to a force parallel to the surface of the slanting surface. Further, by using a helical surface, the parallel force can be a tangential force, e.g., a rotational force around the axis of the helix. Thus, by using a curve slanting surface, such as a helical surface, a vertical force 2962 can be converted to a rotational force 2963 around the axis of the helix.

An annular element 2971 can have multiple teeth 2972 arranging around the annular element 2971. Each tooth can have a curve slanting surface 2973, such as a portion of a helical surface. Each tooth can have a valley point 2974, e.g., the connection between an end of the tooth slanting surface and the beginning of a rise of a next tooth.

A rod 2953 can be disposed within the annular element 2971. A pin 2954 can be coupled to the rod 2953, such as protruding from a surface of the rod. The pin can penetrate the rod at a center of the rod, thus can be protruded from both sides of the rod. The rod thus can be constrained to move in the vertical direction, e.g., along the axis of the rod, subjected to the constraint of the pin. For example, the pin can contact the slanting surface, and thus prevent the rod from continuing moving in a straight vertical direction. The rod can also rotate in the annular element, subjected to the constraint of the pin. For example, the pin can contact the valley point, and thus prevent the rod from continuing rotating.

Thus, under a vertical force 2962, the rod can move in a vertical direction, until the pin 2954 contacts the slanting surface 2973. The pin then moves along the slanting surface to stop at the valley point 2974. The moving of the pin 2954 along the slanting surface 2973 can rotate 2963 the rod 2953. The angle of rotation is from the location of the vertical force to the valley point.

FIG. 29B shows a first portion, such as portion 2951, of a locking mechanism 2950. The first portion can function to convert vertical forces 2961, such as forces caused by the clamping device lifted up and moved down during the picking and releasing of objects, to a rotational force 2964.

The first portion can include two annular elements 2971 and 2976 arranged concentrically. Each annular element can have a number of teeth arranged around the circumference of the annular element. The teeth can be arranged in a cyclic fashion, for example, there can be 4 teeth in one annular element. Each tooth can have a curve slanting surface moving along a circumference of the annular element, such as a portion of a helical surface. Each tooth can have a valley point at an end of the tooth, e.g., at the end of the curve slanting surface. Each tooth can have a sharp rise, for example, from the valley point of an adjacent tooth.

For example, the annular element 2971 can have multiple teeth, such as 4 teeth 2972, arranged cyclically around a circumference of the annular element 2971. Each tooth 2972 can have a curve slanting surface 2973, which ends at a valley point 2974. At the valley point 2974, an adjacent tooth can be positioned, having a sharp rise, and followed by a new slanting surface.

Similarly, the annular element 2976 can have multiple teeth, such as 4 teeth 2977, arranged cyclically around a circumference of the annular element 2976. Each tooth 2977 can have a curve slanting surface 2978, which ends at a valley point 2979. At the valley point 2979, an adjacent tooth can be positioned, having a sharp rise, and followed by a new slanting surface.

A rod 2953 can be disposed in the annular elements 2971 and 2976. The rod outer circumference can be about the same as the inner circumference of the annular elements, so that the rod can fit snuggly within the annular elements. Thus the rod can move along the axis of the rod (which is the same as the axis of the annular elements), as well as can rotate around the rod axis.

A pin 2954 can pass through a center of the rod, perpendicular to the rod axis. The pin can be protruded from the rod outer circumference. The pin can be positioned as to be between the annular elements. The pin can constrain the rod movements within the annular elements. For example, the rod can move vertically, but within the confinement of the two annular elements, e.g., the rod can move relative to the annular elements, but the rod cannot be separated from the annular elements, e.g., the rod cannot be removed from the annular elements. The rod can also rotate, but within the confinement of the teeth, e.g., the rod can rotate, and when the pin hits a tooth, the rod can move vertically to avoid the tooth, before continuing rotating.

The annular elements can be arranged so that a combination of a set of vertical movements or forces, e.g., an up movement followed by a down movement or a down movement followed by an up movement, can rotate the rod to toggle the locking mechanism between a locked state and an unlocked state. The annular elements can be fixedly positioned with respect to each other, e.g., the two annular elements can move as a unit.

For example, the annular elements can be arranged so that the teeth on the annular elements are facing each other, e.g., the teeth on one annular element face the teeth on another annular element. Further, the teeth are arranged in opposite directions, for example, the slanting surfaces of the teeth in one annular element form an angle different from zero angle (e.g., not parallel) with the slanting surfaces of the teeth in another annular element. The angle can be between 70 and 110 degrees, or between 75 and 105 degrees, or between 80 and 100 degrees, or between 85 and 95 degrees. In addition, the valley points of the teeth in one annular element are configured to face the slanting surfaces of the teeth in the opposite annular element.

In operation, the rod can move up, relative to the annular elements. For example, the annular elements can be fixedly coupled to a component of the clamping device. The component can move down while the rod is stationary. The pin 2954, originally positioned at a valley point 2979 of a tooth 2977 of the bottom annular element 2976, can move up to contact the slanting surface 2973 of a tooth 2972 of the top annular element 2971. Further vertical movement of the rod can make the pin moving along the slanting surface 2973, and resting at the valley point 2974. The movement of the pin along the slanting surface can rotate the rod, for example, at an angle corresponded to the traveled distance of the pin along the slanting surface.

The rod can then move down, relative to the annular elements. For example, the component in which the annular elements is fixedly coupled to, can move up while the rod is stationary. The pin 2954, originally positioned at a valley point 2974 of a tooth 2972 of the top annular element 2971, can move up down contact the slanting surface of a tooth of the bottom annular element. Further vertical movement of the rod can make the pin moving along the slanting surface, and resting at the valley point. The movement of the pin along the slanting surface can rotate the rod, for example, at an angle corresponded to the traveled distance of the pin along the slanting surface.

A combination of the rod moving up and then down can rotate the rod an angle corresponded to the movement of the pin from one valley point to an adjacent valley point, for example, of the bottom annular element. Thus, if there are 4 teeth at an annular element, the spacing of two valley points can correspond to an angle of 90 degrees, e.g., the rod rotates a 90 degree angle when the rod moves up and down, e.g., the clamping device component in which the annular elements is fixedly coupled to, moves down and up.

Further movements of the rod (or the component of the clamping device) can rotate the rod another 90 degrees, e.g., vertical movements 2961 of the rod or the clamping device component can be converted to a rotational movement 2964 of the rod.

FIG. 29C shows a second portion, such as portion 2952, of a locking mechanism 2950. The second portion can function to convert a rotation, e.g., the rotation of a rod disposed within two annular elements having teeth with curve slanting surfaces, to a toggling mechanism between a locked state and an unlocked state.

The second portion 2952 can include a receptacle 2981, which is configured to be securable to the rotatable rod 2953. For example, at the end, or near the end, of the rod 2953, there can be an asymmetric hook 2955, including an elongated portion 2955A and a shortened portion 2955B, such as an oval or a rectangular shape. The receptacle 2981 can have a parallel hook feature that is configured to hook or secure on the elongated portion of the rod 2953.

Thus, when the rod rotates, the rod can be locked with the receptacle, e.g., in a locked state between the rod and the receptacle, or the rod can be separable from the receptacle, e.g., in an unlocked state between the rod and the receptacle. The locking and unlocking states can be toggled by continuing rotating the rod. For example, the rod can be positioned so that the elongated portion engaged 2950A with the parallel hook feature of the receptacle, locking the rod 2953 with the receptacle 2981. In the locked state, the rod can move a small distance relative to the receptacle, but the rod cannot be separated or removed from the receptacle.

When the rod rotates 90 degrees, the elongated portion is now parallel with the parallel hook feature of the receptacle, and the shortened portion does not engage with the receptacle. This releases the rod from the receptacle, forming the unlocked state in which the rod can be separated or removed from the receptacle. Rotating the rod 90 degrees again, in either rotation direction, can re-engage the locking mechanism by mating the elongated portion with the parallel hook feature of the receptacle. Thus the locked and unlocked states can be toggled by rotating the rod, such as rotating 90 degrees.

A locking mechanism including the annular elements having cyclic teeth configuration, the rod having the asymmetric hook, and the receptacle having parallel hook feature can be toggled between locked and unlocked states, through set of up and down movements.

Figure 30A:
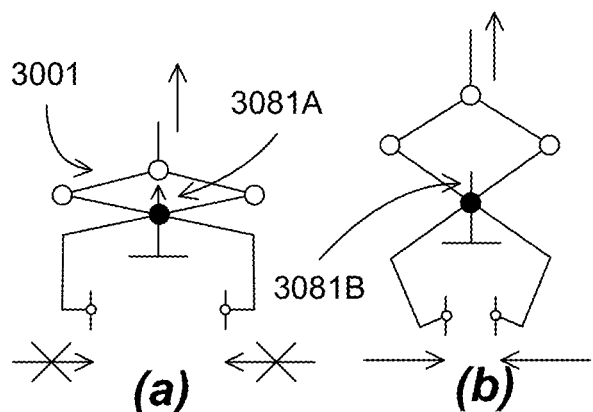
FIGS. 30A-30E illustrate configurations for clamping devices according to some embodiments.

FIGS. 30A-30E illustrate configurations for clamping devices according to some embodiments. In FIGS. 30A(a) and 30A(b), a clamping device 3001 can have a scissor mechanism as the linkage mechanism. A locking mechanism can be included, linking a pulling element to a pivotal point of the scissor mechanism. In FIG. 30A(a), when the locking mechanism is engaged 3081A, e.g., locking the pulling element to the pivotal point, the jaws can be fixed at a open configuration, which can allow the clamping device to move for approaching and placing an object between the opening of the jaw. In FIG. 30A(b), when the locking mechanism is disengaged 3081B, e.g., unlocking the pulling element from the pivotal point, the jaws can move toward each other when the pulling element is pulled up, which can allow the clamping device to clamp on an object for moving to a destination.

Figure 30B:
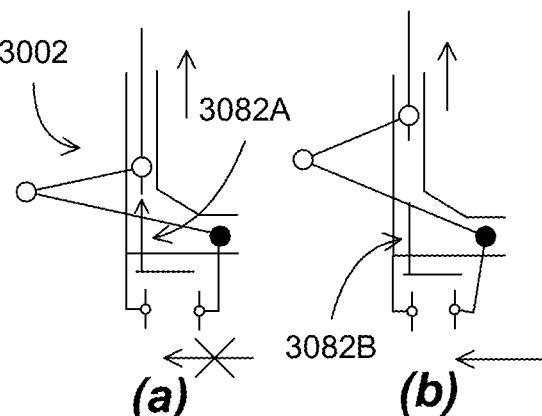

In FIGS. 30B(a) and 30B(b), a clamping device 3002 can have a half scissor mechanism as the linkage mechanism. A locking mechanism can be included, linking a pulling element to a clamp bar of the clamping device. In FIG. 30B(a), when the locking mechanism is engaged 3082A, e.g., locking the pulling element to the clamp bar, the jaws can be fixed at a open configuration, which can allow the clamping device to move for approaching and placing an object between the opening of the jaw. In FIG. 30B(b), when the locking mechanism is disengaged 3082B, e.g., unlocking the pulling element from the clamp bar, the jaws can move toward each other when the pulling element is pulled up, which can allow the clamping device to clamp on an object for moving to a destination.

Figure 30C:
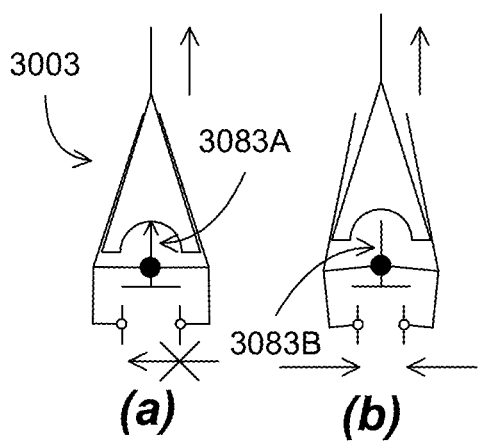

In FIGS. 30C(a) and 30C(b), a clamping device 3003 can have a slanting interface mechanism as the linkage mechanism. A locking mechanism can be included, linking a pulling element to a pivotal point of the scissor mechanism. In FIG. 30C(a), when the locking mechanism is engaged 3083A, e.g., locking the pulling element to the pivotal point, the jaws can be fixed at a open configuration, which can allow the clamping device to move for approaching and placing an object between the opening of the jaw. In FIG. 30C(b), when the locking mechanism is disengaged 3083B, e.g., unlocking the pulling element from the pivotal point, the jaws can move toward each other when the pulling element is pulled up, which can allow the clamping device to clamp on an object for moving to a destination.

Figure 30D:
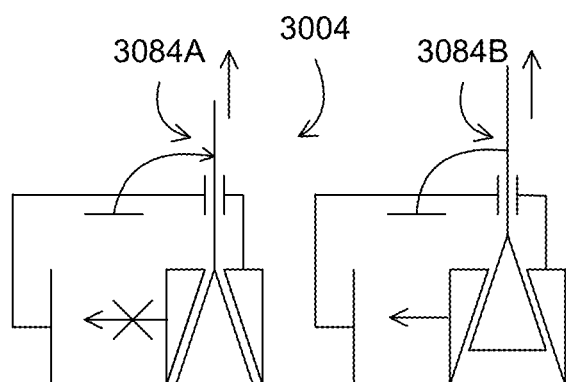

In FIGS. 30D(a) and 30D(b), a clamping device 3005 can have a slanting interface mechanism as the linkage mechanism. A locking mechanism can be included, linking a pulling element to a clamp bar of the clamping device. In FIG. 30D(a), when the locking mechanism is engaged 3085A, e.g., locking the pulling element to the clamp bar, the jaws can be fixed at a open configuration, which can allow the clamping device to move for approaching and placing an object between the opening of the jaw. In FIG. 30D(b), when the locking mechanism is disengaged 3085B, e.g., unlocking the pulling element from the clamp bar, the jaws can move toward each other when the pulling element is pulled up, which can allow the clamping device to clamp on an object for moving to a destination.

Figure 30E:
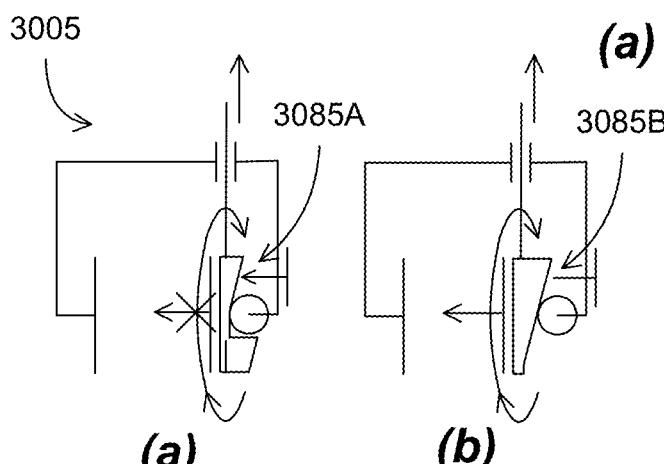

In FIGS. 30E(a) and 30E(b), a clamping device 3006 can have a spiral slanting interface mechanism as the linkage mechanism. A locking mechanism can be included, linking a rotatable element to a jaw support of the clamping device. In FIG. 30E(a), when the locking mechanism is engaged 3086A, e.g., locking the rotatable element to the jaw support, the jaws can be fixed at a open configuration, which can allow the clamping device to move for approaching and placing an object between the opening of the jaw. In FIG. 30E(b), when the locking mechanism is disengaged 3086B, e.g., unlocking the rotatable element from the jaw support, the jaws can move toward each other when the pulling element is pulled up, which can allow the clamping device to clamp on an object for moving to a destination.

In some embodiments, a locking mechanism can include at least a slanting interface, e.g., a coupling between a planar or curved slanting surface with another slanting surface or with a roller for reducing friction. A slanting interface can change a direction of a force, for example, can move sideway a component having the slanting surface by using a straight force. The sideway movement can be used for extending or retracting the component, or can be used for rotating the component.

The locking mechanism can have a cylindrical shape, with curved slanting surfaces, such as portions of a spiral surface. The pressing (and releasing) force can be converted to a rotational action, together with optional extension or retraction. For example, with the recesses configuration, the mover can rotate and retract. The cylindrical shape can avoid the sideward shifting of the locking mechanism, since the mover and the pin coupled to the mover can rotate around a fixed rotational axis.

In some embodiments, the slanting interfaces can be configured to provide a locking mechanism with rotational movements of a locking element, such as the pin coupled to the mover, without the linear movements such as the extension of retraction of the locking element.

In some embodiments, the slanting interfaces can include a slanting surface, such as a planar slanting surface or a spiral slanting surface, mating with a cylindrical element, such as solid rod or a rotatable rod, e.g., a roller. The interface between a slanting surface and a cylindrical element can reduce friction, e.g., the cylindrical can run easier on the slanting surface than a slanting surface runs on the slanting surface, due to the minimum contact area.

In some embodiments, the present invention discloses an automatic locking assembly having an automatic locking mechanism that can be incorporated in a clamping device. The automatic locking assembly can use up and down movements of the clamping device to toggle a lock, e.g., switching between locked and unlocked states, of two movable components of the clamping device. In the locked state, the two movable components of the clamping device are coupled together, e.g., not removable or separatable from each other, thus keeping the jaws in a stationary configuration when the clamping device moves. In the unlocked state, the two movable components of the clamping device are separable, e.g., one component can move relative to the other component, thus imposing a force on the jaws for clamping on an object when the clamping device is lifted up.

In some embodiments, the automatic locking assembly can include a slanting surface, such as a curve slanting surface or a helical slanting surface, mating with a cylindrical element, such as a rotatable pin, e.g., a roller. The slanting surface can change a force direction, such as changing an up/down movement to a rotational movement. The interface between a slanting surface and a cylindrical element can reduce friction, e.g., the cylindrical can run easier on the slanting surface than a flat surface runs on the slanting surface, due to the minimum contact area.

Further, a bearing can be incorporated, to further reduce friction between the cylindrical element and the slanting surface.

The automatic locking assembly can be coupled to a clamping device for automatic disabling or enabling a linkage mechanism of the clamping device. The linkage mechanism is configured to transfer a pulling force on the clamping device to a clamping force from the jaws of the clamping device. The linkage mechanism can include linkage arms, joints and/or elements connecting together, and movable with respect to the body of the clamping device.

In some embodiments, the automatic locking assembly can include two lockable elements that can be secured together, e.g., locked together, and can be removed from each other, e.g., separated from each other. The two lockable elements can include a hook and an eye, in which the hook can be coupled to the eye for securing the hook with the eye. The two lockable elements can include a rod and a receptacle, in which the rod can enter the receptacle to prevent the rod or the receptacle from moving sideway. The two lockable elements can include a rod having a hookable element such as an elongated end and a parallel hook receptacle, e.g., two hooks running parallel to each other. The hookable element can be inserted into the parallel hook receptacle, such as the elongated end positioned parallel to the parallel hook receptacle. In this configuration, the hookable element can enter and leave the receptacle, e.g., the two lockable elements are free to move relative to each other.

After the hookable element is inserted into the parallel hook receptacle, the hookable element can be rotated so that the elongated end can position perpendicular to the parallel hook receptacle. In this configuration, the hookable element is secured with the receptacle, since the hook ends of the parallel hook of the receptacle can prevent the elongated end from leaving the receptacle.

In some embodiments, the automatic locking assembly can include two slanting surfaces together with one or more curve shape elements for interacting with the slanting surfaces. The curve shape elements can include a curved surface such as a cylindrical or elliptical rod, or a partial cylindrical or elliptical rod. The curved surface can reduce friction with the slanting surfaces, for example, due to reduced surface contact area. The curve shape element can include a roller such as a ball bearing or a rod bearing. The roller can further reduce friction with the slanting surface, for example, due to the rollable action of the roller.

The slanting surfaces can change a direction of a movement of the curve shape element, such as rotating the curve shape element when the curve shape element moves toward and interacting with the slanting surfaces. The rotation of the curve shape element can coupled to a lockable configuration of the automatic locking assembly, such as the rotation of a rod having an elongated end in a parallel hook receptacle.

The automatic locking assembly can be configured so that two slanting surfaces can face each other, and also face the curve shape element, such as protruded pins from a rod. The first slanting surface can be configured to accept the protruded pins in a first moving direction of the pins, and then move the protruded pins along the slanting surface. The slanting surface can be a curve slanting surface, such as a helical surface. The movements of the protruded pins along the slanting surface can rotate the rod, e.g., when the pins run along the helical surface.

The second slanting surface can be configured to accept the protruded pins, e.g., the same protruded pins or new additional protruded pins from the rod. The second slanting surface can move the protruded pins along the slanting surface, for example, a helical surface, such as rotating the rod by the protruded pins running along the helical surface.

FIGS. 31A-31D illustrate a schematic configuration for a locking mechanism or assembly according to some embodiments. The locking mechanism can employ a slanting interface for repeatedly rotating a rod through a repeatedly set of vertical forces. If the rod has a rotational symmetry, e.g., the rod geometry remains the same after rotating a certain angle, a set of vertical forces on the rod can rotate the rod half the rotational symmetry angle. Two successive sets of vertical forces will return the rod to its original configuration, e.g., rotating the rod the rotational symmetry angle.

In some embodiments, the locking mechanism can include two lockable elements, such as a rod with a hook end, e.g., a hookable element at or near an end of the rod, and a hook receptacle, e.g., a receptacle having a hookable feature that can be mated to the hookable element of the rod. Depending on the orientation of the hook end, the rod can be secured in the hook receptacle to move as a same unit with the receptacle, or the rod can move independent of the receptacle, e.g., the rod can be separated or removed from the receptacle, and thus operating as two separate units.

For example, the hookable element can have an elongated shape, such as a rectangle or an ellipse. The rod thus can have a perpendicular elongated end, for example, the rod with the hookable element can look line a hammer. The perpendicular elongated end can have the shape of a head of a square sledge hammer, coupled to a rod as a handle of the hammer. The longer side of the elongated shape can be secured to a hookable feature of the hook receptacle, while the shorter end can be released or movable from the hook receptacle. A rotation of the rod can toggle between the secured state, e.g., the longer side hooked to the hook receptacle, and the loose state, e.g., the shorter side faced the hookable feature of the hook receptacle.

FIG. 31A shows a schematic detail of a first portion 3151 of a locking assembly using slanting interfaces. The locking assembly can include two portions 3151 and 3152, forming two lockable elements. A first portion, or the first lockable element can include a slanting surface interacting element 3153, such as a rod, together with slanting surface elements 3171 and 3176, each having at least a slanting surface, such as two annular elements having cyclic teeth. A second portion, or a second lockable element can include a hook receptacle 3181, which can include a hookable feature 3181A, such as parallel hook ends (shown in FIG. 31C).

The first portion, or the first lockable element of a locking assembly can include a slanting surface interacting element, such as a rod 3153. One end of the rod can include a hook end or a hookable element 3155, which can include a perpendicular elongated portion having a longer side 3155A and a shorter side 3155B. The longer side can be latched in the hook receptacle, with the longer side mated with the hook ends 3181A of the hook receptacle 3181. When the longer side 3155A of the rod end 3155 is mated with the hooks 3181A of the hook receptacle 3181, the hook receptacle 3181 can be hooked to the rod and cannot be released from the rod, e.g., the locking mechanism is enable.

The shorter side can allow the rod to be free to move in out of the hook receptacle. The longer side 3155A can be parallel with the parallel hook ends 3181A, and the shorter side 3155B can be clear from the parallel hook ends. Thus the rod 3153 can be separated or removed from the hook receptacle 3181, since the separation between the parallel hook ends 3181A is bigger than the shorter side 3155B of the rod 3153.

By rotating the rod, such as a 90 degree angle for this elongated hook element 3155, the status of the lock can be toggle between locked and unlocked, e.g., the rod is hooked to the hook receptacle, and the rod is free to move in and out of the hook receptacle. When the shorter side of the rod 3153 is clear of the parallel hook ends of the hook receptacle, the hooks do not capture the rod, and thus the rod 3153 and the hook receptacle 3181 can be separated, e.g., the locking mechanism is disable.

The rod 3153 can include a protruded element 3154, such as a pin, which can be a pin passing through the rod and protruded from both sides of the rod, together with optional ball bearings or rollers coupling to the ends of the pin or to the portion of the pin in the rod. The optional bearings can allow the pin to rotate easily with respect to the rod. The protruded pin can include cylindrical pins, rollers, elliptical pins, or any shape protrusions that can slide along the slanting surfaces of the first and second annular elements. Multiple pins can also be used. The protruded element can interface with the slanting surfaces of the elements 3171 and 3176 having slanting surfaces.

The elements 3171 and 3176 having slanting surfaces can include ring-like elements, such as annular elements, which can have slanting surfaces in the form of helical or spiral surfaces. The annular elements can have a hollow cylindrical shape, such as a ring or a hollow cylinder, with an axis of rotation 3151A. For example, the annular elements can have cyclic teeth, e.g., teeth configured around the circumference of the annular elements. The number of teeth can be dividable by 2 or by 4, such as 4 teeth or 8 teeth. The teeth can have helical surfaces rising from a base of the annular elements, followed by abrupt surfaces going back down to the base, after reaching peaks of the teeth. The other end of the helical surfaces can reach valley points, before followed by the abrupt surfaces of the adjacent teeth.

Annular element 3171 can have multiple teeth 3172, such as 4 teeth arranged cyclically around a circumference of the base of the annular element 3171. Each tooth can have a helical surface 3173. At the end of the helical surface 3173 near the base, there can be a valley point 3174, which can be followed by an adjacent tooth, e.g., an abrupt surface of the adjacent tooth.

Similarly, annular element 3176 can have 4 teeth 3177, arranged cyclically around a circumference of the base of the annular element 3176. Each tooth can have a helical surface 3178. At the end of the helical surface 3178 near the base, there can be a valley point 3179, which can be followed by an adjacent tooth, e.g., an abrupt surface of the adjacent tooth.

The two annular elements can be concentric around an axis of rotation 3151A, with the helical surfaces 3173 and 3178 facing each other. Further, the teeth of the annular elements can be configured so that peaks of the teeth of one annular element face helical surfaces of another annular element, and valley points of one annular element face helical surfaces of another annular element.

The rod 3153 can be disposed in the annular elements, such as the axis of the rod coincides with the axes of the annular elements. The rod can be constrained inside the annular elements, e.g., the rod can move along the axis, and can rotate around the axis, without the protruded element.

With the protruded element such as the pin 3154, the rod 3153 is further constrained. For example, the pin can be inserted after the rod has been placed in the annular element, so that the pin is disposed between the two annular elements. Thus the pin can prevent the rod from being removed or separated from the annular elements.

The pin can further limit the movements of the rod, beside the constraint of limited movements along the axis, due to the teeth of the annular elements preventing the pin from going pass the teeth. The rod can have limited rotational movements, constrained by the abrupt surfaces or the helical surfaces of the teeth. The rod can rotate a complete cycle, but only accompanied by axis movements, e.g., when the rotational movement is blocked by the teeth, the rod can move along the axis so that the pin is clear of the teeth before resuming the rotational movement.

The helical surfaces of the first and second annular elements can be facing each other, and can be configured to provide a torque to rotate the rod through the protruded pin. For example, the rod can be pushed into the first annular element, with the protruded pin then contacting the helical surfaces of the first annular element. Due to the helical surfaces, the protruded pin can slide or roll on the helical surfaces, effectively rotating the rod an angle corresponded to the amount of the protruded pin sliding or rolling on the helical surfaces, from the point of contact to the point of rest at the bottom of the helical surfaces.

The rod can be retracted, e.g., a force can be applied for pulling on the rod. The protruded pin then can be configured to contact the helical surfaces of the second annular element. Due to the helical surfaces, the protruded pin can slide or roll on the helical surfaces, effectively rotating the rod another angle corresponded to the amount of the protruded pin sliding or rolling on the helical surfaces, from the point of contact to the point of rest at the bottom of the helical surfaces. Thus, by pushing and pulling, the rod can rotate an angle, such as a 90 degrees angle.

For example, the pin 3154 can be facing the helical surfaces 3173 and 3178, e.g., sandwiching between the helical surface 3173 of the first annular element 3171 and the helical surface 3178 of the second annular element 3176.

The rod can be pushed, so that the pin 3154 contacts the helical surface 3173 of the first annular element 3171. The pin can then run along the helical surface 3173 to the valley point 3174. The movement of the pin 3154 can cause the rod 3153 to rotate an angle corresponded to the length of the movement, e.g., the distance that the pin travels on the helical surface 3173.

The rod can be pulled, so that the pin 3154 contacts the helical surface 3178 of the second annular element 3176. The pin can run along the helical surface 3178 to the valley point 3179 of the second annular element 3176. The movement of the pin 3154 can cause the rod 3153 to rotate an angle corresponded to the length of the movement, e.g., the distance that the pin travels on the helical surface 3178.

FIG. 31B shows a schematic construction of a first portion 3151 of a locking assembly. The first portion, or the first lockable element can include a first annular element 3171 and a second annular element 3176. The annular elements 3171 and 3176 can be placed inside a sleeve 3185.

The first portion can include a rod 3153. One end of the rod can include a hook end or a hookable element 3155, which can include a perpendicular elongated portion having a longer side and a shorter side. A pin 3154 can be inserted into the rod, such as after the rod has been placed inside at least the second annular element 3176. Since the second annular element 3176 is constrained by the pin 3154 and the hook end 3155, the second annular element and the rod are coupled together, e.g., cannot be removed from each other.

The pin can be at any configuration with the regard to the hook end. As shown, the pin is parallel to the hook end. As such, the pin is configured so that when the pin is rested at the valley point of the second annular element 3176, the hook end is either parallel (unlocked state) or perpendicular (locked state) to the parallel hook ends of the hook receptacle.

FIG. 31C shows an assembled first portion 3151 of the locking assembly partially locked with a second portion 3152 of the locking assembly. The annular elements 3171 and 3176 are assembled inside a sleeve 3185. A rod 3153 can be assembled inside the first and second annular elements, with a pin 3154 between the annular elements. As such, the pin is configured so that when the pin is rested at the valley point of the first annular element 3171, the hook end is partially locked to the parallel hook ends of the hook receptacle, e.g., forming a 45 degrees. That way, when the rod is further rotated another 45 degrees, the pin is to be rested at the valley point of the second annular element 3176, the hook end is either parallel (unlocked state) or perpendicular (locked state) to the parallel hook ends of the hook receptacle.

FIG. 31D shows a cross section AA' of an assembled first portion 3151 of the locking assembly partially locked with a second portion 3152 of the locking assembly. The cross section is through the pin 3154.

FIGS. 32A-32L illustrate a toggle process from an unlocked state to a locked state according to some embodiments. A locking assembly can include a first portion that can be lockable to a second portion. In an unlocked state of the first to the second portion, the first portion can be removed or separated from the second portion. In a locked state of the first to the second portion, the first portion is coupled to the second portion, so that the first and second portions move together as a unit, e.g., the first portion cannot be removed or separated from the second portion. The first portion can move a short distance relative to the second portion, such as movements due to the fabrication or design tolerance, or due to the tolerance of the lockability of the two portions.

The first portion can be coupled, such as fixedly coupled, to a first movable component of a clamping device. The second portion can be coupled, such as fixedly coupled, to a second movable component of a clamping device.

The first portion can include two annular elements together with a rod disposed in the annular elements. The rod can have a protruded pin (or more than one protruded pin) placed between the two annular elements. The rod can have a hook end, which can be a hookable element at or near an end of the rod. The rod can move a short distance, e.g., constrained by the movements of the pin, which is blocked by the first and second annular elements.

The second portion can include a hook receptacle, which can include a parallel hookable feature, which can be mated with the hook end of the rod.

Using a set of vertical movements, the locking assembly can change states, between the locked and the unlocked state. And using the same set of vertical movements again can change the state again. Thus, the set of vertical movements can toggle the states of the locking assembly. The set of vertical movements can include a downward movement followed by an upward movement of the first portion with respect to the second portion.

The locking assembly can be in an unlocked state, in which the first portion is separated from the second portion. In the unlocked state, the clamping device is working to clamp on an object. The first movable component can move down relative to the second component. The downward movement of the first moveable component can partially accomplish the toggling of the unlocked state to the locked state.

In FIG. 32A, the first portion 3251 can be brought toward the second portion 3252. For example, a hoist can bring the clamping device clamping on the object to a destination. The hoist can be lowered to place the object on the ground. The hoist can further be lowered after the object touches the ground. The first movable component of the clamping device can move toward the second movable component, bringing the first portion of the locking assembly toward the second portion of the locking assembly.

The first portion can be disposed so that the axis of the annular elements and of the rod 3253 is perpendicular with the ground, e.g., parallel to the gravitational force. Thus gravitational force can pull the rod 3253 downward, so that the pin 3254 can move along a helical surface to rest at a valley point of the bottom annular element 3276. The pin location can be configured so that when the pin rests at a valley point of the bottom annular element 3276.

In FIG. 32B, the first portion 3251 can be further lowered toward the second portion 3252. For example, the hoist can further lower the first movable component toward the second movable component of the clamping device, until the rod 3253 is in contact with the hook receptacle 3281. After the rod contacts the hook receptacle, further lowering of the first movable component (or the lowering of the first portion 3251 or the lowering of the two annular elements) can move the two annular elements down on the pin, or the pin moves 3254A relatively up with respect to the annular elements.

In FIG. 32C, the first portion 3251 can be further lowered toward the second portion 3252. The annular elements can move down until the pin 3254 completely moved 3254A to contact with the helical surface of the top annular element 3271.

In FIG. 32D, the first portion 3251 can be further lowered toward the second portion 3252. The annular elements can move down, forcing the pin to move 3254B along the helical surface of the top annular element. The movement 3254B of the pin can rotate 3256A the rod.

In FIG. 32E, the first portion 3251 can be further lowered toward the second portion 3252. The annular elements can move down until the pin completely moved 3254B along the helical surface of the top annular element, and the rod completes its rotational movement.

The rotational amount of the rod can correspond to the angular distance of the helical surface traveled in the top annular element. For example, the pin can contact a middle portion of the helical surface, and then travel to the valley point, which can correspond to about 45 degrees. Thus the rod can rotate about 45 degrees.

In FIG. 32F, the first portion 3251 completes its movement toward the second portion 3252, e.g., the two portions cannot move toward each other anymore. The pin is rested at the valley point 3274 of the top annular element 3271. The rod 3253 rotates about 45 degrees, and partially hooked with the hook receptacle 3281.

Thus the movement of the first moveable component toward to the second movable component has partially accomplished the toggling of the unlocked state to the locked state.

The first movable component can then move up relative to the second component. The upward movement of the first moveable component can complete the toggling of the unlocked state to the locked state.

In FIG. 32G, the first portion 3251 can start move up from the second portion 3252. For example, the hoist can lift the first movable component upward, which can move away from the second movable component of the clamping device. The upward movement of the annular elements can move 3254C the pin away from the top annular element.

In FIG. 32H, the first portion 3251 can be further moved up from the second portion 3252. The annular elements can move up until the pin 3254 completes its move 3254C to contact with the helical surface of the bottom annular element 3276.

In FIG. 32I, the first portion 3251 can be further moved up from the second portion 3252. The annular elements can move up, lifting the rod to move 3256B (since the pin is in contact with the bottom annular element) until the hookable element of the rod is in contact with the hookable feature of the hook receptacle. This distance can be small, e.g., order of mm, such as 1 mm, 2 mm, 3 mm, 31 mm, or less than 10 mm.

In FIG. 32J, the first portion 3251 can be further moved up from the second portion 3252. The annular elements can move up until the pin starts to move 3254D along the helical surface of the bottom annular element. The movement 3254D along the helical surface of the pin can rotate 3256C the rod.

In FIG. 32K, the first portion 3251 can be further moved up from the second portion 3252. The annular elements can move up until the pin completes its move 3254D along the helical surface of the bottom annular element, resting at a valley point of the bottom annular element. The rod also completes its rotational movement. The up movement 3256B of the rod and the movement 3254D of the pin along the helical surface can occur in any order, such as one before the other, or concurrently, e.g., at a same time.

The rotational amount of the rod can correspond to the angular distance of the helical surface traveled in the bottom annular element. For example, the pin can contact a middle portion of the helical surface, and then travel to the valley point, which can correspond to about 45 degrees. Thus the rod can rotate about 45 degrees.

The two rotations 3256A and 3256C can be about 90 degrees, determined from the separation of a tooth in the bottom annular element. In the beginning of the toggling process (e.g., FIG. 32A), the pin is at a valley point. After the two rotations 3256A and 3256C, the pin is at an adjacent valley point, separated by a tooth in the bottom annular element. Thus, if the bottom annular element has 4 teeth with equal spacing, the total rotation angle is 360/4=90 degrees.

In FIG. 32L, the first portion 3251 completes its movement away from the second portion 3252, e.g., the two portions cannot move away from each other anymore. The pin is rested at the valley point 3279 of the bottom annular element 3276. The rod 3253 rotates further about 45 degrees for a complete 90 degrees, and hooked with the hook receptacle 3281. Any further up movement can move the first and second portions as a unit, e.g., the top portion is hooked or locked with the bottom portion, and cannot be removed or separated from further up movements.

Thus the movement of the first moveable component away from to the second movable component has accomplished the toggling of the unlocked state to the locked state.

FIGS. 33A-33L illustrate a toggle process from a locked state to an unlocked state according to some embodiments. The toggle process can use a same set of vertical movements, e.g., the set of vertical movements that are used to change states from the unlocked state to the locked state. The set of vertical movements can include a downward movement followed by an upward movement of the first portion with respect to the second portion.

The locking assembly can be in a locked state, in which the first portion is coupled to the second portion. In the locked state, the jaws of the clamping device are widely separated, e.g., the clamping device does not function normally, e.g., in the normal operation that when the clamping device is lifted up, the jaws clamp together, with or without an object between the jaws.

The first movable component can move down relative to the second component. The downward movement of the first moveable component can partially accomplish the toggling of the locked state to the unlocked state.

Figure 33A:
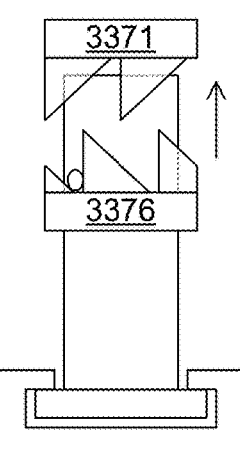
FIGS. 33A-33L illustrate a toggle process from a locked state to an unlocked state according to some embodiments.

In FIG. 33A, the first portion 3351 can be lifted, which then pulls on the second portion 3352. For example, a hoist can bring the empty clamping device, e.g., there is no object between the jaws, to an object location. The jaws can be widely separated, since the first portion is locked to the second portion, which can prevent the jaws from moving toward each other.

In the locked state, the hookable element of the rod is hooked to the hookable feature of the hook receptacle. The rod can be separated a little from the bottom side of the hook receptacle. The pin is rested on a valley point of the bottom annular element.

Figure 33B:
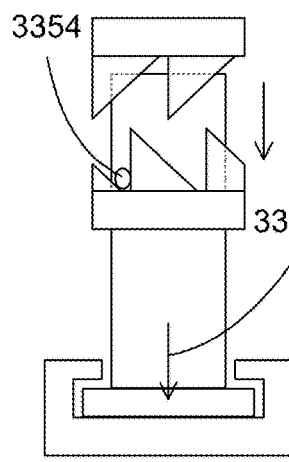

In FIG. 33B, the first portion 3351 can be lowered toward the second portion 3352. The rod can move down 3356A to make contact with the bottom of the hook receptacle.

For example, the hoist can be lowered to place an object between the open jaws. The hoist can further be lowered until the clamping device contacts the object, which is positioned between the jaws. The hoist can further be lowered until the first movable component of the clamping device moves toward the second movable component, bringing the hooked rod to be in contact with the bottom side of the hook receptacle, e.g., from the contact at the hookable feature at the top side of the hook receptacle.

Figure 33C:
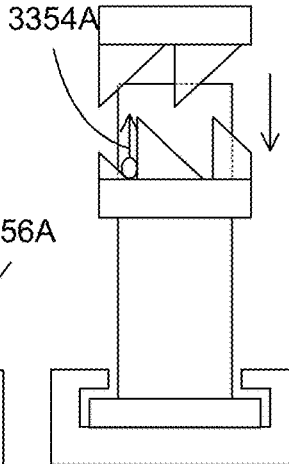

In FIG. 33C, the first portion 3351 can be further lowered toward the second portion 3352. The annular elements can move down until the pin 3354 starts to move 3354A to make contact with the helical surface of the top annular element 3371.

Figure 33D:
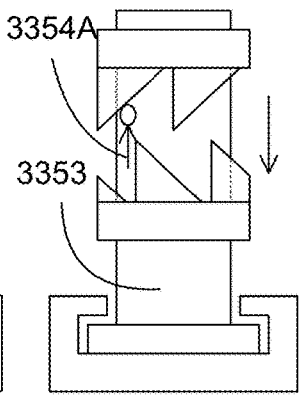

In FIG. 33D, the first portion 3351 can be further lowered toward the second portion 3352. The annular elements can move down until the pin 3354 completely moved 3354A to contact with the helical surface of the top annular element 3371.

Figure 33E:
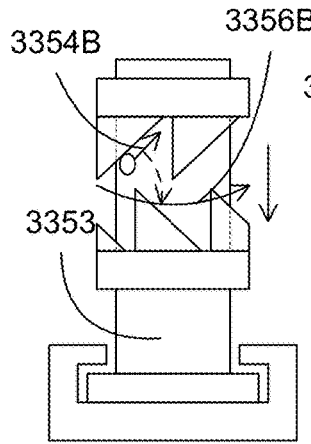

In FIG. 33E, the first portion 3351 can be further lowered toward the second portion 3352. The annular elements can move down, forcing the pin to start to move 3354B along the helical surface of the top annular element. The movement 3354B of the pin can rotate 3356B the rod.

Figure 33F:
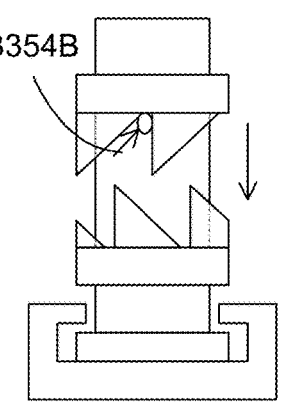

In FIG. 33F, the first portion 3351 can be further lowered toward the second portion 3352. The annular elements can move down until the pin completely moved 3354B along the helical surface of the top annular element, and the rod completes its rotational movement. The pin rests on a valley point of the top annular element. The rod rotates about 45 degrees, and remains partially hooked with the hook receptacle 3381.

Thus the movement of the first moveable component toward to the second movable component has partially accomplished the toggling of the locked state to the unlocked state.

The first movable component can then move up relative to the second component. The upward movement of the first moveable component can complete the toggling of the locked state to the unlocked state.

Figure 33G:
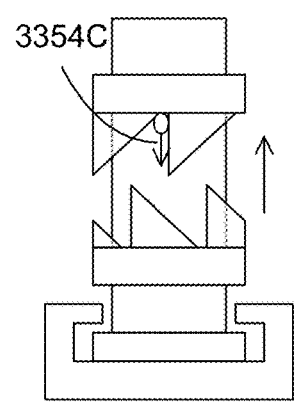

In FIG. 33G, the first portion 3351 can start move up from the second portion 3352. For example, the hoist can lift the first movable component upward, which can move away from the second movable component of the clamping device. The upward movement of the annular elements can start to move 3354C the pin away from the top annular element.

Figure 33H:
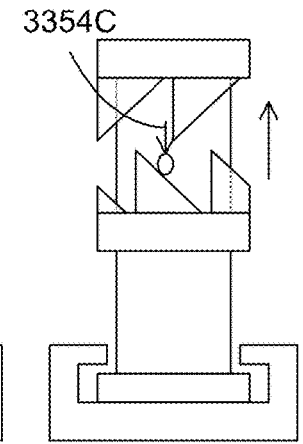

In FIG. 33H, the first portion 3351 can be further moved up from the second portion 3352. The annular elements can move up until the pin 3354 completes its move 3354C to contact with the helical surface of the bottom annular element 3376.

Figure 33I:
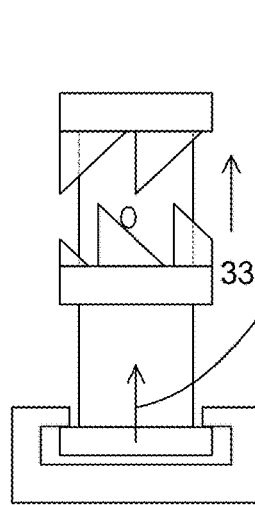

In FIG. 33I, the first portion 3351 can be further moved up from the second portion 3352. The annular elements can move up, lifting the rod to move 3356C (since the pin is in contact with the bottom annular element) until the hookable element of the rod is in contact with the hookable feature of the hook receptacle. This distance can be small, e.g., order of mm, such as 1 mm, 2 mm, 3 mm, 31 mm, or less than 10 mm.

Figure 33J:
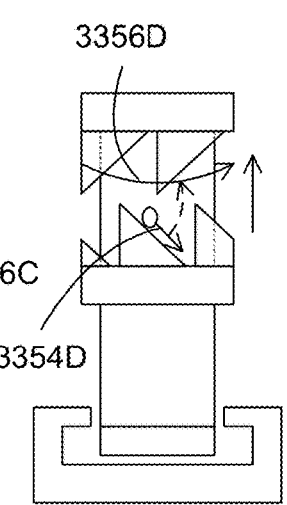

In FIG. 33J, the first portion 3351 can be further moved up from the second portion 3352. The annular elements can move up until the pin starts to move 3354D along the helical surface of the bottom annular element. The movement 3354D along the helical surface of the pin can rotate 3356D the rod.

Figure 33K:
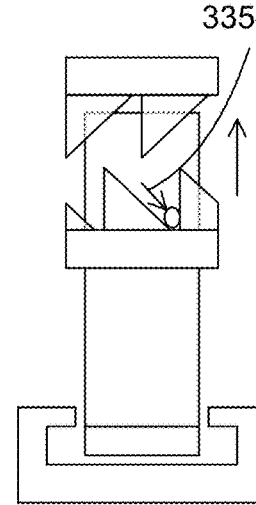

In FIG. 33K, the first portion 3351 can be further moved up from the second portion 3352. The annular elements can move up until the pin completes its move 3354D along the helical surface of the bottom annular element, resting at a valley point of the bottom annular element. The rod also completes its rotational movement. The up movement 3356C of the rod and the movement 3354D of the pin along the helical surface can occur in any order, such as one before the other, or concurrently, e.g., at a same time.

Figure 33L:
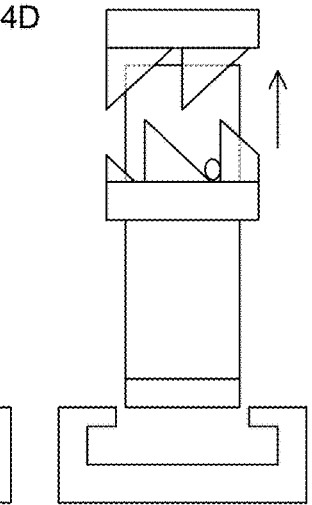

In FIG. 33L, the first portion 3351 can be further moved up from the second portion 3352, e.g., the two portions can be separated from each other, since the hookable element of the rod is not engaged with the hookable feature of the hook receptacle. The pin is rested at the valley point of the bottom annular element 3376. The rod 3353 rotates for a complete 90 degrees, and be separatable from the hook receptacle. A further up movement can move the first portion away from the second portion, allowing the jaws to move toward each other for clamping on the object.

Thus the movement of the first moveable component away from to the second movable component has accomplished the toggling of the locked state to the unlocked state.

In some embodiments, the locking assembly can be optimized for improved reliability, improved operation, and improved fabrication. For example, a pulling force can be higher than a pushing force on the locking assembly, thus the locking assembly can include a feature for providing higher support in the pulling direction, which can provide better reliability for the locking mechanism. The locking assembly can be configured to increase a force conversion from vertical movements to rotation movements of the rod, to provide better operation of the locking mechanism. The locking assembly can be configured to reduce a free movement distance, e.g., a distance in which a pulling element of the clamping device is pulled up, but without any response from the jaws.

Figure 34A:
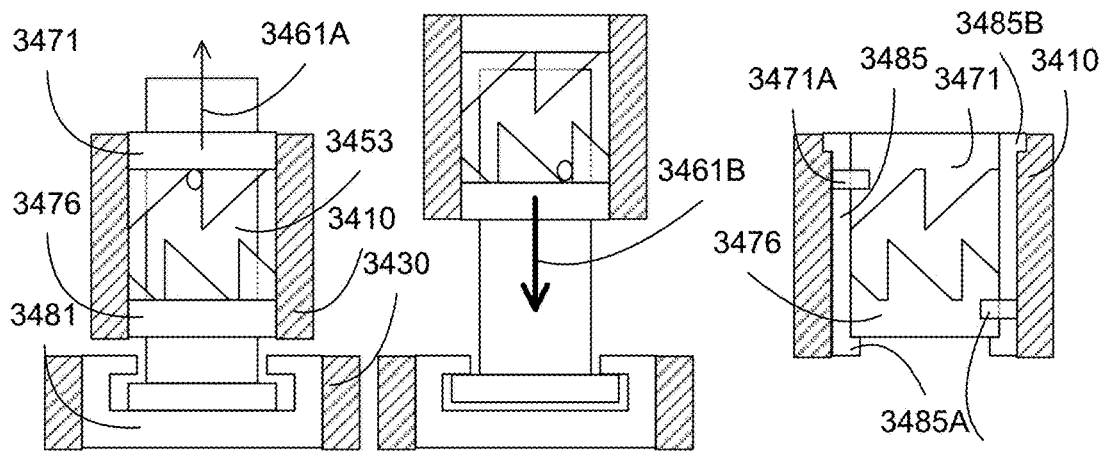
FIGS. 34A-34D illustrate optimized configurations for the locking assembly according to some embodiments.

FIGS. 34A-34D illustrate optimized configurations for the locking assembly according to some embodiments. In FIGS. 34A(a)-34A(c), the locking assembly can include support features 3485A and 3485B, to address an imbalance of forces acting on the locking assembly, such as on the annular elements 3471 and 3476.

In FIGS. 34A(a) and 34A(b), the locking assembly can be coupled, such as fixedly coupled to two movable components 3410 and 3430 of the clamping device. For example, the annular elements 3471 and 3476 can be coupled to a top movable component 3410, such as to the pulling element of a clamping device. The hook receptacle 3481 can be coupled to a bottom movable component 3430, such as to the pivot point of a clamping device.

In a first movement, the top movable component can be pushed down on the bottom movable component, for example, by the hoist not pulling or releasing on the pulling element. Thus the force of the top component pushing down on the bottom component can be due to the weight of the pulling element. This pushing down force can push the rod 3453 against the top annular element 3471, with a force 3461A equaled to the pushing down force.

In a second movement, the top movable component can be pulled up from the bottom movable component, for example, by the hoist pulling on the pulling element. Thus the force of the bottom component pulling on the top component can be due to the weight of the jaw assembly. This pulling up force can pull the rod 3453 against the bottom annular element 3476, with a force 3461B equaled to the pulling up force.

The force 3461B pulling on the bottom annular element can be higher than the force 3461A pushing on the top annular element from the rod. Thus the bottom annular element can be supported from a bottom side.

A sleeve 3485 can be used to house the annular elements 3471 and 3476. The sleeve can have a support element 3485A at a bottom side of the sleeve, on an inner surface, to support the bottom annular element. Pin 3471A can be used to secure the annular element 3471 to the sleeve 3485. Pin 3476A can be used to secure the annular element 3476 to the sleeve 3485.

In fabrication, the annular elements can be inserted into the sleeve from a top side, first the bottom annular element inserted first, followed by the second annular element. Pins 3471A and 3476A can be used to secure the two annular elements with the sleeve.

In operation, the support element 3485A can prevent the bottom annular element from moving down, e.g., supporting the bottom annular element against the pulling down force exerted by the rod. The pin 3476A can be used to add to the support of the bottom annular element, such as to prevent the bottom annular element from moving up. The pin 3471A can prevent the top annular element from moving up, e.g., securing the top annular element against the pushing force exerted by the rod.

The sleeve 3485 can further have another support element 3485B at a top side of the sleeve, on an outer surface, to support the both annular elements on the top movable component 3410. This support element 3485B can support the sleeve 3485 on the top movable component. In fabrication, the sleeve, with the annular elements installed, can be inserted into the top movable component from a top side, so that the support element 3485B rested on a mating feature in the top component. Optional secured elements, such as a pin can be used to secure the sleeve with the top component. Press fit process can also be used.

Figure 34B:
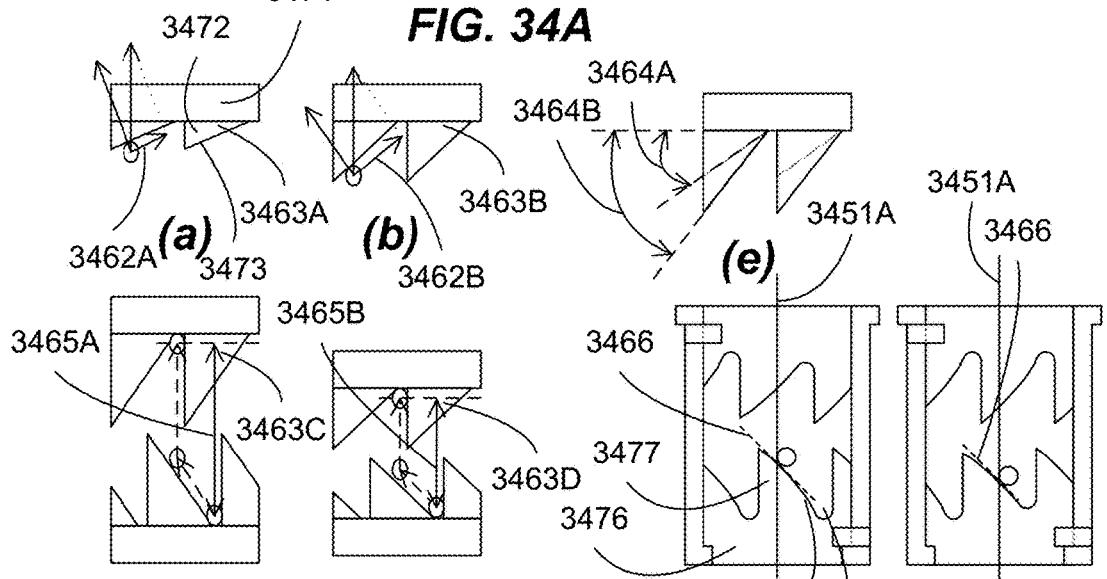

FIGS. 34B(a)-34B(b) shows configurations for different angles 3463A and 3463B of the teeth 3472 on an annular element 3471, such as the angles 3463A and 3463B of the helical surface 3473 of the teeth 3472 making with a horizontal surface of the annular element 3471, which is a surface perpendicular to the axis of the annular element. A force from the pin pushing on the helical surface 3473 can be decomposed into a normal force, and a parallel force 3462A or 3462B, which is the force for moving the pin along the helical surface for rotating the rod.

For small angle 3463A (FIG. 34B(a)), the parallel force 3462A can be small, as compared to the parallel force 3462B caused by the larger angle 3463B (FIG. 34B(b)). From these configurations, a larger angle is preferred for ease of rotating the rod, which can be the activation force for toggling the locking mechanism.

FIGS. 34B(c)-34B(d) shows configurations for different angles 3463C and 3463D of the teeth on an annular element, e.g., the angles of the helical surface of the teeth making with a horizontal surface of the annular element. A pin can move from a valley point of the bottom annular element, along a helical surface of a tooth on the bottom annular element, and up to rest on a valley point of the top annular element. The total vertical distance 3465A or 3465B can be the distance that the annular elements move with respect to the rod, e.g., when the rod is locked with the hook receptacle, the movements of the pin with respect to the annular elements can be regarded as the movements of the annular elements while keeping the rod stationary. Thus, the top movable component 3410 (which is coupled to the annular elements) can move down a distance 3465A or 3465B with respect to the bottom movable component 3430 (which is coupled to the hook receptacle, which can be locked to the rod). In other words, the distance 3465A or 3465B can be the backlash distance when the top component reverses directions. The backlash distance can be the distance that the top component moved relative to the bottom component, in order to toggle the states of the locking assembly. The backlash distance 3465A or 3465B can be as small as possible, in order to improve the operation of the locking mechanism.

For large angle 3463C (FIG. 34B(c)), the backlash distance 3465A can be large, as compared to the backlash distance 3465B caused by the smaller angle 3463D (FIG. 34B(d)). From these configurations, a smaller angle is preferred for better operation of the locking mechanism.

As shown in FIG. 34B(e), the locking assembly can be configured so that the teeth of the annular elements can be optimized for large parallel forces and small backlash distances. The angles of the teeth, e.g., the angles between the helical surfaces and the plane perpendicular to the axis of the annular elements, can be between 30 and 60 degrees, or between 35 and 55 degrees, or between 40 and 50 degrees, or can be about 45 degrees.

FIG. 34B(f) shows a configuration of the annular elements, which are embedded in a sleeve. A tooth 3477 can have a helical surface 3478, rising from a valley point 3479 at a base of the annular element 3476, and an abrupt surface which is terminated at a valley point of an adjacent tooth. The helical surface can be configured to form a constant angle with the axis 3351A of the annular elements.

Figures 34C, 34D:
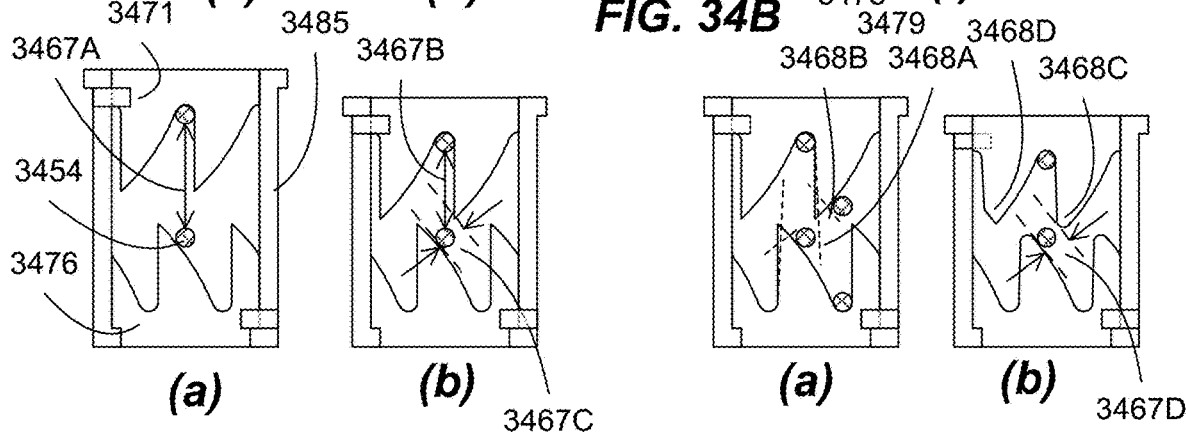

FIGS. 34C(a) and 34C(b) show configurations for improving backlash distance of the annular elements relative to the rod. If the annular elements are positioned farther apart, e.g., separated by a distance 3467A, the backlash distance can be larger, as compared to a closer annular element separation 3467B. A minimum backlash distance can be obtained by placing the two annular elements close together, with minimum clearance 3467C for the pin 3454 to pass the peak of the teeth of an annular element (such as the top annular element as shown) while traveling on the helical surface of the teeth of the other annular element (such as the bottom annular element as shown). The clearance distance can be the distance between the pin and the opposite slanting surface, e.g., the clearance space on the path of the pin while moving on the slanting surface. The clearance distance can be less than 10 mm, less than 5 mm, or less than 2 mm.

FIGS. 34D(a) and 34D(b) show configurations for improving backlash distance and ease of traveling for the pin. For example, if the abrupt surface of the teeth is vertical, e.g., parallel to the path traveled by the pin when moving from the helical surface on one annular element to the valley point of the other annular element, the pin might get caught by the peak of the teeth. Thus, a recess 3468A of the teeth abrupt surface can improve a reliability of the operation of the locking assembly, by preventing the peak of the teeth from interfering with the pin. The recess 3468A can be a small angle from the vertical distance, such as from the axis of rotation of the annular elements. The angle of the recess 3468A can be less than 10 degrees, less than 5 degrees, or less than 2 degrees.

A rounding 3468C of the peak of the teeth of the annular elements can further remove the backlash distance, by allowing the annular elements to be positioned closer, e.g., the clearance distance 3467D can be smaller than the clearance distance 3467C in the case of sharp teeth. Alternatively, the peaks of the teeth can be trimmed 3468B at an angle parallel to the angle of the helical surface. The trim 3468B can occur on a portion of the helical surface that the pin does not travel, e.g., the peak portion of the teeth away from the location where the pin leaves the helical surface to travel vertically to the valley point of the other annular element. The parallel angle can allow the pin to pass the peaks with a uniform clearance, using a trimmed peak 3468D of the teeth.

In some embodiments, the automatic locking assembly can be configured so that two slanting surfaces can face away from each other. There can be two or more curve shape elements that are configured to mate with the slanting surfaces, such as two protruded pins from a rod. The two slanting surfaces can be disposed between the two protruded pins, so that a first protruded pin interfaces with a first slanting surface and a second protruded pin interfaces with a second slanting surface. The slanting surface can be a curve slanting surface, such as a helical surface. The movements of the protruded pins along the slanting surface can rotate the rod, e.g., when the pins run along the helical surface.

The first slanting surface can be configured to accept the first protruded pin in a first moving direction of the pins or of the slanting surface, and then move the first protruded pin along the first slanting surface.

The second slanting surface can be configured to accept the second protruded pin. The second slanting surface can move the second protruded pin along the second slanting surface, for example, a helical surface, such as rotating the rod by the second protruded pin running along the helical surface.

FIGS. 35A-35D illustrate another schematic configuration for a locking mechanism or assembly according to some embodiments. The locking mechanism can employ a slanting interface for repeatedly rotating a rod through a repeatedly set of vertical forces.

In some embodiments, the locking mechanism can include two lockable elements, such as a rod with a hook end and a hook receptacle. Depending on the orientation of the hook end, the rod can be unseparatable from the hook receptacle, or the rod can move independent of the receptacle.

Figure 35A:
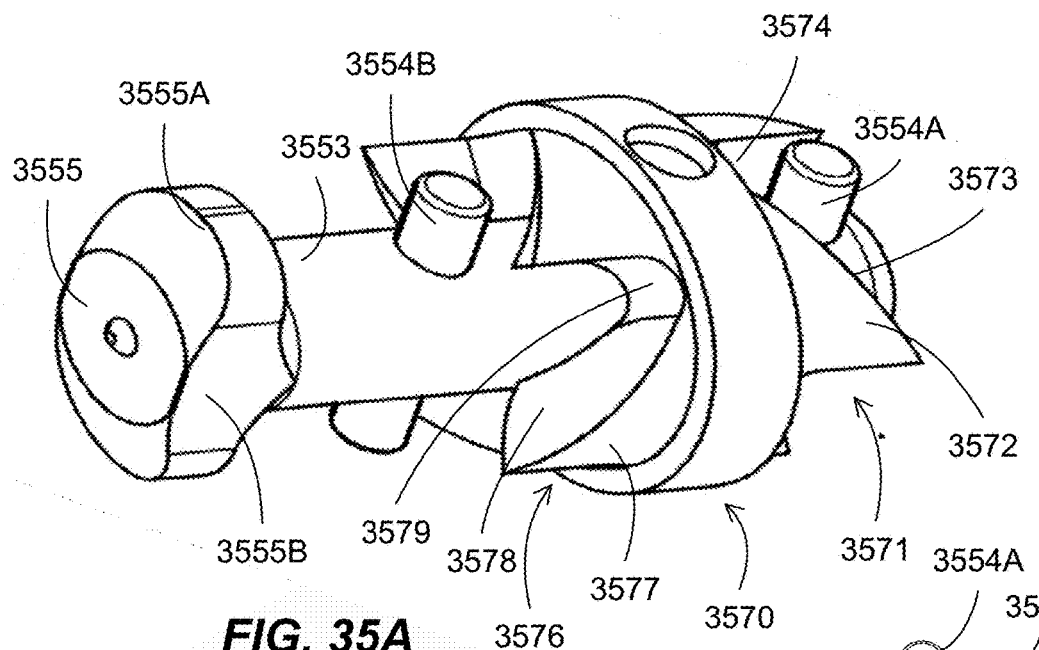
FIGS. 35A-35D illustrate another schematic configuration for a locking mechanism or assembly according to some embodiments.

FIG. 35A shows a schematic detail of a first portion 3551 of a locking assembly using slanting interfaces. The locking assembly can include two portions 3551 and 3552, forming two lockable elements. A first portion can include a rod 3553, placed in an annular element 3570. The annular element 3570 can have opposite slanting surfaces, such as cyclic teeth on two opposite sides. The annular element 3570 can include two annular elements 3571 and 3576 secured together with the slanting surfaces facing opposite directions. The annular element 3570 can be a one piece annular element having slanting surfaces on opposite sides. A second portion can include a hook receptacle 3581.

The first portion of a locking assembly can include a slanting surface interacting element, such as a rod 3553. One end of the rod can include a hook end or a hookable element 3555, which can include a perpendicular elongated portion having a longer side 3555A and a shorter side 3555B. By rotating the rod, such as a 90 degree angle for this elongated hook element 3555, the status of the lock can be toggle between locked and unlocked states.

The rod 3553 can include at least two protruded elements, such as two pins 3554A and 3554B, which can be passing through the rod and protruded from both sides of the rod.

The annular element 3570 can include a ring-like element, with slanting surfaces in the form of helical surfaces. The annular element 3570 can have a hollow cylindrical shape, such as a ring or a hollow cylinder, with an axis of rotation 3551A. The annular element can have cyclic teeth, e.g., teeth configured around the circumference of the annular element. The number of teeth can be dividable by 2 or by 4, such as 4 teeth or 12 teeth. The teeth can have helical surfaces rising from a base of the annular elements, followed by abrupt surfaces going back down to the base, after reaching peaks of the teeth. The other end of the helical surfaces can reach valley points, before followed by the abrupt surfaces of the adjacent teeth.

At one side, the annular element 3570 can have multiple teeth 3572, such as 4 teeth arranged cyclically around a circumference of the base of the annular element 3570. Each tooth can have a helical surface 3573. At the end of the helical surface 3573 near the base, there can be a valley point 3574, which can be followed by an adjacent tooth, e.g., an abrupt surface of the adjacent tooth.

At an opposite side, the annular element 3570 can have 4 teeth 3577, arranged cyclically around a circumference of the base of the annular element 3576. Each tooth can have a helical surface 3578. At the end of the helical surface 3578 near the base, there can be a valley point 3579, which can be followed by an adjacent tooth, e.g., an abrupt surface of the adjacent tooth.

The annular element 3570 can have teeth 3572 and 3577, and helical surfaces 3573 and 3578, facing each other. Further, the teeth of the annular element can be configured so that peaks of the teeth in one side are aligned along the axis of rotation 3551A with helical surfaces of teeth in an opposite side, and valley points of teeth in one side are aligned along the axis of rotation 3551A with helical surfaces of teeth in an opposite side.

The rod 3553 can be disposed in the annular element, such as the axis of the rod coincides with the axes of the annular element 3551A. The rod can be constrained inside the annular elements, e.g., the rod can move along the axis, and can rotate around the axis, in the absence of the protruded elements.

With the protruded elements such as the pins 3554A and 3554B, the rod 3553 is further constrained. For example, the pins can be inserted after the rod has been placed in the annular element, so that the pins are disposed surrounding the annular element. Thus the pins can prevent the rod from being removed or separated from the annular element.

The pins can further limit the movements of the rod, beside the constraint of limited movements along the axis, due to the teeth of the annular element preventing the pins from going pass the teeth. The rod can have limited rotational movements, constrained by the abrupt surfaces or the helical surfaces of the teeth. The rod can rotate a complete cycle, but only accompanied by axis movements, e.g., when the rotational movement is blocked by the teeth, the rod can move along the axis so that the pins are clear of the teeth before resuming the rotational movement.

The helical surfaces on the two sides of the annular element can be facing away from each other, and can be configured to provide a torque to rotate the rod through the protruded pins. For example, the rod can be pushed in one direction toward the annular element, with one protruded pin then contacting the helical surfaces of one side of the annular element. Due to the helical surfaces, the protruded pin can slide or roll on the helical surfaces, effectively rotating the rod an angle corresponded to the amount of the protruded pin sliding or rolling on the helical surfaces, from the point of contact to the point of rest at the bottom of the helical surfaces.

The rod can be retracted, e.g., pushing in an opposite direction toward the annular element. The other protruded pin then can be configured to contact the helical surfaces of the opposite side of the annular element. Due to the helical surfaces, the protruded pin can slide or roll on the helical surfaces, effectively rotating the rod another angle corresponded to the amount of the protruded pin sliding or rolling on the helical surfaces, from the point of contact to the point of rest at the bottom of the helical surfaces. Thus, by pushing and pulling, the rod can rotate an angle, such as a 90 degrees angle.

For example, the pin 3554A can be facing the helical surface 3573, and the pin 3554B can be facing the helical surface 3578, e.g., the helical surfaces 3573 and 3578 of the annular element 3570 can be disposed between the two pins 3554A and 3554B.

The rod can be pushed, so that the pin 3554A contacts the helical surface 3573 of the annular element 3570. The pin can then run along the helical surface 3573 to the valley point 3574. The movement of the pin 3554A can cause the rod 3553 to rotate an angle corresponded to the length of the movement, e.g., the distance that the pin travels on the helical surface 3573.

The rod can be pulled, so that the pin 3554B contacts the helical surface 3578 of the annular element 3570. The pin can run along the helical surface 3578 to the valley point 3579 of the annular element 3570. The movement of the pin 3554B can cause the rod 3553 to rotate an angle corresponded to the length of the movement, e.g., the distance that the pin travels on the helical surface 3578.

Figure 35B:
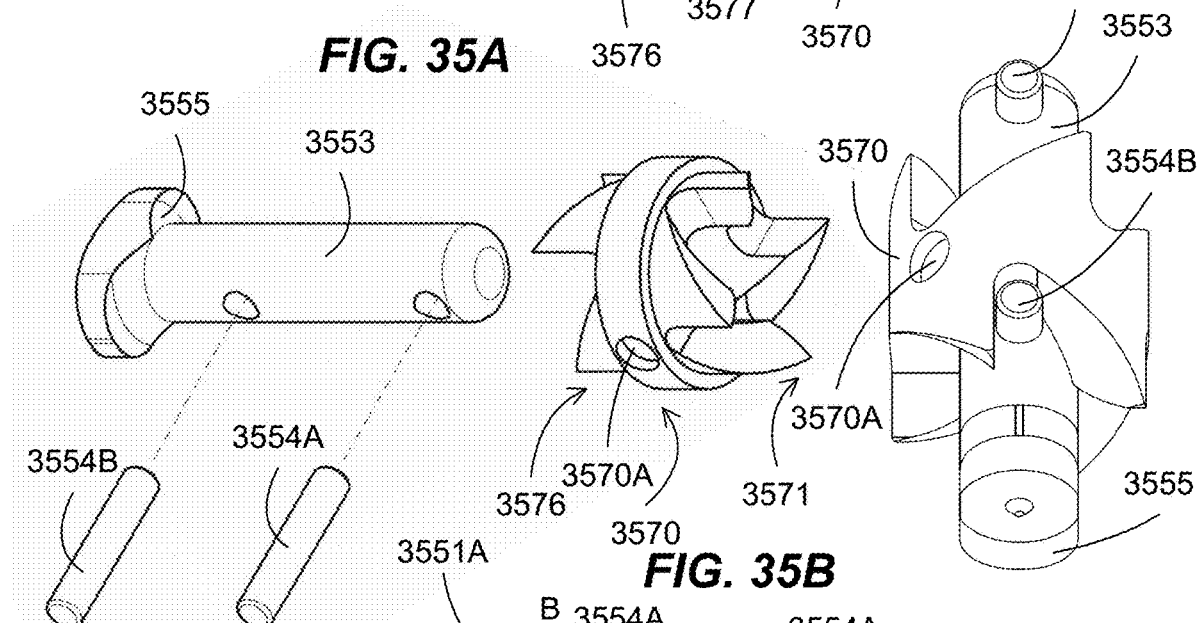

FIG. 35B shows a schematic construction of a first portion 3551 of a locking assembly. The first portion can include an annular element 3570, placed inside a sleeve 3585. A hole 3570A can be formed in the annular element 3570, which can accept a pin 3570B for securing the annular element 3570 with the sleeve 3585. The first portion can include a rod 3553. One end of the rod can include a hookable element 3555, which can include a perpendicular elongated portion having a longer side and a shorter side. Pins 3554A and 3554B can be inserted into the rod, such as after the rod has been placed inside the annular element 3570. Since the annular element 3570 is constrained by the pins 3554A and 3554B, the annular element and the rod are coupled together, e.g., cannot be removed from each other.

The pins can be at any configuration with the regard to the hook end. As shown, the pins are parallel to the hook end. As such, the pin is configured so that when the pin is rested at the valley point of the teeth in a bottom side of the annular element 3570, the hook end is either parallel (unlocked state) or perpendicular (locked state) to the parallel hook ends of the hook receptacle.

Figure 35C:
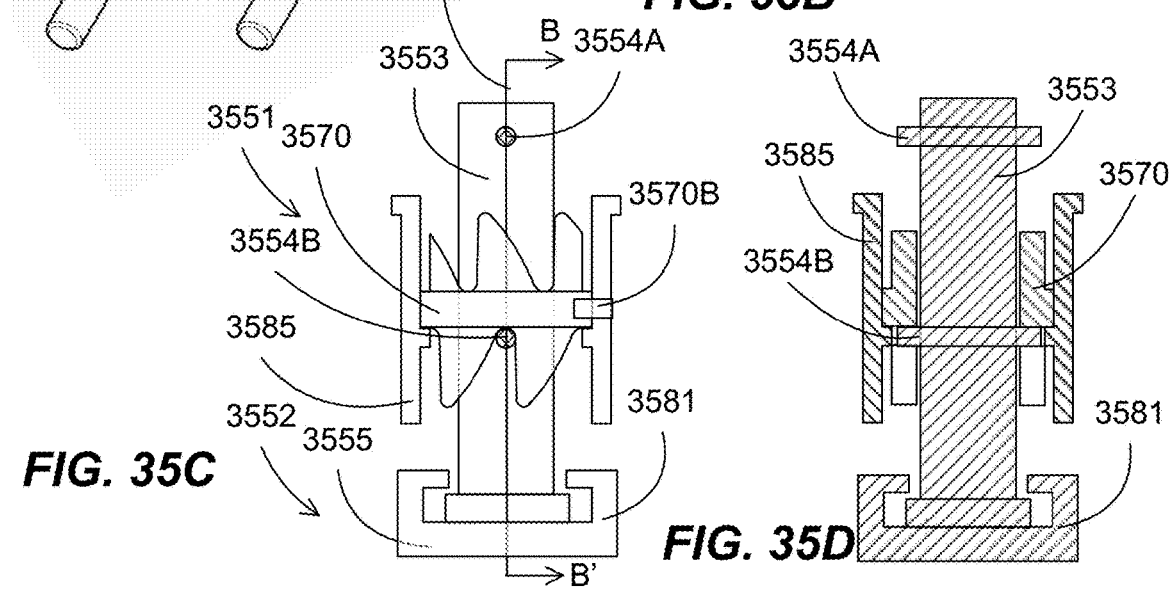

FIG. 35C shows an assembled first portion 3551 of the locking assembly. An assembled first portion 3551 of the locking assembly partially locked with a second portion 3552 of the locking assembly. The annular element 3570 is assembled inside a sleeve 3585. A rod 3553 can be assembled inside the annular element, with pins 3554A and 3554B sandwiching the annular element. As such, the pins are configured so that when the pin 3554B is rested at the valley point of the bottom teeth of the annular element, the hook end is partially locked to the parallel hook ends of the hook receptacle, e.g., forming a 45 degrees. That way, when the pin is further rotated another 45 degrees, to be rested at the valley point of the top teeth of the annular element, the hook end is either parallel (unlocked state) or perpendicular (locked state) to the parallel hook ends of the hook receptacle.

Figure 35D:
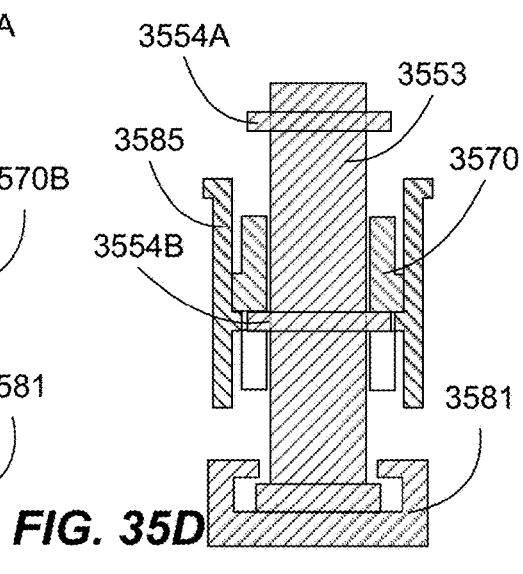

FIG. 35D shows a cross section BB' of an assembled first portion 3551 of the locking assembly partially locked with a second portion 3552 of the locking assembly. The cross section is through the pins 3554A and 3554B.

FIGS. 36A-36C illustrate a toggle process from an unlocked state to a locked state according to some embodiments. FIGS. 36A(a)-36C(a) show perspective views, and FIGS. 36A(b)-36C(b) show side views, of the toggle process. A locking assembly can include a first portion that can be lockable to a second portion. The first portion can include an annular element together with a rod disposed in the annular element. The rod can have two protruded pins (or more than two protruded pins) placed surrounding the annular element. The rod can have a hook end. The second portion can include a hook receptacle, which can include a parallel hookable feature, which can be mated with the hook end of the rod.

In FIGS. 36A(a)-36A(b), the first portion can be removable from the second portion, with the hook end 3655 of the rod 3653 parallel with the parallel hookable feature of the hook receptacle 3681. Top pin 3654A can be rested on a valley point of the top teeth 3672 of the annular element 3670.

In FIGS. 36B(a)-36B(b), the first portion can be brought down on the second portion. Bottom pin 3654B contacts helical surface of bottom teeth 3677 of the annular element 3670. Bottom pin 3654B further moves along the helical surface to rest on a valley point of the bottom teeth 3677 of the annular element 3670. Rod 3653 is rotated a 45 degree angle, so that the hook end 3655 is partially hooked on the hook receptacle.

In FIGS. 36C(a)-36C(b), the first portion can be brought up away from the second portion. Top pin 3654A contacts helical surface of top teeth 3672 of the annular element 3670. Top pin 3654A further moves along the helical surface to rest on a valley point of the top teeth 3672 of the annular element 3670. Rod 3653 is rotated another 45 degree angle, for a total of 90 degrees, so that the hook end 3655 is hooked on the hook receptacle. The locking assembly has completed its toggling process from an unlocked state to a locked state.

FIGS. 37A-37C illustrate a toggle process from a locked state to an unlocked state according to some embodiments. FIGS. 37A(a)-37C(a) show perspective views, and FIGS. 37A(b)-37C(b) show side views, of the toggle process. The toggle process can use a same set of vertical movements, e.g., the set of vertical movements that are used to change states from the unlocked state to the locked state, which includes a downward movement followed by an upward movement of the first portion with respect to the second portion.

In FIGS. 37A(a)-37A(b), the first portion can be locked with the second portion, with the hook end 3755 of the rod 3753 hooked with the parallel hookable feature of the hook receptacle 3781. Top pin 3754A can be rested on a valley point of the top teeth 3772 of the annular element 3770.

In FIGS. 37B(a)-37B(b), the first portion can be brought down on the second portion. Bottom pin 3754B contacts helical surface of bottom teeth 3777 of the annular element 3770. Bottom pin 3754B further moves along the helical surface to rest on a valley point of the bottom teeth 3777 of the annular element 3770. Rod 3753 is rotated a 45 degree angle, so that the hook end 3755 is partially hooked on the hook receptacle.

In FIGS. 37C(a)-37C(b), the first portion can be brought up away from the second portion. Top pin 3754A contacts helical surface of top teeth 3772 of the annular element 3770. Top pin 3754A further moves along the helical surface to rest on a valley point of the top teeth 3772 of the annular element 3770. Rod 3753 is rotated another 45 degree angle, for a total of 90 degrees, so that the hook end 3755 is separatable from the hook receptacle, e.g., the hook end is parallel with the parallel hookable feature of the hook receptacle. The locking assembly has completed its toggling process from a locked state to an unlocked state.

In some embodiments, the locking assembly can be optimized for improved reliability, improved operation, and improved fabrication.

FIGS. 38A-38D illustrate optimized configurations for the locking assembly according to some embodiments. In FIGS. 38A(a)-38A(d), the locking assembly can include support features 3885A and 3885B, to address an imbalance of forces acting on the locking assembly, such as on the annular element 3870.

In FIGS. 38A(a) and 38A(b), the locking assembly can be coupled, such as fixedly coupled to two movable components 3810 and 3830 of the clamping device. For example, the annular element 3870 can be coupled to a top movable component 3810, such as to the pulling element of a clamping device (for example, as in a configuration shown in FIGS. 2A and 2B). The hook receptacle 3881 can be coupled to a bottom movable component 3830, such as to the pivot point of a clamping device (for example, as in a configuration shown in FIGS. 2A and 2B).

In a first movement, the top movable component can be pushed down on the bottom movable component, for example, by the hoist not pulling or releasing on the pulling element. Thus the force of the top component pushing down on the bottom component can be due to the weight of the pulling element. This pushing down force can push the rod 3853 against the top teeth 3872 of the annular element 3870, with a force 3861A equaled to the pushing down force.

In a second movement, the top movable component can be pulled up from the bottom movable component, for example, by the hoist pulling on the pulling element. Thus the force of the bottom component pulling on the top component can be due to the weight of the jaw assembly. This pulling up force can pull the rod 3853 against the bottom teeth 3877 of the annular element 3870, with a force 3861B equaled to the pulling up force.

The force 3861B pulling up on the annular element can be higher than the force 3861A pushing down on the annular element from the rod. Thus the annular element can be supported from a bottom side.

A sleeve 3885 can be used to house the annular element 3870. The sleeve can have a support element 3885A at a bottom side of the sleeve, on an inner surface, to support the bottom side of the annular element. Pin 3870A can be used to secure the annular element 3870 to the sleeve 3885.

In fabrication, the annular element can be inserted into the sleeve from a top side. Pins 3870A can be used to secure the annular element with the sleeve.

In operation, the support element 3885A can prevent the annular element from moving down, e.g., supporting the annular element from a bottom side against the pulling down force exerted by the rod. The pin 3870A can be used to add to the support of the annular element, such as to prevent the annular element from moving up.

The sleeve 3885 can further have another support element 3885B at a top side of the sleeve, on an outer surface, to support the annular element on the top movable component 3810. This support element 3885B can support the sleeve 3885 on the top movable component. The top movable component 1310 can have a support element 3885C at a bottom side, on an inner surface, to support the sleeve.

In assembling, the sleeve, with the annular element installed and secured with the pin 3870A, can be inserted into the top movable component from a top side, so that the support element 3885B rested on a mating feature in the top component. Optional secured elements, such as a pin or a top plate, can be used to secure the sleeve with the top component. Press fit process can also be used.

The locking assembly, including the annular element, the protruded pins installed to the rod, and the rod installed within the annular element, can be installed in a top movable component, e.g., without a sleeve. In assembling, the rod can be inserted to the annular element, followed by the pins inserted into the rod. The locking assembly can be inserted into the top movable component from a top side, to rest on the support element 3885D. Optional secured element, such as sleeve 3870B, can be inserted to prevent the locking assembly from moving out of the top movable element.

FIGS. 38B(a)-38B(b) shows configurations for different angles 3863A and 3863B of the teeth 3877 on an annular element 3870, such as the angles 3863A and 3863B of the helical surface 3873 of the teeth 3877 making with a horizontal surface of the annular element 3870, which is a surface perpendicular to the axis of the annular element. A force from the pin pushing on the helical surface 3873 can be decomposed into a normal force, and a parallel force 3862A or 3862B, which is the force for moving the pin along the helical surface for rotating the rod.

For small angle 3863A (FIG. 38B(a)), the parallel force 3862A can be small, as compared to the parallel force 3862B caused by the larger angle 3863B (FIG. 38B(b)). From these configurations, a larger angle is preferred for ease of rotating the rod, which can be the activation force for toggling the locking mechanism.

FIGS. 38B(c)-38B(d) shows configurations for different angles 3863C and 3863D of the teeth on an annular element, e.g., the angles of the helical surface of the teeth making with a horizontal surface of the annular element. A bottom pin can move from a valley point of the bottom teeth of the annular element, along a helical surface of a tooth on the bottom teeth of the annular element, and up to rest on a valley point. The total vertical distance 3865A or 3865B can be the distance that the annular elements move with respect to the rod, e.g., when the rod is locked with the hook receptacle, the movements of the pin with respect to the annular elements can be regarded as the movements of the annular elements while keeping the rod stationary. Thus, the top movable component 3810 (which is coupled to the annular elements) can move down a distance 3865A or 3865B with respect to the bottom movable component 3830 (which is coupled to the hook receptacle, which can be locked to the rod). In other words, the distance 3865A or 3865B can be the backlash distance when the top component reverses directions. The backlash distance can be the distance that the top component moved relative to the bottom component, in order to toggle the states of the locking assembly. The backlash distance 3865A or 3865B can be as small as possible, in order to improve the operation of the locking mechanism.

For large angle 3863C (FIG. 38B(c)), the backlash distance 3865A can be large, as compared to the backlash distance 3865B caused by the smaller angle 3863D (FIG. 38B(d)). From these configurations, a smaller angle is preferred for better operation of the locking mechanism.

As shown in FIG. 38B(e), the locking assembly can be configured so that the teeth of the annular elements can be optimized for large parallel forces and small backlash distances. The angles of the teeth, e.g., the angles between the helical surfaces and the plane perpendicular to the axis of the annular elements, can be between 30 and 100 degrees, or between 35 and 95 degrees, or between 40 and 90 degrees, or can be about 45 degrees.

FIG. 38B(f) shows a configuration of the annular elements, which are embedded in a sleeve. A tooth 3872 can have a helical surface 3873, rising from a valley point 3874 at a base of the annular element 3870, and an abrupt surface which is terminated at a valley point of an adjacent tooth. The helical surface can be configured to form a constant angle with the axis 3851A of the annular elements.

FIGS. 38C(a) and 38C(b) show configurations for improving backlash distance of the annular elements relative to the rod. If the annular elements are positioned farther apart, e.g., separated by a distance 3867A, the backlash distance can be larger, as compared to a closer annular element separation 3867B. A minimum backlash distance can be obtained by placing the two pins close together, with minimum clearance 3867D for the pin 3854A to pass the peak of the teeth of an annular element (as compared to a larger clearance 3867C) while traveling on the helical surface of the teeth of the other annular element. The clearance distance can be the distance between the pin and the opposite slanting surface, e.g., the clearance space on the path of the pin while moving on the slanting surface. The clearance distance can be less than 10 mm, less than 5 mm, or less than 2 mm.

FIGS. 38D(a) and 38D(b) show configurations for improving backlash distance and ease of traveling for the pin. For example, if the abrupt surface of the teeth is vertical, e.g., parallel to the path traveled by the pin when moving from the helical surface on one annular element to the valley point of the other annular element, the pin might get caught by the peak of the teeth. Thus, a recess 3868A of the teeth abrupt surface can improve a reliability of the operation of the locking assembly, by preventing the peak of the teeth from interfering with the pin. The recess 3868A can be a small angle from the vertical distance, such as from the axis of rotation of the annular elements. The angle of the recess 3868A can be less than 10 degrees, less than 9 degrees, or less than 2 degrees.

A rounding 3868C of the peak of the teeth of the annular elements can further remove the backlash distance, by allowing the annular elements to be positioned closer, e.g., the clearance distance 3867E can be smaller than the clearance distance 3867D in the case of sharp teeth. Alternatively, the peaks of the teeth can be trimmed 3868B at an angle parallel to the angle of the helical surface. The trim 3868B can occur on a portion of the helical surface that the pin does not travel, e.g., the peak portion of the teeth away from the location where the pin leaves the helical surface to travel vertically to the valley point of the other annular element. The parallel angle can allow the pin to pass the peaks with a uniform clearance, using a trimmed peak 3868D of the teeth.

In some embodiments, the hook end of the rod in the locking assembly can be optimized for improved reliability and improved operation.

Figure 39A:
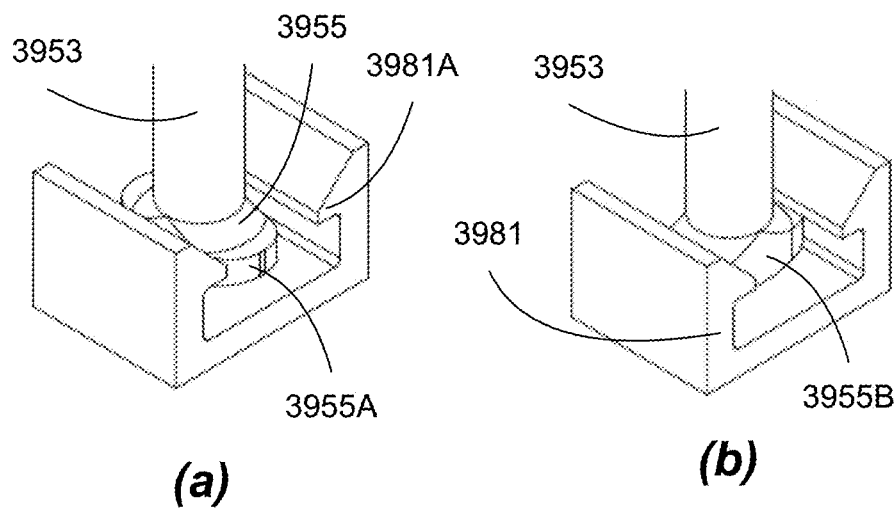
FIGS. 39A-39C illustrate a locking feature of the hook end of a rod with a hookable feature of a hook receptacle according to some embodiments.
Figure 39B:
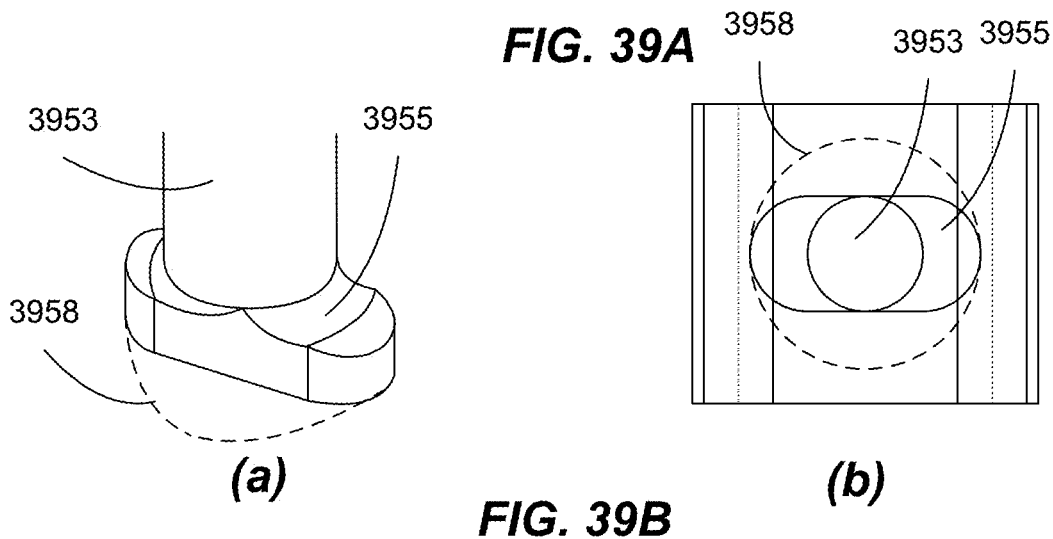
Figure 39C:
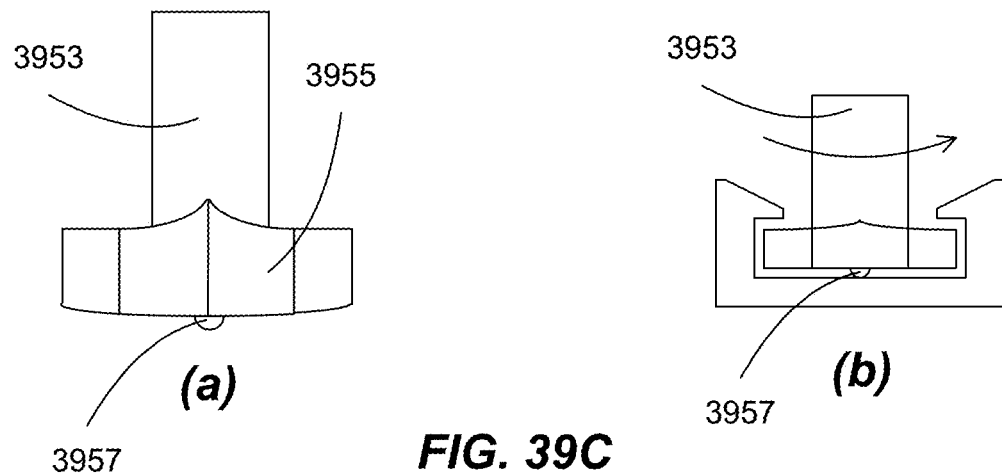

FIGS. 39A-39C illustrate a locking feature of the hook end of a rod with a hookable feature of a hook receptacle according to some embodiments. FIGS. 39A(a) and 39A(b) show unlocked and locked states of the locking feature. The hook end 3955 can have an elongated portion 3955A and a short portion 3955B. In the unlocked state (FIG. 39A(a)), the hook end 3955 of the rod 3953 can have the elongated portion 3955A parallel with the parallel hookable feature 3981A of the hook receptacle 3981. In the locked state (FIG. 39A(b)), the hook end 3955 of the rod 3953 can have the elongated portion 3955A perpendicular to the parallel hookable feature 3981A of the hook receptacle 3981.

In FIGS. 39B(a) and 39B(b), the elongated portion 3955A of the hook end 3955 can be rounded to be less than a circle 3958, which is defined by the farthest point of the elongated portion with respect to the axis of rotation. That way, when the rod rotates, the circle 3958 represents a largest that the hook end occupies.

In FIGS. 39C(a) and 39C(b), the bottom portion 3957 of the hook end 3955 can be rounded, such as to present a minimum contact with the bottom side of the hook. The bottom portion 3957 can include an arc having a small radius, protruded from the bottom side of the hook end. The length or diameter of the arc can be less than 50%, less than 40%, less than 30%, less than 20%, or less than 10% of the dimension of the rod. That way, when the rod rotates, the rod can experience a minimum friction due to the minimization of contact surface area.

FIGS. 40A-40D illustrate a toggling configuration of the locking mechanism according to some embodiments. A clamping device 4000 can be used for lifting and transferring objects, using a linkage mechanism between a pulling element coupled to a hoist and the jaws of the clamping device. The linkage mechanism can include a scissor mechanism in which two scissor arms 4030 can pivot around a pivot point 4031. One ends of the scissor arms can be coupled together to the pulling element 4010. The other ends of the scissor arms can be coupled to two jaws 4060 and 4040. When the pulling element is pulled up with respect to the pivot point, the pulling force on the ends of the scissor arms can move the jaws together for clamping on an object 4020 disposed between the jaws. When the pulling element is lowered down with respect to the pivot point, the lowering force on the ends of the scissor arms can move the jaws away from each other to separate the distance between the jaws, effectively releasing the object.

An automatic locking mechanism can be installed in the clamping device. The automatic locking mechanism can be configured to enable and disable the linkage mechanism, such as the scissor mechanism in the scissor clamping device. For example, the locking mechanism can secure a component of the linkage mechanism to a body of the clamping device, thus can effectively prevent the linkage mechanism from moving. In this state, the clamping device cannot actuate the jaws by pulling or lowering the pulling device. Alternatively, the locking mechanism can secure components of the linkage mechanism, such as securing two portions 4030A and 4030B of scissor arm 4030. When the portion 4030A is fixed with portion 4030B, one end of the scissor arms cannot move when the pulling element is pulled up or lowered down, effectively disable the linkage mechanism.

A scissor clamping device can have an automatic locking mechanism 4050, which can include 2 portions 4051 and 4052, which can be secured together (in locked or engaged stated), or can be separated from each other (in unlocked or disengaged state). The locking mechanism can be a toggle mechanism, which can change between locked and unlocked states after being triggered or activated. The trigger or activation can be a force acting on one or both portions 4051 and 4052 of the locking mechanism. With the locking mechanism incorporated into the scissor clamping device, a force on the pulling element can activate the toggling process between the locked and unlocked states.

The locking mechanism can include a hook rod 4053 and a mating hook receptacle 4081. The hook rod can have a hook end 4055, such as an asymmetric shape, e.g., a shape having an elongated portion and a shortened portion, such as an oval or a rectangular shape. The hook receptacle can have a mating hook end 4081A that is configured to hook/secure or unhook/release on the hook end of the hook rod. Thus, when the rod rotates, the locking (hooked) and unlocking (released) states can be toggled. For example, the rod can be positioned so that the elongated portion of the hook end engaged with the mating hook end of the hook receptacle, locking the rod with the hook receptacle. When the rod rotates 90 degrees, the elongated portion is now parallel with the hook receptacle, and the shortened portion does not engage with the hook end of the hook receptacle. This releases the rod from the hook receptacle. Rotating the rod 90 degrees again, in either rotation direction, can re-engage the lock by mating the elongated portion with the hook.

The automatic locking mechanism can include two slanting surface elements, such as annular elements 4071 and 4076 each having one or more slanting surface in the form of helical surfaces. The hook rod can be disposed between the annular elements and can travel along an axis of the annular elements. One or more slanting surface interacting element, such as protruded pin 4054, can be disposed facing the slanting surfaces of the annular elements.

As shown, the annular elements can be configured so that the slanting surfaces are facing each other, with the protruded element disposed between the slanting surfaces. The protruded pin can move toward the first annular element, in a first direction, for interacting with the slanting surfaces of the first annular element. The protruded pin can move toward the second annular element, in an opposite direction with the first direction, for interacting with the slanting surfaces of the second annular element. The locking mechanism can be similar to the configuration shown in FIGS. 5A-5D.

Alternatively, the annular elements can be configured so that the slanting surfaces are facing away from each other. There can be two protruded pins, with a first protruded pin disposed facing the slanting surfaces of the first annular element, and a second protruded pin disposed facing the slanting surfaces of the second annular element. The first protruded pin can move toward the first annular element, in a first direction, for interacting with the slanting surfaces of the first annular element. The second protruded pin can move toward the second annular element, in an opposite direction with the first direction, for interacting with the slanting surfaces of the second annular element. The first and second annular elements can be integrated together, to form an annular element having slanting surfaces protruded from both sides of the annular element. The locking mechanism can be similar to the configuration shown in FIGS. 9A-9D.

Figures 40A, 40B, 40C, 40D:
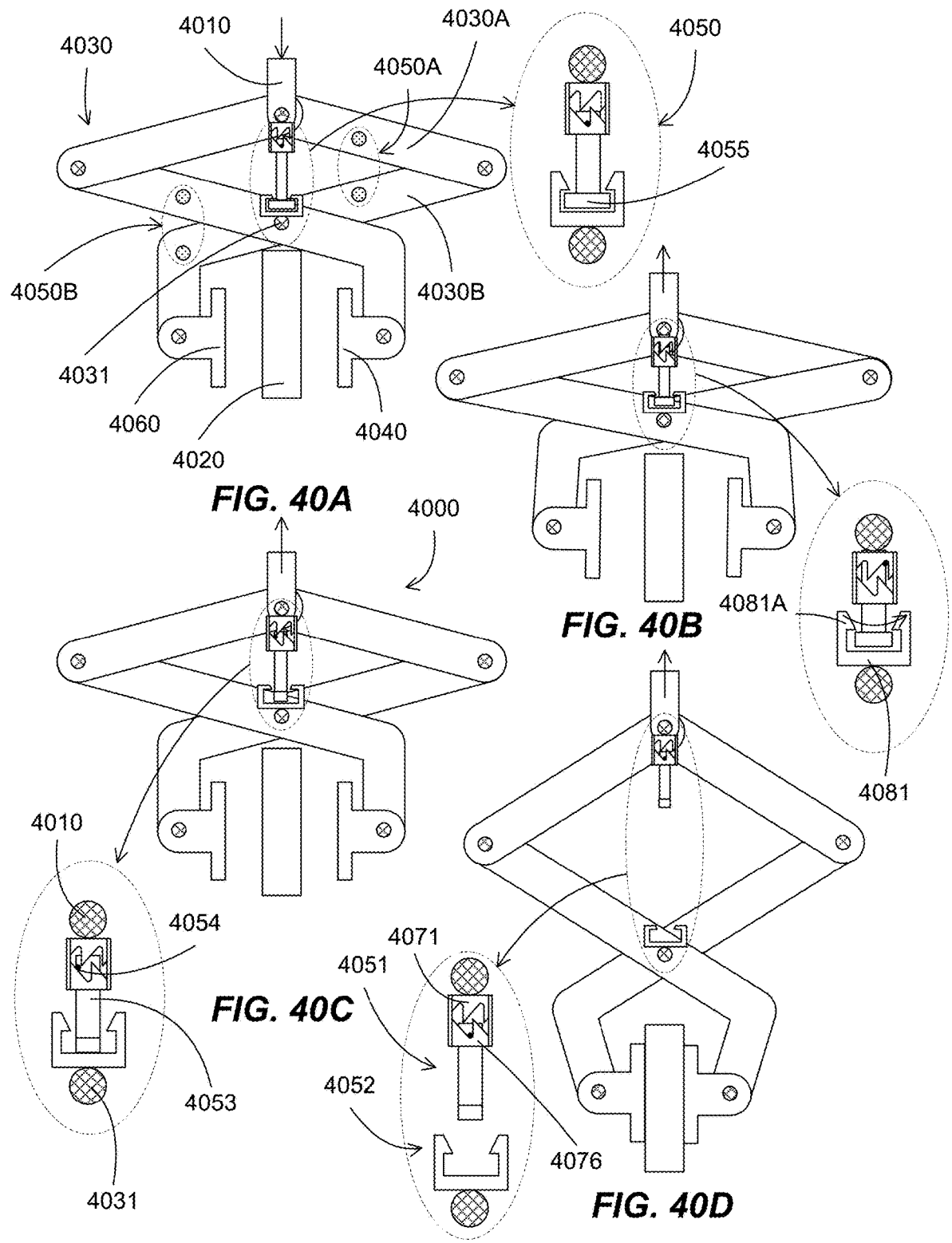
FIGS. 40A-40D illustrate a toggling configuration of the locking mechanism according to some embodiments.

FIG. 40A shows a scissor clamping device having an automatic locking mechanism 4050, such as the locking mechanism shown previously. Other locking mechanism can be used, such as the locking mechanism shown previously. The top portion 4051 of the locking mechanism is coupled to a first portion 4010 of a scissor arm of the clamping device, such as to the pulling element. The bottom portion 4052 of the locking mechanism is coupled to a second portion 4031 of the scissor arm, such as the pivot point. The automatic locking mechanism can be coupled to different portions of the clamping device, such as automatic locking mechanism 4050A coupled to two portions 4030A and 4030B of one side of the scissor arm, or automatic locking mechanism 4050B coupled to two portions 4030B of two sides of the scissor arm.

As shown, the locking mechanism is in an engaged state, e.g., the top portion 4051 is secured to the bottom portion 4052. Thus, the pulling element is secured to the pivot point 4031, e.g., to the body of the clamping device, with only limited movements as configured by the locking mechanism. For example, since the rod 4053 can move between the slanting surfaces of the first and second annular elements 4071 and 4076, for toggling the locking status of the locking mechanism, the pulling element can move with respect to the body of the clamping device for activating or deactivating the locking mechanism. Thus, in the present specification, components are secured together does not mean that the components are rigidly and fixedly attached to each other. The term "components are secured together" can mean that a component of the components cannot move freely relative to another component of the components, such as being removed or separated from each other, and can mean that the components can have limited movements relative to each other.

Due to the locked status of the locking mechanism, the pulling element is secured to the clamping device body. The coupling of the pulling element to the clamping device body can keep the jaws immobilized at a large separation, in order to accept an object between the jaws.

The clamping device can be brought down, for example, by lowering a hoist coupled to the pulling element. The object 4020 can be positioned between the open jaws of the clamping device.

The hoist can lower further, after the clamping device has contacted the object. Since the clamping device has contacted the object, lowering the hoist does not move down the body of the clamping device. Instead, lowering the hoist can move the pulling element down. The first portion 4030A of the scissor arm can move down with respect to the second portion 4030B of the scissor arm. The movement of the first portion 4030A can move the annular element assembly down, until the protruded pin in the rod contact the slanting surface of the top (or second) annular element. The rod can rotate an angle such as 45 degrees.

In FIG. 40B, the hoist can lift up. The first portion 4030A of the scissor arm can move up with respect to the second portion 4030B of the scissor arm. The movement of the first portion 4030A can move the annular element assembly up, until the protruded pin in the rod contact the slanting surface of the bottom (or first) annular element. The rod can rotate another angle such as 45 degrees. The rod can thus rotate a complete angle of 90 degrees, which can switch the locked status to the unlocked status, since the hook end of the rod is no longer be constrained by the hook end of the hook receptacle after a 90 degree rotation.

In FIG. 40C, the hoist can further lift up. Since the locking mechanism is now disabled, pulling on the pulling element can activate the jaws for clamping on the object.

In FIG. 40D, after the jaws clamp on the object, the hoist can further lift up and move to a destination at which the object can be released.

Thus, by bring down and then bring up the pulling element, the locking mechanism changes state from a locked state to an unlock state. There can be pauses between the steps.

FIGS. 41A-41D illustrate another toggling configuration of the locking mechanism according to some embodiments. A clamping device 4100 can have scissor arms 4130 pivotable around a pivot point 4131, linking a pulling element 4110 to two jaws 4160 and 4140.

The clamping device can have an automatic locking mechanism 4150, which can include a first portion 4151 and a second portion 4152. The locking mechanism can include a hook rod 4153 having a hook end 4155 and a mating hook receptacle 4181 having a hook end 4181A. The locking mechanism can include two slanting surface elements, such as annular elements 4171 and 4176. One or more slanting surface interacting element, such as protruded pin 4154 in the hook rod, can be disposed facing the slanting surfaces of the annular elements.

FIG. 41A shows a scissor clamping device having an automatic locking mechanism 4150, such as the locking mechanism shown previously. Other locking mechanism can be used, such as the locking mechanism shown previously. The top portion 4151 of the locking mechanism is coupled to a first portion 4110 of a scissor arm of the clamping device. The bottom portion 4152 of the locking mechanism is coupled to a second portion 4131 of the scissor arm. As shown, the locking mechanism is in a disengaged state, e.g., the top portion 4151 is loose from the bottom portion 4152. Thus, the pulling element is free to move with respect to the pivot point 4131, e.g., to the body of the clamping device.

Due to the unlocked status of the locking mechanism, a hoist coupled to the pulling element can lift the clamping device with the jaws clamped on object 4120. The clamping device can be brought down, for example, by lowering the hoist. Without touching the ground, the clamping device and the object move as a unit, through the action of the hoist.

In FIG. 41B, the hoist can bring the clamping device, together with the clamped object, to a destination. The hoist can be lowered to place the object on the ground.

The hoist can lower further, after the object has contacted the ground. Since the object has contacted the ground, lowering the hoist does not move down the body of the clamping device. Instead, lowering the hoist can move the pulling element down. The first portion 4110 of the scissor arm can move down with respect to the second portion 4131 of the scissor arm. The movement of the first portion 4110 can move the first portion 4151 of the locking mechanism down, until the rod contact the mating hook receptacle. Since the locking mechanism is in unlocked state, lowering the pulling element can separate the jaws to release the clamping action on the object. Further, the hook end of the hook rod can enter the hook end of the hook receptacle.

In FIG. 41C, the hoist can lower further, after the hook end of the hook rod has contacted the bottom surface of the hook receptacle. The pulling element is further lowered down, bringing the annular element assembly (the first annular element 4171 and the second annular element 4176, which is coupled as a unit) down with respect to the hook rod, until the protruded pin in the rod contacts the slanting surface of the top (or second) annular element. The rod can rotate 45 degrees, partially securing the hook end of the hook rod with the hook end of the hook receptacle.

In FIG. 41D, the hoist can lift up. The first portion 4110 of the scissor arm can move up with respect to the second portion 4131 of the scissor arm. The movement of the first portion 4110 can move the annular element assembly up, until the protruded pin in the rod contacts the slanting surface of the bottom (or first) annular element. The rod can rotate another angle such as 45 degrees. The rod can thus rotate a complete angle of 90 degrees, which can switch the unlocked status to the locked status, since the hook end of the rod is now fully constrained by the hook end of the hook receptacle after a 90 degree rotation.

The hoist can further lift up and move to a new object for pick up. Since the locking mechanism is locked, the jaws remain separated for ease of accepting the object.

Thus, by bring down and then bring up the pulling element, the locking mechanism changes state from an unlocked state to a lock state. In combination with the process of changing the state from a locked state to an unlock state, an operator can toggle the locking mechanism between locked and unlocked states by bringing down followed by bringing up the pulling element or by the hoist coupled to the pulling element. There can be pauses between the step of bringing down and the step of bringing up.

FIGS. 42A-42C illustrate flow charts for operating a locking mechanism according to some embodiments. In FIG. 42A, operation 4200 toggles between a movable status and an unmovable status for a component of a clamping mechanism of a clamping device. The toggling process is activated when at least one of the jaws of the clamping device is in a vicinity of an opening distance from the other jaw. In the movable status, the component is configured to allow jaws of the clamping device to be movable toward each other to clamp on an object. In the unmovable status, the component is configured to have the jaws remaining opened.

In FIG. 42B, operation 4220 moves a component of a clamping mechanism of a clamping device downward. When the component reaches a position, a toggling mechanism is activated to toggle between a movable status and an unmovable status for at least a jaw of the clamping device. In the movable status, the jaw is configured to be movably reachable toward an object disposed between the jaw and another jaw of the clamping device. In the unmovable status, the jaws are configured to remain opened.

In FIG. 42C, operation 4240 moves a component of a clamping mechanism of a clamping device downward to toggle at least a jaw of the clamping device between movably reachable toward an object disposed between the jaw and another jaw of the clamping device for clamping on the object and remaining opened without clamping on the object.

FIGS. 43A-43B illustrate flow charts for operating a locking mechanism according to some embodiments. In FIG. 43A, operation 4300 moves a hoist coupled to a clamping device downward to contact a surface. The clamping device clamps on an object.

Operation 4310 continues moving the hoist downward to open the jaws to reach an opening distance. When the jaws reach the opening distance, a locking mechanism of the clamping device is toggled from a movable to an unmovable status. In the movable status, the jaws of the clamping device are movable toward each other to clamp on the object. In the unmovable status, the jaws remain opened without clamping on the object. Operation 4320 moves the hoist upward with the jaws opened and not clamping on the object.

In FIG. 43B, operation 4340 moves a hoist coupled to a clamping device downward to contact an object. The jaws of the clamping device clamps are separated at a distance larger than a dimension of the object. Operation 4350 continues moving the hoist downward to toggle a locking mechanism of the clamping device from an unmovable to a movable status. In the movable status, the jaws of the clamping device are movable toward each other to clamp on the object. In the unmovable status, the jaws are opened without clamping on the object. Operation 4360 moves the hoist upward so that the jaws clamp on the object.

In some embodiments, the present invention discloses an automatic locking mechanism for a clamping device, with the clamping device using a clamping mechanism to clamping on an object. The automatic locking mechanism can activate and deactivate, e.g., toggling clamping mechanism between an operational state, in which the clamping mechanism is operational, and an inoperational state, in which the clamping mechanism is disable.

The automatic locking mechanism can include three elements, which can include a first element which can be fixedly coupled to a first component of the clamping device, a second element which can be fixedly coupled to a second component of the clamping device, and a third element movably but not separably coupled to the first element. The first and second components can be movable components of the clamping mechanism, such as two components of a linkage that couples a pulling element of the clamping device to the jaws of the clamping device. When the linkage is movable, e.g., the first component is movable relative to the second component, the linkage is enable, e.g., the jaws follow the movements of the pulling element. For example, when the pulling element is lifted up, such as by a hoist coupled to the pulling element, the jaws can move toward each other, for clamping on an object.

The automatic locking mechanism can activate the linkage of the clamping mechanism, by allowing the first and second components movable relative to each other. The automatic locking mechanism can deactivate the linkage of the clamping mechanism, by coupling the first and second components together, such as securing the first component with the second component, with an optional backlash distance of movements between the first and second components.

The activation and deactivation of the linkage can be accomplished by toggling the automatic locking mechanism between a coupling configuration, in which the automatic locking mechanism causes the first component to be coupled to and not separatable from, the second component, and a separatable configuration, in which the automatic locking mechanism causes the first component to be separatable from the second component.

The first element can include a toggle element, which can function to toggle the automatic locking mechanism between the coupling configuration and a separatable configuration. The toggle element can include slanting surfaces for converting vertical movements or forces to a rotational movement or force. The vertical movements or forces can be provided by the clamping device, for example, by an operator operating a hoist coupled to the clamping device. A downward movement or force can be accomplished by the hoist lowering the clamping device on an object, including actions of the clamping device contacting the object. An upward movement or force can be accomplished by the hoist raising the clamping device.

The downward and upward movements or forces can be used by the toggle element to rotatably activate and deactivate a latching element, which can deactivate and activate, respectively, the locking mechanism. The latching element can include the third element, which can be coupled or separated from the second element of the locking mechanism, by the rotational movements.

The toggle element can include one or more annular elements, having two sets of teeth, which can be configured to face each other, or to face away from each other. Each tooth can include a valley area, a slanting surface rising from the valley area, and an abrupt surface going down toward a valley area of an adjacent tooth. The slanting surface and the abrupt surface can join at a peak of the tooth.

Each set of teeth can be arranged around the annular element, such as cyclically arranged. For example, there can be 4 teeth for the first set of teeth surrounding a base of the annular element. The second set of teeth can also include 4 teeth surrounding a base of the same annular element, with the first and second sets of teeth are configured to face away from each other. Alternatively, the second set of teeth can also include 4 teeth surrounding a base of another annular element. The two annular elements can be spaced apart, so that the two sets of teeth are facing each other.

The first and second sets of teeth can be configured so that a valley area of a tooth in the first set of teeth is aligned with a slanting surface of another tooth in the second set of teeth. The alignment can be along an axis of rotation of the annular element. The first and second sets of teeth can be configured so that a valley area of a tooth in the second set of teeth is aligned with a slanting surface of another tooth in a first set of teeth. The alignment can be along an axis of rotation of the annular element.

Thus, the valley area of each tooth can be facing the slanting surface of another tooth (in the case of two annular elements, spaced apart with the two sets of teeth facing each other), or the valley area can be facing away from the slanting surface of another tooth (in the case of only one annular element having two sets of teeth facing in opposite directions).

The second element can include a portion of the latch element, e.g., one component of the latch element that can be latched to or released from another component of the latch element.

The portion of the latch element can include a receptacle element, which has a hookable feature, such as two parallel hooks facing each other and disposed in two sides of the receptacle element. The hookable feature, e.g., the parallel hooks, can be configured to be coupled to another component of the latch element, such as the third element of the automatic locking mechanism.

The third element can include the other portion of the latch element, the component of the latch element that can be configured to be latched to or released from the receptacle element, e.g., the parallel hooks. The third element can include a rod, with a hook end at or near an end of the rod for latching to the second element, e.g., to the receptacle or the parallel hooks. For example, the hook end can include an elongated end portion disposed perpendicular to the axis of the rod. The elongated end portion can have an ellipse or rectangular shape, e.g., having a long side and a short side perpendicular to the rod. The hook end can be configured to toggle to with the receptacle, e.g., with the parallel hooks. The hook end can be toggled between the coupling configuration and the separatable configuration.

In the coupling configuration, the hook end is coupled to the receptacle so that the long side of the hook end is perpendicular to the parallel hooks, thus the rod is coupled to the receptacle, and cannot be separated from the receptacle.

In the separatable configuration, the hook end faces the receptacle in such a way so that the long side of the hook end is parallel to the parallel hooks, thus the hook end can be removed from the parallel hooks, e.g., the rod can be separated from the receptacle.

The third element can be disposed in the annular elements. For example, the third element can have a rod shape, such as a rod with a hook end. The rod can be inserted in the hollow portions of the annular elements. For example, in the case of two annular elements spaced from each other, the annular elements can be concentric, with the rod also concentric with the annular elements, e.g., the axes of the rod and the annular elements are the same axes. In the case of one annular element, the rod and the annular element can be concentric.

The rod can have one or more protruded elements, such as one or more pins passing through the rod. The pins can be configured to interface with the slanting surfaces of the teeth, such as moving on the slanting surface. The pins can have a length of the same size as the width of the slanting surface. Since the pins pass through the rod, such as passing through a center of the rod, the pins can protruded at both sides of the rod. The teeth thus can be configured so that both sides of the pins, e.g., two portions of the pins that protruded from two sides of the rod, rest on two slanting surfaces of two opposite teeth, e.g., two teeth across the axis of the annular elements.

The pins can interface with the slanting surfaces of the first and second sets of teeth in such as way so that under a force causing the pins to contact a slanting surface, e.g., a slanting surface of a tooth of the first or second set of teeth, the pins move along the slanting surface to rest at the valley area at the bottom of the slanting surface. The movement of the pins along the slanting surface can cause the rod to rotate an angle, such as between 40 and 50 degrees, such as 45 degrees.

The force can be a vertical force, such as a downward force or an upward force. A combination of a downward and an upward forces can cause the pins to first contact a slanting surface of a tooth in a first set of teeth, followed by contacting a slanting surface of another tooth in a second set of teeth. The combination can cause the rod to rotate twice, forming a rotation of about 90 degrees, and thus toggling the hook end between the separatable configuration and the coupling configuration with the hookable feature.

In some embodiments, the hook end can have a contact point with minimum area, such as a sharp point, or a round point at a center end of the rod. Thus the rod can rotate on the contact point, for example, that contacts a surface of the receptacle. The rod can be perpendicular to the receptacle. The rod can be separated from the receptacle, and then brought in to contact a surface of the receptacle, such as a contact between the parallel hooks. The rod can then be rotate, on the minimum area contact point, to toggle between the coupling configuration and the separatable configuration. The rotation of the rod on the minimum area contact point can have reduced friction, due to the minimum contact area.

In some embodiments, the automatic locking mechanism can include a sleeve for housing the annular elements. For example, the annular elements can include two annular spaced apart, and disposed in a sleeve. The sleeve can serve to keep the two annular elements at a fixed separation. The annular elements can be fixed to the sleeve, for example, by using pins, or screws to secure the annular elements with the sleeve.

The sleeve can include a support feature, such as a step in the inner surface of the sleeve. The support feature can be configured to support one annular element, such as to prevent the annular elements from moving in one direction, such as the downward direction. The support feature can serve to balance a force acting on the annular elements by the rod. Since the rod can exert a large force downward on the annular element, as compared to a smaller force upward, the support feature can assist in helping the annular element against the downward force.

In the case of two annular elements facing each other and spaced apart from each other, the support feature can support one annular element, such as the bottom annular element, e.g., the annular element closer to the receptacle. In the case of one annular element having two sets of teeth facing in opposite directions, the support feature can support the annular element. There can be two annular elements that are touching each other, instead of one annular element. The support feature can support the bottom annular element.

In some embodiments, the clamping device can have a support feature in a housing of the sleeve. For example, the sleeve can be coupled to the first component of the clamping device. The first component can have a housing, such as a recess, to house the sleeve. Alternatively, the sleeve can be housed in a housing, and the housing can be coupled to the first component. The housing can have a support feature to support the sleeve in a downward direction, such as a step in an inner surface of the housing on which the sleeve is rested, in order to support the sleeve and to prevent the sleeve from moving downward, e.g., toward the receptacle.

In some embodiments, the clamping device can have a support feature in a housing of the annular element. For example, the annular element can be one piece annular element or two piece annular elements that are coupled together. The annular element can be coupled to the first component of the clamping device, without a sleeve. The first component can have a housing, such as a recess, to house the annular element. Alternatively, the annular element can be housed in a housing, and the housing can be coupled to the first component. The housing can have a support feature to support the annular element in a downward direction, such as a step in an inner surface of the housing on which the annular element is rested, in order to support the annular element and to prevent the annular element from moving downward, e.g., toward the receptacle.

In some embodiments, the slanting surfaces of the teeth in the two sets of teeth can be helical curves, such as sections of helical curves, around the annular elements. A tooth can have a helical curve, rising from a valley area, and stopping at a peak of the tooth. The helical curve can have tangent lines forming a constant angle, for example, with the axis of the annular element. The tangent line of the slanting surface, e.g., of the helical curve, can make an angle between 40 and 50 degrees, or 35 and 55 degrees.

In some embodiments, in the case of two annular elements having the two sets of teeth facing each other with a protruded pin disposed in between, the spacing of the two sets of teeth can be configured to have a minimum clearance distance, e.g., the clearance between the two opposite teeth (in two sets of teeth) for the protruded pin to pass through.

In the case of one annular element having the two sets of teeth facing in opposite directions, with two protruded pins sandwiching the two sets of teeth, the spacing of the two protruded pins can be configured to have a minimum clearance distance, e.g., when a protruded pin moves along the slanting surface of a tooth, the clearance on an opposite tooth for an opposite protruded pin to pass through the opposite tooth.

In some embodiments, a tooth of the two sets of teeth is chamfered or rounded. The chamfered or rounded tooth can provide a smaller clearance distance, either between two annular elements sandwiching a protruded pin, or between two protruded pins sandwiching an annular element. The chamfered plane of one tooth can be parallel to the tangent of the opposite tooth to obtain the minimum clearance distance.

In some embodiments, the abrupt surface can be formed or chamfered to form an angle greater than zero with the axis of rotation.

In some embodiments, the automatic locking mechanism can be used in a clamping device using a half scissor mechanism with at least a stationary jaw coupled to a body, and at least a movable jaw coupled to a scissor arm. A first part of the automatic locking mechanism can be coupled to a first arm of the scissor arm. A second part of the automatic locking mechanism can be coupled to the body or to a second arm of the scissor arm.

The automatic locking mechanism can be used in a clamping device using a scissor mechanism comprising two arm assemblies for moving two opposite jaws. A first part of the automatic locking mechanism can be coupled to the slanting surface element or to a first arm of an arm assembly of the two arm assemblies. A second part of the automatic locking mechanism can be coupled to a second arm of the arm assembly of the two arm assemblies or to a third arm of another arm assembly of the two arm assemblies.

The automatic locking mechanism can be used in a clamping device using a scissor mechanism comprising two arm assemblies for moving two opposite jaws. A first part of the automatic locking mechanism can be coupled to a first arm of an arm assembly of the two arm assemblies. A second part of the automatic locking mechanism can be coupled to a second arm of the arm assembly of the two arm assemblies or to a third arm of another arm assembly of the two arm assemblies.

The automatic locking mechanism can be used in a clamping device having a puling element having a roller to roll on a slanting surface element to move a movable jaw against a stationary jaw. A first part of the automatic locking mechanism can be coupled to the pulling element or to the roller. A second part of the automatic locking mechanism can be coupled to a body of the clamping device.

In some embodiments, the frit element of the automatic locking mechanism can include two annular elements or one annular element. In the case of two annular elements, the two annular elements each can have a set of teeth arranged on a circumference of the annular element. The two annular elements can be configured to be spaced apart, with the two sets of teeth facing each other. Alternatively, the two annular elements can be coupled together, with the two sets of teeth facing opposite directions.

In the case of one annular element, the annular element can have two sets of teeth arranged on one or two circumferences of the annular element. The two sets of teeth can be configured to face opposite directions.

For the configurations in which the two sets of teeth face each other, there can be a protruded pin disposed between the two sets of teeth. The protruded pin can be coupled to a rod.

For the configurations in which the two sets of teeth face in opposite directions, there can be two protruded pins sandwiching the two sets of teeth. The protruded pins can be coupled to a rod.

Figure 44:
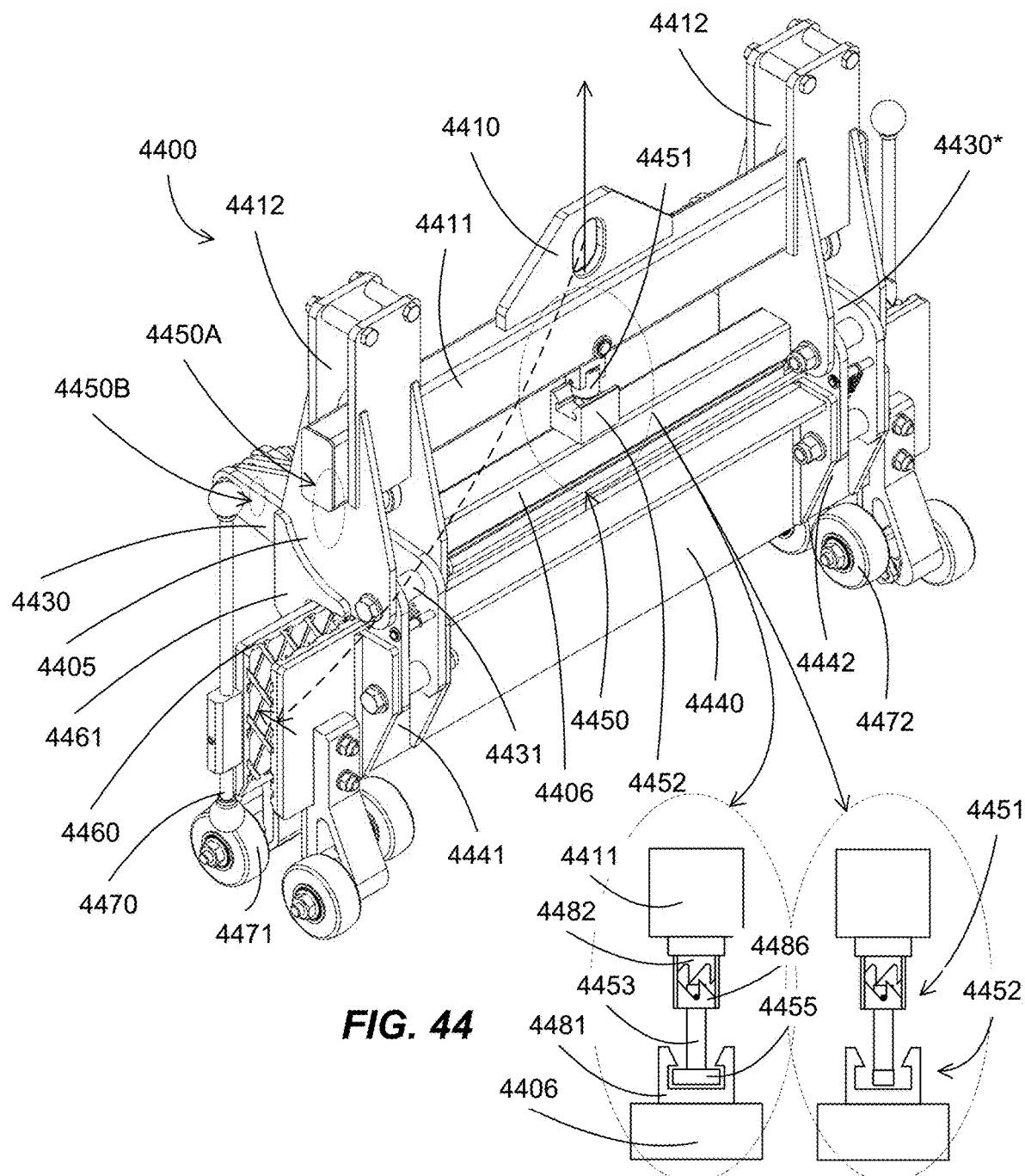
FIG. 44 illustrates a clamping device according to some embodiments.

FIG. 44 illustrates a clamping device according to some embodiments. The clamping device 4400 can use a half scissor mechanism, e.g., one jaw is fixed, and the opposite jaw is coupled by a scissor mechanism to a pulling element. For example, a half scissor mechanism 4430 can couple a movable jaw 4441 to move against a stationary jaw 4461.

The clamping device can include multiple half scissor mechanisms 4430 and 4430*, with each half scissor mechanism coupled to a movable jaw opposite a stationary jaw. Optional elongated jaw plates 4440 and 4460 can be coupled to multiple jaws at a same side, such as jaw plate 4440 is coupled to the moving jaws 4441 and 4442.

The stationary jaws, such as jaw 4461, can be fixed coupled to a body 4405 of the clamping device. The half scissor mechanism can include a pivot point 4431, also fixedly coupled to the body 4405. A jaw arm coupled to the pivot point can be coupled to the movable jaw 4441. An activation arm coupled to the pivot point can include a scissor joint. Thus, when the activation arm is pulled up, the scissor joint is activated. Due to the pivot point, the jaw arm is moved when the activation arm is moved, which can move the jaw 4431 toward the opposite jaw 4461.

A connecting bar 4411 can be connected to ends of the activation arms of the multiple half scissor mechanisms 4430 and 4430*, for example, to actuating all the half scissor mechanisms together. The scissor mechanism 4430 can include multiple guides 4412 to guide the connecting bar 4411 into proper movements for actuating the half scissor mechanisms. A pulling element 4410 can be coupled to the connecting bar 4411. When the pulling element is pulled up, the connecting bar also moves up, pulling on the activation arms of the half scissor mechanisms. Through the pivot points, the movable jaws move toward the opposite jaws, pressing the movable jaw plate 4440 toward the stationary jaw plate 4460.

Thus the clamping device can have a linkage mechanism, linking the pulling element 4410 with the jaw plate 4440. Pulling on the pulling element can move the movable jaw plate toward the stationary opposite jaw plate. Releasing the pull on the pulling element can move the movable jaw plate in the opposite direction, for example, due to gravitation. The linkage mechanism can include the connecting bar, coupled to the activation arms, coupled to the pivot points, and coupled to the jaw arms.

A locking mechanism 4450 can be included, for hand-free actuating the clamping device using the multiple half scissor mechanisms. The locking mechanism can allow or prevent the engagement of the half scissor mechanisms, e.g., allowing or prevent the linkage mechanism between the pulling element and the jaw plate. When the locking mechanism is activated or locked, the linkage mechanism is prevented or disable, meaning pulling on the pulling element does not move the jaw plate. When the locking mechanism is deactivated or unlocked, the linkage mechanism is allowed or enable, meaning pulling on the pulling element move the jaw plate toward the opposite jaw plate.

The locking mechanism can include a top part 4451, which can be locked to or release from the bottom part 4452. The top part 4451 can be secured to the pulling element 4410 through the connecting bar 4411, e.g., the top part can be secured to the connecting bar, and since the connecting bar is secured to the pulling element, the top part can move as a unit together with the pulling element. The bottom part 4452 can be secured to the body 4405 of the clamping device, such as to a connecting bar 4406 coupling two portions of the body. The top part can include a movable rod having an elongated head, which can be locked to or released from a mated hook in the bottom part.

The automatic locking mechanism can be coupled to different portions of the clamping device, such as automatic locking mechanism 4450A coupled to the connecting bar 4411 and the body 4405 of one side of the scissor arm, or automatic locking mechanism 4450B coupled to two portions 4430 of one side of the scissor arm.

The top part 4451 can include a rod 4453 having an elongated head 4455. The elongated head can have one side longer than a side perpendicular to it, such as an ellipse shape or a rectangular shape. If the elongated head has the longer side disposed within the hook 4481 of the bottom part 4452, the rod can be secured to the hook, forming a lock status in which the top part is secured to the bottom part. If the elongated head has the shorter side disposed within the hook 4481 of the bottom part 4452, the rod can be movable out of the hook, forming an unlock status in which the top part can be moved from the bottom part.

The top part can include annular elements 4482 and 4486 having slanting surfaces, which can be mated with protruded pin on the rod. The annular elements and the protruded pin can be configured so that when the rod is pushed into and released out of the annular elements, the rod can rotate an angle such as 90 degrees, to toggle between longer side and shorter side, e.g., toggle between a lock status and an unlock status.

When the locking mechanism is engaged, meaning the top part is locked into the bottom part, the pulling element is fixedly coupled to the body of the clamping device. Thus the pulling element cannot move to activate the half scissor mechanisms, and the movable jaw plate is stationary when pulling on or lowering the pulling element.

When the locking mechanism is disengaged, meaning the top part is unlocked from the bottom part, the pulling element is freely to move with respect to the body of the clamping device. Thus the pulling element can move to activate the half scissor mechanisms, and the movable jaw plate can move toward or away from the opposite jaw plate when pulling on or lowering the pulling element, respectively.

The clamping device can have other options, such as a contact mechanism 4470 to visually detecting the object, for example, when the clamping device moves toward the object for clamping. The contact mechanism can be particular useful for transparent objects, such as glass plates, which can be difficult for the operator to see the edge of the plates. The clamping device can include roller feet 4471 for rolling the scissor clamp, for example, for moving between places on the ground. The clamping device can include a guiding mechanism 4472 for guiding objects toward the space between the stationary jaw and the movable jaw.

Figure 45A:
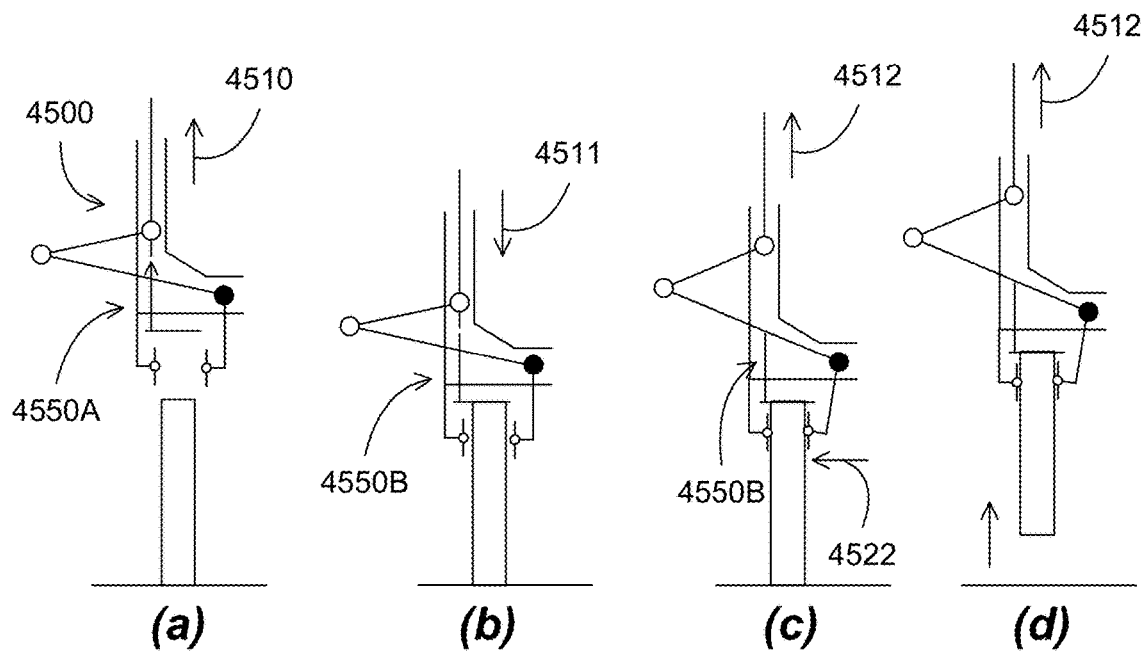
FIGS. 45A-45B illustrate processes for operating a clamping device according to some embodiments.
Figure 45B:
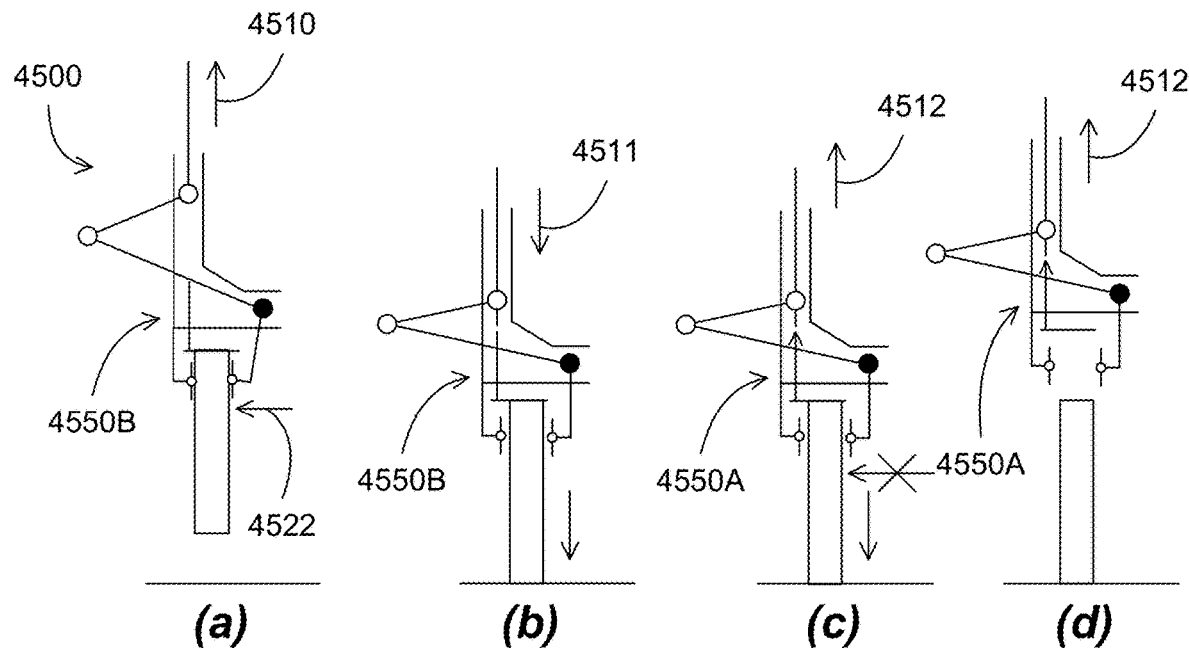

FIGS. 45A-45B illustrate processes for operating a clamping device according to some embodiments. The clamping device 4500 can include a locking mechanism that can automatically lock and release the jaws.

FIGS. 45A(a)-45A(d) show a process for an empty clamping device to pick an object. In FIG. 45A(a), the locking mechanism is engaged 4550A, securing the opening of the jaws, e.g., the jaws are separated at a fixed distance, regardless of movements of the clamping device. Thus, when the clamping device is lifted up 4510 and moved to approaching the object, the distance between the jaws is unchanged.

In FIG. 45A(b), the clamping device is moved to be positioned on the object. Since the locking mechanism is engaged, the space between the jaws is large to accommodate the object. The clamping device then can be lowered so that the object is disposed between the jaws.

The clamping device is lowered 4511 enough to touch the object. A pulling element can then be further lowered, with respect to the body of the clamping device, to partially unlock the locking mechanism. For example, a top part of the locking mechanism can move down (since the top part is secured to the pulling element), so that a rod is moved up. Annular elements with slanting surfaces in the top part can partial rotate the rod, for example, through protruded pins coupled to the rod.

In FIG. 45A(c), the pulling element is lifted up 4512. At the beginning, the top part of the locking mechanism can move up (since the top part is secured to the pulling element), so that the rod is moved down. Annular elements with slanting surfaces in the top part can partial rotate the rod again through protruded pins coupled to the rod. The complete rotation can be 90 degrees, thus can release the rod from a hook in a bottom part of the locking mechanism.

The pulling element is then further lifted up. Since the locking mechanism is unlocked, the linkage mechanism is activated, and the jaws move toward each other for clamping 4522 on the object.

In FIG. 45A(d), the lifting of the pulling element will also lift the object after the jaws clamp on the object. The clamping device can lift and move the clamped object to a destination.

FIGS. 45B(a)-45B(d) show a process for a clamping device clamping on an object to release the object at a destination.

In FIG. 45B(a), the locking mechanism is disengaged 4550B, allowing the jaws to move when the clamping device is lifted up. Thus, when the clamping device is lifted up 4510 and moved, the jaws clamp on the object to secure the object to the clamping device.

In FIG. 45B(b), the clamping device is moved to a destination for dropping the object. The clamping device can be lowered 4511 until the object touches the ground. The pulling element can be further lowered while the body of the clamping device is stationary by contacting the object. The lowering of the pulling element can enlarge the distance between the jaws, e.g., increasing the separation between the jaws.

When the jaws are separated at a predetermined distance, such as a maximum distance, the top part of the locking mechanism can contact the bottom part of the locking mechanism, such as the elongated head of the rod can contact the hook of the bottom part. Since the locking mechanism is disable, the shorter side of the elongated head is facing the hook, thus the elongated head can enter the hook without any obstacle.

The lowering of the pulling element can lower the top part, thus moving the rod upward. The contact of the protruded pins with the slanting surfaces of the annular elements can partially rotate the rod.

In FIG. 45B(c), the pulling element is lifted up 4512. At the beginning, the top part of the locking mechanism can move up (since the top part is secured to the pulling element), so that the rod is moved down. The contact of the protruded pins with the slanting surfaces of the annular elements can partially rotate the rod again. The complete rotation can be 90 degrees, thus can secure the rod to the hook in a bottom part of the locking mechanism, e.g., the rod is rotated so that the longer side mates with the hook to secure the rod with the hook.

The pulling element is then further lifted up. Since the locking mechanism is locked, the linkage mechanism is deactivated, and the jaws are stationary, e.g., fixed in the separated state.

In FIG. 45B(d), the clamping device is lifted up. Since the jaws are separated, the object is left at the destination, and only the empty clamping device is moved. The clamping device is ready to move for approaching a new object for pick up.

Figure 46:
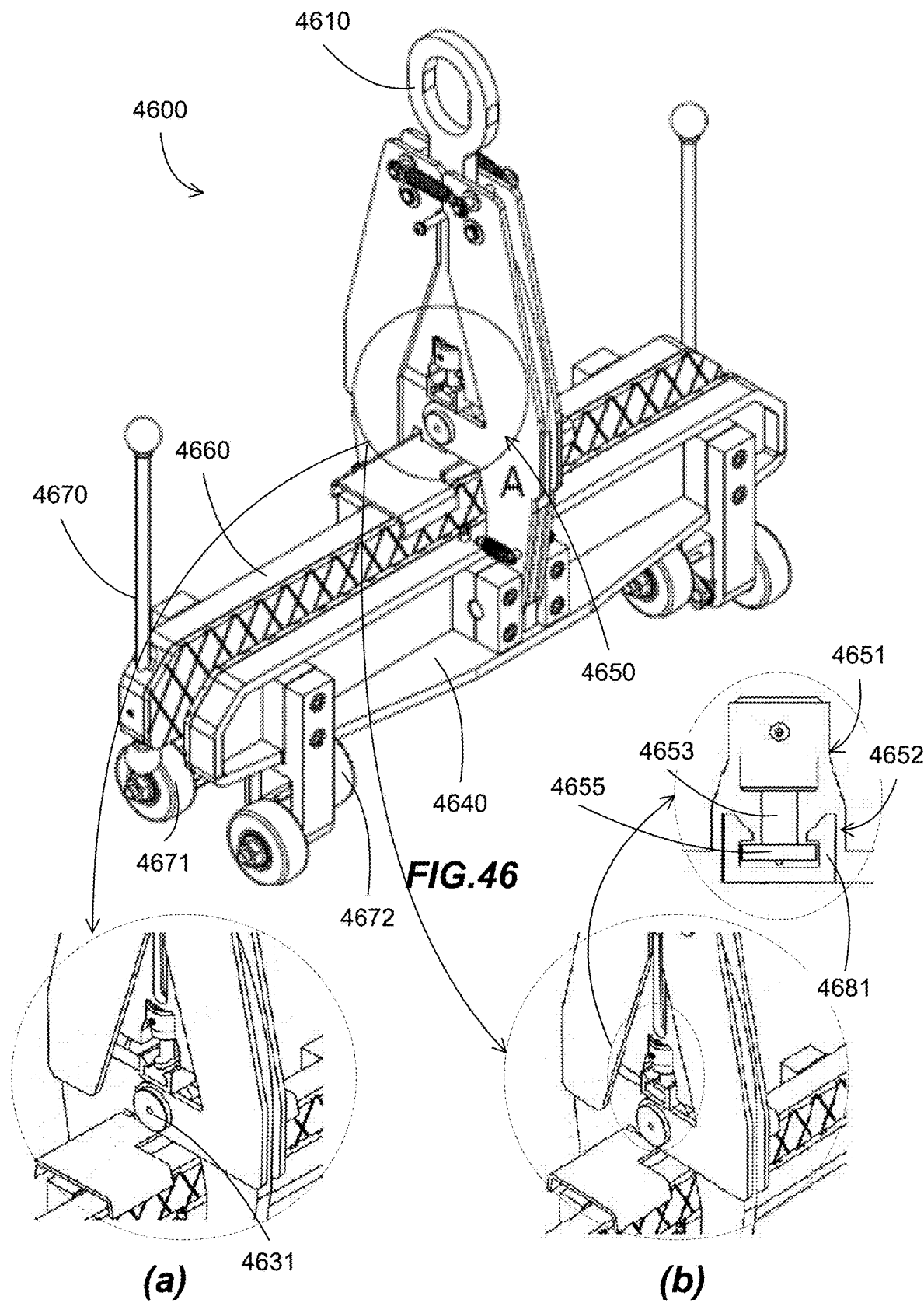
FIG. 46 illustrates a clamping device according to some embodiments.

FIG. 46 illustrates a clamping device according to some embodiments. The clamping device 4600 can use a slanting interface mechanism, e.g., a pulling element having a slanting surface can be coupled to scissor arms to move clamping jaws. For example, a triangle pulling element can employ the slanting sides to extend or retract two scissor arms, which can pivot around a pivot point 4631 to move opposite jaws.

The clamping device can include elongated jaws 4640 and 4660. The clamping device can include a pulling element 4610, which can activate scissor arms around a pivot point. Thus, when the pulling element is pulled up, the scissor arms can extend. Due to the pivot point, the jaw arm can move when the scissor arms extend, which can move the jaws for clamping on an object.

Thus the clamping device can have a linkage mechanism, linking the pulling element 4610 with the jaws 4640 and 4660. Pulling on the pulling element can move the jaws together. Releasing the pull on the pulling element can separate the jaws, for example, due to gravitation.

A locking mechanism 4650 can be included, for hand-free actuating the clamping device. The locking mechanism can allow or prevent the engagement of the linkage mechanism between the pulling element and the jaws. When the locking mechanism is activated or locked, the linkage mechanism is prevented or disable, meaning pulling on the pulling element does not move the jaws. When the locking mechanism is deactivated or unlocked, the linkage mechanism is allowed or enable, meaning pulling on the pulling element move the jaws together.

The locking mechanism can include a top part 4651, which can be locked to or release from the bottom part 4652. The top part 4651 can be secured to the pulling element 4610. The bottom part 4652 can be secured to the pivot point 4631. The top part can include a movable rod having an elongated head, which can be locked to or released from a mated hook in the bottom part.

The top part 4651 can include a rod 4653 having an elongated head 4655. The top part can include annular elements having slanting surfaces, which can be mated with protruded pins on the rod. The annular elements and the protruded pins can be configured so that when the rod is pushed into and released out of the annular elements, the rod can rotate an angle such as 90 degrees, to toggle between longer side and shorter side, e.g., toggle between a lock status and an unlock status.

When the locking mechanism is engaged, meaning the top part is locked into the bottom part, the pulling element is fixedly coupled to the body of the clamping device. Thus the pulling element cannot move to activate the linkage mechanism, and the jaws are stationary when pulling on or lowering the pulling element.

When the locking mechanism is disengaged, meaning the top part is unlocked from the bottom part, the pulling element is freely to move, e.g., separatable with respect to the body of the clamping device. Thus the pulling element can move to activate the linkage mechanism, and the jaws can move toward or away from each other when pulling on or lowering the pulling element, respectively.

The clamping device can have other options, such as a contact mechanism 4670 to visually detecting the object, for example, when the clamping device moves toward the object for clamping. The contact mechanism can be particular useful for transparent objects, such as glass plates, which can be difficult for the operator to see the edge of the plates. The clamping device can include roller feet 4671 for rolling the scissor clamp, for example, for moving between places on the ground. The clamping device can include a guiding mechanism 4672 for guiding objects toward the space between the stationary jaw and the movable jaw.

Figure 47A:
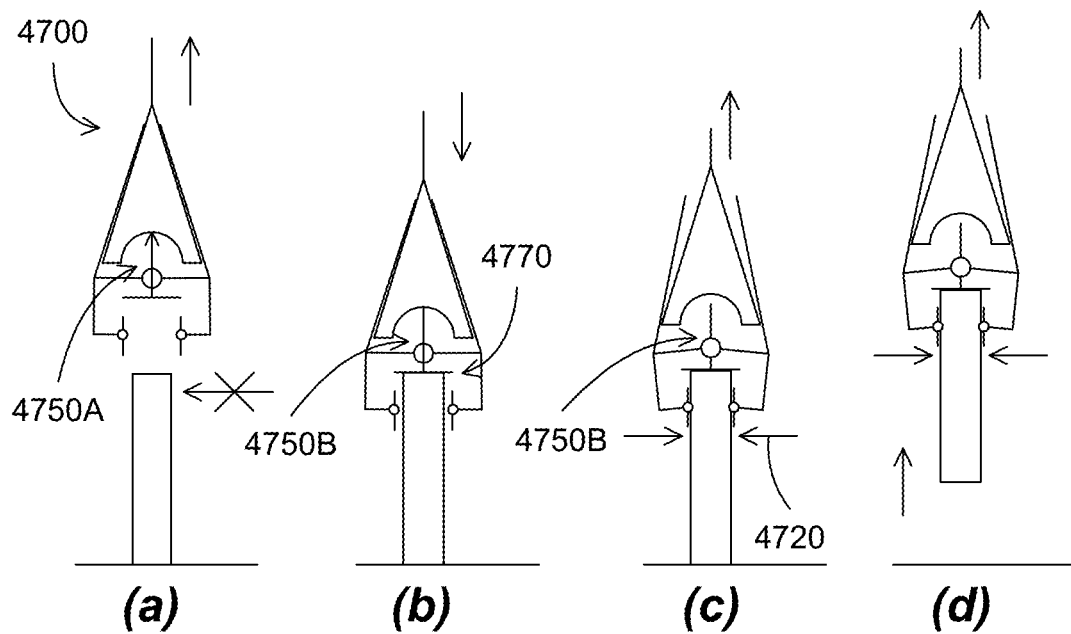
FIGS. 47A-47B illustrate processes for operating a clamping device according to some embodiments.
Figure 47B:
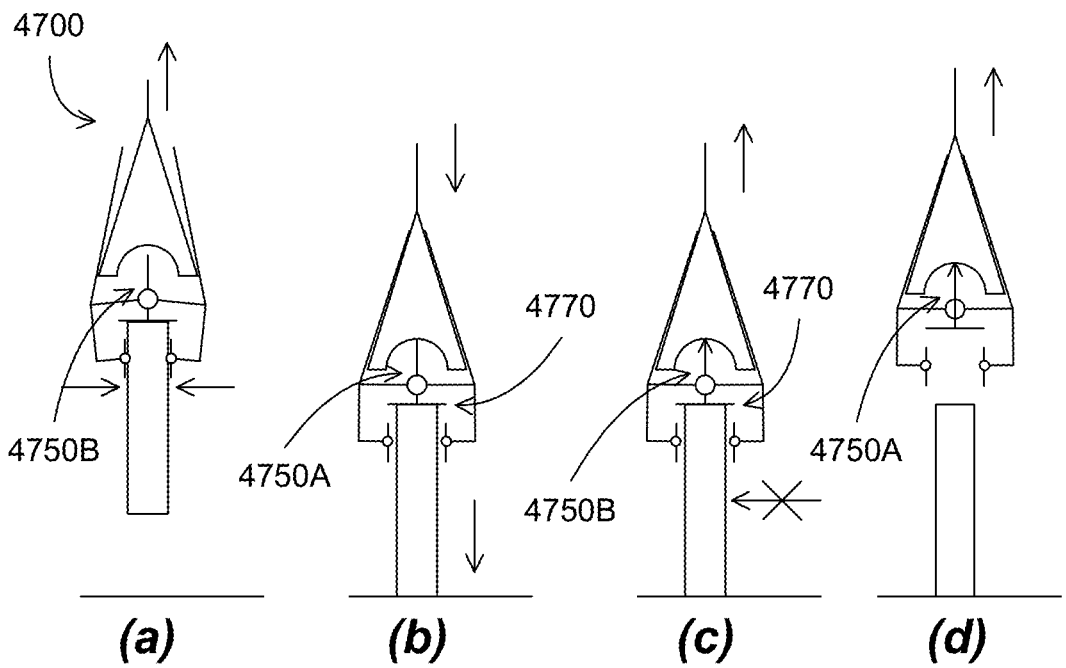

FIGS. 47A-47B illustrate processes for operating a clamping device according to some embodiments. The clamping device 4700 can include a locking mechanism that can automatically lock and release the jaws.

FIGS. 47A(a)-47A(d) show a process for an empty clamping device to pick an object. In FIG. 47A(a), the locking mechanism is engaged 4750A, securing the opening of the jaws. In FIG. 47A(b), the clamping device is moved to place an object between the jaws. A pulling element can then be further lowered, with respect to the body of the clamping device, to partially unlock the locking mechanism. For example, a rod in the locking mechanism can partially rotate.

In FIG. 47A(c), the pulling element is lifted up, and can partial rotate the rod again. The complete rotation can release the rod from a hook in the locking mechanism. The pulling element is then further lifted up to move the jaws for clamping on the object. In FIG. 47A(d), the lifting of the pulling element will also lift the object after the jaws clamp on the object.

FIGS. 47B(a)-47B(d) show a process for a clamping device clamping on an object to release the object at a destination.

In FIG. 47B(a), the locking mechanism is disengaged 4750B. In FIG. 47B(b), the clamping device moves to a destination, and lowers the object to the ground. The pulling element can be further lowered to increase the separation between the jaws. The pulling element can be lowered until the rod pressing on the hook, which can partially rotate the rod.

In FIG. 47B(c), the pulling element is lifted up, and can partial rotate the rod again. The complete rotation can lock the rod to the hook. In FIG. 47B(d), the pulling element is lifted up to move for approaching a new object for pick up.

Figure 48A:
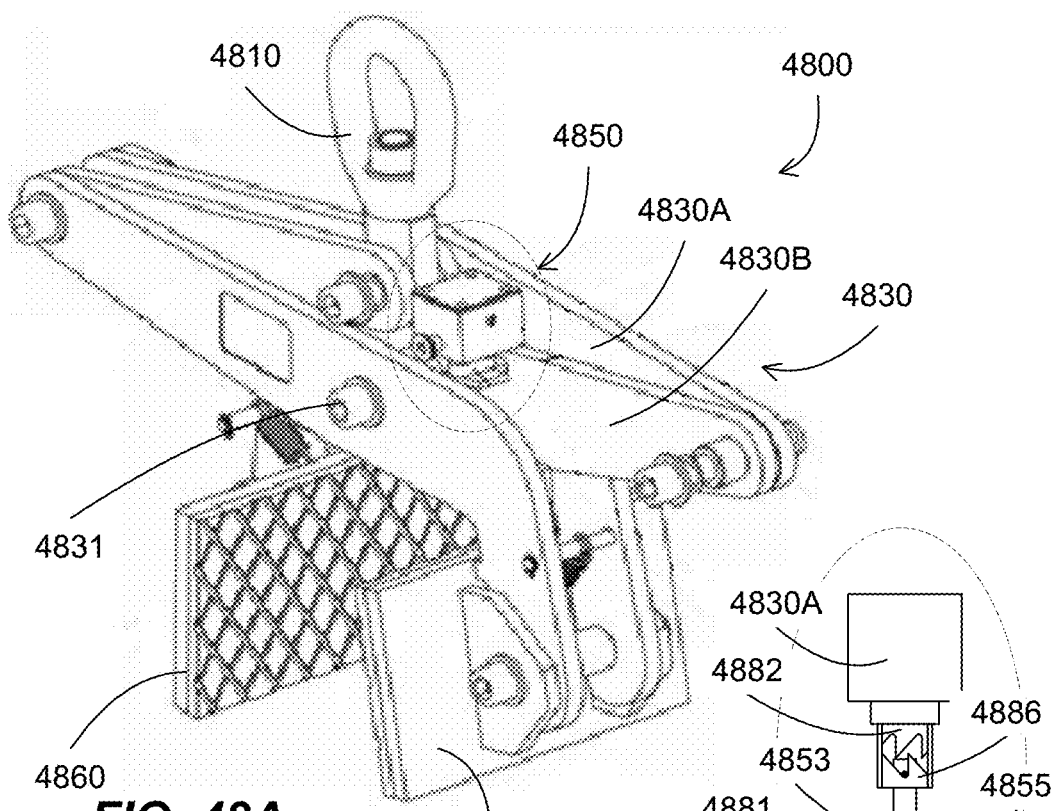
FIGS. 48A-48B illustrate a clamping device according to some embodiments.
Figure 48B:
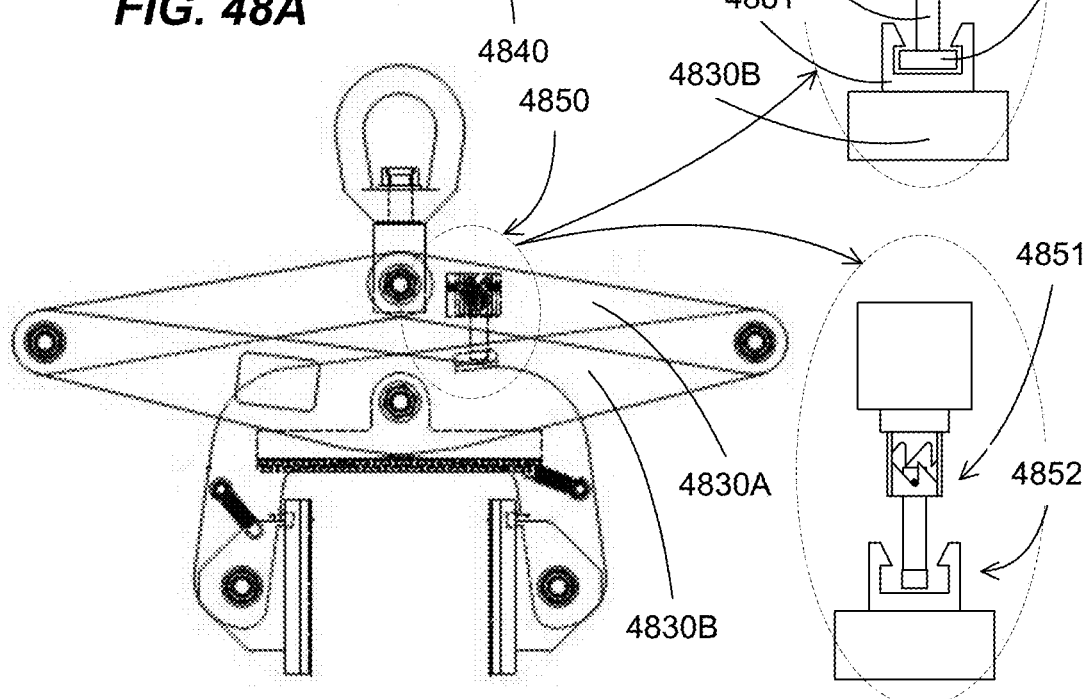

FIGS. 48A-48B illustrate a clamping device according to some embodiments. The clamping device 4800 can use a scissor mechanism, e.g., two jaws are coupled to a scissor mechanism to a pulling element. For example, a scissor mechanism 4830 can couple to jaws 4840 and 4860, so that when a pulling element 4810 is pulled up or released, the jaws move toward each other or away from each other, respectively.

The scissor mechanism can include a pivot point 4831, which is fixedly coupled to the body of the clamping device. The scissor mechanism can include a pulling element arm, which is connected to the pulling element, and a jaw arm, which is connected to the jaw, and rotatable over the pivot joint 4831.

Thus, when the pulling element is pulled up, the scissor mechanism is activated. Due to the pivot point, the jaw arm is moved when the pulling element arm is moved, which can move the jaws together or away from each other.

Thus the clamping device can have a linkage mechanism, linking the pulling element 4810 with the jaws 4840 and 4860. Pulling on the pulling element can move the jaws toward each other. Releasing the pull on the pulling element can move the jaws away from each other, for example, due to gravitation. The linkage mechanism can include the pulling element arms, coupled to the jaw arms through the pivot points.

A locking mechanism 4850 can be included, for hand-free actuating the clamping device using the scissor mechanism. The locking mechanism can allow or prevent the engagement of the scissor mechanism, e.g., allowing or prevent the linkage mechanism between the pulling element and the jaws. When the locking mechanism is activated or locked, the linkage mechanism is prevented or disable, meaning pulling on the pulling element does not move the jaws. When the locking mechanism is deactivated or unlocked, the linkage mechanism is allowed or enable, meaning pulling on the pulling element move the jaws away from each other.

The locking mechanism can include a top part 4851, which can be locked to or release from the bottom part 4852. The top part 4851 can be secured to a pulling element arm 4830A. The bottom part 4852 can be secured to a jaw arm 4830B. The top part can include a movable rod having an elongated head, which can be locked to or released from a mated hook in the bottom part.

The top part 4851 can include a rod 4853 having an elongated head 4855. The elongated head can have one side longer than a side perpendicular to it, such as an ellipse shape or a rectangular shape. If the elongated head has the longer side disposed within the hook 4881 of the bottom part 4852, the rod can be secured to the hook, forming a lock status in which the top part is secured to the bottom part. If the elongated head has the shorter side disposed within the hook 4881 of the bottom part 4852, the rod can be movable out of the hook, forming an unlock status in which the top part can be moved from the bottom part.

The top part can include annular elements 4882 and 4886 having slanting surfaces, which can be mated with protruded pins on the rod. The annular elements and the protruded pins can be configured so that when the rod is pushed into and released out of the annular elements, the rod can rotate an angle such as 90 degrees, to toggle between longer side and shorter side, e.g., toggle between a lock status and an unlock status.

When the locking mechanism is engaged, meaning the top part is locked into the bottom part, the pulling element arm is fixedly coupled to the jaw arm. Thus the pulling element cannot move to activate the scissor mechanism, and the jaws are stationary when pulling on or lowering the pulling element.

When the locking mechanism is disengaged, meaning the top part is unlocked from the bottom part, the pulling element is freely to move, e.g., separatable with respect to the body of the clamping device. Thus the pulling element can move to activate the scissor mechanism, and the movable jaws can move toward or away from each other when pulling on or lowering the pulling element, respectively.

Figure 49A:
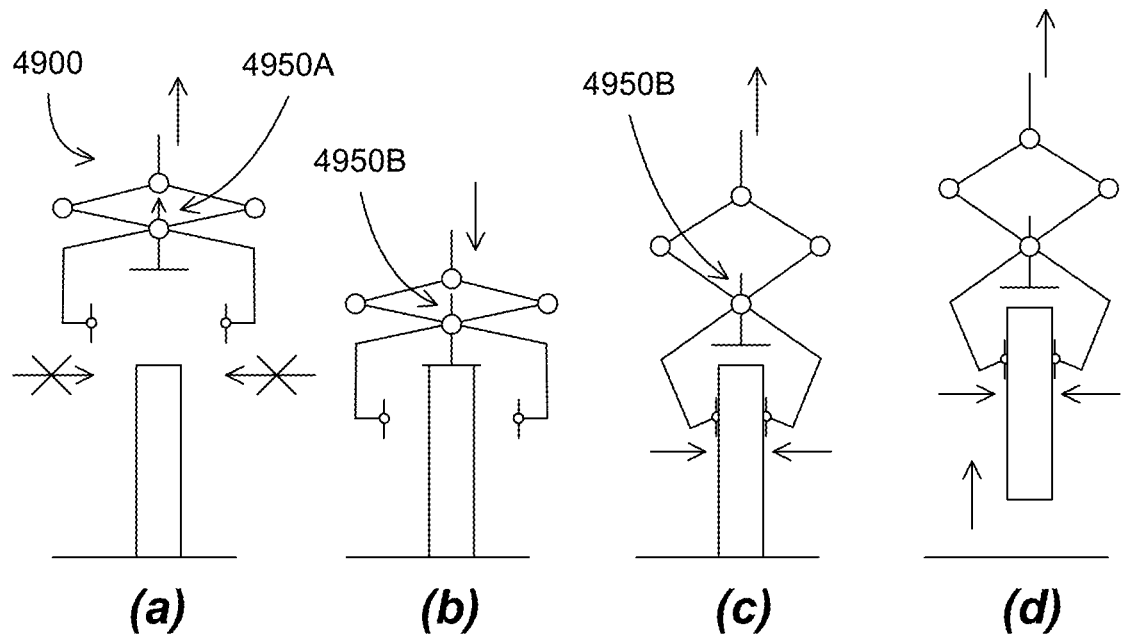
FIGS. 49A-49B illustrate processes for operating a clamping device according to some embodiments.
Figure 49B:
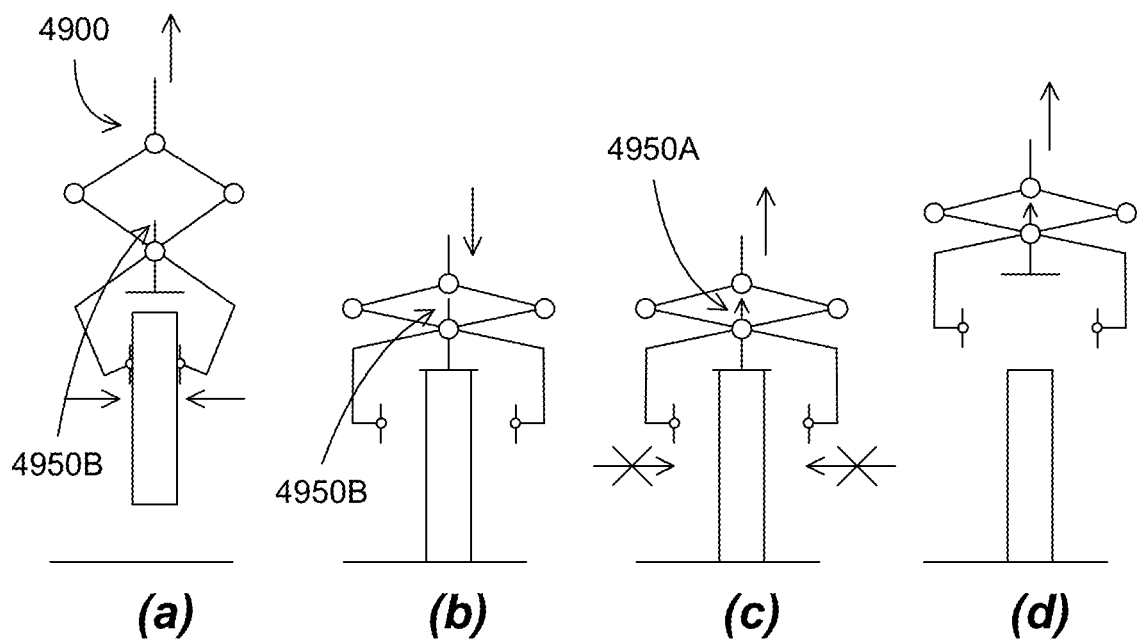

FIGS. 49A-49B illustrate processes for operating a clamping device according to some embodiments. The clamping device 4900 can include a locking mechanism that can automatically lock and release the jaws.

FIGS. 49A(a)-49A(d) show a process for an empty clamping device to pick an object.

In FIG. 49A(a), the locking mechanism is engaged 4950A, securing the opening of the jaws. In FIG. 49A(b), the clamping device is moved to place an object between the jaws. A pulling element can then be further lowered, with respect to the body of the clamping device, to partially unlock the locking mechanism. For example, a rod in the locking mechanism can partially rotate.

In FIG. 49A(c), the pulling element is lifted up, and can partial rotate the rod again. The complete rotation can release the pin from a hook in the locking mechanism. The pulling element is then further lifted up to move the jaws for clamping on the object. In FIG. 49A(d), the lifting of the pulling element will also lift the object after the jaws clamp on the object.

FIGS. 49B(a)-49B(d) show a process for a clamping device clamping on an object to release the object at a destination.

In FIG. 49B(a), the locking mechanism is disengaged 4950B. In FIG. 49B(b), the clamping device moves to a destination, and lowers the object to the ground. The pulling element can be further lowered to increase the separation between the jaws. The pulling element can be lowered until the rod pressing on the hook, which can partially rotate the rod.

In FIG. 49B(c), the pulling element is lifted up, and can partial rotate the rod again. The complete rotation can lock the rod to the hook. In FIG. 49B(d), the pulling element is lifted up to move for approaching a new object for pick up.

Figures 50A, 50B:
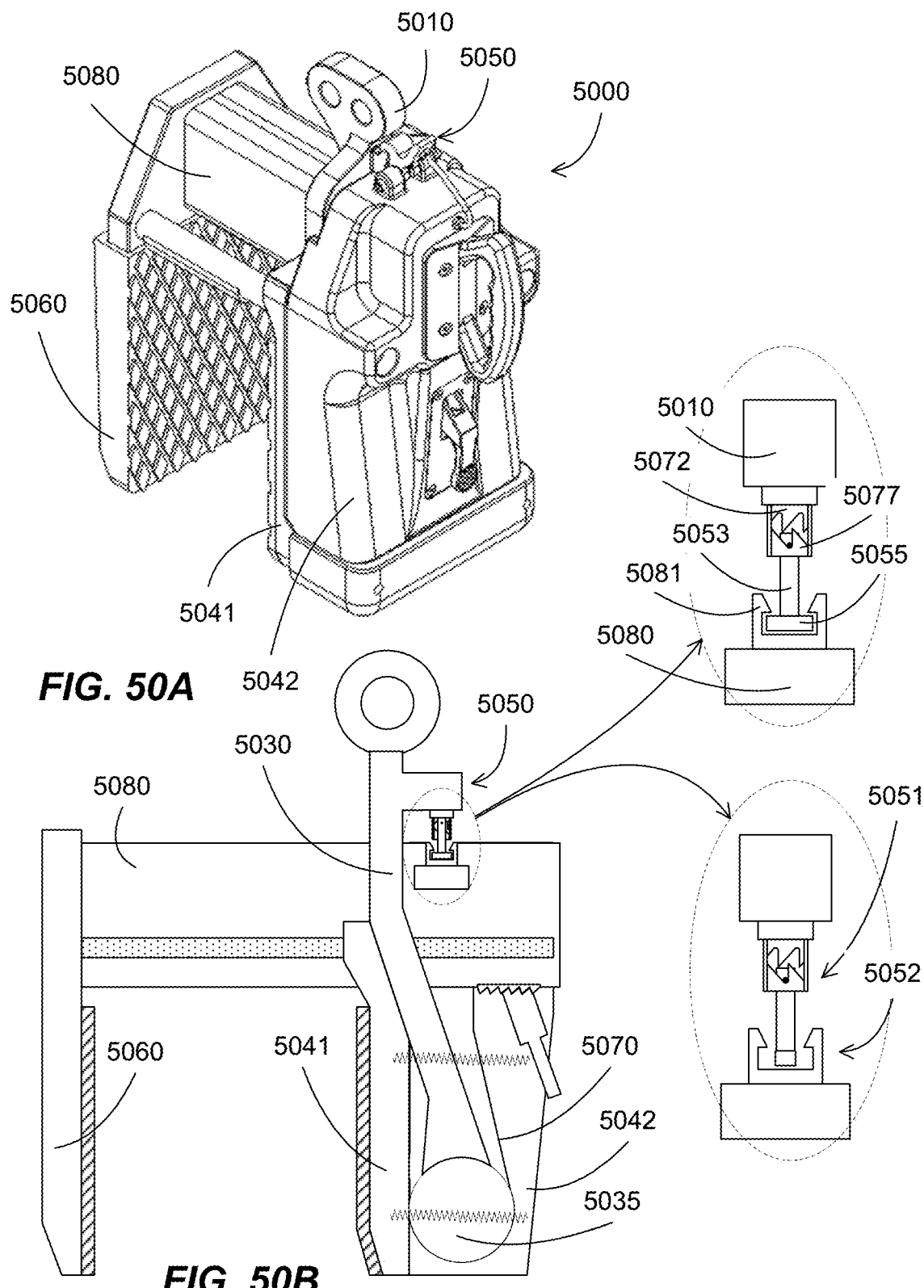
FIGS. 50A-50B illustrate a clamping device according to some embodiments.

FIGS. 50A-50B illustrate a clamping device according to some embodiments. The clamping device 5000 can use a slanting interface mechanism, e.g., a pulling element having a roller for rolling on a slanting surface of a jaw support. For example, the pulling element can be disposed between a jaw and a jaw support. When the pulling element rolls of the slanting surface of the jaw support, the jaw can move away from or toward the jaw support.

The clamping device 5000 can be configured for lifting heavy objects. The clamping device can include a first jaw 5060 coupled to a clamp bar 5080. The clamping device can include a second jaw assembly, which can be movably and lockably coupled to the clamp bar. The second jaw assembly can include a second jaw 5041 disposed opposite the first jaw. The second jaw assembly can include a jaw support 5042, which can slide along the clamp bar for movably coupled to the clamp bar. The second jaw assembly can be lockable to the clamp bar. The second jaw assembly can include stretchable elements, such as springs, which can be coupled to the second jaw and the jaw support, for pulling the second jaw toward the jaw support. The stretchable elements can allow the second jaw to move away from the jaw support, for a limited distance, such as a distance equal or smaller than a distance between the discrete locking locations of the discrete locking mechanism.

The clamping device can include a pulling element 5010, which can be configured to be pulled on for lifting the clamped object. The pulling element can freely move in an up direction. The pulling element can be configured to exert a clamping force on the object when being pulled, for example, by rolling through roller 5035 on slanting surface 5070 of the jaw support.

A locking mechanism 5050 can be included, for hand-free actuating the slanting interface mechanism. The locking mechanism can allow or prevent the engagement of the linkage mechanism between the pulling element and the jaw. When the locking mechanism is activated or locked, the linkage mechanism is prevented or disable, meaning pulling on the pulling element does not move the pulling element. When the locking mechanism is deactivated or unlocked, the linkage mechanism is allowed or enable, meaning pulling on the pulling element move the pulling element for moving the jaw toward the other jaw.

The locking mechanism can include a top part 5051, which can be locked to or release from the bottom part 5052. The top part 5051 can be secured to the pulling element 5010. The bottom part 5052 can be secured to the clamp bar 5080. The top part can include a movable rod having an elongated head, which can be locked to or released from a mated hook in the bottom part.

The automatic locking mechanism can be coupled to different portions of the clamping device, such as another automatic locking mechanism coupled to the roller 5035 and the jaw support body 5042.

The top part 5051 can include a rod 5053 having an elongated head 5055. The top part can include annular elements 5072 and 5076 having slanting surfaces, which can be mated with protruded pins on the rod. The annular elements and the protruded pins can be configured so that when the rod is pushed into and released out of the annular elements, the rod can rotate an angle such as 90 degrees, to toggle between longer side and shorter side, e.g., toggle between a lock status and an unlock status.

When the locking mechanism is engaged, meaning the top part is locked into the bottom part, the pulling element is fixedly coupled to the body of the clamping device. Thus the pulling element cannot move to activate the linkage mechanism, and the jaws are stationary when pulling on or lowering the pulling element.

When the locking mechanism is disengaged, meaning the top part is unlocked from the bottom part, the pulling element is separatable with respect to the body of the clamping device. Thus the pulling element can move to activate the linkage mechanism, and the jaws can move toward or away from each other when pulling on or lowering the pulling element, respectively.

FIGS. 51A-51F illustrate another clamping device configuration according to some embodiments. The clamping device 5100 can use a slanting interface mechanism, e.g., a pulling element 5110 having a roller for rolling on a slanting surface of a jaw support.

The clamping device can include a first jaw 5160 coupled to clamp bars 5180. The clamping device can include a second jaw assembly, which can be movably and lockably coupled to the clamp bar. The second jaw assembly can include a second jaw 5141 disposed opposite the first jaw. The second jaw assembly can include a jaw support 5142, which can slide along the clamp bars for movably coupled to the clamp bar. The second jaw 5141 can be movable relative to the jaw support 5142, such as a function of the pulling element positions.

A locking mechanism 5150 can be included, for hand-free actuating the slanting interface mechanism.

The locking mechanism can include a top part, which can be locked to or release from the bottom part. The bottom part can include a hook receptacle 5181, which can be secured to a stationary portion of the clamping device, such as to the body of the clamping device, for example, to the jaw support 5142.

The top part can include a shell 5185, which can be secured to a movable portion of clamping device, such as to the pulling element 5110. An annular element 5170 can be disposed inside the shell 5185, and can be secured to the shell, for example, by a set of nuts and bolts 5170A. The shell 5185 can have a support 5185A, such as a step, to support the annular element 5170, e.g., against a downward force acting on the annular element. The annular element 5170 can include teeth 5172 and 5177, disposed on two opposite sides. A movable rod 5153 with protruded pins can be disposed inside the annular element. The rod 5153 can have an elongated head 5155 for releasably mating with the hook receptacle 5181.

Figure 52A:
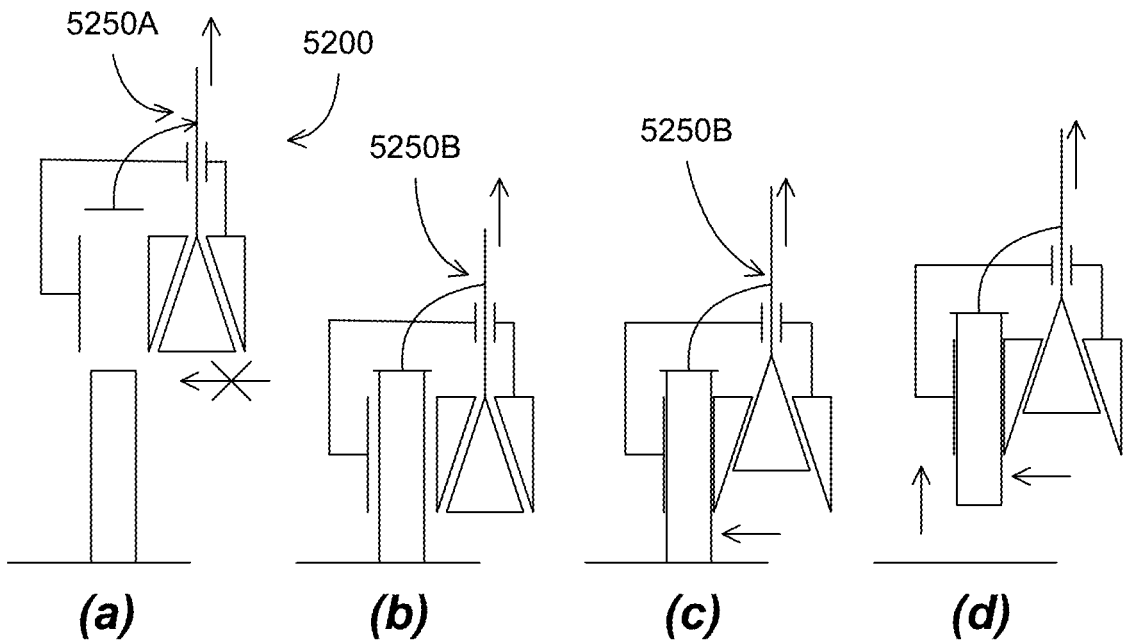
FIGS. 52A-52B illustrate processes for operating a clamping device according to some embodiments.
Figure 52B:
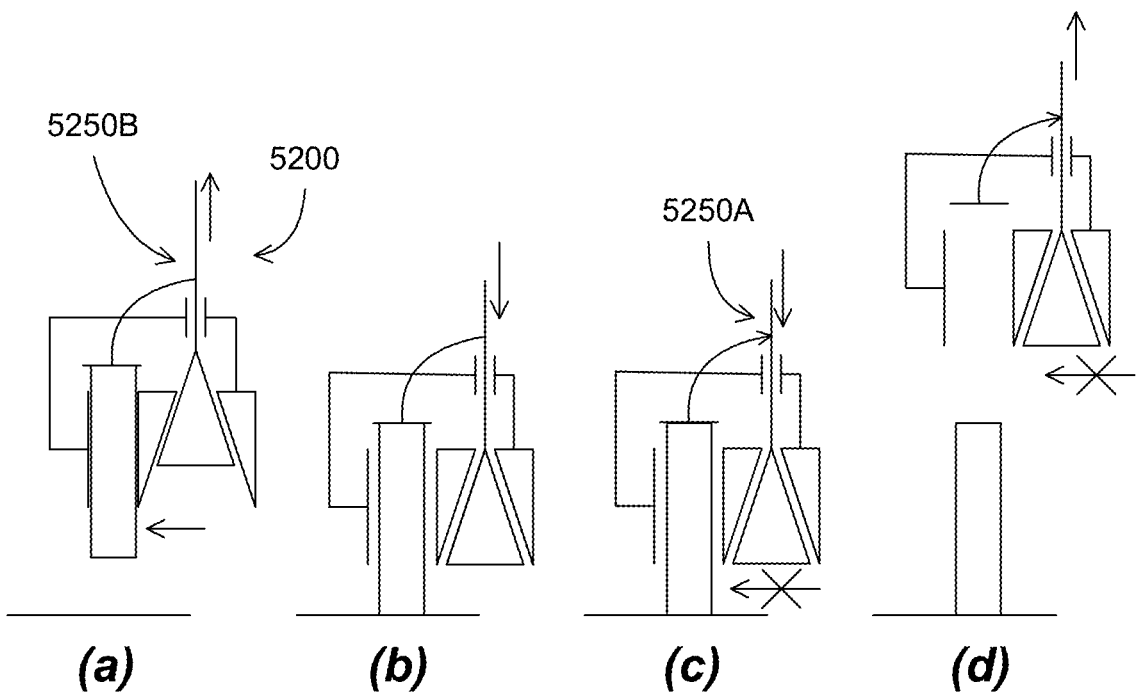

FIGS. 52A-52B illustrate processes for operating a clamping device according to some embodiments. The clamping device 5200 can include a locking mechanism that can automatically lock and release the jaws.

FIGS. 52A(a)-52A(d) show a process for an empty clamping device to pick an object. In FIG. 52A(a), the locking mechanism is engaged 5250A, securing the opening of the jaws. In FIG. 52A(b), the clamping device is moved to place an object between the jaws. A pulling element can then be further lowered, with respect to the body of the clamping device, to partially unlock the locking mechanism. For example, a rod in the locking mechanism can partially rotate.

In FIG. 52A(c), the pulling element is lifted up, and can partial rotate the rod again. The complete rotation can release the rod from a hook in the locking mechanism. The pulling element is then further lifted up to move the jaws for clamping on the object. In FIG. 52A(d), the lifting of the pulling element will also lift the object after the jaws clamp on the object.

FIGS. 52B(a)-52B(d) show a process for a clamping device clamping on an object to release the object at a destination.

In FIG. 52B(a), the locking mechanism is disengaged 5250B. In FIG. 52B(b), the clamping device moves to a destination, and lowers the object to the ground. The pulling element can be further lowered to increase the separation between the jaws. The pulling element can be lowered until the rod pressing on the hook, which can partially rotate the rod.

In FIG. 52B(c), the pulling element is lifted up, and can partial rotate the rod again. The complete rotation can lock the rod to the hook. In FIG. 52B(d), the pulling element is lifted up to move for approaching a new object for pick up.

FIGS. 53A-53D illustrate a clamping device according to some embodiments. A clamping device can include a first jaw assembly and a second jaw assembly disposed in substantially perpendicular with a clamp bar. The clamp bar can include multiple bars, which can be coupled to the first and second jaw assembly. The first jaw assembly can be fixedly coupled to the clamp bar. The second jaw assembly can also be fixedly coupled to the clamp bar. Alternatively, the second jaw assembly can be movably coupled to the clamp bar, such as moving along the clamp bar, and then secured to the clamp bar, for example, by a locking mechanism.

The clamping device can include a rotatable element, which can be coupled to a jaw assembly. For example, the jaw assembly can include a jaw facing a jaw support. The rotatable element can be disposed between the jaw and the jaw support, and can be rotatably coupled to a component of the jaw assembly, such as to the jaw. A pulling element can be coupled to the rotatable element to rotate the rotatable element in one direction. A return mechanism, such as a spiral spring assembly, can be used to rotate the rotatable element in an opposite direction.

An interface between the rotatable element and a component of the jaw assembly, such as the jaw support can include a slanting surface, which can be configured so that when the rotatable element is rotated in the direction caused by the pulling of the pulling element, the jaw is moving away from the jaw support if there is no obstacle blocking the movement of the jaw. If an object is already present between the jaws of the clamping device, the slanting surface can convert the action of pulling the pulling element to an action, e.g., a force, pushing on the jaw, to clamp on the object.

The slanting interface can include one or more spiral surfaces coupled to the rotatable element, and one or more rollers coupled to a component of the jaw assembly, such as to the jaw support.

FIG. 53A shows a perspective view of the clamping device. A clamping device 5300 can include a first jaw 5360 which is coupled to a clamp bar 5380. A rubber pad 5365 can be coupled to the first jaw to increase friction with clamped objects. A jaw assembly including a second jaw 5341 and a jaw support 5342 can be coupled to the clamp bar. A rubber pad 5345 can be coupled to the second jaw to increase friction with clamped objects.

A rotatable element 5330 can be disposed between the second jaw and the jaw support. The rotatable element can be rotatably coupled to the second jaw, and can have slanting interfaces with the jaw support. The rotatable element can have spiral surfaces, interfacing with rollers in the jaw support. The rollers can roll on the spiral or helical surfaces of the rotatable element.

A pulling element 5343 can have one end fixedly coupled to the rotatable element, and wrapped around the rotatable element. Thus, when the pulling element is pulled up, the rotatable element can rotate, which can rotate the spiral surfaces on the rollers, moving the rotatable element relative to the jaw support. The other end of the pulling element can include a coupled, such as a hook, for coupling with a hoist for moving the clamping device.

The clamping device can include other components, such as an automatic locking mechanism for enabling or disabling a linkage between the pulling element and the second jaw. For example, the automatic locking mechanism can allow or prevent the rotatable element from rotating, thus pulling on the pulling element can rotate or non-rotate the rotatable element.

FIG. 53B shows a cross section of a clamping device, which can include a first jaw 5360 fixedly coupled to a clamp bar 5380, such as a single bar or multiple connection bars. The first jaw can include a rubber pad 5365 to increase a friction with objects to be clamped. In some embodiments, the first jaw can be removably coupled to the clamp bar, together with a locking mechanism for securing the first jaw to the clamp bar. Alternatively, the first jaw can be a part of a first jaw assembly, which can also include a first jaw support. The first jaw of the first jaw support can be coupled to the clamp bar, such as fixedly coupled or removably coupled with a locking mechanism.

The clamping device can include a second jaw assembly, which can be movably and lockably coupled to the clamp bar. The second jaw assembly can include a second jaw 5341 disposed opposite the first jaw. The second jaw can include a rubber pad 5345 to increase a friction with objects to be clamped. The second jaw assembly can include a jaw support 5342, which can slide along the clamp bar for movably coupled to the clamp bar. As shown, the first jaw is fixedly coupled to the clamp bar, and the second jaw assembly is movably coupled to the clamp bar. Other configurations can be used, such as the first jaw is movably coupled to the clamp bar, and the second jaw assembly is fixedly coupled to the clamp bar. Alternatively, the first jaw and the second jaw assembly can both be movably coupled to the clamp bar. A jaw or a jaw assembly, if movably coupled to the clamp bar, can include a locking mechanism for securing the jaw or the jaw assembly to the clamp bar.

There can be flexible couplings between the second jaw and the jaw support. The flexible couplings can allow the second jaw to move in multiple directions with respect to the jaw support, such as down and away from the jaw support. The flexible couplings can include springs having two ends fixedly coupled to the second jaw 5341 and the jaw support 5342. The springs can bend and flex, allowing the second jaw to move relative to the jaw support.

The clamping device can include a pulling element 5343, which can be configured to be pulled on for lifting the clamped object. The pulling element can be coupled to a rotatable element 5330, which is disposed between the second jaw and the jaw support. The pulling element can also be disposed between the clamp bar, e.g., between the multiple connection bars. The pulling element can freely move in an up direction. In the down direction, a spring set can be used to pull the pulling element toward the rotatable element.

The rotatable element can be configured to exert a clamping force on the object when rotating, for example, through a slanting surface on the rotatable element. For example, the jaw support can include a set of rollers, which can provide rolling friction with the slanting surface of the rotatable element. Thus there can be minimum friction when the rotatable element is rotating, pushing the second jaw away from the jaw support due to the slanting surface.

The clamping device can include a locking mechanism 5350A, which can be coupled to either the clamp bar or to the second jaw assembly to prevent the rotatable element from being rotated. The rotatable element can be constrained from rotating, thus the second locking mechanism, when engaged, can secure the rotatable element to the second jaw. The rotatable element can be locked to a position of maximum jaw opening, which can provide that the second jaw is closest to the jaw support.

In operation, the locking mechanism, e.g., the locking mechanism that locks the second jaw assembly to the clamp bar, can be unlocked, for example, by pulling back a second mated component to disengage the second mated component 5372 from a first mated component. This will release the second jaw assembly from the clamp bar, and thus the second jaw assembly can slide along the clamp bar so that the distance between the two jaws can be large enough to accommodate the object.

After putting the object within the first and second jaw, the locking mechanism can be engaged, e.g., the second mated component can be pushed up to engage with the first mated component, locking the second jaw assembly to the clamp bar. If the locking mechanism is a discrete locking mechanism, there can be gaps between the object and the jaws.

This process can be optional. In some embodiments, the second jaw assembly can be secured to the clamp bar, and the clamping device can be configured to handle objects having a range of thicknesses, determined by the movements of the second jaw.

Next, the locking mechanism 5350A can be unlocked, so the pulling element can be pulled up. Due to the rollers, the rotatable element can easily rotate against the jaw support. The second jaw can move away from the jaw support, until the second jaw is in contact with the object. If there is a gap between the object and the first jaw, the second jaw can keep moving to narrow that gap. The second jaw then continue to move until the first and second jaws all contact the object.

FIGS. 53C-53D show internal views of the rotatable clamping device. A clamping device can include a first jaw 5360 facing a second jaw 5341. A rotatable element 5330 can be rotatably coupled to the second jaw, for example, through ball bearings. A pulling element 5343 can be coupled to the rotatable element, and can rotate the rotatable element, when pulled, in one direction, such as counter-clockwise as shown. Spring assembly 5335 can be coupled between the rotatable element and the second jaw to rotate the rotatable element in an opposite direction, for example, when the pulling element is not pulled or released.

The rotatable element can include slanting surface, such as spiral or helical surfaces 5371, which can change a distance between the rotatable element and a jaw support (not shown). An automatic locking mechanism 5350B or 5350C can be coupled to the rotatable element at different locations. The automatic locking mechanism can be fixedly coupled to the second jaw, and can function to allow or to prevent the rotatable element from rotating.

A pulling element 5343 can be coupled to a rotatable element 5330. For example, one end of the pulling element can be fixedly coupled to the rotatable element. Thus, when the pulling element is pulled up, the rotatable element can rotate, such as in a clockwise direction as shown. A spring assembly 5335 can be used to rotate the rotatable element in an opposite direction, when the pulling element is relaxed.

A limiter can be used to limit the amount of rotation. For example, as shown, the rotatable element can rotate at most about 180 degrees. Rollers can be included to reduce friction between the rotatable element and a jaw support (not shown). The rotatable element can include slanting surface, such as spiral or helical surfaces 5371. There can be 2 spiral or helical surfaces, thus the rotatable element can obtain a maximum separation with the jaw support when rotating about 180 degrees.

Figure 54A:
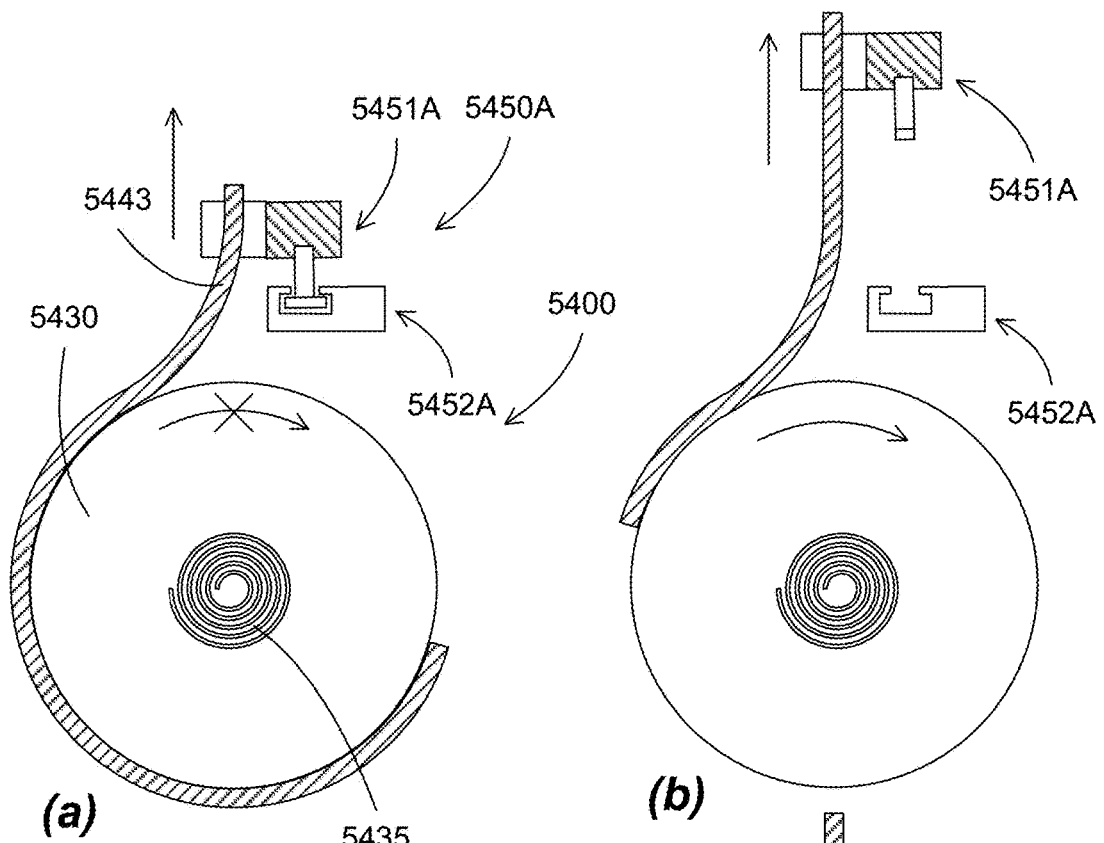
FIGS. 54A-54B illustrate locking mechanisms for a clamping device according to some embodiments.
Figure 54B:
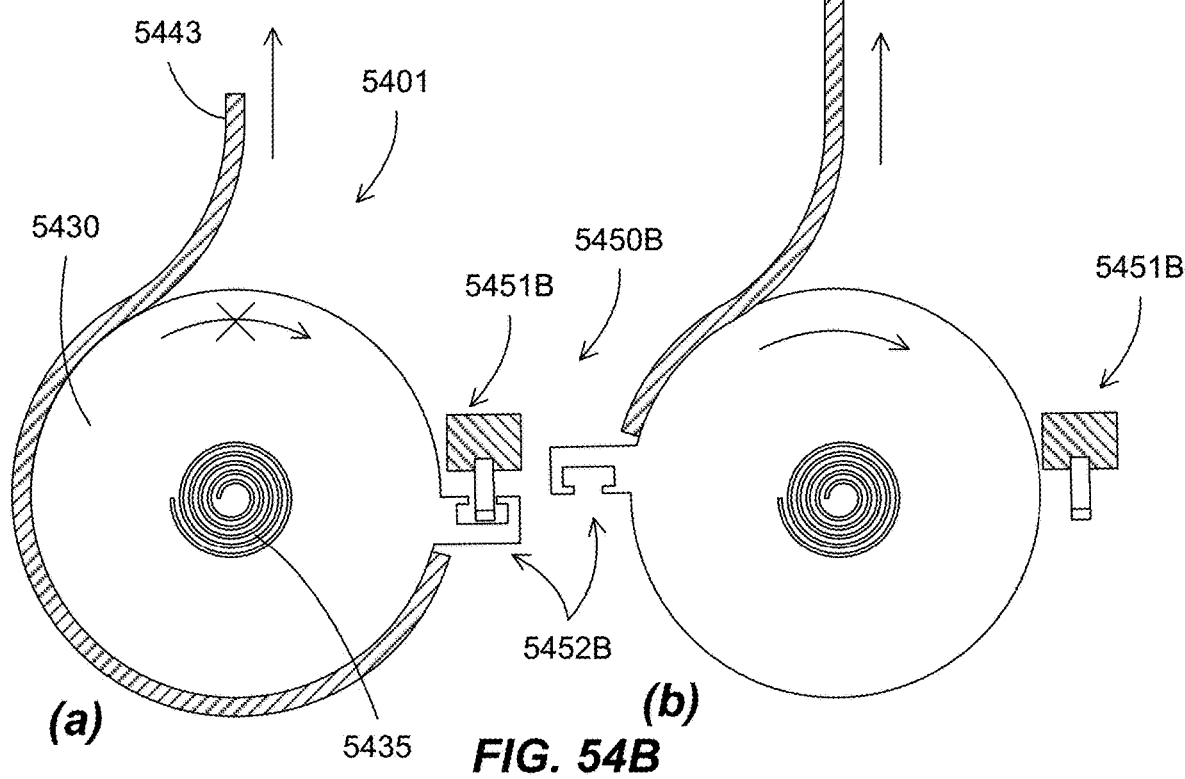

FIGS. 54A-54B illustrate locking mechanisms for a clamping device according to some embodiments. A clamping device can use a slanting interface mechanism, such as a rotatable element having spiral or helical surfaces coupling with rollers of a jaw support. For example, the rotatable element can be disposed between a jaw and a jaw support. When the rotatable element rotates, the rollers can roll on the spiral or helical surfaces of the rotatable element to push the jaw away from or pull the jaw toward the jaw support.

A pulling element can be coupled to the rotatable element for rotating the rotatable element. When the pulling element is pulled up, the rotatable element can rotate, and the second jaw can move toward the first jaw for clamping on an object. When the pulling element is released, e.g., not pulling up, a return mechanism such as a spiral spring can rotate the rotatable element in an opposite direction, which can move the second jaw away from the first jaw.

A locking mechanism can be included, for hand-free actuating the slanting interface mechanism. The locking mechanism can allow or prevent the rotation of the rotatable element.

FIGS. 54A(a) and 54A(b) show locked and unlocked states for a locking mechanism of a clamping device 5400 employing a rotatable mechanism. A top part 5451A of a locking mechanism 5450A is coupled to the pulling element, such as coupled to a flexible element 5443 (e.g., a rope, a belt, or a chain) which is configured to rotate a rotatable element 5430 (e.g., a disk or a round plate). A bottom part 5452A of the locking mechanism 5450A is coupled to a body of the clamping device.

When the top part is locked with the bottom part (FIG. 54A(a)), the pulling element 5443 is coupled with the body of the clamping device. Thus the pulling element cannot move up freely, e.g., the pulling element can be fixedly coupled to the body (except maybe a small backlash distance caused by the operation of the locking mechanism). The fixed pulling element can stop the rotatable element from rotating, and the jaws are fixed in position, e.g., the jaws are not movable toward each other for clamping.

When the top part is unlocked with the bottom part (FIG. 54A(b)), the pulling element 5443 is free to move with respect to the body of the clamping device. Thus the top part can move away from the bottom part. The rotatable element can rotate in one direction when the pulling element is pulled up. The rotation of the rotatable element in this direction can cause the jaws to move toward each other, for clamping on an object. The rotatable element can rotate in an opposite direction when the pulling element is released, due to the presence of a spring configuration 5435. The rotation of the rotatable element in this opposite direction can cause the jaws to move away from each other, for releasing the object.

The locking mechanism can be automatically toggled due to a set of vertical movements, which can include a lowering movement of the pulling element, followed by a raising movement of the pulling element. The set of vertical movements can rotate a rod having a hook end, which can be toggled between hooked and unhooked to a mating hook receptacle.

FIGS. 54B(a) and 54A(b) show locked and unlocked states for another locking mechanism of a clamping device 5401 employing a rotatable mechanism. A top part 5451B of a locking mechanism 5450B is coupled to a body of the clamping device. A bottom part 5452B of the locking mechanism 5450B is coupled to the rotatable element 5430 (e.g., a disk or a round plate).

When the top part is locked with the bottom part (FIG. 54B(a)), the rotatable element 5430 is coupled with the body of the clamping device. Thus the rotatable element cannot rotate freely, e.g., the rotatable element can be fixedly coupled to the body (except maybe a small backlash distance caused by the operation of the locking mechanism). The fixed rotatable element can stop the jaws from moving, e.g., the jaws are not movable toward each other for clamping.

When the top part is unlocked with the bottom part (FIG. 54B(b)), the rotatable element 5430 is free to move with respect to the body of the clamping device. Thus the top part can move away from the bottom part. The rotatable element can rotate in one direction when the pulling element is pulled up. The rotation of the rotatable element in this direction can cause the jaws to move toward each other, for clamping on an object. The rotatable element can rotate in an opposite direction when the pulling element is released, due to the presence of a spring configuration 5435. The rotation of the rotatable element in this opposite direction can cause the jaws to move away from each other, for releasing the object.

The locking mechanism can be automatically toggled due to a set of vertical movements, which can include a lowering movement of the pulling element, followed by a raising movement of the pulling element. The set of vertical movements can rotate a rod having a hook end, which can be toggled between hooked and unhooked to a mating hook receptacle.

What is claimed is:

1. An automatic locking mechanism for a clamping device comprising a rotatable element rotatably coupled to a body, the automatic locking mechanism comprising
    a lockable element; and
    a receptacle configured to be mated to the lockable element,
    wherein one selected from a group consisting of the lockable element and the receptacle is coupled to the rotatable element, and the other selected from the group consisting of the lockable element and the receptacle is coupled to the body,
    wherein the lockable element and the receptacle are configured to toggle the rotatable element of the clamping device by rotating the rotatable element in a first direction, followed by rotating the rotatable element in a second direction opposite the first direction,
    wherein the toggling process toggles the rotatable element between a rotatable configuration and a non-rotatable configuration,
    wherein in the rotatable configuration, the rotatable element is configured for further rotating in the second direction,
    wherein in the non-rotatable configuration, the rotatable element configured for not rotating in the second direction,
    wherein the receptacle comprises a zigzag path formed on a surface of the rotatable element,
    wherein the lockable element comprises a rod element configured to fit in the zigzag path.

2. An automatic locking mechanism as in claim 1 further comprising
    a spring mechanism to bias the lockable element in a direction from a first abrupt turn of the zigzag path toward a second abrupt turn of the zigzag path.

3. An automatic locking mechanism as in claim 1 further comprising
    a one way valve coupled to a first end of the zigzag path to allow the lockable element to exit the zigzag path and to prevent the lockable element from entering the zigzag path at the first end.

4. An automatic locking mechanism as in claim 1,
    wherein the rod element is coupled to the body,
    wherein the zigzag path comprises an entrance and an exit, wherein the zigzag path comprises a first abrupt turn nearer the entrance and a second abrupt turn nearer the exit,
wherein the zigzag path is configured so that when the entrance is in a vicinity of the lockable element and the rotatable element rotates in the first direction, the entrance rotates past the lockable element,
wherein when the entrance is past the lockable element in the first direction and the rotatable element rotates in the second direction, the zigzag path rotates to accept the lockable element into the entrance and stops at the first abrupt turn,
wherein when the lockable element is at the first abrupt turn, the rotatable element is prevented from rotating in the second direction,
wherein the zigzag path is configured so that when the lockable element is at the first abrupt turn and the rotatable element rotates in the first direction, the zigzag path rotates to guide the lockable element toward the second abrupt turn,
wherein when the lockable element is at the second abrupt turn and the rotatable element rotates in the second direction, the zigzag path rotates to guide the lockable element toward the exit,
wherein when the lockable element is at the exit, the rotatable element is configured for further rotating in the second direction.

5. An automatic locking mechanism as in claim 1,
wherein the zigzag path comprises an entrance and an exit,
wherein the zigzag path comprises a first abrupt turn nearer the entrance and a second abrupt turn nearer the exit,
wherein the zigzag path is configured so that when the lockable element is in a vicinity of the entrance and the rotatable element rotates in the first direction, the lockable element rotates past the entrance,
wherein when the lockable element is past the entrance in the first direction and the rotatable element rotates in the second direction, the lockable element rotates to enter into the entrance of the zigzag path and stops at the first abrupt turn,
wherein when the lockable element is at the first abrupt turn, the rotatable element is prevented from rotating in the second direction,
wherein the zigzag path is configured so that when the lockable element is at the first abrupt turn and the rotatable element rotates in the first direction, the lockable element rotates to move toward the second abrupt turn,
wherein when the lockable element is at the second abrupt turn and the rotatable element rotates in the second direction, the lockable element rotates to move toward the exit,
wherein when the lockable element is at the exit, the rotatable element is configured for further rotating in the second direction.

6. A clamping device comprising
a first jaw;
a second jaw facing the first jaw;
a first mechanism coupled to the second jaw,
wherein the first mechanism comprises a rotatable element configured to be rotatable around a center of rotation,
wherein the first mechanism is configured for moving the second jaw toward the first jaw when the rotatable element rotates in a first direction,
wherein the first mechanism is configured for moving the second jaw away from the first jaw when the rotatable element rotates in a second direction opposite to the first direction;
a cable,
wherein the cable comprises a first end,
wherein the cable comprises a second end coupled to the first mechanism,
wherein the cable is configured to rotate the rotatable element when the first end moves relative to the center of rotation;
a second mechanism coupled to the first mechanism,
wherein the second mechanism comprises a lockable element and a receptacle configured to be mated to the lockable element,
wherein one selected from a group consisting of the lockable element and the receptacle is coupled to the rotatable element,
wherein the lockable element and the receptacle are configured to toggle the rotatable element of the clamping device by rotating the rotatable element in a first direction, followed by rotating the rotatable element in a second direction opposite the first direction,
wherein the toggling process toggles the rotatable element between a rotatable configuration and a non-rotatable configuration,
wherein in the rotatable configuration, the rotatable element is configured for further rotating in the second direction,
wherein in the non-rotatable configuration, the rotatable element is configured for not rotating in the second direction.

7. A clamping device as in claim 6
wherein the receptacle comprises a zigzag path formed on a surface of the rotatable element,
wherein the lockable element comprises a pin element configured to fit in the zigzag path.

8. A clamping device as in claim 6 further comprising
wherein the receptacle comprises a zigzag path formed on a surface of h rotatable element,
a spring mechanism to bias the lockable element in a direction from a first abrupt turn of the zigzag path toward a second abrupt turn of the zigzag path.

9. A clamping device as in claim 6 further comprising
wherein the receptacle comprises a zigzag path formed on a surface of the rotatable element,
a one way valve coupled to a first end of the zigzag path to allow the lockable element to exit the zigzag path and to prevent the lockable element from entering the zigzag path at the first end.

10. A clamping device as in claim 6
wherein the receptacle comprises a zigzag path coupled to the rotatable element,
wherein the lockable element comprises a pin element configured to fit in the zigzag path,
wherein the pin element is coupled to the second jaw,
wherein the zigzag path comprises an entrance and an exit,
wherein the zigzag path comprises a first abrupt turn nearer the entrance and a second abrupt turn in an opposite direction nearer the exit,
wherein the zigzag path is configured so that when the entrance is in a vicinity of the lockable element and the rotatable element rotates in the first direction, the entrance rotates past the lockable element,
wherein when the entrance is past the lockable element in the first direction and the rotatable element rotates in the second direction, the zigzag path rotates to accept the lockable element into the entrance and stops at the first abrupt turn, wherein when the lockable element is at the first abrupt turn, the rotatable element is prevented from rotating in the second direction, wherein the zigzag path is configured so that when the lockable element is at the first abrupt turn and the rotatable element rotates in the first direction, the zigzag path rotates to guide the lockable element toward the second abrupt turn, wherein when the lockable element is at the second abrupt turn and the rotatable element rotates in the second direction, the zigzag path rotates to guide the lockable element toward the exit, wherein when the lockable element is at the exit, the rotatable element is configured for further rotating in the second direction.

11. A clamping device as in claim 6
wherein the receptacle comprises a zigzag path coupled to the second jaw,
wherein the lockable element comprises a pin element configured to fit in the zigzag path,
wherein the pin element is coupled to the rotatable element,
wherein the zigzag path comprises an entrance and an exit,
wherein the zigzag path comprises a first abrupt turn nearer the entrance and a second abrupt turn in an opposite direction nearer the exit,
wherein the zigzag path is configured so that when the entrance is in a vicinity of the lockable element and the rotatable element rotates in the first direction, the entrance rotates past the lockable element,
wherein the zigzag path is configured so that when the lockable element is in a vicinity of the entrance and the rotatable element rotates in the first direction, the lockable element rotates past the entrance,
wherein when the lockable element is past the entrance in the first direction and the rotatable element rotates in the second direction, the lockable element rotates to enter into the entrance of the zigzag path and stops at the first abrupt turn,
wherein when the lockable element is at the first abrupt turn, the rotatable element is prevented from rotating in the second direction,
wherein the zigzag path is configured so that when the lockable element is at the first abrupt turn and the rotatable element rotates in the first direction, the lockable element rotates to move toward the second abrupt turn,
wherein when the lockable element is at the second abrupt turn and the rotatable element rotates in the second direction, the lockable element rotates to move toward the exit,
wherein when the lockable element is at the exit, the rotatable element is configured for further rotating in the second direction.

12. A clamping device as in claim 6
wherein the receptacle comprises a hookable element coupled to the rotatable element,
wherein the lockable element comprises a rod element comprising an elongated head,
wherein the elongated head is configured to be coupled to the hookable element when the lockable element is at a first rotation,
wherein the elongated head is configured to be decouplable from the hookable element when the lockable element is at a second rotation,
wherein the rod element comprises one or more pins,
wherein at least one of the one or more pins is configured to face at least one of two opposite facing slanting surfaces,
wherein the two slanting surfaces are coupled to the second jaw,
wherein the one or more pins and the two slanting surfaces are configured to rotate the rod element when the one or more pins contact the slanting surfaces,
wherein the receptacle, the rod element, and the two slanting surfaces are configured so that when the receptacle is in a vicinity of the rod element and the two slanting surfaces, and when the rotatable element rotates in the first direction, the receptacle pushes into the rod element to cause the rod element to rotate a first turn to partially couple the elongated head with the hookable element,
wherein when the rotatable element rotates in the second direction, the receptacle pulls away from the rod element to cause the rod element to rotate a second turn to fully couple the elongated head with the hookable element,
wherein when the rod element is fully coupled with the hookable element, the rotatable element is prevented from rotating in the second direction,
wherein the receptacle, the rod element, and the two slanting surfaces are configured so that when the rod element is fully coupled with receptacle, and the rotatable element rotates in the first direction, the receptacle pushes into the rod element to cause the rod element to rotate a third turn to partially couple the elongated head with the hookable element,
wherein when the rotatable element rotates in the second direction, the receptacle pulls away from the rod element to cause the rod element to rotate a fourth turn to fully decouple the elongated head from the hookable element
wherein when the rod element is fully decoupled with the hookable element, the rotatable element is configured for further rotating in the second direction.

13. A clamping device as in claim 6
wherein the receptacle comprises a hookable element coupled to the second jaw,
wherein the lockable element comprises a rod element comprising an elongated head,
wherein the elongated head is configured to be coupled to the hookable element when the lockable element is at a first rotation,
wherein the elongated head is configured to be decouplable from the hookable element when the lockable element is at a second rotation,
wherein the rod element comprises one or more pins,
wherein at least one of the one or more pins is configured to face at east one of two opposite facing slanting surfaces,
wherein the two slanting surfaces are coupled to the rotatable element,
wherein the one or more pins and the two slanting surfaces are configured to rotate the rod element when the one or more pins contact the slanting surfaces,
wherein the receptacle, the rod element, and the two slanting surfaces are configured so that when the receptacle is in a vicinity of the rod element and the two slanting surfaces, and when the rotatable element rotates in the first direction, the rod element pushes into the receptacle to cause the rod element to rotate a first turn to partially couple the elongated head with the hookable element, wherein when the rotatable element rotates in the second direction, the rod element pulls away from the receptacle to cause the rod element to rotate a second turn to fully couple the elongated head with the hookable element, wherein when the rod element is fully coupled with the hookable element, the rotatable element is prevented from rotating in the second direction, wherein the receptacle, the rod element, and the two slanting surfaces are configured so that when the rod element is fully coupled with receptacle, and the rotatable element rotates in the first direction, the rod element pushes into the receptacle to cause the rod element to rotate a third turn to partially couple the elongated head with the hookable element, wherein when the rotatable element rotates in the second direction, the rod element pulls away from the receptacle to cause the rod element to rotate a fourth turn to fully decouple the elongated head from the hookable element wherein when the rod element is fully decoupled with the hookable element, the rotatable element is configured for further rotating in the second direction.

14. A clamping device as in claim 6
wherein the rotatable element comprises a slanting surface,
wherein the slanting surface is configured to interface with the second jaw so that when the rotatable element rotates in the first direction, the second jaw is pushed toward the first jaw.

15. A clamping device as in claim 6 further comprising
a spring mechanism coupled to the rotatable element, wherein the spring mechanism is configured to rotate the rotatable element in the second direction.

16. A clamping device as in claim 6
wherein the cable is configured to rotate the rotatable element in the first direction when the first end of the cable is pulled away from the center of rotation.

17. A method for automatic clamping of a clamping device,
wherein the clamping device comprises two jaws configured to clamp on an object,
wherein the clamping device comprises a rotatable element coupled to a jaw of the two jaws for moving the jaw toward or away from the other jaw,
wherein the clamping device comprises a cable with one end coupled to the rotatable element,
wherein the clamping device comprises an automatic locking mechanism configured to toggle the rotatable element between a rotatable configuration and a non-rotatable configuration,
wherein in the rotatable configuration, the rotatable element is free to rotate,
wherein in the non-rotatable configuration, the rotatable element is prevented from moving in a first direction to move the jaw toward the other jaw,
the method comprising
lowering the cable to a ground, wherein the clamping device clamps on an object,
after the object touches the ground, lowering the cable further until the automatic locking mechanism coupled to the clamping device is partially activated, wherein a spring mechanism coupled to the rotatable element acts to rotate the rotatable element in a second direction opposite to the first direction to separate the two jaws to loosen a grip on the object,
raising the cable up to rotate the rotatable element in the first direction to complete the activation of the automatic locking mechanism, wherein the activation of the automatic locking mechanism prevents the rotatable element from rotating further in the first direction,
continuing raising the cable up to raise the clamping device, wherein the jaws of the clamping device remain open due to the non-rotatable configuration of the rotatable element, leaving the object on the ground,
moving the clamping device to approach a second object,
lowering the cable to place the second object between the two jaws,
after the clamping device contacts the second object, lowering the cable further to rotate the rotatable element in the second direction until the automatic locking mechanism is partially activated,
raising the cable up to rotate the rotatable element in the first direction to complete the activation of the automatic locking mechanism, wherein the activation of the automatic locking mechanism toggles the rotatable element from the non-rotatable configuration to the rotatable configuration,
continuing raising the cable up to rotate the rotatable element in the first direction to clamp on the second object,
moving the clamping device while the clamping device clamps on the second object to a destination.

* * * * *